United States Patent
Howard et al.

(10) Patent No.: US 12,458,640 B2
(45) Date of Patent: Nov. 4, 2025

(54) PYRAZOLO[3,4-B]PYRAZINE SHP2 PHOSPHATASE INHIBITORS

(71) Applicants: OTSUKA PHARMACEUTICAL CO., LTD., Tokyo (JP); TAIHO PHARMACEUTICAL CO., LTD., Tokyo (JP)

(72) Inventors: Steven Howard, Cambridge (GB); John Walter Liebeschuetz, Cambridge (GB); Tadashi Shimamura, Tsukuba (JP)

(73) Assignees: OTSUKA PHARMACEUTICAL CO., LTD., Tokyo (JP); TAIHO PHARMACEUTICAL CO., LTD., Tokyo (JP)

( * ) Notice: Subject to any disclaimer, the term of this patent is extended or adjusted under 35 U.S.C. 154(b) by 802 days.

(21) Appl. No.: 17/753,048

(22) PCT Filed: Aug. 20, 2020

(86) PCT No.: PCT/IB2020/057815
§ 371 (c)(1),
(2) Date: Feb. 16, 2022

(87) PCT Pub. No.: WO2021/033153
PCT Pub. Date: Feb. 25, 2021

(65) Prior Publication Data
US 2023/0049719 A1    Feb. 16, 2023

(30) Foreign Application Priority Data
Aug. 20, 2019 (GB) .................... 1911928

(51) Int. Cl.
| | | |
|---|---|---|
| A61K 31/4985 | (2006.01) | |
| A61K 9/00 | (2006.01) | |
| A61K 9/19 | (2006.01) | |
| A61K 9/20 | (2006.01) | |
| A61K 9/48 | (2006.01) | |
| A61K 45/06 | (2006.01) | |
| A61K 47/10 | (2017.01) | |
| A61K 47/26 | (2006.01) | |
| A61P 35/00 | (2006.01) | |
| C07D 487/04 | (2006.01) | |
| C07D 519/00 | (2006.01) | |

(52) U.S. Cl.
CPC ........ *A61K 31/4985* (2013.01); *A61K 9/0019* (2013.01); *A61K 9/19* (2013.01); *A61K 9/2013* (2013.01); *A61K 9/2018* (2013.01); *A61K 9/4825* (2013.01); *A61K 45/06* (2013.01); *A61K 47/10* (2013.01); *A61K 47/26* (2013.01); *A61P 35/00* (2018.01); *C07D 487/04* (2013.01); *C07D 519/00* (2013.01)

(58) Field of Classification Search
CPC .............. A61K 31/498; A61K 31/4985; A61K 9/0019; A61K 9/19; A61K 9/2013; A61K 9/2018; A61K 9/4825; A61K 45/06; A61K 47/10; A61K 47/26; A61P 35/00; C07D 487/04; C07D 519/00
See application file for complete search history.

(56) References Cited

U.S. PATENT DOCUMENTS

| | | | |
|---|---|---|---|
| 10,954,243 B2 * | 3/2021 | Jones | ....................... A61K 45/06 |
| 11,466,016 B2 | 10/2022 | Johnson et al. | |

(Continued)

FOREIGN PATENT DOCUMENTS

| | | |
|---|---|---|
| CL | 202100843 | 4/2021 |
| CL | 202200404 | 2/2022 |

(Continued)

OTHER PUBLICATIONS

Bagdanoff et al. "Optimization of fused bicyclic allosteric SHP2 inhibitors." Journal of medicinal chemistry 62, No. 4 (2019): 1781-1792 (Year: 2019).*

(Continued)

*Primary Examiner* — James H Alstrum-Acevedo
*Assistant Examiner* — Carolyn L. Ladd
(74) *Attorney, Agent, or Firm* — HESLIN ROTHENBERG FARLEY & MESITI P.C.

(57) ABSTRACT

The invention provides new pyrazine derivatives of formula (I):

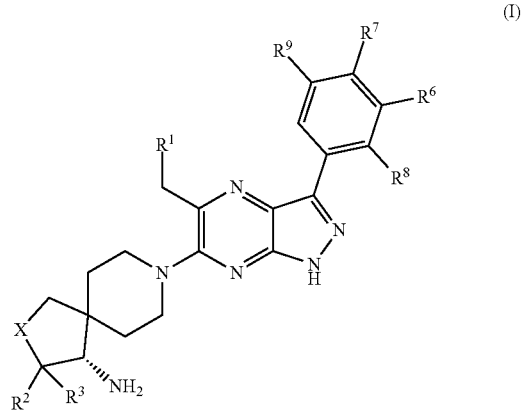

or a tautomer or a solvate or a pharmaceutically acceptable salt thereof, wherein the substituents are as defined herein. The invention also provides pharmaceutical compositions comprising said compounds and to the use of said compounds in the treatment of diseases, e.g. cancer.

33 Claims, No Drawings

(56) References Cited

U.S. PATENT DOCUMENTS

| | | |
|---|---|---|
| 12,037,345 B2 | 7/2024 | Shimamura et al. |
| 2019/0343836 A1 | 11/2019 | Alghalandis et al. |
| 2021/0107908 A1 | 4/2021 | Johnson et al. |
| 2022/0363693 A1 | 11/2022 | Shimamura et al. |
| 2023/0146795 A1 | 5/2023 | Hoshino et al. |

FOREIGN PATENT DOCUMENTS

| | | | |
|---|---|---|---|
| CN | 102311447 B | 11/2013 | |
| JP | 2019-517487 A | 6/2019 | |
| JP | 2019-521181 A | 7/2019 | |
| JP | 2021/506776 A | 2/2021 | |
| JP | 2021/514962 A | 6/2021 | |
| JP | 2021-518441 A | 8/2021 | |
| JP | 7326305 B2 | 8/2023 | |
| MX | 2020011528 A | 2/2021 | |
| RU | 2635917 C2 | 11/2017 | |
| TW | 201808931 A | 3/2018 | |
| TW | 201840553 A | 11/2018 | |
| TW | 201925186 A | 7/2019 | |
| TW | 202003471 A | 1/2020 | |
| WO | 2005/099688 A2 | 10/2005 | |
| WO | 2006/058074 A1 | 6/2006 | |
| WO | 2009/032653 A1 | 3/2009 | |
| WO | 2010121212 A2 | 10/2010 | |
| WO | 2013/063214 A1 | 5/2013 | |
| WO | 2015/107493 A1 | 7/2015 | |
| WO | 2015/107494 A1 | 7/2015 | |
| WO | 2015/107495 A1 | 7/2015 | |
| WO | 2016/203404 A1 | 12/2016 | |
| WO | 2016/203405 A1 | 12/2016 | |
| WO | 2016/203406 A1 | 12/2016 | |
| WO | 2016/208595 A1 | 12/2016 | |
| WO | 2017/156397 A1 | 9/2017 | |
| WO | 2017/210134 A1 | 12/2017 | |
| WO | 2017/211303 A1 | 12/2017 | |
| WO | 2017/216706 A1 | 12/2017 | |
| WO | 2018/057884 A1 | 3/2018 | |
| WO | 2018/081091 A1 | 5/2018 | |
| WO | 2018/130928 A1 | 7/2018 | |
| WO | 2018/193410 A1 | 10/2018 | |
| WO | 2018/218133 A1 | 11/2018 | |
| WO | 2019/051084 A1 | 3/2019 | |
| WO | 2019/165073 A1 | 8/2019 | |
| WO | 2019/182960 A1 | 9/2019 | |
| WO | WO-2019183364 A1 * | 9/2019 | ......... A61K 31/4985 |
| WO | 2019/213318 A1 | 11/2019 | |
| WO | 2020/022323 A1 | 1/2020 | |
| WO | 2020/065452 A1 | 4/2020 | |
| WO | 2020/065453 A1 | 4/2020 | |
| WO | 2021/033153 A1 | 2/2021 | |
| WO | 2021/149817 A1 | 7/2021 | |

OTHER PUBLICATIONS

Garcia Fortanet et al. "Allosteric inhibition of SHP2: identification of a potent, selective, and orally efficacious phosphatase inhibitor." Journal of medicinal chemistry 59, No. 17 (2016): 7773-7782 (Year: 2016).*

International Search Report and Written Opinion of the International Searching Authority for International Application No. PCT/IB2020/057815 mailed on Oct. 16, 2020.

J R Riggs et al. The Discovery of a Dual TTK Protein Kinase/CDC-2 Like Kinase (CLK2) Inhibitor for the Treatment of Triple Negative Breast Cancer Initiated from a Phenotypic Screen, Journal of Medicinal Chemistry, 2017, vol. 60, No. 21, pp. 8989-9002.

Bagdanoff, et al., "Optimization of Fused Bicyclic Allosteric SHP2 Inhibitors," J. Med. Chem. 2019, 62, 1781-1792.

Chen, et al., "Allosteric Inhibition of SHP2 Phosphatase Inhibits Cancers Driven by Receptor Tyrosine Kinases," Nature, vol. 535, Jul. 7, 2016, 148-152.

Yuan, et al., "Recent Advances of SHP2 Inhibitors in Cancer Therapy: Current Development and Clinical Application," J. Med. Chem. 2020, 63, 11368-11396.

Lamarche, et al., "Identification of TNO155, an Allosteric SHP2 Inhibitor for the Treatment of Cancer," J. Med. Chem. 2020, 63, 13578-13594.

Nichols, et al., "RAS Nucleotide Cycling Underlies the SHP2 Phosphatase Dependence of Mutant BRAF-NF1- and RAS-Driven Cancers," Nature Cell Biology, 2018, 20, 1064-1073.

Caira, Mino R., "Crystalline Polymorphism of Organic Compounds", Springer, Berlin, 198, 1998, 163-208.

Search Report for PCT/IB2020/057815 mailed on Oct. 16, 2020.

Search Report for GB1911928.8 mailed on Jan. 11, 2021.

Bagdanoff, Jeffrey et al., "Optimization of Fused Bicyclic Allosteric SHP2 Inhibitors" J. Med. Chem. 2019, 62, pp. 1781-1792.

V.G. Belikov, Pharmaceutical Chemistry, Chapter 2.6 "Relationship between the chemical structure, the properties of substances and their actions in an organism"—M.: MEDpress-inform, 2007, pp. 27-29.

Himiceskij, Chemical Encyclopedic dictionary, Chief editor I, L. Knunanc, Moscow, Soviet Encyclopedia, 1983, pp. 130-131.

Harkevic D.A., Pharmacology—textbook, 10th edition, M.Lgeotar-Media, 2010, pp. 72-82.

K. Kummerer, Pharmaceuticals in the environment, Annual Review of Environment and Resources, 2010, V.35, p. 57-75, doi: 10.1146/annurev-environ-052809-161223.

P. V. Sergeeva, Short course on molecular pharmacology, M., 1975, p. 10.

L. E. Holodov et al. Clinical pharmacokinetics, M., "Medicine", 1985, pp. 83-98, 134-138, 160, 378-380.

Smit V., Bochkov A., Caple R., Organic synthesis, the science behind the art: Translation from English Language—M.: Mir, 2001, 573 pages, figures, p. 64.

Pokrovsky, Small medical encyclopedia, vol. 5, Moscow, "Medicine", 1996, pp. 90-96.

M. D. Maskovskij Medicaments, 14th edition, vol. 1, Moscow, 2001, p. 11.

Kubasov A. A., Chemical Kinetics and catalysis. Part 1, Moscow, Publisher of the University of Moscow, 2004, pp. 2-3.

Meng, Fanhao, "Pharmaceutical Chemistry" pp. 385-387, Jan. 2016.

Himiceskaa enciklopedia [Encyclopedia of Chemistry], vol. 4, pp. 499-501, Academic Publisher "Bol'saa rossijskaa enciklopedia" [The Great Russian Encyclopedia], Moscow, 1995.

V.V. Boltromeuk "Obsaa himia" [General Chemistry], Minsk, Vysejsaa skola, 2012, p. 65.

Patani et al., Bioisosterism: A Rational Approach in Drug Design, Chem. Rev. 1996, 96, 3147-3176.

* cited by examiner

PYRAZOLO[3,4-B]PYRAZINE SHP2 PHOSPHATASE INHIBITORS

CROSS REFERENCE TO RELATED APPLICATIONS

This application is a national stage filing under section 371 of International Application No. PCT/IB2020/057815, filed on Aug. 20, 2020, and published on Feb. 25, 2021 as WO 2021/033153 A1, which claims priority to Great Britain Application No. 1911928.8, filed on Aug. 20, 2019. The entire contents of WO 2021/033153 A1 are hereby incorporated herein by reference.

FIELD OF THE INVENTION

The invention relates to new pyrazine derivatives, to pharmaceutical compositions comprising said compounds and to the use of said compounds in the treatment of diseases, e.g. cancer.

RELATED APPLICATIONS

This application is related to United Kingdom patent application number 1911928.8 filed 20 Aug. 2019, the contents of which are incorporated herein by reference in their entirety.

BACKGROUND OF THE INVENTION

Src homology region 2 (SH2)-containing protein tyrosine phosphatase 2 (SHP2) is a ubiquitously expressed protein tyrosine phosphatase encoded by the PTPN11 gene. SHP2 contains two N-terminal tandem SH2 domains (N—SH2, C—SH2), a catalytic phosphatase (PTP) domain and a C-terminal tail with 2 tyrosine phosphorylation sites.

SHP2 switches between "open" active and "closed" inactive forms due to autoinhibitory interactions between the N—SH2 and the PTP domain. This naturally occurring autoinhibition is released when bis-tyrosylphorphorylated peptides bind to the N—SH2 domains and SHP2 adopts an "open" conformation, resulting in activation of the enzyme and exposure of the PTP domain for substrate recognition and catalysis.

PTPN11 mutations have been linked to several human diseases including cancer. Germline PTPN11 mutations are associated with developmental disorders such as Noonan Syndrome and Leopard Syndrome, whilst somatic mutations occur in several types of hematologic malignancies, such as JMML and more rarely in solid tumours.

SHP2 is required for signalling downstream of receptor tyrosine kinases (e.g. EGFR, ALK, PDGFR) and plays a positive role in regulating many cellular processes such as proliferation in response to growth factor and cytokine stimulation. Previous studies have shown that SHP2 acts upstream of Ras and is required for full, sustained activation of the MAPK pathway. RTK deregulation often leads to a wide range of cancers, making SHP2 a valuable target in RTK-activated cancers. SHP2 is also reported to play a role in regulating immune responses by mediating immune checkpoint pathways (e.g. PD-1) as immunoreceptor tyrosine-based inhibitory motifs (ITIMs) bind to the SH2 domains of SHP2 to mediate a negative signal. It has been reported that some SHP2 inhibitor compounds show inhibitory effect on proliferation of in vitro cancer cells and on increase in tumour volume in a mouse xenograft model (Nature (2016) 535: 148-152).

The present invention describes a novel series of compounds which selectively inhibit SHP2 and which have anticancer activity.

SUMMARY OF THE INVENTION

In one aspect, the invention provides a compound of formula (I):

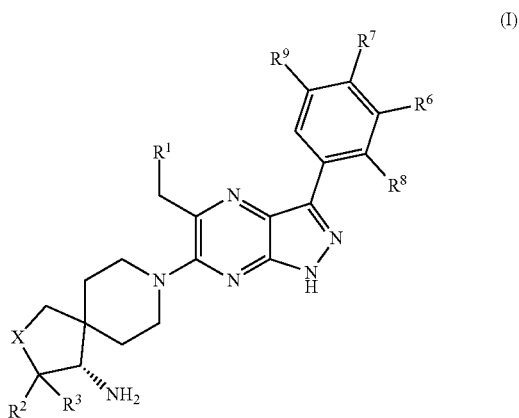

(I)

or a tautomer or a solvate or a pharmaceutically acceptable salt thereof, wherein:

$R^1$ is hydrogen or hydroxyl;

$R^2$ and $R^3$ are independently selected from hydrogen, halogen, $C_{1-4}$alkyl, halo$C_{1-4}$alkyl, hydroxy$C_{1-4}$alkyl and —CN;

X is O or $CR^4R^5$;

$R^4$ and $R^5$ are independently selected from hydrogen, halogen, hydroxyl, $C_{1-4}$alkyl, $C_{1-4}$alkoxy and halo$C_{1-4}$alkyl;

$R^6$ and $R^7$ are hydrogen, $C_{1-4}$alkoxy or halogen (e.g. chlorine or fluorine), or $R^6$ and $R^7$ join to form a.

Ring A which is optionally substituted by one or more (e.g. 1, 2, or 3) $R^{10}$ groups;

Ring A is either:
(i) a five-membered nitrogen-containing heterocyclic ring (e.g. an aromatic ring or a non-aromatic ring) wherein the heterocyclic ring optionally contains one or two additional heteroatoms selected from N, O and S, or
(ii) a six-membered aromatic nitrogen-containing heterocyclic ring, wherein the heterocyclic ring optionally contains one or two additional heteroatoms selected from N, O and S; or
(iii) a six-membered non-aromatic nitrogen-containing heterocyclic ring, wherein the heterocyclic ring optionally contains one or two additional heteroatoms selected from N and S;

$R^8$ is selected from halo$C_{1-4}$alkyl (e.g. —$CF_3$), —$CH_3$ and halogen (e.g. chlorine or fluorine);

$R^9$ is selected from hydrogen, $C_{1-4}$alkyl (e.g. —$CH_3$), halo$C_{1-4}$alkyl (e.g. —$CF_3$) and halogen (e.g. chlorine);

$R^{10}$ are independently selected from halogen, cyano, cyano$C_{1-4}$alkyl (e.g. —$CH_2$—CN), hydroxyl, =O (oxo), $C_{1-4}$alkyl (e.g. —$CH_3$, —$CH(CH_3)_2$, or —$CH_2CH_3$), halo$C_{1-4}$alkyl (e.g. —$CHF_2$), $C_{1-4}$alkoxy (e.g. —$OCH_3$, —$OCH_2CH_3$ and —$OCH(CH_3)_2$), hydroxyl$C_{1-4}$alkyl (e.g. —$CH_2C(CH_3)_2OH$, —CH($CH_3$)$CH_2OH$, —CH($CH_3$)OH, —$CH_2CH_2OH$ or —$CH_2OH$), $C_{1-4}$alkoxy$C_{1-4}$alkylene (e.g. —$CH_2$—

O—CH$_3$ or —CH$_2$—CH$_2$—O—CH$_3$), C$_{1-4}$alkylsulfone (e.g. —SO$_2$CH$_3$), amino, monoC$_{1-4}$alkylamino, diC$_{1-4}$alkylamino (e.g. —N(CH$_3$)$_2$), aminoC$_{1-4}$alkylene (e.g. —CH$_2$NH$_2$), —C$_{1-4}$alkylene-C(=O)NH$_{(2-q)}$(C$_{1-6}$ alkyl)$_q$), —C$_{0-4}$alkylene-NHC(=O)C$_{1-6}$ alkyl, sulfonamideC$_{0-4}$ alkylene (e.g. —SO$_2$NR$^x_2$ or —CH$_2$SO$_2$NR$^x_2$ wherein R$^x$ is independently selected from H and C$_{1-6}$ alkyl), 3 to 6 membered cycloalkyl, optionally substituted five- or six-membered unsaturated heterocyclic group containing 1, 2, 3 or 4 heteroatoms selected from O, N, or S where the optional substituent is selected from C$_{1-4}$alkyl, C$_{1-4}$alkyl substituted with 3 to 6 membered cycloalkyl, C$_{1-4}$alkyl substituted with optionally substituted five- or six-membered unsaturated heterocyclic group containing 1, 2, 3 or 4 heteroatoms selected from O, N, or S where the optional substituent is selected from C$_{1-4}$alkyl, C$_{1-4}$alkyl substituted with optionally substituted four- to six-membered saturated heterocyclic group containing 1 or 2 heteroatoms selected from O, N, or S where the optional substituent is selected from C$_{1-4}$alkyl, and optionally substituted four- to six-membered saturated heterocyclic group containing 1 or 2 heteroatoms selected from O, N, or S where the optional substituent is selected from C$_{1-4}$alkyl; and q is selected from 0, 1 or 2.

In further aspects of the invention there is provided a compound of formula (I) for use in the prophylaxis or treatment of a disease or condition as described herein, methods for the prophylaxis or treatment of a disease or condition as described herein comprising administering to a patient a compound of formula (I), pharmaceutical compositions comprising a compound of formula (I) and processes for the synthesis of a compound of formula (I).

DEFINITIONS

Unless the context indicates otherwise, references to formula (I) in all sections of this document (including the uses, methods and other aspects of the invention) include references to all other sub-formula, sub-groups, embodiments and examples as defined herein.

"Potency" is a measure of drug activity expressed in terms of the amount required to produce an effect of given intensity. A highly potent drug evokes a larger response at low concentrations. Potency is proportional to affinity and efficacy. Affinity is the ability of the drug to bind to a receptor. Efficacy is the relationship between receptor occupancy and the ability to initiate a response at the molecular, cellular, tissue or system level.

The term "inhibitor" refers to an enzyme inhibitor that is a type of ligand or drug that blocks or dampens biological responses mediated by SHP2. Inhibitors mediate their effects by binding to the active site or to allosteric sites on enzymes, or they may interact at unique binding sites not normally involved in the biological regulation of the enzyme's activity. The inhibition may arise directly or indirectly, and may be mediated by any mechanism and at any physiological level. As a result, inhibition by ligands or drugs may under different circumstances manifest itself in functionally different ways. Inhibitory activity may be reversible or irreversible depending on the longevity of the inhibitor—enzyme complex, which, in turn, depends on the nature of inhibitor-enzyme binding.

As used herein, the term "mediated", as used e.g. in conjunction with SHP2 as described herein (and applied for example to various physiological processes, diseases, states, conditions, therapies, treatments or interventions) is intended to operate limitatively so that the various processes, diseases, states, conditions, treatments and interventions to which the term is applied are those in which the protein plays a biological role. In cases where the term is applied to a disease, state or condition, the biological role played by the protein may be direct or indirect and may be necessary and/or sufficient for the manifestation of the symptoms of the disease, state or condition (or its aetiology or progression).

Thus, the protein function (and in particular aberrant levels of function, e.g. over- or under-expression) need not necessarily be the proximal cause of the disease, state or condition: rather, it is contemplated that the mediated diseases, states or conditions include those having multifactorial aetiologies and complex progressions in which the protein in question is only partially involved. In cases where the term is applied to treatment, prophylaxis or intervention, the role played by the protein may be direct or indirect and may be necessary and/or sufficient for the operation of the treatment, prophylaxis or outcome of the intervention. Thus, a disease state or condition mediated by a protein includes the development of resistance to any particular cancer drug or treatment.

The term "treatment" as used herein in the context of treating a condition i.e. state, disorder or disease, pertains generally to treatment and therapy, whether for a human or an animal (e.g. in veterinary applications), in which some desired therapeutic effect is achieved, for example, the inhibition of the progress of the condition, and includes a reduction in the rate of progress, a halt in the rate of progress, amelioration of the condition, diminishment or alleviation of at least one symptom associated or caused by the condition being treated and cure of the condition. For example, treatment can be diminishment of one or several symptoms of a disorder or complete eradication of a disorder.

The term "prophylaxis" (i.e. use of a compound as prophylactic measure) as used herein in the context of treating a condition i.e. state, disorder or disease, pertains generally to the prophylaxis or prevention, whether for a human or an animal (e.g. in veterinary applications), in which some desired preventative effect is achieved, for example, in preventing occurrence of a disease or guarding from a disease. Prophylaxis includes complete and total blocking of all symptoms of a disorder for an indefinite period of time, the mere slowing of the onset of one or several symptoms of the disease, or making the disease less likely to occur.

References to the prophylaxis or treatment of a disease state or condition such as cancer include within their scope alleviating or reducing the incidence e.g. of cancer.

The combinations of the invention may produce a therapeutically efficacious effect relative to the therapeutic effect of the individual compounds/agents when administered separately.

The term 'efficacious' includes advantageous effects such as additivity, synergism, reduced side effects, reduced toxicity, increased time to disease progression, increased time of survival, sensitization or resensitization of one agent to another, or improved response rate. Advantageously, an efficacious effect may allow for lower doses of each or either component to be administered to a patient, thereby decreasing the toxicity of chemotherapy, whilst producing and/or maintaining the same therapeutic effect. A "synergistic" effect in the present context refers to a therapeutic effect produced by the combination which is larger than the sum of the therapeutic effects of the agents of the combination when presented individually. An "additive" effect in the present context refers to a therapeutic effect produced by the combination which is larger than the therapeutic effect of any of the agents of the combination when presented individually. The term "response rate" as used herein refers, in the case of a solid tumour, to the extent of reduction in the size of the tumour at a given time point, for example 12 weeks. Thus, for example, a 50% response rate means a reduction in tumour size of 50%.

References herein to a "clinical response" refer to response rates of 50% or greater. A "partial response" is defined herein as being a response rate of less than 50%.

As used herein, the term "combination", as applied to two or more compounds and/or agents, is intended to define material in which the two or more agents are associated. The terms "combined" and "combining" in this context are to be interpreted accordingly.

The association of the two or more compounds/agents in a combination may be physical or non-physical. Examples of physically associated combined compounds/agents include:
   compositions (e.g. unitary formulations) comprising the two or more compounds/agents in admixture (for example within the same unit dose);
   compositions comprising material in which the two or more compounds/agents are chemically/physicochemically linked (for example by crosslinking, molecular agglomeration or binding to a common vehicle moiety);
   compositions comprising material in which the two or more compounds/agents are chemically/physicochemically co-packaged (for example, disposed on or within lipid vesicles, particles (e.g. micro- or nanoparticles) or emulsion droplets);
   pharmaceutical kits, pharmaceutical packs or patient packs in which the two or more compounds/agents are co-packaged or co-presented (e.g. as part of an array of unit doses);
Examples of non-physically associated combined compounds/agents include:
   material (e.g. a non-unitary formulation) comprising at least one of the two or more compounds/agents together with instructions for the extemporaneous association of the at least one compound to form a physical association of the two or more compounds/agents;
   material (e.g. a non-unitary formulation) comprising at least one of the two or more compounds/agents together with instructions for combination therapy with the two or more compounds/agents;
   material comprising at least one of the two or more compounds/agents together with instructions for administration to a patient population in which the other(s) of the two or more compounds/agents have been (or are being) administered;
   material comprising at least one of the two or more compounds/agents in an amount or in a form which is specifically adapted for use in combination with the other(s) of the two or more compounds/agents.

As used herein, the term "combination therapy" is intended to define therapies which comprise the use of a combination of two or more compounds/agents (as defined above). Thus, references to "combination therapy", "combinations" and the use of compounds/agents "in combination" in this application may refer to compounds/agents that are administered as part of the same overall treatment regimen. As such, the posology of each of the two or more compounds/agents may differ: each may be administered at the same time or at different times. It will therefore be appreciated that the compounds/agents of the combination may be administered sequentially (e.g. before or after) or simultaneously, either in the same pharmaceutical formulation (i.e. together), or in different pharmaceutical formulations (i.e. separately). Simultaneously in the same formulation is as a unitary formulation whereas simultaneously in different pharmaceutical formulations is non-unitary. The posologies of each of the two or more compounds/agents in a combination therapy may also differ with respect to the route of administration.

As used herein, the term "pharmaceutical kit" defines an array of one or more unit doses of a pharmaceutical composition together with dosing means (e.g. measuring device) and/or delivery means (e.g. inhaler or syringe), optionally all contained within common outer packaging. In pharmaceutical kits comprising a combination of two or more compounds/agents, the individual compounds/agents may unitary or non-unitary formulations. The unit dose(s) may be contained within a blister pack. The pharmaceutical kit may optionally further comprise instructions for use.

As used herein, the term "pharmaceutical pack" defines an array of one or more unit doses of a pharmaceutical composition, optionally contained within common outer packaging. In pharmaceutical packs comprising a combination of two or more compounds/agents, the individual compounds/agents may unitary or non-unitary formulations. The unit dose(s) may be contained within a blister pack. The pharmaceutical pack may optionally further comprise instructions for use.

The term 'optionally substituted' as used herein refers to a group which may be unsubstituted or substituted by a substituent as herein defined.

The prefix "$C_{x-y}$" (where x and y are integers) as used herein refers to the number of carbon atoms in a given group. Thus, a $C_{1-6}$ alkyl group contains from 1 to 6 carbon atoms, a $C_{3-6}$ cycloalkyl group contains from 3 to 6 carbon atoms, a $C_{1-4}$ alkoxy group contains from 1 to 4 carbon atoms, and so on.

The term 'amino' as used herein refers to the group —$NH_2$.

The term 'halo' or 'halogen' as used herein refers to fluorine, chlorine, bromine or iodine, in particular fluorine or chlorine.

Each and every hydrogen in the compound (such as in an alkyl group or where referred to as hydrogen) includes all isotopes of hydrogen, in particular $^1H$ and $^2H$ (deuterium).

The term 'oxo' as used herein refers to the group =O.

The term '$C_{1-4}$alkyl' as used herein as a group or part of a group refers to a linear or branched saturated hydrocarbon group containing from 1 to 4 carbon atoms respectively. Examples of such groups include methyl, ethyl, n-propyl, isopropyl, n-butyl, isobutyl, sec-butyl, tert butyl and the like.

The term '$C_{2-4}$alkenyl' or '$C_{2-6}$alkenyl' as used herein as a group or part of a group refers to a linear or branched hydrocarbon group containing from 2 to 4, or 2 to 6 carbon atoms, respectively, and containing a carbon carbon double bond. Examples of such groups include $C_{3-4}$alkenyl or $C_{3-6}$alkenyl groups, such as ethenyl (vinyl), 1-propenyl, 2-propenyl (allyl), isopropenyl, butenyl, buta-1,4-dienyl, pentenyl, and hexenyl.

The term '$C_{2-4}$ alkynyl' or '$C_{2-6}$ alkynyl' as used herein as a group or part of a group refers to a linear or branched hydrocarbon group having from 2 to 4 or 2 to 6 carbon atoms, respectively, and containing a carbon carbon triple bond. Examples of such groups include $C_{3-4}$ alkynyl or $C_{3-6}$ alkynyl groups such as ethynyl and 2 propynyl (propargyl) groups.

The term '$C_{1-4}$alkoxy' as used herein as a group or part of a group refers to an —O—$C_{1-4}$alkyl group wherein $C_{1-4}$alkyl is as defined herein. Examples of such groups include methoxy, ethoxy, propoxy, butoxy, and the like.

The term '$C_{3-6}$ cycloalkyl' as used herein refers to a saturated monocyclic hydrocarbon ring of 3 to 6 carbon atoms. Examples of such groups include cyclopropyl, cyclobutyl, cyclopentyl or cyclohexyl and the like.

The term '$C_{3-6}$ cycloalkenyl' as used herein refers to a partially saturated monocyclic hydrocarbon ring of 3 to 6 carbon atoms having one or more (usually one) carbon carbon double bond(s). Examples of such groups include cyclopentenyl, cyclohexenyl, and cyclohexadienyl.

The term 'hydroxy$C_{1-4}$alkyl' as used herein as a group or part of a group refers to a $C_{1-4}$alkyl group as defined herein wherein one or more (e.g. 1, 2 or 3) than one hydrogen atom is replaced with a hydroxyl group. The term 'hydroxy$C_{1-4}$alkyl' therefore includes monohydroxy$C_{1-4}$alkyl, and also polyhydroxy$C_{1-4}$ alkyl. There may be one, two, three or more hydrogen atoms replaced with a hydroxyl group, so the hydroxy$C_{1-4}$alkyl may have one, two, three or more hydroxyl groups. Examples of such groups include hydroxymethyl, hydroxyethyl, hydroxypropyl and the like.

The term 'halo$C_{1-4}$alkyl' as used herein as a group or part of a group refers to a $C_{1-4}$alkyl group as defined herein wherein one or more (e.g. 1, 2 or 3) than one hydrogen atom is replaced with a halogen. The term 'halo$C_{1-4}$alkyl' therefore includes monohalo$C_{1-4}$alkyl and also polyhalo$C_{1-4}$alkyl. There may be one, two, three or more hydrogen atoms replaced with a halogen, so the halo$C_{1-4}$alkyl may have one, two, three or more halogens. Examples of such groups include fluoroethyl, fluoromethyl, difluoromethyl, trifluoromethyl or trifluoroethyl and the like.

The term 'halo$C_{1-4}$alkoxy' as used herein as a group or part of a group refers to a —O—$C_{1-4}$ alkyl group as defined herein wherein one or more (e.g. 1, 2 or 3) than one hydrogen atom is replaced with a halogen. The terms 'halo$C_{1-4}$alkoxy' therefore include monohalo$C_{1-4}$alkoxy, and also polyhalo$C_{1-4}$alkoxy. There may be one, two, three or more hydrogen atoms replaced with a halogen, so the halo$C_{1-4}$alkoxy may have one, two, three or more halogens. Examples of such groups include fluoroethyloxy, difluoromethoxy or trifluoromethoxy and the like.

The term "heterocyclyl group" as used herein shall, unless the context indicates otherwise, include both aromatic and non-aromatic ring systems. Thus, for example, the term "heterocyclyl group" include within their scope aromatic, non-aromatic, unsaturated, partially saturated and saturated heterocyclyl ring systems. In general, unless the context indicates otherwise, such groups may be monocyclic or bicyclic (including fused, spiro and bridged bicyclic groups) and may contain, for example, 3 to 12 ring members, more usually 5 to 10 ring members. Reference to 4 to 7 ring members includes 4, 5, 6 or 7 atoms in the ring and reference to 4 to 6 ring members include 4, 5, or 6 atoms in the ring. Examples of monocyclic groups are groups containing 3, 4, 5, 6, 7 and 8 ring members, more usually 3 to 7, or 4 to 7 and preferably 5, 6 or 7 ring members, more preferably 5 or 6 ring members. Examples of bicyclic groups are those containing 8, 9, 10, 11 and 12 ring members, and more usually 9 or 10 ring members. The heterocyclyl groups can be heteroaryl groups having from 5 to 12 ring members, more usually from 5 to 10 ring members. Where reference is made herein to a heterocyclyl group, the heterocyclyl ring can, unless the context indicates otherwise, be optionally substituted i.e. unsubstituted or substituted, by one or more (e.g. 1, 2, 3, or 4 in particular one or two) substituents as defined herein.

The heterocyclyl group can be, for example, a five membered or six membered monocyclic ring or a bicyclic structure formed from fused five and six membered rings or two fused six membered rings, or two fused five membered rings. Each ring may contain up to five heteroatoms particularly selected from nitrogen, sulfur and oxygen and oxidised forms of nitrogen or sulfur. Particularly the heterocyclyl ring will contain up to 4 heteroatoms, more particularly up to 3 heteroatoms, more usually up to 2, for example a single heteroatom. In one embodiment, the heterocyclyl ring will contain one or two heteroatoms selected from N, O, S and oxidised forms of N or S. In one embodiment, the heterocyclyl ring contains at least one ring nitrogen atom. The nitrogen atoms in the heterocyclyl rings can be basic, as in the case of an imidazole or pyridine, or essentially non-basic as in the case of an indole or pyrrole nitrogen. In general the number of basic nitrogen atoms present in the heterocyclyl group, including any amino group substituents of the ring, will be less than five.

The heterocyclyl groups can be attached via a carbon atom or a heteroatom (e.g. nitrogen). Equally the heterocyclyl groups can be substituted on a carbon atom or on a heteroatom (e.g. nitrogen).

Examples of five membered aromatic heterocyclyl groups include but are not limited to pyrrolyl, furanyl, thienyl, imidazolyl, furazanyl, oxazolyl, oxadiazolyl, oxatriazolyl, isoxazolyl, thiazolyl, thiadiazolyl, isothiazolyl, pyrazolyl, triazolyl and tetrazolyl groups.

Examples of six membered aromatic heterocyclic groups include but are not limited to pyridinyl, pyrazinyl, pyridazinyl, pyrimidinyl and triazinyl.

The term "heteroaryl" is used herein to denote a heterocyclyl group having aromatic character. The term "heteroaryl" embraces polycyclic (e.g. bicyclic) ring systems wherein one or more rings are non-aromatic, provided that at least one ring is aromatic. In such polycyclic systems, the group may be attached by the aromatic ring, or by a non-aromatic ring.

Examples of heteroaryl groups are monocyclic and bicyclic groups containing from five to twelve ring members, and more usually from five to ten ring members.

Examples of five membered heteroaryl groups include but are not limited to pyrrole, furan, thiophene, imidazole, furazan, oxazole, oxadiazole, oxatriazole, isoxazole, thiazole, thiadiazole, isothiazole, pyrazole, triazole and tetrazole groups.

Examples of six membered heteroaryl groups include but are not limited to pyridine, pyrazine, pyridazine, pyrimidine and triazine.

A bicyclic heteroaryl group may be, for example, a group selected from:
 a) a benzene ring fused to a 5- or 6-membered ring containing 1, 2 or 3 ring heteroatoms;
 b) a pyridine ring fused to a 5- or 6-membered ring containing 0, 1, 2 or 3 ring heteroatoms;
 c) a pyrimidine ring fused to a 5- or 6-membered ring containing 0, 1 or 2 ring heteroatoms;
 d) a pyrrole ring fused to a 5- or 6-membered ring containing 0, 1, 2 or 3 ring heteroatoms;
 e) a pyrazole ring fused to a 5- or 6-membered ring containing 0, 1 or 2 ring heteroatoms;
 f) an imidazole ring fused to a 5- or 6-membered ring containing 0, 1 or 2 ring heteroatoms;

g) an oxazole ring fused to a 5- or 6-membered ring containing 0, 1 or 2 ring heteroatoms;
h) an isoxazole ring fused to a 5- or 6-membered ring containing 0, 1 or 2 ring heteroatoms;
i) a thiazole ring fused to a 5- or 6-membered ring containing 0, 1 or 2 ring heteroatoms;
j) an isothiazole ring fused to a 5- or 6-membered ring containing 0, 1 or 2 ring heteroatoms;
k) a thiophene ring fused to a 5- or 6-membered ring containing 0, 1, 2 or 3 ring heteroatoms;
l) a furan ring fused to a 5- or 6-membered ring containing 0, 1, 2 or 3 ring heteroatoms;
m) a cyclohexyl ring fused to a 5- or 6-membered ring containing 1, 2 or 3 ring heteroatoms; and
n) a cyclopentyl ring fused to a 5- or 6-membered ring containing 1, 2 or 3 ring heteroatoms.

Particular examples of bicyclic heteroaryl groups containing a five membered ring fused to another five membered ring include but are not limited to imidazothiazole (e.g. imidazo[2,1-b]thiazole) and imidazoimidazole (e.g. imidazo[1,2-a]imidazole).

Particular examples of bicyclic heteroaryl groups containing a six membered ring fused to a five membered ring include but are not limited to benzofuran, benzothiophene, benzimidazole, benzoxazole, isobenzoxazole, benzisoxazole, benzothiazole, benzisothiazole, isobenzofuran, indole, isoindole, indolizine, indoline, isoindoline, purine (e.g., adenine, guanine), indazole, pyrazolopyrimidine (e.g. pyrazolo[1,5-a]pyrimidine), triazolopyrimidine (e.g. [1,2,4]triazolo[1,5-a]pyrimidine), benzodioxole, imidazopyridine and pyrazolopyridine (e.g. pyrazolo[1,5-a]pyridine) groups.

Particular examples of bicyclic heteroaryl groups containing two fused six membered rings include but are not limited to quinoline, isoquinoline, chroman, thiochroman, isochroman, chromene, isochromene, benzodioxan, quinolizine, benzoxazine, pyridopyridine, quinoxaline, quinazoline, cinnoline, phthalazine, naphthyridine and pteridine groups.

Examples of polycyclic heteroaryl groups containing an aromatic ring and a non-aromatic ring include, tetrahydroisoquinoline, tetrahydroquinoline, dihydrobenzthiophene, dihydrobenzofuran, 2,3-dihydro-benzo[1,4]dioxine, benzo[1,3]dioxole, 4,5,6,7-tetrahydrobenzofuran, tetrahydrotriazolopyrazine (e.g. 5,6,7,8-tetrahydro-[1,2,4]triazolo[4,3-a]pyrazine), chroman, thiochroman, isochroman, chromene, isochromene, benzodioxan, benzoxazine, benzodiazepine, and indoline groups.

A nitrogen-containing heteroaryl ring must contain at least one ring nitrogen atom. The nitrogen-containing heteroaryl ring can be N-linked or C-linked. Each ring may, in addition, contain up to about four other heteroatoms particularly selected from nitrogen, sulfur and oxygen. Particularly the heteroaryl ring will contain up to 3 heteroatoms, for example 1, 2 or 3, more usually up to 2 nitrogens, for example a single nitrogen. The nitrogen atoms in the heteroaryl rings can be basic, as in the case of an imidazole or pyridine, or essentially non-basic as in the case of an indole or pyrrole nitrogen. In general, the number of basic nitrogen atoms present in the heteroaryl group, including any amino group substituents of the ring, will be less than five.

Examples of nitrogen-containing heteroaryl groups include, but are not limited to, monocyclic groups such as pyridyl, pyrrolyl, imidazolyl, oxazolyl, oxadiazolyl, thiadiazolyl, oxatriazolyl, isoxazolyl, thiazolyl, isothiazolyl, furazanyl, pyrazolyl, pyrazinyl, pyrimidinyl, pyridazinyl, triazinyl, triazolyl (e.g., 1,2,3-triazolyl, 1,2,4-triazolyl), tetrazolyl, and bicyclic groups such as quinolinyl, isoquinolinyl, benzimidazolyl, benzoxazolyl, benzisoxazole, benzothiazolyl and benzisothiazole, indolyl, 3H-indolyl, isoindolyl, indolizinyl, isoindolinyl, purinyl (e.g., adenine [6-aminopurine], guanine [2-amino-6-hydroxypurine]), indazolyl, quinolizinyl, benzoxazinyl, benzodiazepinyl, pyridopyridinyl, quinoxalinyl, quinazolinyl, cinnolinyl, phthalazinyl, naphthyridinyl and pteridinyl.

Examples of nitrogen-containing polycyclic heteroaryl groups containing an aromatic ring and a non-aromatic ring include tetrahydroisoquinolinyl, tetrahydroquinolinyl, and indolinyl.

The term "non-aromatic" embraces, unless the context indicates otherwise, unsaturated ring systems without aromatic character, partially saturated and saturated heterocyclyl ring systems. The terms "unsaturated" and "partially saturated" refer to rings wherein the ring structure(s) contains atoms sharing more than one valence bond i.e. the ring contains at least one multiple bond e.g. a C=C, C≡C or N=C bond. The term "saturated" refers to rings where there are no multiple bonds between ring atoms.

Saturated heterocyclyl groups include piperidinyl, morpholinyl, and thiomorpholinyl. Partially saturated heterocyclyl groups include pyrazolinyl, for example pyrazolin-2-yl and pyrazolin-3-yl.

Examples of non-aromatic heterocyclyl groups are groups having from 3 to 12 ring members, more usually 5 to 10 ring members. Such groups can be monocyclic or bicyclic, for example, have 3 to 7 ring members in particular 4 to 6 ring members. Such groups particularly have from 1 to 5 or 1 to 4 heteroatom ring members (more usually 1, 2, or 3 heteroatom ring members), usually selected from nitrogen, oxygen and sulfur and oxidised forms thereof. The heterocyclyl groups can contain, for example, cyclic ether moieties (e.g. as in tetrahydrofuran and dioxane), cyclic thioether moieties (e.g. as in tetrahydrothiophene and dithiane), cyclic amine moieties (e.g. as in pyrrolidine), cyclic amide moieties (e.g. as in pyrrolidone), cyclic thioamides, cyclic thioesters, cyclic ureas (e.g. as in imidazolidin-2-one), cyclic ester moieties (e.g. as in butyrolactone), cyclic sulfones (e.g. as in sulfolane and sulfolene), cyclic sulfoxides, cyclic sulfonamides and combinations thereof (e.g. thiomorpholine).

Particular examples include morpholinyl, piperidinyl (e.g. piperidin-1-yl, piperidin-2-yl, piperidin-3-yl and piperidin-4-yl), piperidinonyl, pyrrolidinyl (e.g. pyrrolidin-1-yl, pyrrolidin-2-yl and pyrrolidin-3-yl), pyrrolidonyl, azetidinyl, pyranyl (2H-pyran or 4H-pyran), dihydrothienyl, dihydropyranyl, dihydrofuranyl, dihydrothiazolyl, tetrahydrofuranyl, tetrahydrothienyl, dioxanyl, oxanyl (also known as tetrahydropyranyl) (e.g. oxan-4-yl), imidazolinyl, imidazolidinonyl, oxazolinyl, thiazolinyl, pyrazolin-2-yl, pyrazolidinyl, piperazinonyl, piperazinyl, and N-alkyl piperazines such as N-methyl piperazinyl. In general, typical non-aromatic heterocyclyl groups include saturated groups such as piperidinyl, pyrrolidinyl, azetidinyl, morpholinyl, piperazinyl and N-alkyl piperazines such as N-methyl piperazinyl.

In a nitrogen-containing non-aromatic heterocyclyl ring the ring must contain at least one ring nitrogen atom. The nitrogen-containing heterocyclyl ring can be N-linked or C-linked. The heterocylic groups can contain, for example, cyclic amine moieties (e.g. as in pyrrolidinyl), cyclic amides (such as a pyrrolidinonyl, piperidinonyl or caprolactamyl), cyclic sulfonamides (such as an isothiazolidinyl 1,1-dioxide, [1,2]thiazinanyl 1,1-dioxide or [1,2]thiazepanyl 1,1-dioxide) and combinations thereof.

Particular examples of nitrogen-containing non-aromatic heterocyclyl groups include aziridinyl, morpholinyl, thiomorpholinyl, piperidinyl (e.g. piperidin-1-yl, piperidin-2yl, piperidin-3-yl and piperidin-4-yl), pyrrolidinyl; (e.g. pyrrolidin-1-yl, pyrrolidin-2-yl and pyrrolidin-3-yl), pyrrolidonyl, dihydrothiazolyl, imidazolinyl, imidazolidinonyl, oxazolinyl, thiazolinyl, 6H-1,2,5-thiadiazinyl, pyrazolin-2-yl, pyrazolin-3-yl, pyrazolidinyl, piperazinyl, and N-alkyl piperazines such as N-methyl piperazinyl.

The heterocyclyl groups can be polycyclic fused ring systems or bridged ring systems such as the oxa- and aza analogues of bicycloalkanes, tricycloalkanes (e.g. adamantane and oxa-adamantane). For an explanation of the distinction between fused and bridged ring systems, see Advanced Organic Chemistry, by Jerry March, 4th Edition, Wiley Interscience, pages 131-133, 1992.

Where, in a definition of a cyclic group or ring, it is stated that the cyclic group contains a certain number of heteroatom ring members, e.g. as in the phrase "a 5 or 6 membered ring containing 0, 1 or 2 nitrogen ring members", this is to be taken as meaning that apart from the certain number of heteroatom ring members specified, the remaining ring members are carbon atoms.

The compound of formula (I) may contain saturated cyclic groups that can be joined to the rest of the molecule by one or more bonds. When the cyclic group is joined to the rest of the molecule by two or more bonds, these bonds (or two of these bonds) can be made to the same atom (usually a carbon atom) of the ring or different atoms of the ring. Where the bonds are made to the same atom of the ring, this results in a cyclic group with a single atom (usually a quaternary carbon) bound to two groups. In other words, when the compound of formula (I) includes a cyclic group that group may either be linked to the rest of the molecule by a bond or the cyclic group and the rest of the molecule can have an atom in common e.g. a spiro compound.

The heterocyclyl group can each be unsubstituted or substituted by one or more (e.g. 1, 2 or 3) substituent groups. For example, heterocyclyl or carbocyclyl groups can be unsubstituted or substituted by 1, 2, 3 or 4 substituents and particularly it is unsubstituted or has 1, 2 or 3 substituents as defined herein. Where the cyclic group is saturated there may be 2 substituents joined to the same carbon (where the substituents are the same so called geminal or 'gem' disubstitution).

A combination of substituents is permissible only if such as combination results in a stable or chemically feasible compound (i.e. one that is not substantially altered when kept at 40° C. or less for at least a week).

The various functional groups and substituents making up the compounds of the invention are particularly chosen such that the molecular weight of the compound of the invention does not exceed 1000. More usually, the molecular weight of the compound will be less than 750, for example less than 700, or less than 650, or less than 600, or less than 550. More particularly, the molecular weight is less than 525 and, for example, is 500 or less.

DETAILED DESCRIPTION OF THE INVENTION

The invention provides a compound of formula (I):

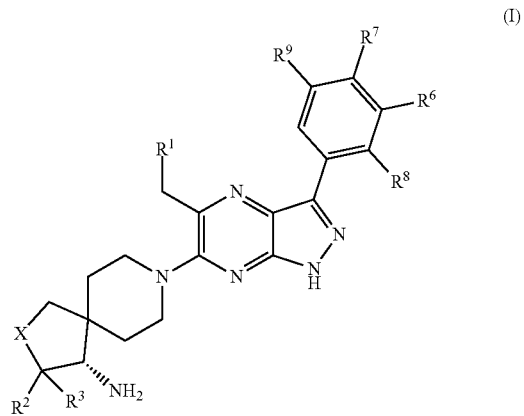

or a tautomer or a solvate or a pharmaceutically acceptable salt thereof, wherein X, $R^1$, $R^2$, $R^3$, $R^6$, $R^7$, $R^8$, and $R^9$ are as defined herein.

X

X is O or $CR^4R^5$.

When X is $CR^4R^5$, $R^4$ and $R^5$ are independently selected from hydrogen, halogen, hydroxyl, $C_{1-4}$alkyl, $C_{1-4}$alkoxy and halo$C_{1-4}$alkyl.

In one embodiment, $R^4$ and $R^5$ are independently selected from hydrogen, halogen, $C_{1-4}$alkyl and halo$C_{1-4}$alkyl (e.g. halo$C_1$alkyl).

In one embodiment, X is O and the compound of formula (I) is a compound of formula (Ia):

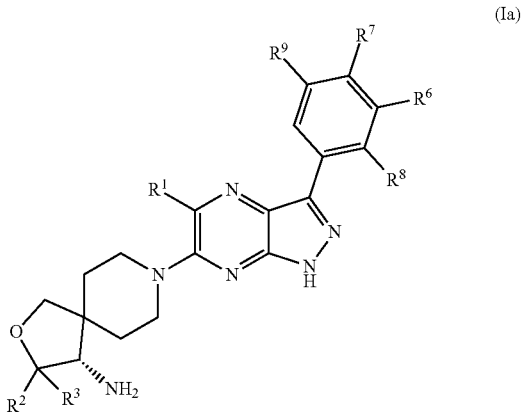

In one embodiment, X is CR⁴R⁵ and the compound of formula (I) is a compound of formula (Ib):

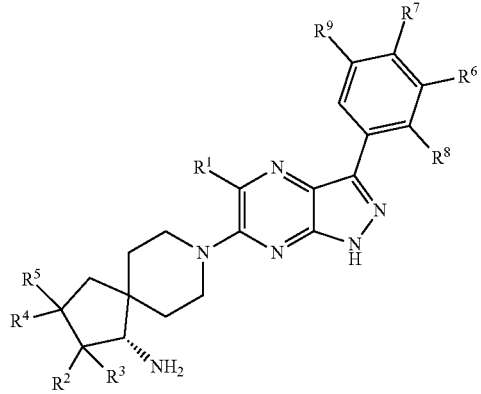

(Ib)

wherein R¹, R², R³, R⁴, R⁵, R⁶, R⁷, R⁸, and R⁹ are as defined herein.

In particular, X is O and the compound of formula (I) is a compound of formula (Ia).

In one embodiment, X is CR⁴R⁵ and R⁴ and R⁵ are independently selected from hydrogen, halogen (e.g. fluorine, chlorine, bromine or iodine, in particular fluorine) and haloC₁₋₄alkyl (e.g. monohalomethyl, dihalomethyl and trihalomethyl, wherein halo is selected from fluorine, chlorine, bromine or iodine).

In one embodiment, X is CR⁴R⁵ and R⁴ and R⁵ are independently selected from hydrogen, fluorine, and trifluoromethyl.

In one embodiment, X is CR⁴R⁵ and R⁴ and R⁵ are hydrogen.

In one embodiment, X is CR⁴R⁵ and R⁴ and R⁵ are halogen (e.g. fluorine).

In one embodiment, X is CR⁴R⁵ and R⁴ is hydrogen and R⁵ is selected from halogen (e.g. fluorine, chlorine, bromine or iodine, in particular fluorine) and halomethyl (e.g. monohalomethyl, dihalomethyl and trihalomethyl, wherein halo is selected from fluorine, chlorine, bromine or iodine).

In one embodiment, X is CR⁴R⁵ and R⁴ is hydrogen and R⁵ is fluorine or trifluoromethyl.

In one embodiment, X is CR⁴R⁵ and R⁴ is hydrogen and R⁵ is fluorine.

In one embodiment, X is CR⁴R⁵ and R⁴ is hydrogen and R⁵ is trifluoromethyl.

In one embodiment, X is CR⁴R⁵ and R⁴ is hydrogen and R⁵ is selected from halogen (e.g. fluorine, chlorine, bromine or iodine, in particular fluorine) and halomethyl (e.g. monohalomethyl, dihalomethyl and trihalomethyl, wherein halo is selected from fluorine, chlorine, bromine or iodine), and the compound of formula (Ib) is a compound of formula (Ib'):

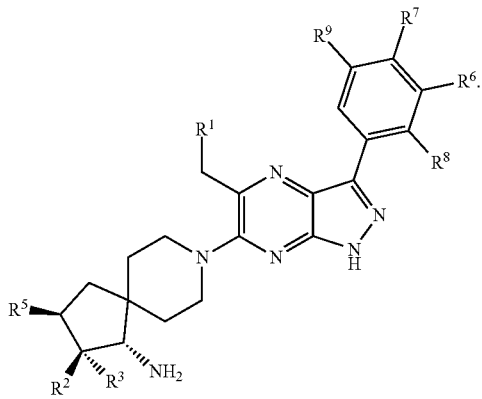

(Ib')

wherein R¹, R², R³, R⁵, R⁶, R⁷, R⁸, and R⁹ are as defined herein.

In one embodiment of the compound of formula (Ib'), R⁵ is fluorine or trifluoromethyl, in particular fluorine.

In one embodiment, X is CR⁴R⁵ and R⁴ is hydrogen and R⁵ is selected from halogen (e.g. fluorine, chlorine, bromine or iodine, in particular fluorine) and halomethyl (e.g. monohalomethyl, dihalomethyl and trihalomethyl, wherein halo is selected from fluorine, chlorine, bromine or iodine), and the compound of formula (Ib) is a compound of formula (Ib"):

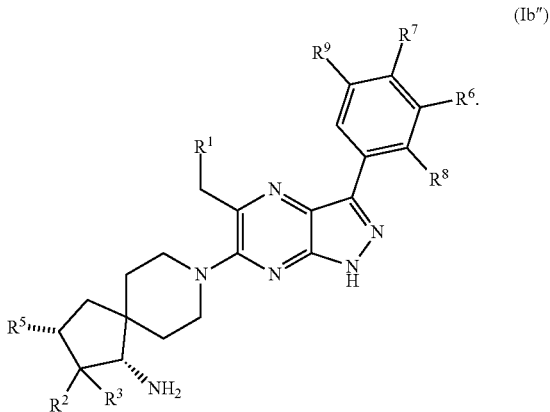

(Ib")

wherein R¹, R², R³, R⁵, R⁶, R⁷, R⁸, and R⁹ are as defined herein.

In one embodiment of the compound of formula (Ib"), R⁵ is fluorine or trifluoromethyl, in particular trifluoromethyl.
R¹

R¹ is hydrogen or hydroxyl.

In one embodiment, $R^1$ is hydrogen, and the compound of formula (I) is a compound of formula (II):

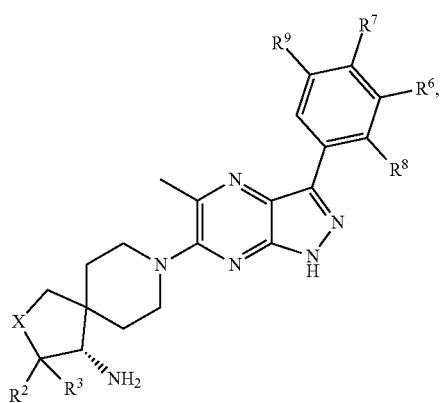

(II)

wherein X, $R^2$, $R^3$, $R^6$, $R^7$, $R^8$, and $R^9$ are as defined herein.

In one embodiment, $R^1$ is hydroxyl, and the compound of formula (I) is a compound of formula (III):

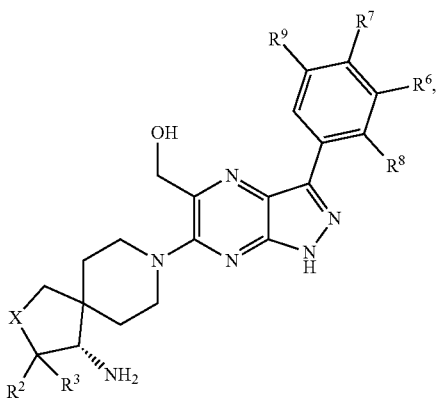

(III)

wherein X, $R^2$, $R^3$, $R^6$, $R^7$, $R^8$, and $R^9$ are as defined herein.

In particular, $R^1$ is hydroxyl, and the compound of formula (I) is a compound of formula (III).

In particular, $R^1$ is hydroxyl and X is O, and the compound of formula (III) is a compound of formula (III'):

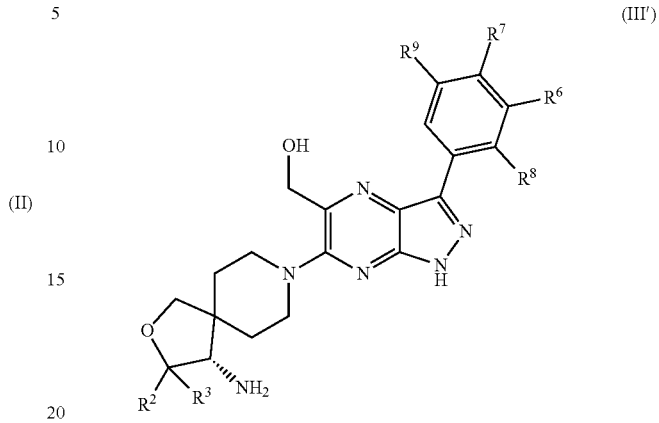

(III')

wherein $R^2$, $R^3$, $R^6$, $R^7$, $R^8$, and $R^9$ are as defined herein.

$R^2$ and $R^3$ $R^2$ and $R^3$ are independently selected from hydrogen, halogen, $C_{1-4}$alkyl, halo$C_{1-4}$alkyl, hydroxy$C_{1-4}$alkyl and —CN.

In one embodiment, $R^2$ and $R^3$ are independently selected from hydrogen, $C_{1-4}$alkyl, halo$C_{1-4}$alkyl, hydroxy$C_{1-4}$alkyl and —CN.

In one embodiment, $R^2$ and $R^3$ are hydrogen.

In one embodiment, $R^2$ is hydrogen and $R^3$ is selected from $C_{1-4}$alkyl, halo$C_{1-4}$alkyl, hydroxy$C_{1-4}$alkyl and —CN.

In one embodiment, $R^2$ is hydrogen and $R^3$ is selected from $C_{1-4}$alkyl, halo$C_{1-4}$alkyl, and hydroxy$C_{1-4}$alkyl.

In one embodiment, $R^2$ is hydrogen and $R^3$ is $C_{1-4}$alkyl e.g. —$CH_3$.

In one embodiment, $R^2$ is hydrogen and $R^3$ is halogen e.g. —F.

In one embodiment, $R^2$ is halogen e.g. —F and $R^3$ is hydrogen.

In one embodiment, $R^2$ and $R^3$ are halogen e.g. —F.

In one embodiment, $R^2$ is hydrogen and $R^3$ is selected from $C_{1-4}$alkyl, halo$C_{1-4}$alkyl, hydroxy$C_{1-4}$alkyl and —CN, and the compound of formula (I) is a compound of formula (IV):

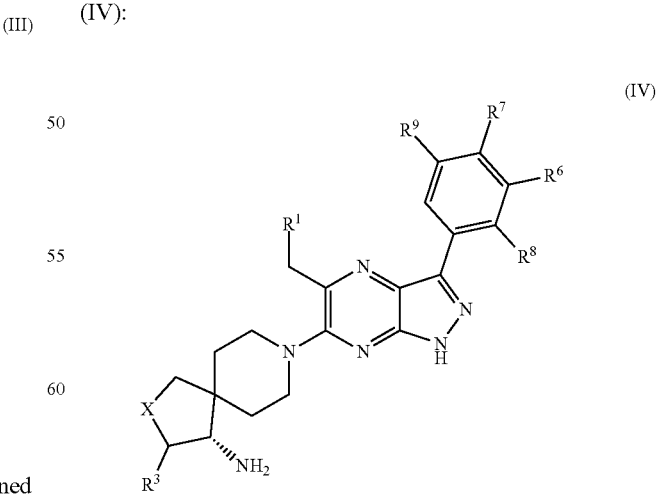

(IV)

wherein X, $R^1$, $R^3$, $R^6$, $R^7$, $R^8$, and $R^9$ are as defined herein.

In one embodiment, the compound of formula (IV) is a compound of formula (IV'):

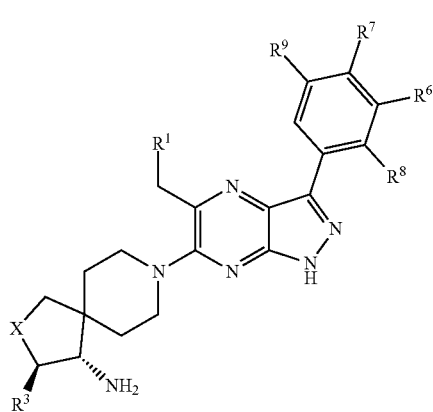

(IV')

wherein X, $R^1$, $R^3$, $R^6$, $R^7$, $R^8$, and $R^9$ are as defined herein.

In one embodiment, the compound of formula (IV) is a compound of formula (IV"):

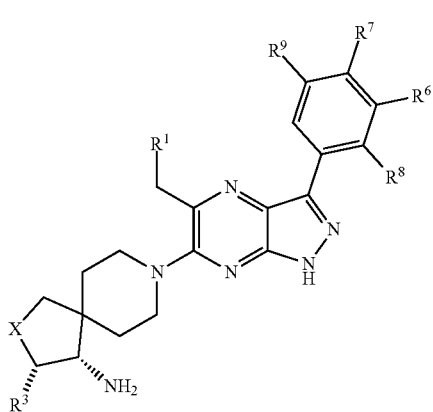

(IV")

wherein X, $R^1$, $R^3$, $R^6$, $R^7$, $R^8$, and $R^9$ are as defined herein.

In one embodiment of the compound of formulae (IV), (IV') and (IV"), $R^3$ is selected from $C_{1-4}$alkyl, halo$C_{1-4}$alkyl, and hydroxy$C_{1-4}$alkyl.

In one embodiment of the compound of formulae (IV), (IV') and (IV"), $R^3$ is selected from $C_{1-4}$alkyl e.g. —$CH_3$.

In particular, the compound of formula (IV) is a compound of formula (IV"), $R^3$ is selected from $C_{1-4}$alkyl e.g. —$CH_3$.

In one embodiment of the compound of formulae (IV), (IV') and (IV"), $R^3$ is selected from $C_{1-4}$alkyl e.g. —$CH_3$ and X is O.

In particular, the compound of formula (IV) is a compound of formula (IV"), $R^3$ is selected from $C_{1-4}$alkyl e.g. —$CH_3$ and X is O.

$R^8$ $R^8$ is selected from halo$C_{1-4}$alkyl (e.g. —$CF_3$), —$CH_3$ and halogen (e.g. chlorine or fluorine).

In one embodiment, $R^8$ is selected from $C_{1-4}$alkyl (e.g. —$CH_3$), halo$C_{1-4}$alkyl (e.g. —$CF_3$) and chlorine.

In one embodiment, $R^8$ is selected from —$CH_3$, chlorine and fluorine.

In one embodiment, $R^8$ is halogen (e.g. fluorine, chlorine, bromine or iodine, e.g fluorine or chlorine), and the compound of formula (I) is a compound of formula (V) or a tautomer or a solvate or a pharmaceutically acceptable salt thereof:

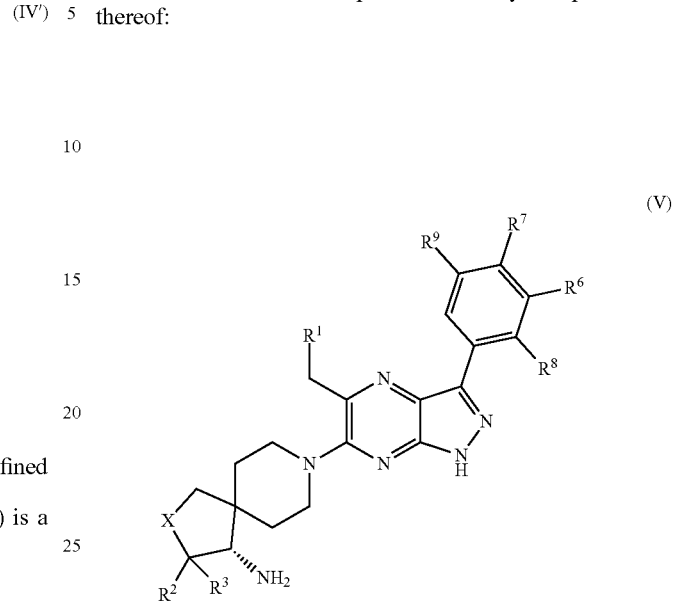

(V)

wherein X, $R^1$, $R^2$, $R^3$, $R^6$, $R^7$ and $R^9$ are as defined herein, wherein $R^8$ is halogen, in particular wherein $R^8$ is chlorine.

In one embodiment, $R^8$ is selected from methyl, chlorine and fluorine.

In one embodiment, $R^8$ is selected from chlorine and fluorine.

In one embodiment, $R^8$ is methyl.

In particular, $R^8$ is fluorine.

In particular, $R^8$ is chlorine.

In one embodiment of the compound of formula (V), X is $CR^4R^5$.

In particular, in one embodiment of the compound of formula (V), X is O.

In one embodiment of the compound of formula (V), $R^1$ is hydrogen

In particular, in one embodiment of the compound of formula (V), $R^1$ is hydroxyl.

In particular, in one embodiment of the compound of formula (V), X is O and $R^1$ is hydroxyl.

$R^9$ $R^9$ is selected from hydrogen, $C_{1-4}$alkyl (e.g. —$CH_3$), halo$C_{1-4}$alkyl (e.g. —$CF_3$) and halogen (e.g. chlorine).

In one embodiment, $R^9$ is selected from hydrogen, —$CH_3$, —$CF_3$, chlorine and fluorine.

In one embodiment, $R^9$ is selected from hydrogen, —$CH_3$, —$CF_3$ and chlorine.

In particular, $R^9$ is hydrogen and the compound of formula (I) is a compound of formula (VI) or a tautomer or a solvate or a pharmaceutically acceptable salt thereof:

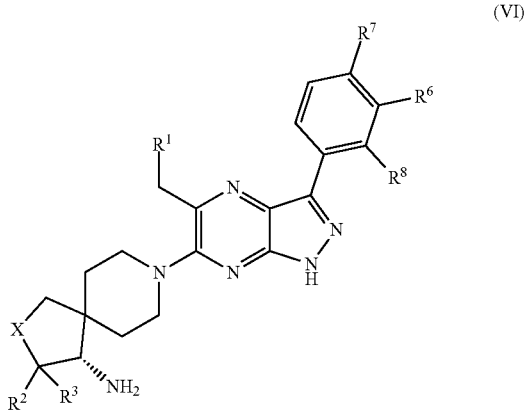

(VI)

wherein X, $R^1$, $R^2$, $R^3$, $R^6$, $R^7$ and $R^8$ are as defined herein.

In one embodiment of the compound of formula (VI), X is $CR^4R^5$.

In particular, in one embodiment of the compound of formula (VI), X is O.

In one embodiment of the compound of formula (VI), $R^1$ is hydrogen.

In particular, in one embodiment of the compound of formula (VI), $R^1$ is hydroxyl.

In particular, in one embodiment of the compound of formula (VI), $R^8$ is halogen e.g. chlorine.

In particular, in one embodiment of the compound of formula (VI), X is O, $R^1$ is hydroxyl, and $R^8$ is chlorine. $R^6$ and $R^7$ $R^6$ and $R^7$ are hydrogen, $C_{1-4}$alkoxy or halogen (e.g. chlorine or fluorine), or $R^6$ and $R^7$ join to form a Ring A which is optionally substituted by one or more (e.g. 1, 2, or 3) $R^{10}$ groups.

In one embodiment, $R^6$ and $R^7$ are hydrogen or halogen (e.g. chlorine or fluorine), or $R^6$ and $R^7$ join to form a Ring A which is optionally substituted by one or more (e.g. 1, 2, or 3) $R^{10}$ groups;

Ring A is either:
(i) a five-membered nitrogen-containing heterocyclic ring (e.g. an aromatic ring or a non-aromatic ring) wherein the heterocyclic ring optionally contains one or two additional heteroatoms selected from N, O and S, or
(ii) a six-membered aromatic nitrogen-containing heterocyclic ring, wherein the heterocyclic ring optionally contains one or two additional heteroatoms selected from N, O and S; or
(iii) a six-membered non-aromatic nitrogen-containing heterocyclic ring, wherein the heterocyclic ring optionally contains one or two additional heteroatoms selected from N and S; and $R^{10}$ are independently selected from halogen, cyano, cyano$C_{1-4}$alkyl (e.g. —$CH_2$—CN), hydroxyl, =O (oxo), $C_{1-4}$alkyl (e.g. —$CH_3$, —$CH(CH_3)_2$, or —$CH_2CH_3$), halo$C_{1-4}$alkyl (e.g. —$CHF_2$), $C_{1-4}$alkoxy (e.g. —$OCH_3$, —$OCH_2CH_3$ and —$OCH(CH_3)_2$), hydroxyl$C_{1-4}$alkyl (e.g. —$CH_2C(CH_3)_2OH$, —CH($CH_3$)$CH_2OH$, —$CH(CH_3)OH$, —$CH_2CH_2OH$ or —$CH_2OH$), $C_{1-4}$alkoxy$C_{1-4}$alkylene (e.g. —$CH_2$—O—$CH_3$ or —$CH_2$—$CH_2$—O—$CH_3$), $C_{1-4}$alkylsulfone (e.g. —$SO_2CH_3$), amino, mono$C_{1-4}$alkylamino, di$C_{1-4}$alkylamino (e.g. —$N(CH_3)_2$), amino$C_{1-4}$alkylene (e.g. —$CH_2NH_2$), —$C_{1-4}$alkylene-C(=O)$NH_{(2-q)}$($C_{1-6}$ alkyl)$_q$), —$C_{0-4}$alkylene-NHC(=O)$C_{1-6}$ alkyl, sulfonamide$C_{0-4}$ alkylene (e.g. —$SO_2NR^x_2$ or —$CH_2SO_2NR^x_2$ wherein $R^x$ is independently selected from H and $C_{1-6}$ alkyl), 3 to 6 membered cycloalkyl, optionally substituted five- or six-membered unsaturated heterocyclic group containing 1, 2, 3 or 4 heteroatoms selected from O, N, or S where the optional substituent is selected from $C_{1-4}$alkyl, $C_{1-4}$alkyl substituted with 3 to 6 membered cycloalkyl, $C_{1-4}$alkyl substituted with optionally substituted five- or six-membered unsaturated heterocyclic group containing 1, 2, 3 or 4 heteroatoms selected from O, N, or S where the optional substituent is selected from $C_{1-4}$alkyl, $C_{1-4}$alkyl substituted with optionally substituted four- to six-membered saturated heterocyclic group containing 1 or 2 heteroatoms selected from O, N, or S where the optional substituent is selected from $C_{1-4}$alkyl, and optionally substituted four- to six-membered saturated heterocyclic group containing 1 or 2 heteroatoms selected from O, N, or S where the optional substituent is selected from $C_{1-4}$alkyl; and
q is selected from 0, 1 or 2.

In one embodiment, $R^6$ and $R^7$ are hydrogen, $C_{1-4}$alkoxy or fluorine, or $R^6$ and $R^7$ join to form a Ring A which is optionally substituted by one or more (e.g. 1, 2, or 3) $R^{10}$ groups.

In one embodiment, $R^6$ and $R^7$ are hydrogen or fluorine, or $R^6$ and $R^7$ join to form a Ring A which is optionally substituted by one or more (e.g. 1, 2, or 3) $R^{10}$ groups;

Ring A is either:
(i) a five-membered nitrogen-containing heterocyclic ring (e.g. an aromatic ring or a non-aromatic ring) wherein the heterocyclic ring optionally contains one or two additional heteroatoms selected from N, O and S, or
(ii) a six-membered aromatic nitrogen-containing heterocyclic ring, wherein the heterocyclic ring optionally contains one or two additional heteroatoms selected from N, O and S; or
(iii) a six-membered non-aromatic nitrogen-containing heterocyclic ring, wherein the heterocyclic ring optionally contains one or two additional heteroatoms selected from N and S; and $R^{10}$ are independently selected from halogen, cyano, cyano$C_{1-4}$alkyl (e.g. —$CH_2$—CN), hydroxyl, =O (oxo), $C_{1-4}$alkyl (e.g. —$CH_3$, —$CH(CH_3)_2$, or —$CH_2CH_3$), halo$C_{1-4}$alkyl (e.g. —$CHF_2$), $C_{1-4}$alkoxy (e.g. —$OCH_3$, —$OCH_2CH_3$ and —$OCH(CH_3)_2$), hydroxyl$C_{1-4}$alkyl (e.g. —$CH_2C(CH_3)_2OH$, —CH($CH_3$)$CH_2OH$, —$CH(CH_3)OH$, —$CH_2CH_2OH$ or —$CH_2OH$), $C_{1-4}$alkoxy$C_{1-4}$alkylene (e.g. —$CH_2$—O—$CH_3$ or —$CH_2$—$CH_2$—O—$CH_3$), $C_{1-4}$alkylsulfone (e.g. —$SO_2CH_3$), amino, mono$C_{1-4}$alkylamino, di$C_{1-4}$alkylamino (e.g. —$N(CH_3)_2$), amino$C_{1-4}$alkylene (e.g. —$CH_2NH_2$), —$C_{1-4}$alkylene-C(=O)$NH_{(2-q)}$($C_{1-6}$ alkyl)$_q$), —$C_{0-4}$alkylene-NHC(=O)$C_{1-6}$ alkyl, sulfonamide$C_{0-4}$ alkylene (e.g. —$SO_2NR^x_2$ or —$CH_2SO_2NR^x_2$ wherein $R^x$ is independently selected from H and $C_{1-6}$ alkyl), 3 to 6 membered cycloalkyl, optionally substituted five- or six-membered unsaturated heterocyclic group containing 1, 2, 3 or 4 heteroatoms selected from O, N, or S where the optional substituent is selected from $C_{1-4}$alkyl, $C_{1-4}$alkyl substituted with 3 to 6 membered cycloalkyl, $C_{1-4}$alkyl substituted with optionally substituted five- or six-membered unsaturated heterocyclic group containing 1, 2, 3 or 4 heteroatoms selected from O, N, or S where the optional substituent is selected from $C_{1-4}$alkyl, $C_{1-4}$alkyl substituted with optionally substituted four- to six-membered saturated heterocyclic group containing 1 or 2 heteroatoms selected from O, N, or S where the optional substituent is selected from $C_{1-4}$alkyl, and optionally substituted four- to six-membered saturated heterocyclic group containing 1 or 2 heteroatoms selected from O, N, or S where the optional substituent is selected from $C_{1-4}$alkyl; and q is selected from 0, 1 or 2.

In one embodiment, $R^6$ and $R^7$ are hydrogen or halogen (e.g. chlorine or fluorine).

In one embodiment, $R^6$ and $R^7$ are hydrogen, $C_{1-4}$alkoxy or fluorine.

In one embodiment, $R^6$ and $R^7$ are hydrogen or $C_{1-4}$alkoxy.

In one embodiment, $R^6$ and $R^7$ are hydrogen.

In particular, $R^7$ is hydrogen and $R^6$ is halogen (e.g. chlorine or fluorine), and the compound of formula. (I) is a compound of formula (VII) or a tautomer or a solvate or a pharmaceutically acceptable salt thereof:

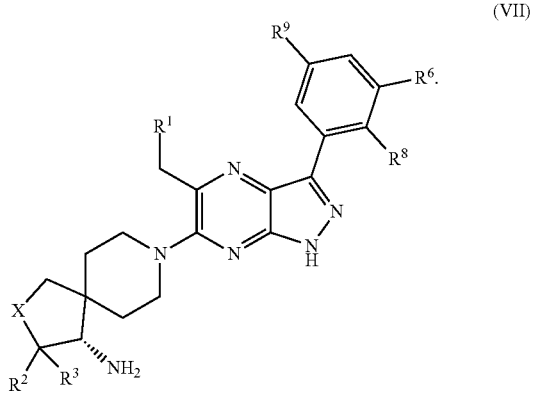

(VII)

In particular, in one embodiment of the compound of formula (VII) $R^8$ is fluorine.

In particular, in one embodiment of the compound of formula (VII) $R^8$ is chlorine.

In one embodiment of the compound of formula (VII), X is $CR^4R^5$.

In particular, in one embodiment of the compound of formula (VII), X is O.

In one embodiment of the compound of formula (VII), $R^1$ is hydrogen.

In particular, in one embodiment of the compound of formula (VII), $R^1$ is hydroxyl.

In particular, in one embodiment of the compound of formula (VII), $R^8$ is halogen e.g. chlorine or fluorine.

In particular, in one embodiment of the compound of formula (VII), $R^9$ is hydrogen.

In particular, in one embodiment of the compound of formula (VII), X is O, $R^1$ is hydroxyl, $R^9$ is hydrogen and $R^8$ is chlorine or fluorine.

In one embodiment, $R^6$ and $R^7$ join to form a Ring A which is optionally substituted by one or more (e.g. 1, 2, or 3) $R^{10}$ groups;
wherein Ring A is either:
(i) a five-membered nitrogen-containing heterocyclic ring (e.g. an aromatic ring or a non-aromatic ring) wherein the heterocyclic ring optionally contains one or two additional heteroatoms selected from N, O and S, or
(ii) a six-membered aromatic nitrogen-containing heterocyclic ring, wherein the heterocyclic ring optionally contains one or two additional heteroatoms selected from N, O and S; or
(iii) a six-membered non-aromatic nitrogen-containing heterocyclic ring, wherein the heterocyclic ring optionally contains one or two additional heteroatoms selected from N and S.

In one embodiment, ring A is a five-membered nitrogen-containing heterocyclic ring (e.g. an aromatic ring or a non-aromatic ring), or a six-membered aromatic nitrogen-containing heterocyclic ring, wherein the heterocyclic ring optionally contains one or two additional heteroatoms selected from N, O and S.

In one embodiment, ring A is pyrazolyl, thiazolyl, pyrazinyl, and pyridyl. This then with the fused benzo moeity forms indazolyl, benzothiazolyl, quinoxalinyl or quinolinyl respectively.

In one embodiment, ring A is a five-membered nitrogen-containing heterocyclic ring (e.g. an aromatic ring or a non-aromatic ring), wherein the heterocyclic ring optionally contains one or two additional heteroatoms selected from N, O and S.

In one embodiment, ring A is a five-membered nitrogen-containing heterocyclic ring (e.g. an aromatic ring or a non-aromatic ring), or a six-membered aromatic nitrogen-containing heterocyclic ring, wherein the heterocyclic ring optionally contains one or two additional heteroatoms selected from N, O and S.

In one embodiment, ring A is a five-membered nitrogen-containing heterocyclic ring wherein the heterocyclic ring optionally contains one or two additional heteroatoms selected from N, O and S.

In one embodiment, ring A is a five-membered nitrogen-containing heterocyclic ring wherein the heterocyclic ring optionally contains one additional heteroatom selected from N, O and S.

In one embodiment, ring A is a five-membered nitrogen-containing heterocyclic ring wherein the heterocyclic ring optionally contains one additional heteroatom which is N or S.

In one embodiment, ring A is a five-membered aromatic nitrogen-containing heterocyclic ring, wherein the heterocyclic ring optionally contains one or two additional heteroatoms selected from N and S.

In one embodiment, ring A is a five-membered nitrogen-containing heterocyclic ring wherein the heterocyclic ring contains one additional heteroatom which is N.

In one embodiment, ring A is a five-membered aromatic nitrogen-containing heterocyclic ring wherein the heterocyclic ring contains one additional heteroatom which is N.

In one embodiment, ring A is a five-membered nitrogen-containing heterocyclic ring wherein the heterocyclic ring contains one additional heteroatom which is S.

In one embodiment, ring A is a five-membered aromatic nitrogen-containing heterocyclic ring wherein the heterocyclic ring contains one additional heteroatom which is S.

In one embodiment, ring A is pyrrolyl, imidazolyl, oxazolyl, oxadiazolyl, isoxazolyl, thiazolyl, thiadiazolyl, isothiazolyl, pyrazolyl and triazolyl, for example wherein ring A is thiazolyl or pyrazolyl.

In one embodiment, ring A is a five-membered nitrogen-containing heterocyclic ring (e.g. an aromatic ring or a non-aromatic ring), wherein the heterocyclic ring optionally contains one or two additional heteroatoms selected from N, O and S, and the compound of formula (I) is a compound of formula (VIII) or a tautomer or a solvate or a pharmaceutically acceptable salt thereof:

(VIII)

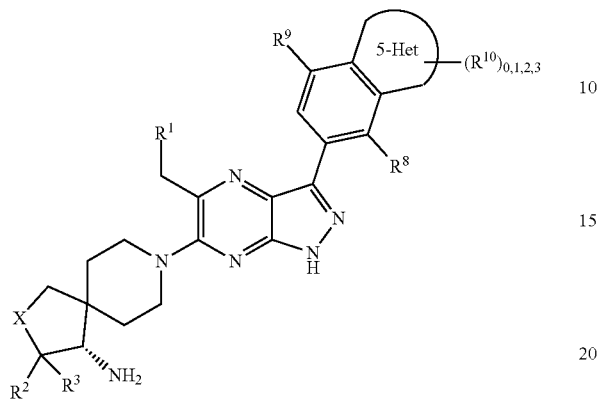

wherein X, $R^1$, $R^2$, $R^3$, $R^8$, $R^9$ and $R^{10}$ are as defined herein, and 5-Het is a five-membered nitrogen-containing heterocyclic ring (e.g. an aromatic ring or a non-aromatic ring), wherein the heterocyclic ring optionally contains one or two additional heteroatoms selected from N, O and S.

In one embodiment, the moiety

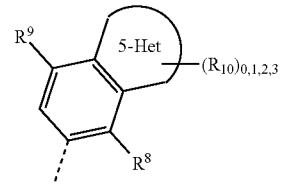

is selected from the following options in Table I, wherein c is 0, 1, 2 or 3:

TABLE I

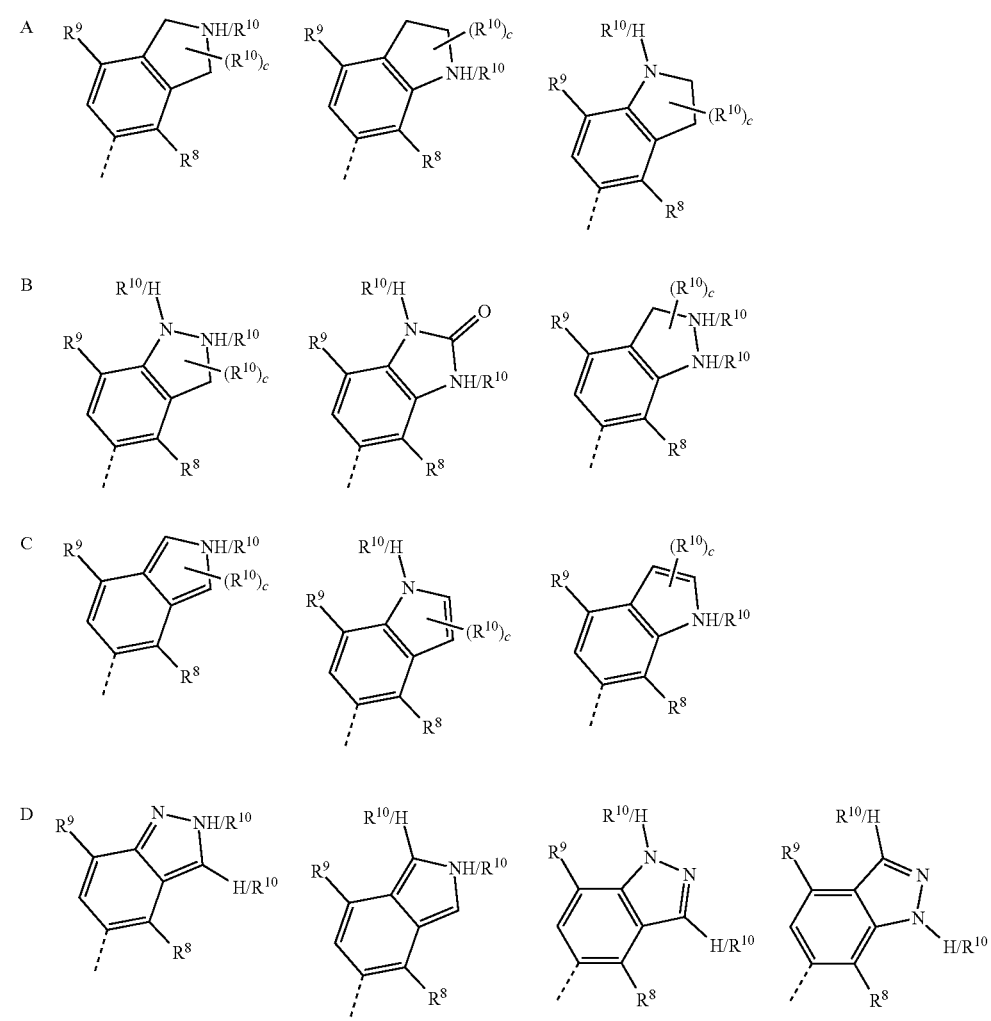

TABLE I-continued
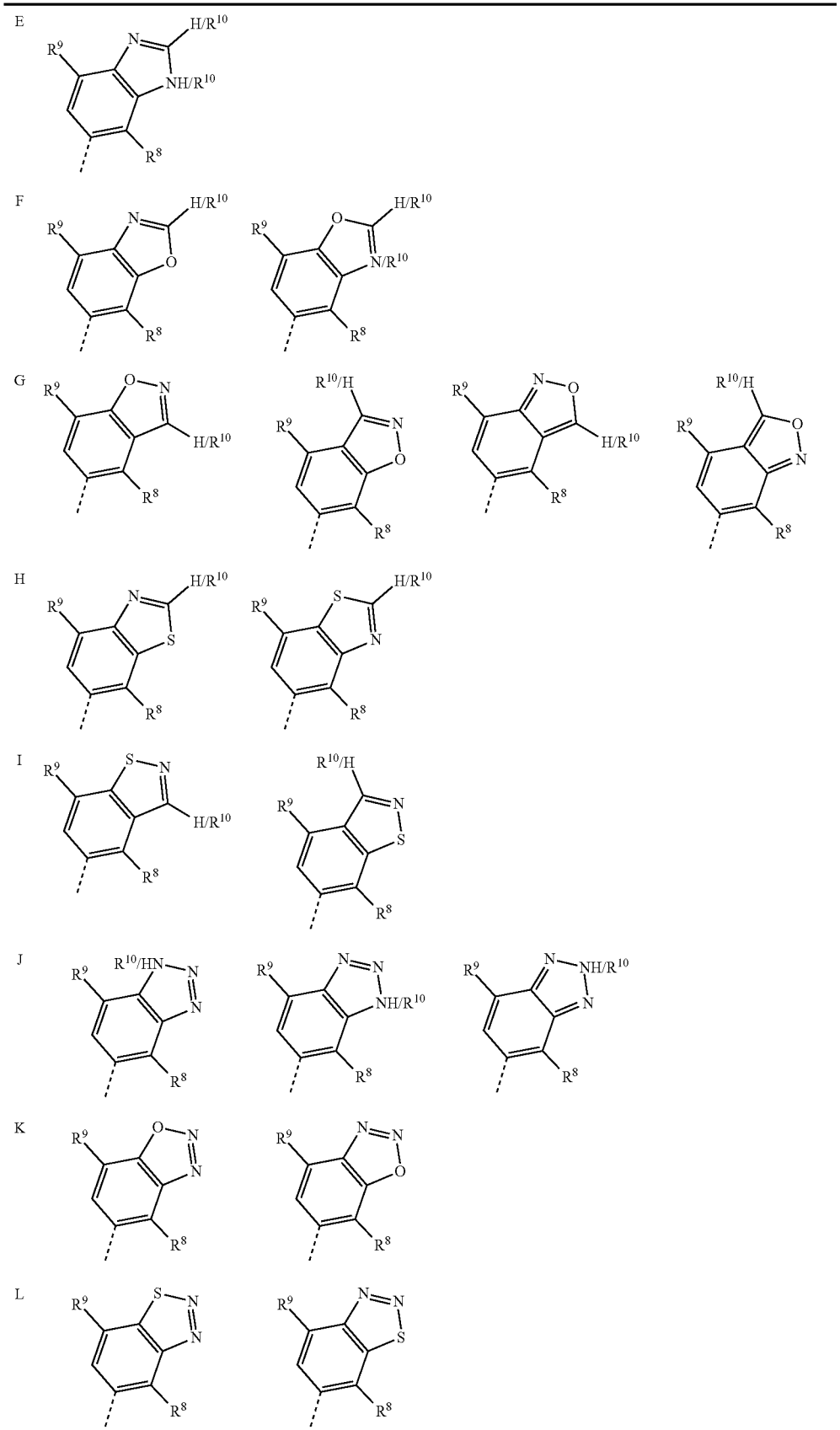

TABLE I-continued
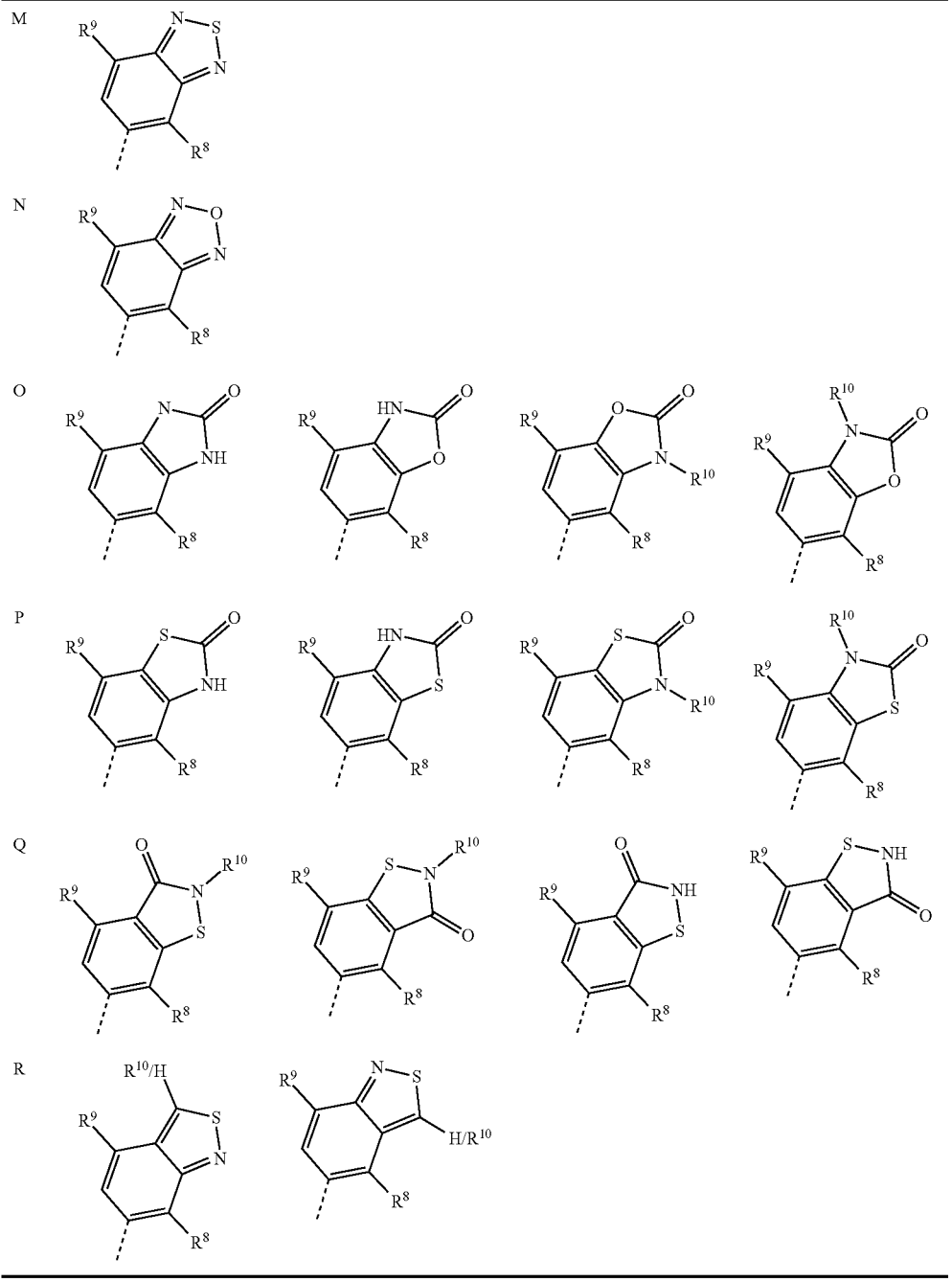
For example, the moiety
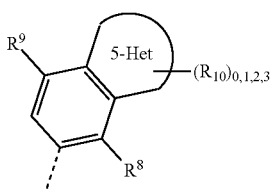
is selected from options A, B, C, D, E, F, G, H, I, O, P and Q in Table I.
In particular, the moiety
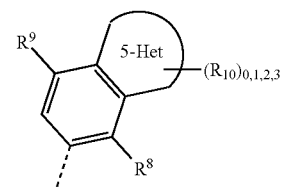
is selected from options C, D, E, F, G, H, I, O, P and Q in Table I.

In particular, the moiety

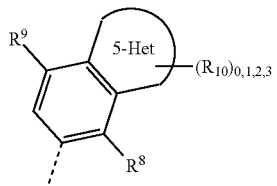

is selected from options D, H, P and Q in Table I. In one embodiment the moiety is selected from D and H.

In particular, the moiety

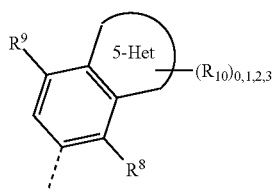

is selected from:

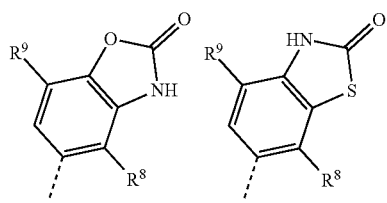

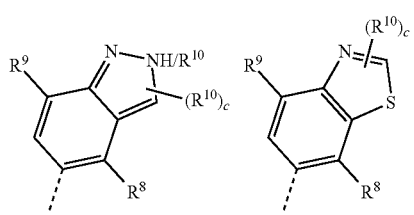

wherein c is 0, 1, 2 or 3, for example

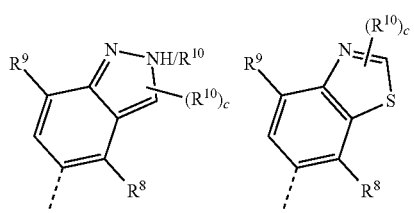

wherein c is 0, 1, 2 or 3.

In particular, the moiety

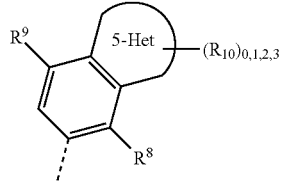

is selected from

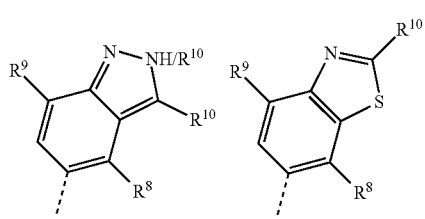

In particular, the compound of formula (VIII) is a compound of formula (VIIIa) or a tautomer or a solvate or a pharmaceutically acceptable salt thereof:

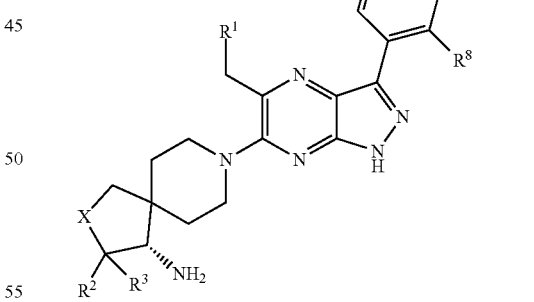

(VIIIa)

wherein X, $R^1$, $R^2$, $R^3$, $R^8$, $R^9$ and $R^{10}$ are as defined herein, for example wherein $R^{10}$ is $C_{1-4}$alkyl.

In particular, the compound of formula (VIIIa) is a compound of formula (VIIIb) or a tautomer or a solvate or a pharmaceutically acceptable salt thereof:

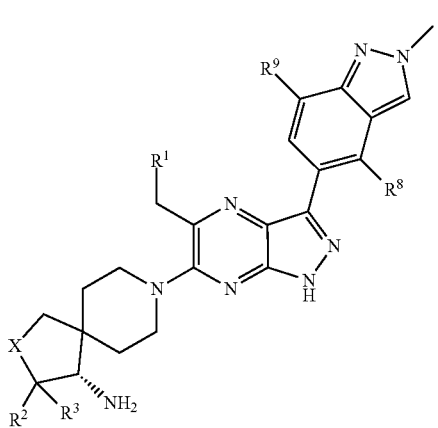

(VIIIb)

wherein X, R$^1$, R$^2$, R$^3$, R$^8$ and R$^9$ are as defined herein.

In particular, the compound of formula (VIIIa) is a compound of formula (VIIIc) or a tautomer or a solvate or a pharmaceutically acceptable salt thereof:

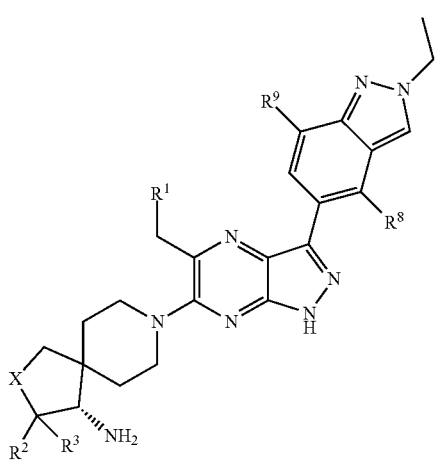

(VIIIc)

wherein X, R$^1$, R$^2$, R$^3$, R$^8$ and R$^9$ are as defined herein.

In particular, the compound of formula (VIII) is a compound of formula (IX) or a tautomer or a solvate or a pharmaceutically acceptable salt thereof:

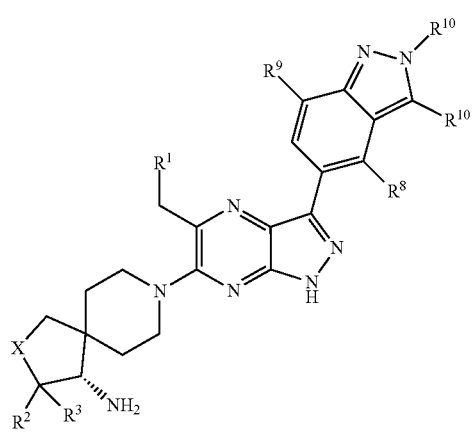

(IX)

wherein X, R$^1$, R$^2$, R$^3$, R$^8$, R$^9$ and R$^{10}$ are as defined herein.

In particular, the compound of formula (VIII) is a compound of formula (IXa) or a tautomer or a solvate or a pharmaceutically acceptable salt thereof:

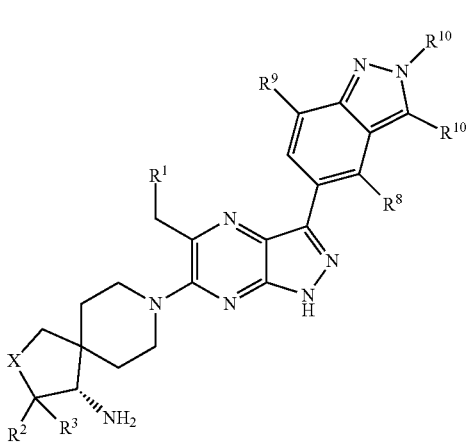

(IXa)

wherein X, R$^1$, R$^2$, R$^3$, R$^8$, and R$^9$ are as defined herein, and R$^{10}$ is independently selected from C$_{1-4}$ alkyl (e.g. —CH$_3$) and halogen (e.g. chlorine). In particular, R$^{10}$ is independently selected from C$_{1-4}$alkyl (e.g. —CH$_3$), when on the nitrogen or carbon atom, and halogen (e.g. chlorine), when on the carbon atom.

In particular, the compound of formula (VIII) is a compound of formula (IXb) or a tautomer or a solvate or a pharmaceutically acceptable salt thereof:

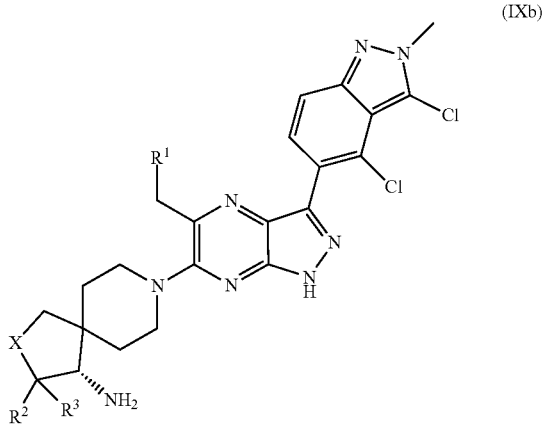

(IXb)

wherein X, $R^1$, $R^2$ and $R^3$, are as defined herein.

In particular, the compound of formula (VIII) is a compound of formula (X) or a tautomer or a solvate or a pharmaceutically acceptable salt thereof:

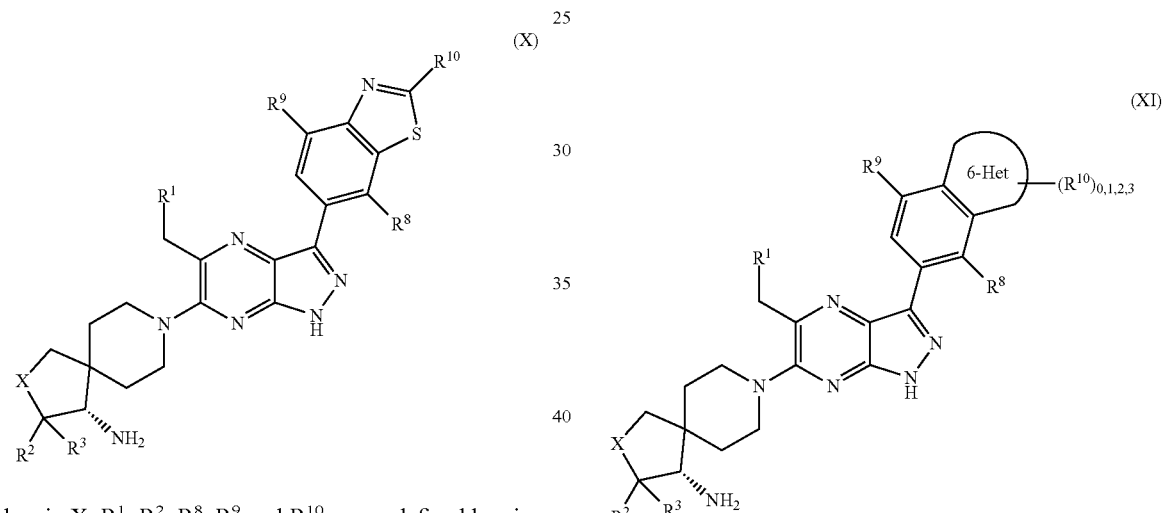

(X)

wherein X, $R^1$, $R^2$, $R^8$, $R^9$ and $R^{10}$ are as defined herein.

In particular, in one embodiment of the compound of formula (VIII), (VIIIa), (VIIIb), (VIIIc), (IX), (IXa) and (X), $R^8$ is halogen e.g. chlorine or fluorine.

In particular, in one embodiment of the compound of formula (VIII), (VIIIa), (VIIIb), (VIIIc), (IX), (IXa) and (X), $R^8$ is fluorine.

In particular, in one embodiment of the compound of formula (VIII), (VIIIa), (VIIIb), (VIIIc), (IX), (IXa) and (X), $R^8$ is chlorine.

In one embodiment of the compound of formula (VIII), (VIIIa), (VIIIb), (VIIIc), (IX), (IXa) and (X), X is $CR^4R^5$.

In particular, in one embodiment of the compound of formula (VIII), (VIIIa), (VIIIb), (VIIIc), (IX), (IXa) and (X), X is O.

In one embodiment of the compound of formula (VIII), (VIIIa), (VIIIb), (VIIIc), (IX), (IXa) and (X), $R^1$ is hydrogen.

In particular, in one embodiment of the compound of formula (VIII), (VIIIa), (VIIIb), (VIIIc), (IX), (IXa) and (X), $R^1$ is hydroxyl.

In particular, in one embodiment of the compound of formula (VIII), (VIIIa), (VIIIb), (VIIIc), (IX), (IXa) and (X), $R^9$ is hydrogen.

In particular, in one embodiment of the compound formula (VIII), (VIIIa), (VIIIb), (VIIIc), (IX), (IXa) and (X), X is O, $R^1$ is hydroxyl, $R^9$ is hydrogen and $R^8$ is chlorine or fluorine.

In one embodiment, ring A is either:
(i) a six-membered aromatic nitrogen-containing heterocyclic ring, wherein the heterocyclic ring optionally contains one or two additional heteroatoms selected from N, O and S; or
(ii) a six-membered non-aromatic nitrogen-containing heterocyclic ring, wherein the heterocyclic ring optionally contains one or two additional heteroatoms selected from N and S.

In one embodiment, ring A is a six-membered aromatic nitrogen-containing heterocyclic ring, and the compound of formula (I) is a compound of formula (XI) or a tautomer or a solvate or a pharmaceutically acceptable salt thereof:

(XI)

wherein X, $R^1$, $R^2$, $R^3$, $R^8$, $R^9$ and $R^{10}$ are as defined herein, and 6-Het is either:
(i) a six-membered aromatic nitrogen-containing heterocyclic ring, wherein the heterocyclic ring optionally contains one or two additional heteroatoms selected from N, O and S; or
(iii) a six-membered non-aromatic nitrogen-containing heterocyclic ring, wherein the heterocyclic ring optionally contains one or two additional heteroatoms selected from N and S.

When ring A is a six-membered nitrogen-containing ring, if the ring is aromatic then the ring may optionally contain one or two additional heteroatoms selected from N, O and S. However, if the six-membered nitrogen-containing ring is non-aromatic then the ring may optionally contain one or two additional heteroatoms selected from N and S i.e. the ring cannot include a further heteroatom which is O.

In one embodiment, 6-Het is a six-membered nitrogen-containing heterocyclic ring, wherein the heterocyclic ring optionally contains one or two additional heteroatoms selected from N and S.

In particular, 6-Het is a six-membered nitrogen-containing heterocyclic ring, wherein the heterocyclic ring optionally contains one or two additional heteroatoms selected from N.

In particular, 6-Het is a six-membered nitrogen-containing heterocyclic ring, wherein the heterocyclic ring optionally contains one additional heteroatom selected from N.

In particular, 6-Het is a six-membered nitrogen-containing heterocyclic ring, wherein the heterocyclic ring contains one additional heteroatom which is N.

In one embodiment, the moiety

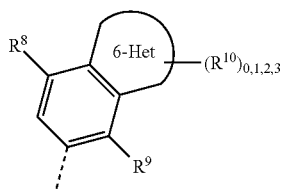

is selected from the following options in Table II, wherein c is 0, 1, 2 or 3:

TABLE II

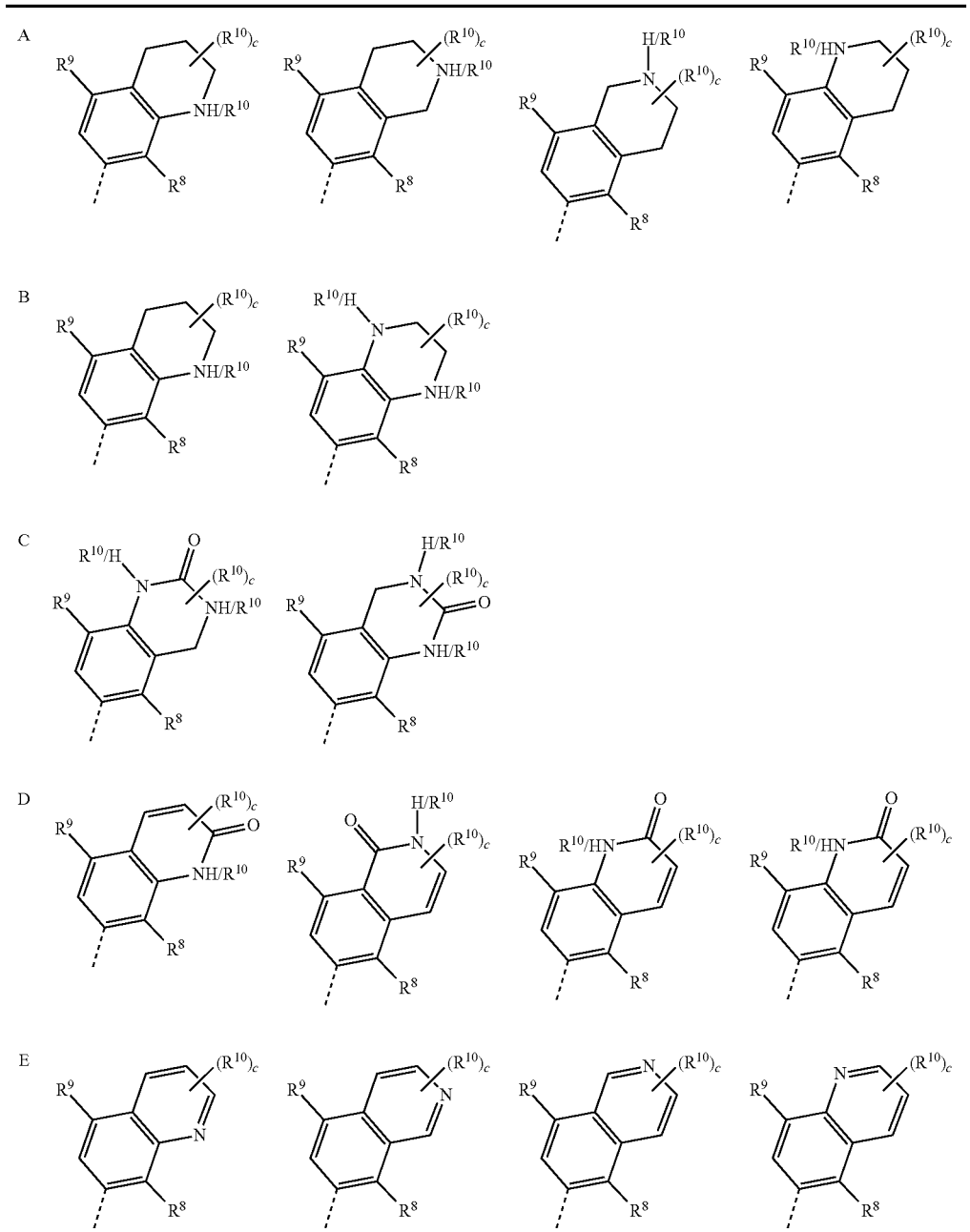

TABLE II-continued
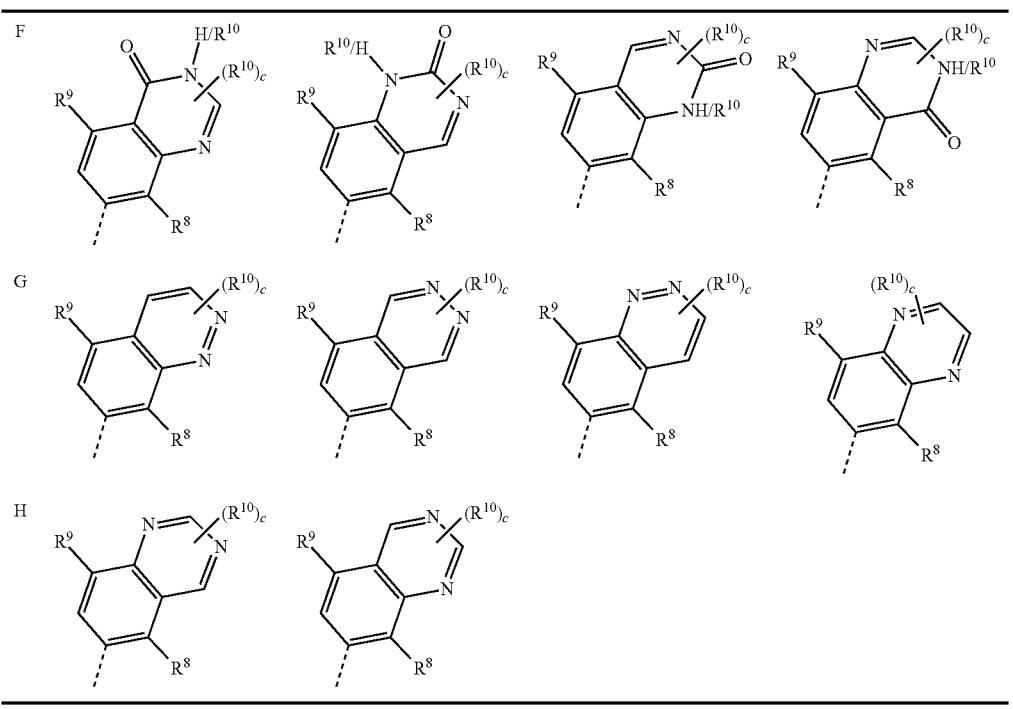
In particular, the moiety
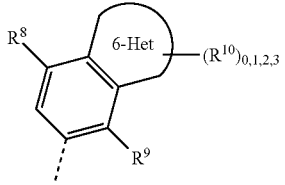
is selected from options D, E, G and H in Table II, more particularly selected from D, E and H, for example D.
In particular, the moiety
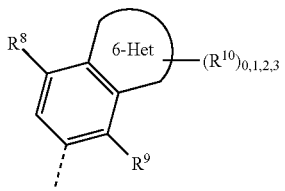
is selected from:
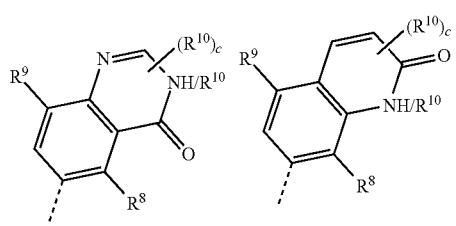
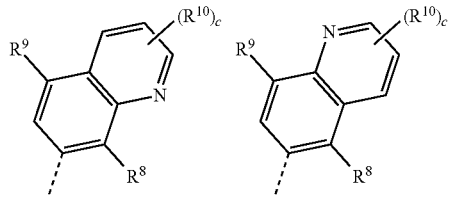
wherein c is 0, 1, 2 or 3.
In particular, the moiety
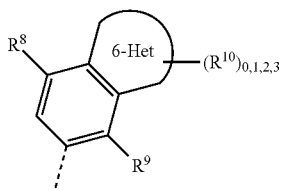
is:
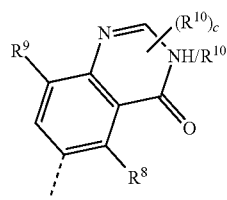
wherein c is 0, 1, 2 or 3.

In particular, the moiety

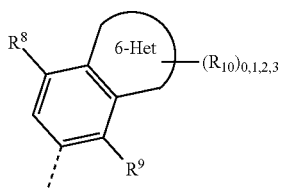

is selected from options E and G in Table II, in particular option G.

In particular, the moiety

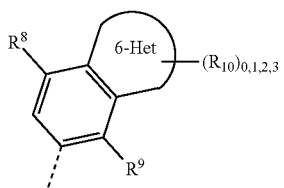

is selected from:

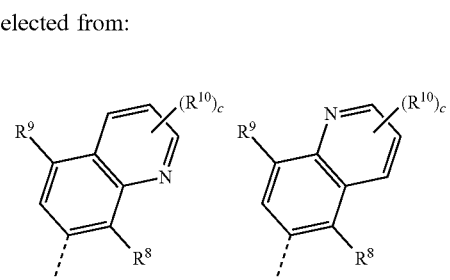

wherein c is 0, 1, 2 or 3.

In particular the moiety

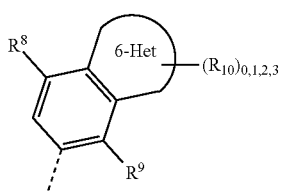

is:

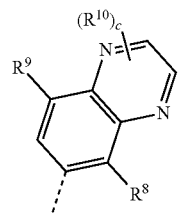

wherein c is 0, 1, 2 or 3.

In one embodiment, the compound of formula (I) is a compound of formula (XII) or a tautomer or a solvate or a pharmaceutically acceptable salt thereof:

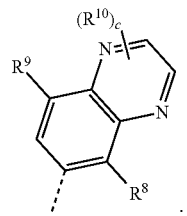

(XII)

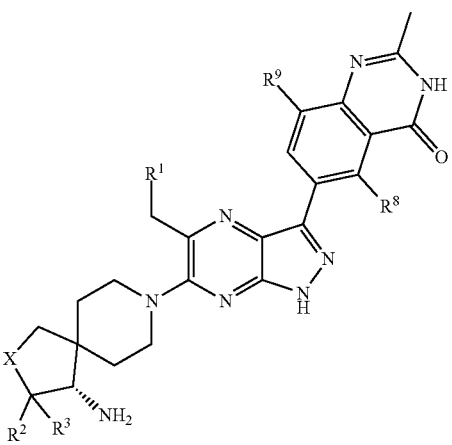

wherein X, $R^1$, $R^2$, $R^3$, $R^8$, $R^9$ and $R^{10}$ are as defined herein.

In one embodiment, the compound of formula (XII) is a compound of formula (XIIa) or a tautomer or a solvate or a pharmaceutically acceptable salt thereof:

(XIIa)

wherein X, $R^1$, $R^2$, $R^3$, $R^8$ and $R^9$ are as defined herein.

In one embodiment, the compound of formula (XII) is a compound of formula (XIIb) or a tautomer or a solvate or a pharmaceutically acceptable salt thereof:

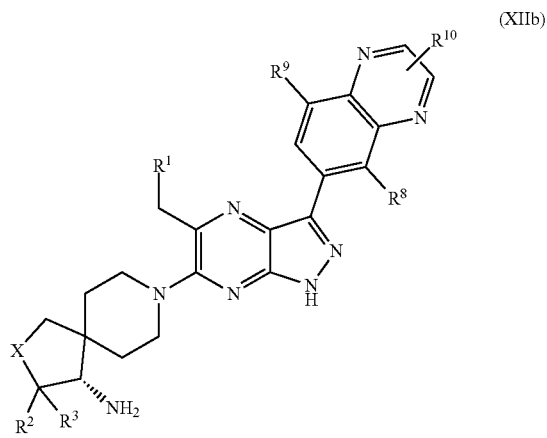

(XIIb)

wherein X, $R^1$, $R^2$, $R^3$, $R^8$, $R^9$ and $R^{10}$ are as defined herein.

In one embodiment, the compound of formula (XII) is a compound of formula (XIIc) or a tautomer or a solvate or a pharmaceutically acceptable salt thereof:

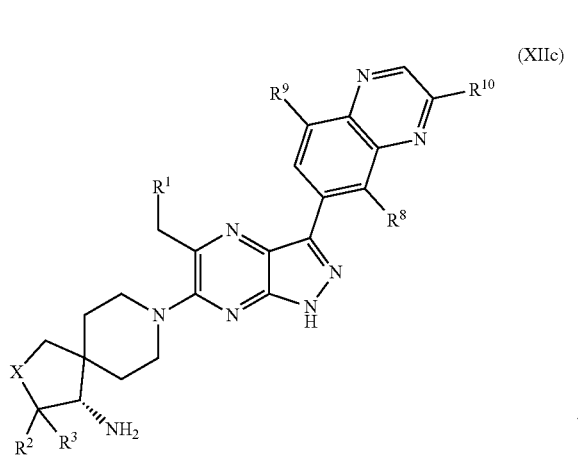

(XIIc)

wherein X, $R^1$, $R^2$, $R^3$, $R^8$, $R^9$ and $R^{10}$ are as defined herein.

In one embodiment of the compound of formula (XIIc), $R^{10}$ is halogen, cyano, $C_{1-4}$alkyl (e.g. —CH$_3$, —CH(CH$_3$)$_2$, or —CH$_2$CH$_3$), haloC$_{1-4}$alkyl (e.g. —CHF$_2$), C$_{1-4}$alkoxy (e.g. —OCH$_3$, —OCH$_2$CH$_3$ and —OCH(CH$_3$)$_2$), hydroxylC$_{1-4}$alkyl (e.g. —CH$_2$C(CH$_3$)$_2$OH, —CH(CH$_3$)CH$_2$OH, —CH(CH$_3$)OH, —CH$_2$CH$_2$OH or —CH$_2$OH), amino, monoC$_{1-4}$alkylamino, diC$_{1-4}$alkylamino (e.g. —N(CH$_3$)$_2$), aminoC$_{1-4}$alkylene (e.g. —CH$_2$NH$_2$), and optionally substituted four- to six-membered saturated heterocyclic group containing 1 or 2 heteroatoms selected from O, N, or S where the optional substituent is selected from C$_{1-4}$alkyl.

In one embodiment of the compound of formula (XIIc), $R^{10}$ is diC$_{1-4}$alkylamino (e.g. —N(CH$_3$)$_2$), C$_{1-4}$alkoxy (e.g. —OCH$_3$, —OCH$_2$CH$_3$ and —OCH(CH$_3$)$_2$), haloC$_{1-4}$alkyl (e.g. —CF$_3$), and optionally substituted four- to six-membered saturated heterocyclic group containing 1 or 2 heteroatoms selected from O, N, or S where the optional substituent is selected from C$_{1-4}$alkyl.

In one embodiment, ring A includes a nitrogen atom adjacent to (i.e. bonded directly to) the benzene ring and the compound of formula (I) is a compound of formula (XIIIa) or (XIIIb) or a tautomer or a solvate or a pharmaceutically acceptable salt thereof, i.e:

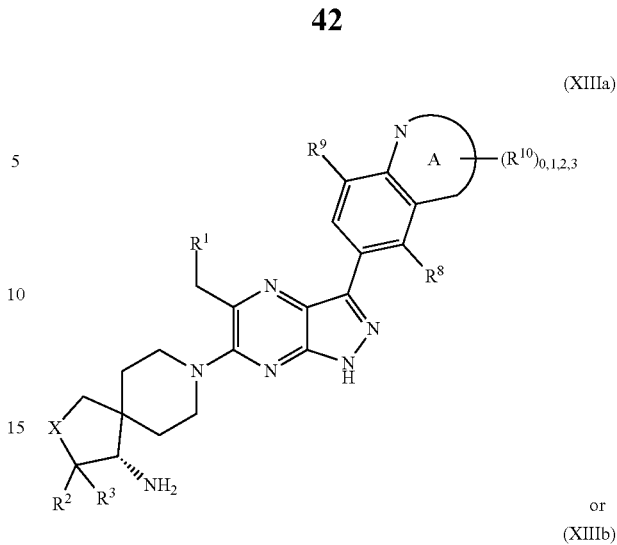

(XIIIa)

or

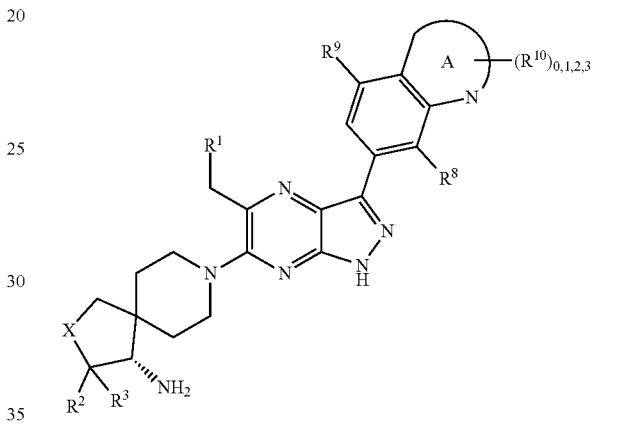

(XIIIb)

wherein X, Q, $R^1$, $R^2$, $R^3$, $R^8$, $R^9$ and $R^{10}$ are as defined herein.

$R^{10}$ are independently selected from halogen, cyano, cyanoC$_{1-4}$alkyl (e.g. —CH$_2$—CN), hydroxyl, =O (oxo), C$_{1-4}$alkyl (e.g. —CH$_3$, CH(CH$_3$)$_2$, or —CH$_2$CH$_3$), haloC$_{1-4}$alkyl (e.g. —CHF$_2$), C$_{1-4}$alkoxy (e.g. —OCH$_3$ —OCH$_2$CH$_3$ and —OCH(CH$_3$)$_2$), hydroxylC$_{1-4}$alkyl (e.g. —CH$_2$C(CH$_3$)$_2$OH, —CH (CH$_3$)CH$_2$OH, —CH(CH$_3$)OH, —CH$_2$CH$_2$OH or —CH$_2$OH), C$_{1-4}$alkoxyC$_{1-4}$alkylene (e.g. —CH$_2$—O—CH$_3$ or —CH$_2$—CH$_2$—O—CH$_3$), C$_{1-4}$alkylsulfone (e.g. —SO$_2$CH$_3$), amino, monoC$_{1-4}$alkylamino, diC$_{1-4}$alkylamino (e.g. —N(CH$_3$)$_2$), amino C$_{1-4}$alkylene (e.g. —CH$_2$NH$_2$), —C$_{1-4}$alkylene-C (=O)NH$_{(2-q)}$(C$_{1-6}$ alkyl)$_q$), —C$_{1-4}$alkylene-NHC (=O)C$_{1-6}$ alkyl, sulfonamideC$_{0-4}$ alkylene (e.g. —SO$_2$NR$^x_2$ or —CH$_2$SO$_2$NR$^x_2$ wherein R$^x$ is independently selected from H and C$_{1-6}$ alkyl), 3 to 6 membered cycloalkyl, optionally substituted five- or six-membered unsaturated heterocyclic group containing 1, 2, 3 or 4 heteroatoms selected from O, N, or S where the optional substituent is selected from C$_{1-4}$alkyl, C$_{1-4}$alkyl substituted with 3 to 6 membered cycloalkyl, C$_{1-4}$alkyl substituted with optionally substituted five- or six-membered unsaturated heterocyclic group containing 1, 2, 3 or 4 heteroatoms selected from O, N, or S where the optional substituent is selected from C$_{1-4}$alkyl, C$_{1-4}$alkyl substituted with optionally substituted four- to six-membered saturated heterocyclic group containing 1 or 2 heteroatoms selected from O, N, or S where the optional substituent is selected from $C_{1-4}$alkyl, and optionally substituted four- to six-membered saturated heterocyclic group containing 1 or 2 heteroatoms selected from O, N, or S where the optional substituent is selected from $C_{1-4}$alkyl; and q is selected from 0, 1 or 2.

In one embodiment, $R^{10}$ are independently selected from halogen, cyano, cyano$C_{1-4}$alkyl (e.g. —CH$_2$—CN), hydroxyl, =O (oxo), $C_{1-4}$alkyl (e.g. —CH$_3$ or —CH$_2$CH$_3$), halo$C_{1-4}$alkyl, $C_{1-4}$alkoxy (e.g. —OCH$_3$), hydroxyl$C_{1-4}$alkyl (e.g. —CH$_2$C(CH$_3$)$_2$OH, —CH(CH$_3$)CH$_2$OH, —CH(CH$_3$)OH, —CH$_2$CH$_2$OH or —CH$_2$OH), $C_{1-4}$alkoxy$C_{1-4}$alkylene (e.g. —CH$_2$—O—CH$_3$ or —CH$_2$—CH$_2$—O—CH$_3$), $C_{1-4}$alkylsulfone (e.g. —SO$_2$CH$_3$), amino, mono$C_{1-4}$alkylamino, di$C_{1-4}$alkylamino (e.g. —N(CH$_3$)$_2$), amino$C_{1-4}$alkylene (e.g. —CH$_2$NH$_2$), —$C_{1-4}$alkylene-C(=O)NH$_{(2-q)}$($C_{1-6}$ alkyl)$_q$), —$C_{1-4}$alkylene-NHC(=O)$C_{1-6}$ alkyl, sulfonamide$C_{0-4}$ alkylene (e.g. —SO$_2$NR$^x_2$ or —CH$_2$SO$_2$NR$^x_2$, wherein R$^x$ is independently selected from H and $C_{1-6}$alkyl), and optionally substituted four- to six-membered saturated heterocyclic group containing 1 or 2 heteroatoms selected from O, N, or S where the optional substituent is selected from $C_{1-4}$alkyl; and q is selected from 0, 1 or 2.

In one embodiment, $R^{10}$ are independently selected from halogen, cyano, cyano$C_{1-4}$alkyl (e.g. —CH$_2$—CN), hydroxyl, =O (oxo), $C_{1-4}$alkyl (e.g. —CH$_3$ or —CH$_2$CH$_3$), halo$C_{1-4}$alkyl, $C_{1-4}$alkoxy (e.g. —OCH$_3$), hydroxyl$C_{1-4}$alkyl (e.g. —CH$_2$C(CH$_3$)$_2$OH, —CH(CH$_3$)CH$_2$OH, —CH(CH$_3$)OH, —CH$_2$CH$_2$OH or —CH$_2$OH), —$C_{1-4}$alkylene$C_{1-4}$alkoxy (e.g. —CH$_2$—O—CH$_3$ or —CH$_2$—CH$_2$—O—CH$_3$), $C_{1-4}$alkylsulfone (e.g. —SO$_2$CH$_3$), amino, mono$C_{1-4}$alkylamino, di$C_{1-4}$alkylamino (e.g. —N(CH$_3$)$_2$), —$C_{1-4}$alkyleneamino (e.g. —CH$_2$NH$_2$), —$C_{1-4}$alkylene-C(=O)NH$_{(2-q)}$($C_{1-6}$ alkyl)$_q$), —$C_{1-4}$alkylene-NHC(=O)$C_{1-6}$ alkyl, —$C_{0-4}$alkylenesulfonamide (e.g. —SO$_2$NR$^x_2$ or —CH$_2$SO$_2$NR$^x_2$, wherein R$^x$ is independently selected from H and $C_{1-6}$alkyl), and optionally substituted four- to six-membered saturated heterocyclic group containing 1 or 2 heteroatoms selected from O, N, or S where the optional substituent is selected from $C_{1-4}$alkyl.

In one embodiment, two substituents $R^{10}$ are present; one $R^{10}$ is =O (oxo) and one $R^{10}$ is independently selected from halogen, cyano, cyano$C_{1-4}$alkyl (e.g. —CH$_2$—CN), hydroxyl, $C_{1-4}$alkyl (e.g. —CH$_3$ or —CH$_2$CH$_3$), halo$C_{1-4}$alkyl, $C_{1-4}$alkoxy (e.g. —OCH$_3$), hydroxyl$C_{1-4}$alkyl (e.g. —CH$_2$C(CH$_3$)$_2$OH, —CH(CH$_3$)CH$_2$OH, —CH(CH$_3$)OH, —CH$_2$CH$_2$OH or —CH$_2$OH), $C_{1-4}$alkoxy$C_{1-4}$alkylene (e.g. —CH$_2$—O—CH$_3$ or —CH$_2$—CH$_2$—O—CH$_3$), $C_{1-4}$alkylsulfone (e.g. —SO$_2$CH$_3$), amino, mono$C_{1-4}$alkylamino, di$C_{1-4}$alkylamino (e.g. —N(CH$_3$)$_2$), amino$C_{1-4}$alkylene (e.g. —CH$_2$NH$_2$), —$C_{1-4}$alkylene-C(=O)NH$_{(2-q)}$($C_{1-6}$ alkyl)$_q$, —$C_{1-4}$alkylene-NHC(=O)$C_{1-6}$ alkyl, sulfonamide$C_{0-4}$ alkylene (e.g. —SO$_2$NR$^x_2$ or —CH$_2$SO$_2$NR$^x_2$, wherein R$^x$ is independently selected from H and $C_{1-6}$ alkyl), and optionally substituted four- to six-membered saturated heterocyclic group containing 1 or 2 heteroatoms selected from O, N, or S where the optional substituent is selected from $C_{1-4}$alkyl.

In one embodiment, q is 0 or 1. In particular, q is 1. In particular, q is 2.

In one embodiment, no substituent or one substituent $R^{10}$ is present. In particular, one substituent $R^{10}$ is present.

In particular, two substituents $R^{10}$ are present. In particular, no substituent $R^{10}$ is present.

In one embodiment, $R^{10}$ are independently selected from halogen, cyano, cyano$C_{1-4}$alkyl (e.g. —CH$_2$—CN), hydroxyl, =O (oxo), $C_{1-4}$alkyl (e.g. —CH$_3$ or —CH$_2$CH$_3$), halo$C_{1-4}$alkyl, $C_{1-4}$alkoxy (e.g. —OCH$_3$), hydroxyl$C_{1-4}$alkyl (e.g. —CH(CH$_3$)CH$_2$OH, —CH(CH$_3$)OH, —CH$_2$CH$_2$OH or —CH$_2$OH), di$C_{1-4}$alkylamino (e.g. —N(CH$_3$)$_2$), and $C_{1-4}$alkoxy$C_{1-4}$alkylene (e.g. —CH$_2$—O—CH$_3$), for example wherein $R^{10}$ are independently selected from halogen, cyano, hydroxyl, =O (oxo), and $C_{1-4}$alkyl (e.g. —CH$_3$ or —CH$_2$CH$_3$).

In one embodiment, $R^{10}$ are independently selected from halogen, cyano, cyano$C_{1-4}$alkyl (e.g. —CH$_2$—CN), hydroxyl, =O (oxo), $C_{1-4}$alkyl (e.g. —CH$_3$ or —CH$_2$CH$_3$), halo$C_{1-4}$alkyl, $C_{1-4}$alkoxy (e.g. —OCH$_3$), hydroxyl$C_{1-4}$alkyl (e.g. —CH(CH$_3$)CH$_2$OH, —CH(CH$_3$)OH, —CH$_2$CH$_2$OH or —CH$_2$OH) and $C_{1-4}$alkoxy$C_{1-4}$alkylene (e.g. —CH$_2$—O—CH$_3$), for example wherein $R^{10}$ are independently selected from halogen, cyano, hydroxyl, =O (oxo), and $C_{1-4}$alkyl (e.g. —CH$_3$ or —CH$_2$CH$_3$).

In one embodiment, $R^{10}$ are independently selected from halogen, cyano, cyano$C_{1-4}$alkyl (e.g. —CH$_2$—CN), hydroxyl, =O (oxo), $C_{1-4}$alkyl (e.g. —CH$_3$ or —CH$_2$CH$_3$), halo$C_{1-4}$alkyl, $C_{1-4}$alkoxy (e.g. —OCH$_3$), hydroxyl$C_{1-4}$alkyl (e.g. —CH(CH$_3$)CH$_2$OH, —CH(CH$_3$)OH, —CH$_2$CH$_2$OH or —CH$_2$OH) and $C_{1-4}$alkoxy$C_{1-4}$alkylene (e.g. —CH$_2$—O—CH$_3$), for example wherein $R^{10}$ are independently selected from halogen, cyano, hydroxyl, =O (oxo), and $C_{1-4}$alkyl (e.g. —CH$_3$ or —CH$_2$CH$_3$).

In one embodiment, $R^{10}$ are independently selected from halogen, cyano, hydroxyl, =O (oxo), and $C_{1-4}$alkyl (e.g. —CH$_3$ or —CH$_2$CH$_3$), for example wherein $R^{10}$ are independently selected from hydroxyl, =O (oxo) and $C_{1-4}$alkyl (e.g. —CH$_3$).

In one embodiment, $R^{10}$ are independently selected from halogen (e.g. chlorine or fluorine), =O (oxo), $C_{1-4}$alkyl (e.g. —CH$_3$, —CH$_2$CH$_3$, —CH(CH$_3$)$_2$), $C_{1-4}$alkoxy (e.g. —OCH$_3$), and di$C_{1-4}$alkylamino (e.g. —N(CH$_3$)$_2$), for example wherein $R^{10}$ are independently selected from halogen, =O (oxo), and $C_{1-4}$alkyl (e.g. —CH$_3$ or —CH$_2$CH$_3$).

In one embodiment, $R^{10}$ are independently selected from halogen (e.g. chlorine), cyano, cyano$C_{1-4}$alkyl (e.g. —CH$_2$—CN), $C_{1-4}$alkoxy (e.g. —OCH$_3$, —OCH$_2$CH$_3$ and —OCH(CH$_3$)$_2$), =O (oxo), $C_{1-4}$alkyl (e.g. —CH$_3$, —CH$_2$CH$_3$ and —CH(CH$_3$)$_2$), hydroxyl$C_{1-4}$alkyl (e.g. —CH$_2$OH, —CH$_2$CH$_2$OH or —CH$_2$C(CH$_3$)$_2$OH), halo$C_{1-4}$alkyl (e.g. —CHF$_2$), di$C_{1-4}$alkylamino (e.g. —N(CH$_3$)$_2$), $C_{1-4}$alkoxy$C_{1-4}$alkylene (e.g. —CH$_2$—O—CH$_3$ or —CH$_2$—CH$_2$—O—CH$_3$), —$C_{0-4}$alkylene-C(=O)NH$_{(2-q)}$($C_{1-6}$ alkyl)$_q$) (e.g. —CO—N(CH$_3$)$_2$, —CH$_2$—CH$_2$—CO—N(CH$_3$)$_2$, —CH$_2$—CO—N(CH$_3$)$_2$, —CH$_2$—CO—NH(C(CH$_3$)$_3$) or —CH$_2$—CO—NH(CH$_3$), four- to six-membered saturated heterocyclic group containing O or N (e.g. tetrahydrofuranyl, morpholino, azetidinyl or oxetanyl), and $C_{1-4}$alkyl (e.g $C_1$ alkyl) substituted with optionally substituted five- or six-membered unsaturated heterocyclic group (e.g. five-membered unsaturated heterocyclic group)

containing 1, 2, 3 or 4 heteroatoms selected from O, N, and S (e.g. N or O) where the optional substituent is selected from $C_{1-4}$alkyl (e.g. —$CH_3$).

In one embodiment, $R^{10}$ is halogen (e.g. chlorine), cyano, $C_{1-4}$alkyl (e.g. —$CH_3$, —$CH(CH_3)_2$ or —$CH_2CH_3$), halo$C_{1-4}$alkyl (e.g. —$CHF_2$), $C_{1-4}$alkoxyl (e.g. —$OCH_3$, —$OCH_2CH_3$ or —$OCH(CH_3)_2$), $C_{1-4}$alkoxy$C_{1-4}$alkene (e.g. —$CH_2OCH_3$). di$C_{1-4}$alkylamino (e.g. —$N(CH_3)_2$) or optionally substituted (e.g. unsubstituted) four- to six-membered saturated heterocyclic group containing 1 or 2 heteroatoms selected from 0 or N where the optional substituent is selected from $C_{1-4}$alkyl (e.g. morpholinyl or azetidinyl).

In one embodiment, $R^{10}$ is —$C_{0-4}$alkylene-C(=O)$NH_{(2-q)}(C_{1-6}$ alkyl$)_q$ which is selected from —$C_{1-4}$alkylene-C(=O)$NH_{(2-q)}(C_{1-6}$ alkyl$)_q$ (e.g. —$CH_2$—$CH_2$—CO—N$(CH_3)_2$, —$CH_2$—CO—N$(CH_3)_2$, —$CH_2$—CO—NH(C$(CH_3)_3$) or —$CH_2$—CO—NH($CH_3$) and —CO—N$(CH_3)_2$).

In one embodiment, $R^{10}$ are independently selected from halogen, cyano, hydroxyl, =O (oxo), and $C_{1-4}$alkyl (e.g. —$CH_3$ or —$CH_2CH_3$), for example wherein $R^{10}$ are independently selected from $C_{1-4}$alkyl (e.g. —$CH_3$), halogen or oxo.

In one embodiment, $R^{10}$ are independently selected from =O (oxo), hydroxyl and $C_{1-4}$alkyl (e.g. —$CH_3$ or —$CH_2CH_3$). In particular, $R^{10}$ are independently selected from =O (oxo), hydroxyl and —$CH_3$.

In particular, one substituent $R^{10}$ is present and $R^{10}$ is selected from =O (oxo), hydroxyl and —$CH_3$.

In particular, one substituent $R^{10}$ is present and $R^{10}$ is —$CH_3$.

In one embodiment, two substituents $R^{10}$ are present and one $R^{10}$ is =O (oxo) and one $R^{10}$ is $C_{1-4}$alkyl (e.g. —$CH_3$ or —$CH_2CH_3$).

In one embodiment, two substituents $R^{10}$ are present and one is halogen e.g. chlorine and one $R^{10}$ is. $C_{1-4}$alkyl (e.g. —$CH_3$ or —$CH_2CH_3$).

In one embodiment, $R^{10}$ is $C_{1-4}$alkyl (e.g. —$CH_3$, —$CH_2CH_3$, or —$CH(CH_3)_2$).

In one embodiment, $R^{10}$ is halogen e.g. chlorine.

In one embodiment, $R^{10}$ is optionally substituted four- to six-membered saturated heterocyclic group containing 1 or 2 heteroatoms selected from O, N, or S where the optional substituent is selected from $C_{1-4}$alkyl.

In one embodiment, $R^{10}$ is optionally substituted four- to six-membered saturated heterocyclic group containing 1 or 2 heteroatoms selected from O and N, where the optional substituent is selected from $C_{1-4}$alkyl.

In one embodiment, $R^{10}$ is a four- to six-membered saturated heterocyclic group containing 1 or 2 heteroatoms selected from O and N (e.g. morpholinyl or azetidinyl).

In one embodiment, $R^{10}$ are independently selected from halogen (e.g. chlorine), $C_{1-4}$alkoxy (e.g. —$OCH_3$), =O (oxo), $C_{1-4}$alkyl (e.g. —$CH_3$ or —$CH_2CH_3$), hydroxyl$C_{1-4}$alkyl (e.g. —$CH_2CH_2OH$ or —$CH_2OH$), di$C_{1-4}$alkylamino (e.g. —$N(CH_3)_2$), $C_{1-4}$alkoxy$C_{1-4}$alkylene (e.g. —$CH_2$—O—$CH_3$ or —$CH_2$—$CH_2$—O—$CH_3$), and four- to six-membered saturated heterocyclic group containing O (e.g. tetrahydrofuran).

It is to be understood that the above definitions of heterocycles and substituents $R^{10}$ cover all possible tautomeric forms of the rings. Thus, for example, the following compound can exist in the following tautomeric forms and both fall within the scope of formula (I):

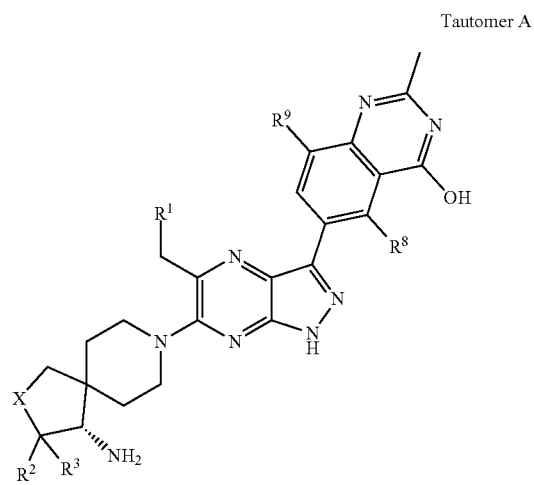

Tautomer A

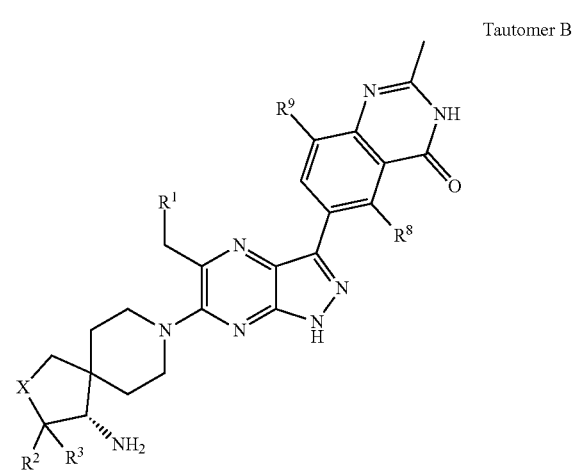

Tautomer B

Also, for example, the following compound can exist in the following tautomeric forms and both fall within the scope of formula (I):

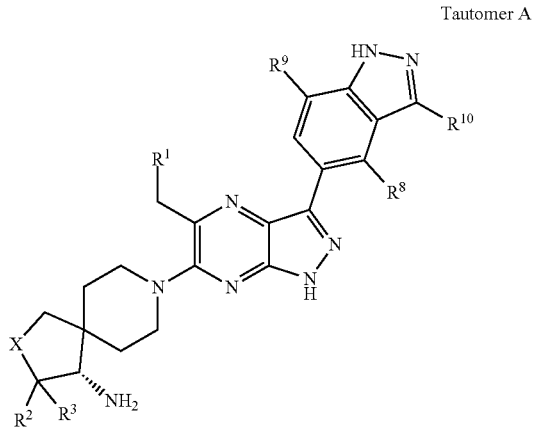

Tautomer A

Tautomer B
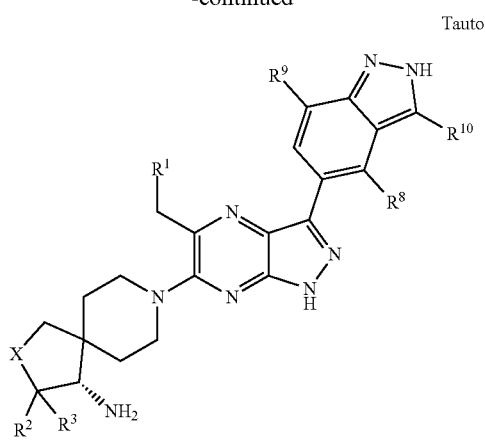
In one embodiment, the moiety
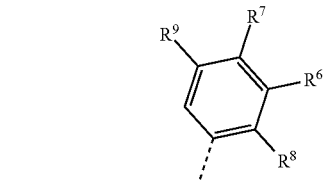
is selected from:
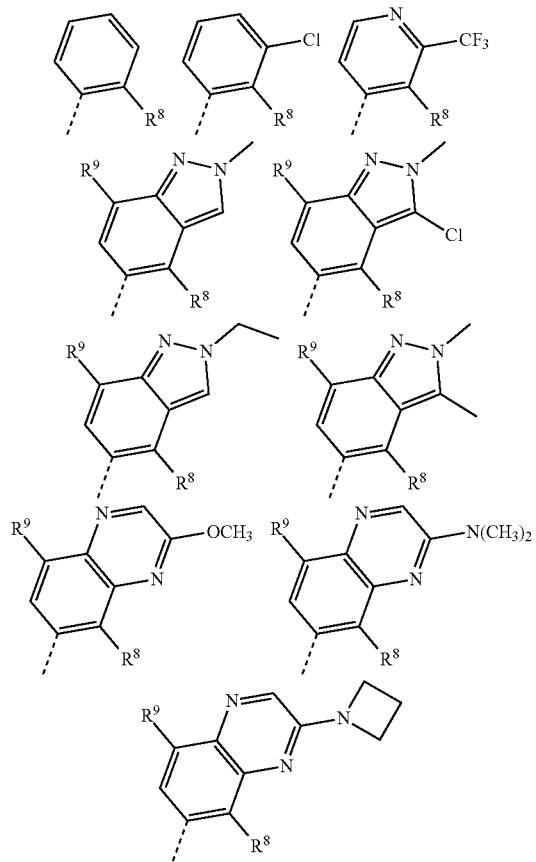
-continued
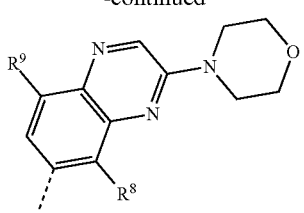
In one embodiment, the moiety
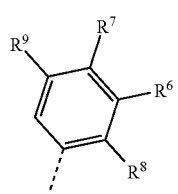
is selected from:
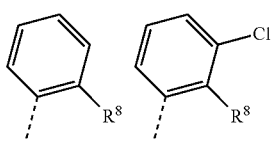
In one embodiment, the moiety
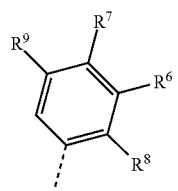
is selected from:
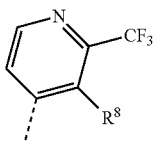
In one embodiment, the moiety
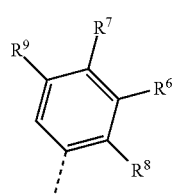

is selected from:

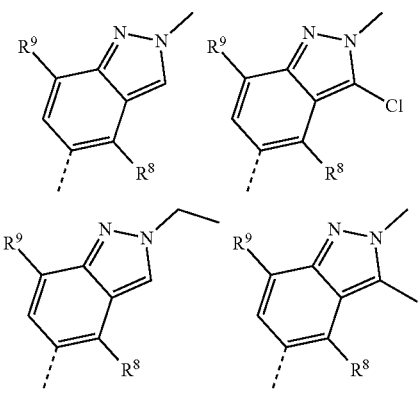

In one embodiment, the moiety

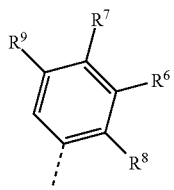

is selected from:

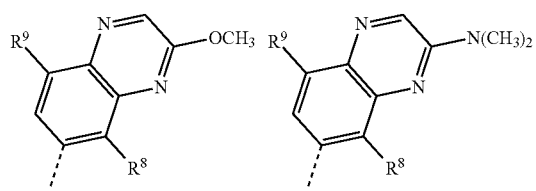

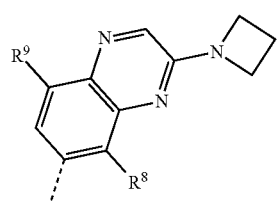

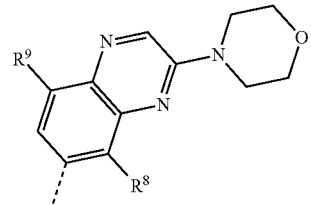

In particular, in one embodiment the moiety

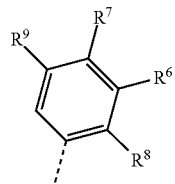

is selected from:

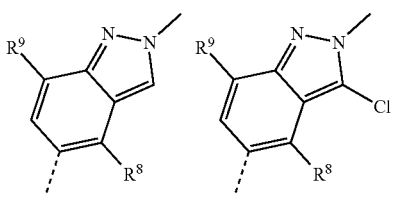

In particular, in one embodiment the moiety

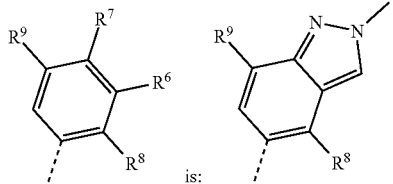

is:

In particular, in one embodiment the moiety

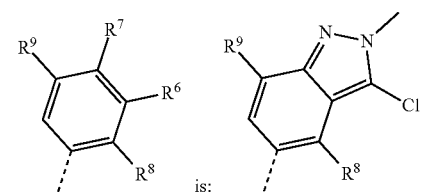

is:

Combinations of Substituents

In one embodiment, the compound of formula (I) is a compound of formula (XIV') or a tautomer or a solvate or a pharmaceutically acceptable salt thereof:

(XIV')

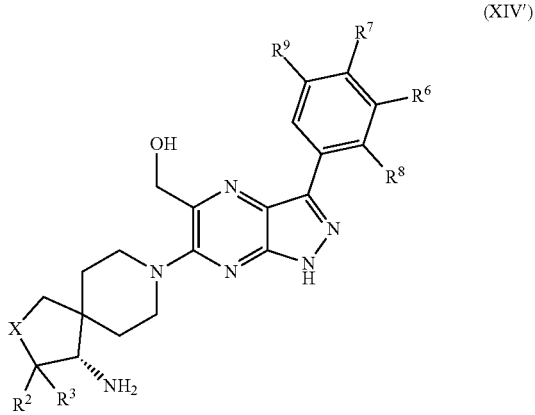

wherein X, $R^2$, $R^3$, $R^6$, $R^7$, $R^8$ and $R^9$ are as defined herein.

In one embodiment, the compound of formula (XIV') is a compound of formula (XV) or a tautomer or a solvate or a pharmaceutically acceptable salt thereof:

(XV)

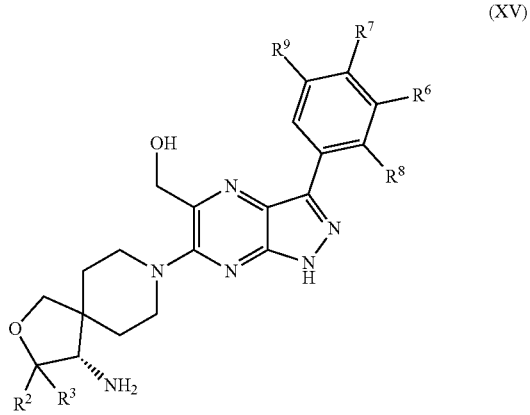

wherein $R^2$, $R^3$, $R^6$, $R^7$, $R^8$ and $R^9$ are as defined herein.

In one embodiment, the compound of formula (XV) is a compound of formula (XVI) or a tautomer or a solvate or a pharmaceutically acceptable salt thereof:

(XVI)

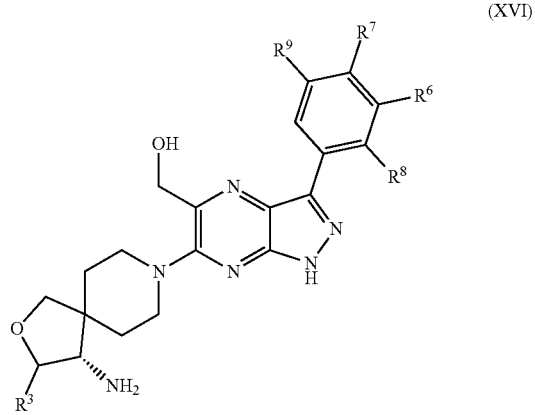

wherein $R^3$, $R^6$, $R^7$, $R^8$ and $R^9$ are as defined herein.

In one embodiment, the compound of formula (XVI) is a compound of formula (XVIa) or a tautomer or a solvate or a pharmaceutically acceptable salt thereof:

(XVIa)

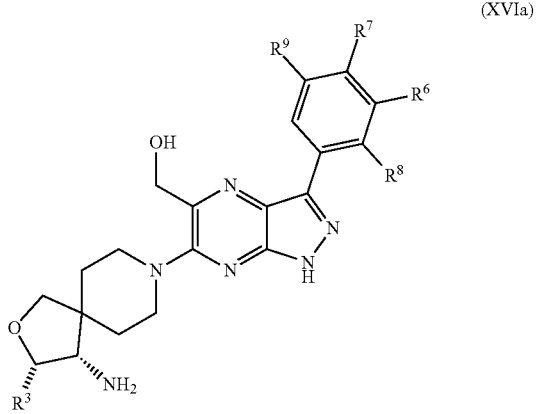

wherein $R^3$, $R^6$, $R^7$, $R^8$ and $R^9$ are as defined herein.

In one embodiment, the compound of formula (XVIa) is a compound of formula (XVIb) or a tautomer or a solvate or a pharmaceutically acceptable salt thereof:

(XVIb)

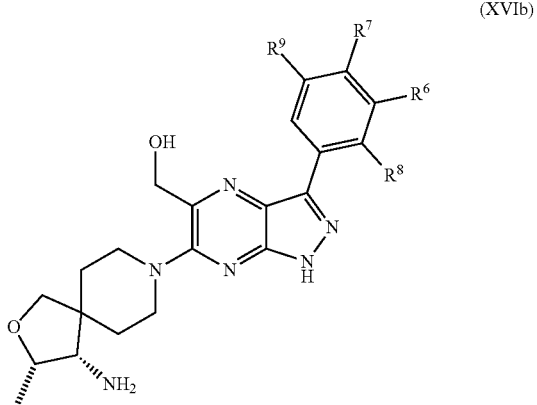

wherein $R^6$, $R^7$, $R^8$ and $R^9$ are as defined herein.

In one embodiment, the compound of formula (XVIb) is a compound of formula (XVII) or a tautomer or a solvate or a pharmaceutically acceptable salt thereof:

(XVII)

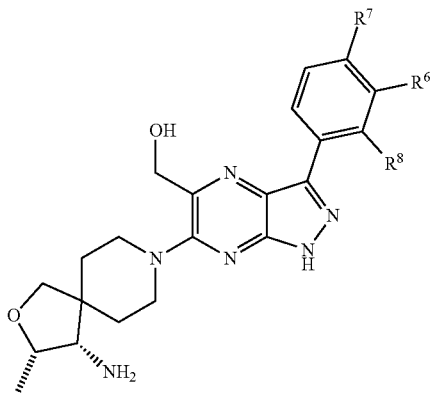

wherein R⁶, R⁷, and R⁸ are as defined herein. In one embodiment R⁸ is halogen.

In one embodiment, the compound of formula (XVII) is a compound of formula (XVIII) or a tautomer or a solvate or a pharmaceutically acceptable salt thereof:

(XVIII)

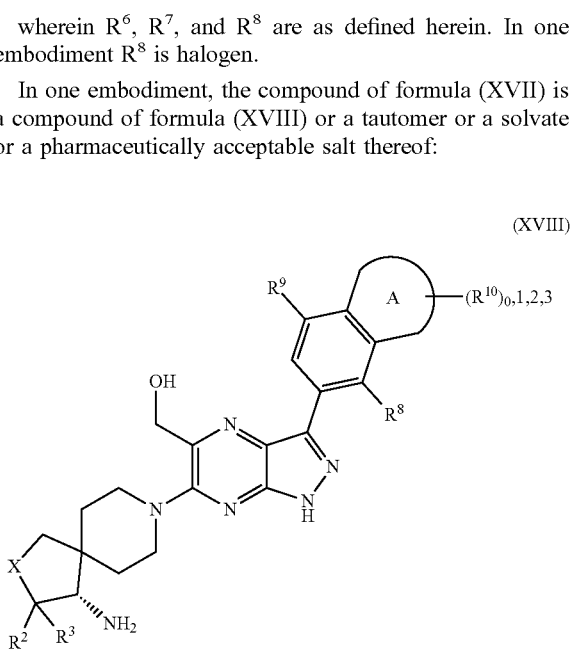

wherein R¹, R², R³, R⁸ R⁹, A and R¹⁰ are as defined herein.

In one embodiment, of the compound of formula (XVIII), the moiety

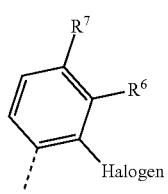

is selected from the following where R⁸ is halogen:

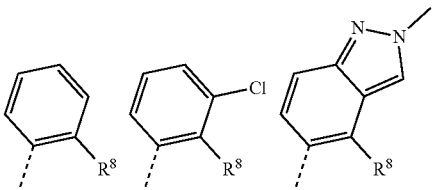

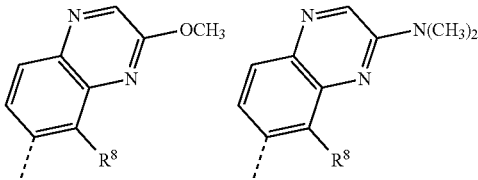

In particular, in one embodiment, of the compound of formula (XVIII), the moiety

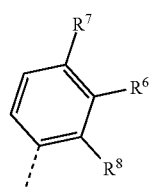

is selected from the following wherein R⁸ is halogen:

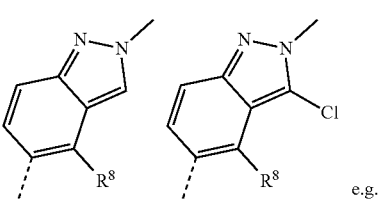

e.g.

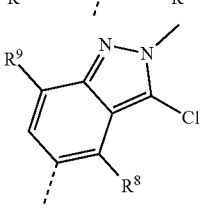

A Particular Group of Compounds

In one aspect, the invention provides a compound of formula (I*):

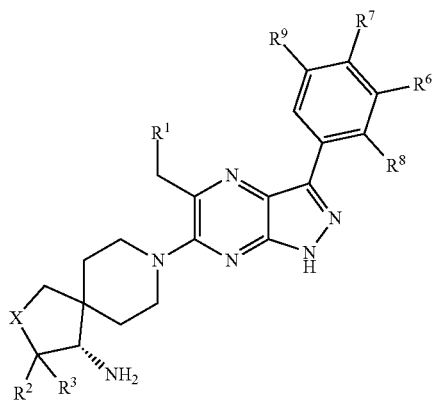

(I*)

or a tautomer or a solvate or a pharmaceutically acceptable salt thereof, wherein:

- $R^1$ is hydrogen or hydroxyl;
- $R^2$ is hydrogen;
- $R^3$ is hydrogen or $C_{1-4}$alkyl, (e.g. —$CH_3$);
- X is O or $CR^4R^5$;
- wherein when X is $CR^4R^5$, $R^4$ and $R^5$ are independently selected from hydrogen, halogen (e.g. fluorine) and $C_{1-4}$alkyl optionally substituted by one or more halogen (e.g. —$CF_3$);
- $R^6$ and $R^7$ are independently selected from hydrogen and halogen (e.g. chlorine or fluorine);
- or $R^6$ and $R^7$ join to form a Ring A which is optionally substituted by one or more (e.g. 1, 2, or 3) $R^{10}$ groups;
- wherein Ring A is a five-membered or six-membered aromatic heterocyclic ring comprising one or two nitrogen atoms (e.g. two nitrogen atoms);
- $R^8$ is halogen (e.g. chlorine or fluorine);
- $R^9$ is hydrogen;
- $R^{10}$ are independently selected from halogen (e.g. chlorine), $C_{1-4}$alkyl (e.g. —$CH_3$ or —$CH_2CH_3$), $C_{1-4}$alkoxy (e.g. —$OCH_3$), $diC_{1-4}$alkylamino (e.g. —$N(CH_3)_2$), halo$C_{1-4}$alkyl (e.g. —$CF_3$), and an optionally substituted four- to six-membered saturated heterocyclic group containing 1 or 2 heteroatoms selected from O, N, or S where the optional substituent is selected from $C_{1-4}$alkyl (e.g. morpholinyl or azetidinyl).

In one embodiment of the compound of formula I*, the moiety

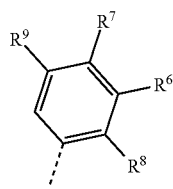

is selected from:

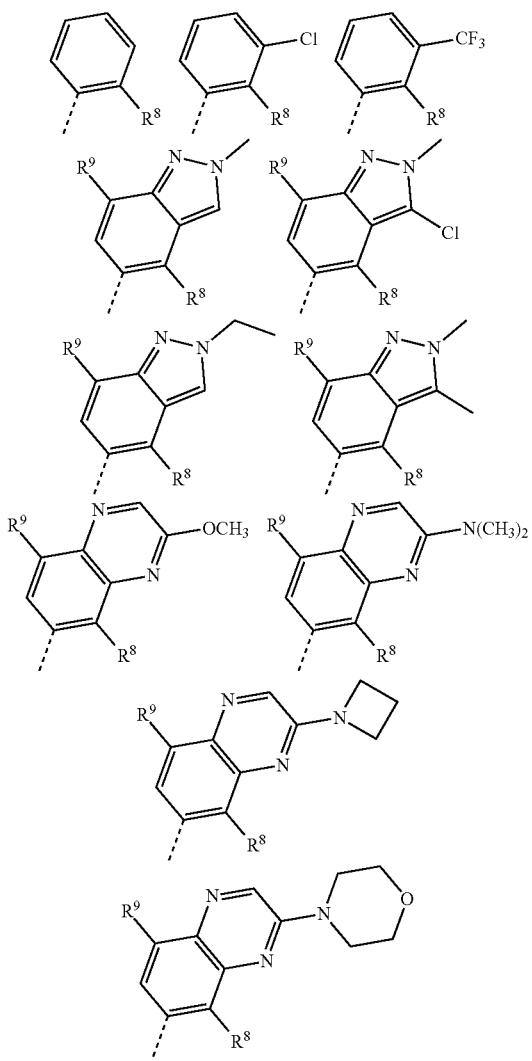

In particular, in one embodiment of the compound of formula I*, the moiety

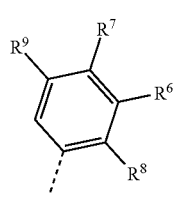

is selected from:

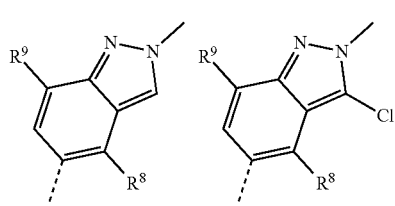

e.g.

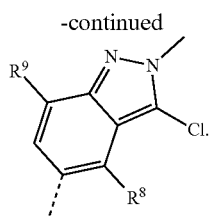

Particular Compounds

In one embodiment, the invention provides a compound of formula (I) which is one of the Examples 1-27 or is a tautomer, N-oxide, pharmaceutically acceptable salt or solvate thereof.

In one embodiment, the invention provides a compound of formula (I) which is selected from the following compounds, or a tautomer, N-oxide, pharmaceutically acceptable salt or solvate thereof:

{6-[(3S,4S)-4-amino-3-methyl-2-oxa-8-azaspiro[4.5]decan-8-yl]-3-(3,4-dichloro-2-methyl-2H-indazol-5-yl)-1H-pyrazolo[3,4-b]pyrazin-5-yl}methanol;

(3S,4S)-8-{3-[5-chloro-3-(dimethylamino)quinoxalin-6-yl]-5-methyl-1H-pyrazolo[3,4-b]pyrazin-6-yl}-3-methyl-2-oxa-8-azaspiro[4.5]decan-4-amine;

{6-[(3S,4S)-4-amino-3-methyl-2-oxa-8-azaspiro[4.5]decan-8-yl]-3-(2-chlorophenyl)-1H-pyrazolo[3,4-b]pyrazin-5-yl}methanol;

{6-[(3S,4S)-4-amino-3-methyl-2-oxa-8-azaspiro[4.5]decan-8-yl]-3-(3-chloro-2-fluorophenyl)-1H-pyrazolo[3,4-b]pyrazin-5-yl}methanol; and {6-[(3S,4S)-4-amino-3-methyl-2-oxa-8-azaspiro[4.5]decan-8-yl]-3-(5-chloro-3-methoxyquinoxalin-6-yl)-1H-pyrazolo[3,4-b]pyrazin-5-yl}methanol.

In one embodiment, the invention provides a compound of formula (I) which is the following compound, or a tautomer, N-oxide, pharmaceutically acceptable salt or solvate thereof:

{6-[(3S,4S)-4-amino-3-methyl-2-oxa-8-azaspiro[4.5]decan-8-yl]-3-(3,4-dichloro-2-methyl-2H-indazol-5-yl)-1H-pyrazolo[3,4-b]pyrazin-5-yl}methanol.

In one embodiment, the invention provides a compound of formula (I) which is the following compound, or a tautomer, N-oxide, pharmaceutically acceptable salt or solvate thereof:

(3S,4S)-8-{3-[5-chloro-3-(dimethylamino)quinoxalin-6-yl]-5-methyl-1H-pyrazolo[3,4-b]pyrazin-6-yl}-3-methyl-2-oxa-8-azaspiro[4.5]decan-4-amine.

In one embodiment, the invention provides a compound of formula (I) which is the following compound, or a tautomer, N-oxide, pharmaceutically acceptable salt or solvate thereof:

{6-[(3S,4S)-4-amino-3-methyl-2-oxa-8-azaspiro[4.5]decan-8-yl]-3-(2-chlorophenyl)-1H-pyrazolo[3,4-b]pyrazin-5-yl}methanol.

In one embodiment, the invention provides a compound of formula (I) which is the following compound, or a tautomer, N-oxide, pharmaceutically acceptable salt or solvate thereof:

{6-[(3S,4S)-4-amino-3-methyl-2-oxa-8-azaspiro[4.5]decan-8-yl]-3-(3-chloro-2-fluorophenyl)-1H-pyrazolo[3,4-b]pyrazin-5-yl}methanol.

In one embodiment, the invention provides a compound of formula (I) which is the following compound, or a tautomer, N-oxide, pharmaceutically acceptable salt or solvate thereof:

{6-[(3S,4S)-4-amino-3-methyl-2-oxa-8-azaspiro[4.5]decan-8-yl]-3-(5-chloro-3-methoxyquinoxalin-6-yl)-1H-pyrazolo[3,4-b]pyrazin-5-yl}methanol.

For the avoidance of doubt, it is to be understood that each general and specific embodiment and example for one substituent may be combined with each general and specific embodiment and example for one or more, in particular all, other substituents as defined herein and that all such embodiments are embraced by this application.

In one embodiment, the invention provides a compound of formula (I) as defined herein or a tautomer or a solvate or a pharmaceutically acceptable salt thereof, wherein X, R$^1$, R$^2$, R$^3$, R$^6$, R$^7$, R$^8$, and R$^9$ are as defined herein, and wherein the compound of formula (I) is not:

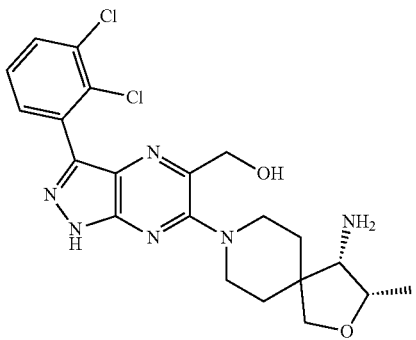 [SMILES: C[C@@H]1OCC2(CCN(c3nc4[nH]nc(-c5cccc(Cl)c5Cl)c4nc3CO)CC2)[C@@H]1N]

i.e. is not 6-((3S,4S)-4-amino-3-methyl-2-oxa-8-azaspiro[4.5]decan-8-yl)-3-(2,3-dichlorophenyl)-1H-pyrazolo[3,4-b]pyrazin-5-yl)methanol.

In one embodiment, the invention provides a compound of formula (I) as defined herein or a tautomer or a solvate or a pharmaceutically acceptable salt thereof, wherein X, R$^1$, R$^2$, R$^3$, R$^6$, R$^7$, R$^8$, and R$^9$ are as defined herein, and wherein the compound of formula (I) is not:

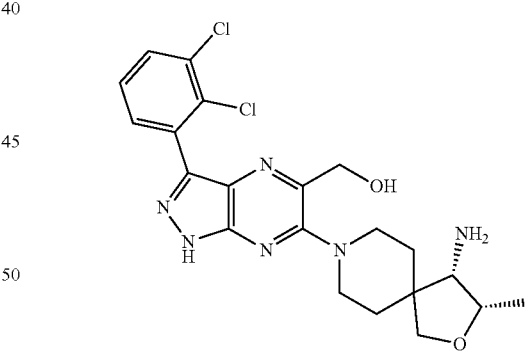

or a salt or tautomer thereof i.e. is not 6-((3S,4S)-4-amino-3-methyl-2-oxa-8-azaspiro[4.5]decan-8-yl)-3-(2,3-dichlorophenyl)-1H-pyrazolo[3,4-b]pyrazin-5-yl)methanol or a salt or tautomer thereof.

In one embodiment, the invention provides a compound of formula (I) as defined herein or a tautomer or a solvate or a pharmaceutically acceptable salt thereof, wherein X, R$^1$, R$^2$, R$^3$, R$^6$, R$^7$, R$^8$, and R$^9$ are as defined herein, and wherein the compound of formula (I) is not Example 16 in WO2019213318.

In one embodiment, the invention provides a compound of formula (I) as defined herein or a tautomer or a solvate or a pharmaceutically acceptable salt thereof, wherein X, R$^1$, $R^2$, $R^3$, $R^6$, $R^7$, $R^8$, and $R^9$ are as defined herein, and wherein the compound of formula (I) is not:

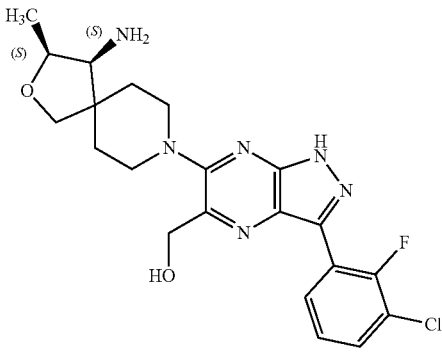

i.e. is not is not (6-((3S,4S)-4-amino-3-methyl-2-oxa-8-azaspiro[4.5]decan-8-yl)-3-(2-flouro-3-chlorophenyl)-1H-pyrazolo[3,4-b]pyrazin-5-yl)methanol.

In one embodiment, the invention provides a compound of formula (I) as defined herein or a tautomer or a solvate or a pharmaceutically acceptable salt thereof, wherein X, $R^1$, $R^2$, $R^3$, $R^6$, $R^7$, $R^8$, and $R^9$ are as defined herein, and wherein the compound of formula (I) is not:

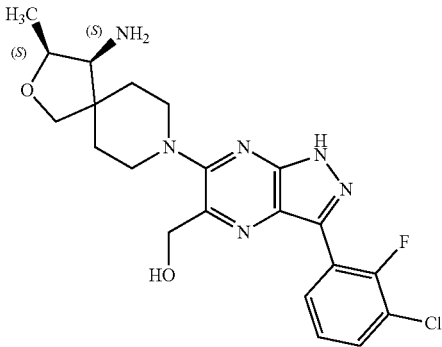

or a salt or tautomer thereof
i.e. is not is not (6-((3S,4S)-4-amino-3-methyl-2-oxa-8-azaspiro[4.5]decan-8-yl)-3-(2-flouro-3-chlorophenyl)-1H-pyrazolo[3,4-b]pyrazin-5-yl)methanol or a pharmaceutically acceptable salt or stereoisomer thereof.

In one embodiment, the invention provides a compound of formula (I) as defined herein or a tautomer or a solvate or a pharmaceutically acceptable salt thereof, wherein X, $R^1$, $R^2$, $R^3$, $R^6$, $R^7$, $R^8$, and $R^9$ are as defined herein, and wherein the compound of formula (I) is not Example 19C in WO2019183364, Salts, Solvates, Tautomers, Isomers, N-Oxides, Esters, Prodrugs and Isotopes A reference to a compound of the formula (I), sub-groups thereof (e.g. formulae (I), (Ia), (Ib), (Ib'), (Ib"), (II), (III), (III'), (IV), (IV'), (IV"), (V), (VI), (VII), (VIII), (VIIIa), (VIIIb), (VIIIc), (IX), (IXa), (X), (XI), (XII), (XIIa), (XIIb), (XIIb), (XIIc), (XIIIa), (XIIIb), (XIV), (XIV'), (XV), (XVI), (XVIa), (XVIb), (XVII), (XVIII) and (I*)) and any example also includes ionic forms, salts, solvates, isomers (including geometric and stereochemical isomers unless specified), tautomers, N-oxides, esters, prodrugs, isotopes and protected forms thereof, for example, as discussed below; in particular, the salts or tautomers or isomers or N-oxides or solvates thereof; and more particularly the salts or tautomers or N-oxides or solvates thereof. In one embodiment reference to a compound of the formula (I), sub-groups thereof (e.g. formulae (I), (Ia), (Ib), (Ib'), (Ib"), (II), (III), (III'), (IV), (IV'), (IV"), (V), (VI), (VII), (VIII), (VIIIa), (VIIIb), (VIIIc), (IX), (IXa), (X), (XI), (XII), (XIIa), (XIIb), (XIIb), (XIIc), (XIIIa), (XIIIb), (XIV), (XIV'), (XV), (XVI), (XVIa), (XVIb), (XVII), (XVIII) and (I*)) and any example also includes the salts or tautomers or solvates thereof.

Salts

Many compounds of the formula (I) can exist in the form of salts, for example acid addition salts or, in certain cases salts of organic and inorganic bases such as carboxylate, sulfonate and phosphate salts. All such salts are within the scope of this invention, and references to compounds of the formula (I) include the salt forms of the compounds.

The salts of the present invention can be synthesized from the parent compound that contains a basic or acidic moiety by conventional chemical methods such as methods described in *Pharmaceutical Salts: Properties, Selection, and Use*, P. Heinrich Stahl (Editor), Camille G. Wermuth (Editor), ISBN: 3-90639-026-8, Hardcover, 388 pages, August 2002. Generally, such salts can be prepared by reacting the free acid or base forms of these compounds with the appropriate base or acid in water or in an organic solvent, or in a mixture of the two; generally, nonaqueous media such as ether, ethyl acetate, ethanol, isopropanol, or acetonitrile are used.

Acid addition salts (mono- or di-salts) may be formed with a wide variety of acids, both inorganic and organic. Examples of acid addition salts include mono- or di-salts formed with an acid selected from acetic, 2,2-dichloroacetic, adipic, alginic, ascorbic (e.g. L-ascorbic), L-aspartic, benzenesulfonic, benzoic, 4-acetamidobenzoic, butanoic, (+) camphoric, camphor-sulfonic, (+)-(1S)-camphor-10-sulfonic, capric, caproic, caprylic, cinnamic, citric, cyclamic, dodecylsulfuric, ethane-1,2-disulfonic, ethanesulfonic, 2-hydroxyethanesulfonic, formic, fumaric, galactaric, gentisic, glucoheptonic, D-gluconic, glucuronic (e.g. D-glucuronic), glutamic (e.g. L-glutamic), α-oxoglutaric, glycolic, hippuric, hydrohalic acids (e.g. hydrobromic, hydrochloric, hydriodic), isethionic, lactic (e.g. (+)-L-lactic, (±)-DL-lactic), lactobionic, maleic, malic, (−)-L-malic, malonic, (±)-DL-mandelic, methanesulfonic, naphthalene-2-sulfonic, naphthalene-1,5-disulfonic, 1-hydroxy-2-naphthoic, nicotinic, nitric, oleic, orotic, oxalic, palmitic, pamoic, phosphoric, propionic, pyruvic, L-pyroglutamic, salicylic, 4-amino-salicylic, sebacic, stearic, succinic, sulfuric, tannic, (+)-L-tartaric, thiocyanic, p-toluenesulfonic, undecylenic and valeric acids, as well as acylated amino acids and cation exchange resins.

One particular group of salts consists of salts formed from acetic, hydrochloric, hydriodic, phosphoric, nitric, sulfuric, citric, lactic, succinic, maleic, malic, isethionic, fumaric, benzenesulfonic, toluenesulfonic, methanesulfonic (mesylate), ethanesulfonic, naphthalenesulfonic, valeric, acetic, propanoic, butanoic, malonic, glucuronic and lactobionic acids. One particular salt is the hydrochloride salt.

In one embodiment the compound is the sodium or mesylate salt.

If the compound is anionic, or has a functional group which may be anionic (e.g., —COOH may be —COO⁻), then a salt may be formed with an organic or inorganic base, generating a suitable cation. Examples of suitable inorganic cations include, but are not limited to, alkali metal ions such as $Li^+$, $Na^+$ and $K^+$, alkaline earth metal cations such as $Ca^{2+}$ and $Mg^{2+}$, and other cations such as $Al^{3+}$ or $Zn^+$. Examples of suitable organic cations include, but are not limited to, ammonium ion (i.e., NH$_4$)+ and substituted ammonium ions (e.g., NH$_3$R$^+$, NH$_2$R$_2^+$, NHR$_3^+$, NR$_4^+$). Examples of some suitable substituted ammonium ions are those derived from: methylamine, ethylamine, diethylamine, propylamine, dicyclohexylamine, triethylamine, butylamine, ethylenediamine, ethanolamine, diethanolamine, piperazine, benzylamine, phenylbenzylamine, choline, meglumine, and tromethamine, as well as amino acids, such as lysine and arginine. An example of a common quaternary ammonium ion is N(CH$_3$)$_4^+$.

Where the compounds of the formula (I) contain an amine function, these may form quaternary ammonium salts, for example by reaction with an alkylating agent according to methods well known to the skilled person. Such quaternary ammonium compounds are within the scope of formula (I).

The compounds of the invention may exist as mono- or di-salts depending upon the pKa of the acid from which the salt is formed.

The salt forms of the compounds of the invention are typically pharmaceutically acceptable salts, and examples of pharmaceutically acceptable salts are discussed in Berge et al., 1977, "Pharmaceutically Acceptable Salts," *J. Pharm. Sci.*, Vol. 66, pp. 1-19. However, salts that are not pharmaceutically acceptable may also be prepared as intermediate forms which may then be converted into pharmaceutically acceptable salts. Such non-pharmaceutically acceptable salt forms, which may be useful, for example, in the purification or separation of the compounds of the invention, also form part of the invention.

In one embodiment of the invention, there is provided a pharmaceutical composition comprising a solution (e.g. an aqueous solution) containing a compound of the formula (I) and sub-groups and examples thereof as described herein in the form of a salt in a concentration of greater than 10 mg/ml, typically greater than 15 mg/ml and typically greater than 20 mg/ml.

N-Oxides

Compounds of the formula (I) containing an amine function may also form N-oxides. A reference herein to a compound of the formula (I) that contains an amine function also includes the N-oxide.

Where a compound contains several amine functions one, or more than one, nitrogen atom may be oxidised to form an N-oxide. Particular examples of N-oxides are the N-oxides of a tertiary amine or a nitrogen atom of a nitrogen-containing heterocyclylic group.

N-Oxides can be formed by treatment of the corresponding amine with an oxidizing agent such as hydrogen peroxide or a per-acid (e.g. a peroxycarboxylic acid), see for example *Advanced Organic Chemistry*, by Jerry March, 4$^{th}$ Edition, Wiley Interscience, pages. More particularly, N-oxides can be made by the procedure of L. W. Deady (*Syn. Comm.* 1977, 7, 509-514) in which the amine compound is reacted with m-chloroperoxybenzoic acid (MCPBA), for example, in an inert solvent such as dichloromethane.

In one embodiment of the invention, the compound is an N-oxide, e.g. from a nitrogen atom on the R$^6$ or R$^7$ group, for example a pyridine N-oxide.

Geometric Isomers and Tautomers

Compounds of the formula (I) may exist in a number of different geometric isomeric, and tautomeric forms and references to compounds of the formula (I) include all such forms. For the avoidance of doubt, where a compound can exist in one of several geometric isomeric or tautomeric forms and only one is specifically described or shown, all others are nevertheless embraced by formula (I).

For example, certain heteroaryl rings can exist in the two tautomeric forms such as A and B shown below. For simplicity, a formula may illustrate one form but the formula is to be taken as embracing both tautomeric forms.

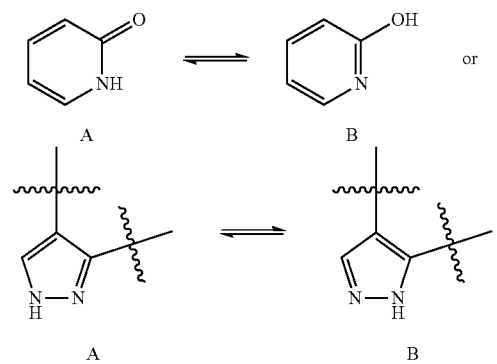

Other examples of tautomeric forms include, for example, keto-, enol-, and enolate-forms, as in, for example, the following tautomeric pairs: keto/enol (illustrated below), imine/enamine, amide/imino alcohol, amidine/enediamines, nitroso/oxime, thioketone/enethiol, and nitro/aci-nitro.

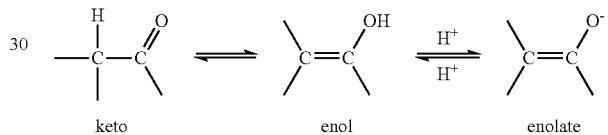

Stereoisomers

Unless otherwise mentioned or indicated, the chemical designation of compounds denotes the mixture of all possible stereochemically isomeric forms.

Stereocentres are illustrated in the usual fashion, using 'hashed' or 'solid' wedged lines. e.g.

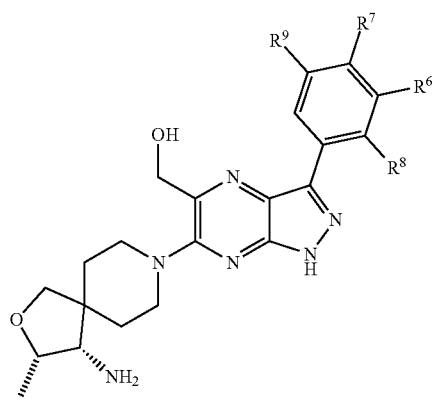

Where a compound is described as a mixture of two diastereoisomers/epimers, the configuration of the stereocentre is not specified and is represented by straight lines.

Where compounds of the formula (I) contain one or more chiral centres, and can exist in the form of two or more optical isomers, references to compounds of the formula (I) include all optical isomeric forms thereof (e.g. enantiomers, epimers and diastereoisomers), either as individual optical isomers, or mixtures (e.g. racemic or scalemic mixtures) or two or more optical isomers, unless the context requires otherwise.

The optical isomers may be characterised and identified by their optical activity (i.e. as + and − isomers, or d and l isomers) or they may be characterised in terms of their absolute stereochemistry using the "R and S" nomenclature developed by Cahn, Ingold and Prelog, see *Advanced Organic Chemistry* by Jerry March, 4$^{th}$ Edition, John Wiley & Sons, New York, 1992, pages 109-114, and see also Cahn, Ingold & Prelog, *Angew. Chem. Int. Ed. Engl.*, 1966, 5, 385-415.

Optical isomers can be separated by a number of techniques including chiral chromatography (chromatography on a chiral support) and such techniques are well known to the person skilled in the art.

As an alternative to chiral chromatography, optical isomers can be separated by forming diastereoisomeric salts with chiral acids such as (+)-tartaric acid, (−)-pyroglutamic acid, (−)-di-toluoyl-L-tartaric acid, (+)-mandelic acid, (−)-malic acid, and (−)-camphorsulfonic acid, separating the diastereoisomers by preferential crystallisation, and then dissociating the salts to give the individual enantiomer of the free base.

Additionally, enantiomeric separation can be achieved by covalently linking an enantiomerically pure chiral auxiliary onto the compound and then performing diastereisomer separation using conventional methods such as chromatography. This is then followed by cleavage of the aforementioned covalent linkage to generate the appropriate enantiomerically pure product.

Where compounds of the formula (I) exist as two or more optical isomeric forms, one enantiomer in a pair of enantiomers may exhibit advantages over the other enantiomer, for example, in terms of biological activity. Thus, in certain circumstances, it may be desirable to use as a therapeutic agent only one of a pair of enantiomers, or only one of a plurality of diastereoisomers.

Accordingly, the invention provides compositions containing a compound of the formula (I) having one or more chiral centres, wherein at least 55% (e.g. at least 60%, 65%, 70%, 75%, 80%, 85%, 90% or 95%) of the compound of the formula (I) is present as a single optical isomer (e.g. enantiomer or diastereoisomer). In one general embodiment, 99% or more (e.g. substantially all) of the total amount of the compound of the formula (I) may be present as a single optical isomer (e.g. enantiomer or diastereoisomer).

Compounds encompassing double bonds can have an E (entgegen) or Z (zusammen) stereochemistry at said double bond. Substituents on bivalent cyclic or (partially) saturated radicals may have either the cis- or trans-configuration. The terms cis and trans when used herein are in accordance with Chemical Abstracts nomenclature (J. Org. Chem. 1970, 35 (9), 2849-2867), and refer to the position of the substituents on a ring moiety.

Of special interest are those compounds of formula (I) which are stereochemically pure. When a compound of formula (I) is for instance specified as R, this means that the compound is substantially free of the S isomer. If a compound of formula (I) is for instance specified as E, this means that the compound is substantially free of the Z isomer. The terms cis, trans, R, S, E and Z are well known to a person skilled in the art.

Isotopic Variations

The present invention includes all pharmaceutically acceptable isotopically-labeled compounds of the invention, i.e. compounds of formula (I), wherein one or more atoms are replaced by atoms having the same atomic number, but an atomic mass or mass number different from the atomic mass or mass number usually found in nature.

Examples of isotopes suitable for inclusion in the compounds of the invention comprise isotopes of hydrogen, such as $^{2}$H (D) and $^{3}$H (T), carbon, such as $^{11}$C, $^{13}$C and $^{14}$C, chlorine, such as $^{36}$Cl, fluorine, such as $^{18}$F, iodine, such as $^{123}$I, $^{125}$I and $^{131}$I, nitrogen, such as $^{13}$N and $^{15}$N, oxygen, such as $^{15}$O, $^{17}$O and $^{18}$O, phosphorus, such as $^{32}$P, and sulfur, such as $^{35}$S.

Certain isotopically-labelled compounds of formula (I), for example, those incorporating a radioactive isotope, are useful in drug and/or substrate tissue distribution studies. The compounds of formula (I) can also have valuable diagnostic properties in that they can be used for detecting or identifying the formation of a complex between a labelled compound and other molecules, peptides, proteins, enzymes or receptors. The detecting or identifying methods can use compounds that are labelled with labelling agents such as radioisotopes, enzymes, fluorescent substances, luminous substances (for example, luminol, luminol derivatives, luciferin, aequorin and luciferase), etc. The radioactive isotopes tritium, i.e. $^{3}$H (T), and carbon-14, i.e. $^{14}$C, are particularly useful for this purpose in view of their ease of incorporation and ready means of detection.

Substitution with heavier isotopes such as deuterium, i.e. $^{2}$H (D), may afford certain therapeutic advantages resulting from greater metabolic stability, for example, increased in vivo half-life or reduced dosage requirements, and hence may be used in some circumstances.

In particular, every reference to hydrogen in the application should be constructed to cover $^{1}$H and $^{2}$H, whether hydrogen is defined explicitly, or hydrogen is present implicitly to satisfy the relevant atom's (in particular carbon's) valency.

Substitution with positron emitting isotopes, such as $^{11}$C, $^{18}$F, $^{15}$O and $^{13}$N, can be useful in Positron Emission Topography (PET) studies for examining target occupancy.

Isotopically-labeled compounds of formula (I) can generally be prepared by conventional techniques known to those skilled in the art or by processes analogous to those described in the accompanying Examples and Preparations using an appropriate isotopically-labeled reagents in place of the non-labeled reagent previously employed.

Esters

Esters such as carboxylic acid esters, acyloxy esters and phosphate esters of the compounds of formula (I) bearing a carboxylic acid group or a hydroxyl group are also embraced by Formula (I). Examples of esters are compounds containing the group —C(=O)OR, wherein R is an ester substituent, for example, a $C_{1-7}$ alkyl group, a $C_{3-12}$ heterocyclyl group, or a $C_{5-12}$ aryl group, typically a $C_{1-6}$ alkyl group. Particular examples of ester groups include, but are not limited to, —C(=O)OCH$_3$, —C(=O)OCH$_2$CH$_3$, —C(=O)OC(CH$_3$)$_3$, and —C(=O)OPh. Examples of acyloxy (reverse ester) groups are represented by —OC(=O)R, wherein R is an acyloxy substituent, for example, a $C_{1-6}$ alkyl group, a $C_{3-12}$ heterocyclyl group, or a $C_{6-12}$ aryl group, typically a $C_{1-6}$ alkyl group. Particular examples of acyloxy groups include, but are not limited to, —OC(=O)CH$_3$ (acetoxy), —OC(=O)CH$_2$CH$_3$, —OC(=O)C(CH$_3$)$_3$, —OC(=O)Ph, and —OC(=O)CH$_2$Ph. Examples of phosphate esters are those derived from phosphoric acid.

In one embodiment of the invention, formula (I) includes within its scope esters of compounds of the formula (I) bearing a carboxylic acid group or a hydroxyl group. In another embodiment of the invention, formula (I) does not include within its scope esters of compounds of the formula (I) bearing a carboxylic acid group or a hydroxyl group.
Solvates and Crystalline Forms Also encompassed by formula (I) are any polymorphic forms of the compounds, and solvates such as hydrates, alcoholates and the like.

The compounds of the invention may form solvates, for example with water (i.e., hydrates) or common organic solvents. As used herein, the term "solvate" means a physical association of the compounds of the present invention with one or more solvent molecules. This physical association involves varying degrees of ionic and covalent bonding, including hydrogen bonding. In certain instances the solvate will be capable of isolation, for example when one or more solvent molecules are incorporated in the crystal lattice of the crystalline solid. The term "solvate" is intended to encompass both solution-phase and isolatable solvates. Non-limiting examples of suitable solvates include compounds of the invention in combination with water, isopropanol, ethanol, methanol, DMSO, ethyl acetate, acetic acid or ethanolamine and the like. The compounds of the invention may exert their biological effects whilst they are in solution.

Solvates are well known in pharmaceutical chemistry. They can be important to the processes for the preparation of a substance (e.g. in relation to their purification), the storage of the substance (e.g. its stability) and the ease of handling of the substance and are often formed as part of the isolation or purification stages of a chemical synthesis. A person skilled in the art can determine by means of standard and long used techniques whether a hydrate or other solvate has formed by the isolation conditions or purification conditions used to prepare a given compound. Examples of such techniques include thermogravimetric analysis (TGA), differential scanning calorimetry (DSC), X-ray crystallography (e.g. single crystal X-ray crystallography or X-ray powder diffraction) and Solid State NMR (SS-NMR, also known as Magic Angle Spinning NMR or MAS-NMR). Such techniques are as much a part of the standard analytical toolkit of the skilled chemist as NMR, IR, HPLC and MS.

Alternatively, the skilled person can deliberately form a solvate using crystallisation conditions that include an amount of the solvent required for the particular solvate. Thereafter the standard methods described herein, can be used to establish whether solvates had formed.

Furthermore, the compounds of the present invention may have one or more polymorph or amorphous crystalline forms and as such are intended to be included in the scope of the invention.

Complexes

Formula (I) also includes within its scope complexes (e.g. inclusion complexes or clathrates with compounds such as cyclodextrins, or complexes with metals) of the compounds. Inclusion complexes, clathrates and metal complexes can be formed by means of methods well known to the skilled person.

Prodrugs

Also encompassed by formula (I) are any pro-drugs of the compounds of the formula (I). By "prodrugs" is meant for example any compound that is converted in vivo into a biologically active compound of the formula (I).

For example, some prodrugs are esters of the active compound (e.g., a physiologically acceptable metabolically labile ester). During metabolism, the ester group (—C(=O) OR) is cleaved to yield the active drug. Such esters may be formed by esterification, for example, of any of the carboxylic acid groups (—C(=O)OH) in the parent compound, with, where appropriate, prior protection of any other reactive groups present in the parent compound, followed by deprotection if required.

Examples of such metabolically labile esters include those of the formula —C(=O)OR wherein R is:

$C_{1-7}$alkyl (e.g., -Me, -Et, -nPr, -iPr, -nBu, -sBu, -iBu, -tBu); $C_{1-7}$ aminoalkyl (e.g., aminoethyl; 2-(N,N-diethylamino)ethyl; 2-(4-morpholino)ethyl); and acyloxy-$C_{1-7}$alkyl (e.g., acyloxymethyl; acyloxyethyl; pivaloyloxymethyl; acetoxymethyl; 1-acetoxyethyl; 1-(1-methoxy-1-methyl) ethyl-carbonxyloxyethyl; 1-(benzoyloxy)ethyl; isopropoxy-carbonyloxymethyl; 1-isopropoxy-carbonyloxyethyl; cyclohexyl-carbonyloxymethyl; 1-cyclohexyl-carbonyloxyethyl; cyclohexyloxy-carbonyloxymethyl; 1-cyclohexyloxy-carbonyloxyethyl; (4-oxanyloxy) carbonyloxymethyl; 1-(4-oxanyloxy)carbonyloxyethyl; (4-oxanyl)carbonyloxymethyl; and 1-(4-tetrahydropyranyl)carbonyloxyethyl).

Also, some prodrugs are activated enzymatically to yield the active compound, or a compound which, upon further chemical reaction, yields the active compound (for example, as in antigen-directed enzyme pro-drug therapy (ADEPT), gene-directed enzyme pro-drug therapy (GDEPT), and ligand-directed enzyme pro-drug therapy (LIDEPT), etc.). For example, the prodrug may be a sugar derivative or other glycoside conjugate, or may be an amino acid ester derivative. In one embodiment formula (I) does not include pro-drugs of the compounds of the formula (I) within its scope.

Methods for the Preparation of Compounds of Formula (I)

In this section, as in all other sections of this application unless the context indicates otherwise, references to formula (I) also include all other subformulae (e.g. formulae (I), (Ia), (Ib), (Ib'), (Ib"), (II), (III), (III'), (IV), (IV'), (IV"), (V), (VI), (VII), (VIII), (VIIIa), (VIIIb), (VIIIc), (IX), (IXa), (X), (XI), (XII), (XIIa), (XIIb), (XIIb), (XIIc), (XIIIa), (XIIIb), (XIV), (XIV'), (XV), (XVI), (XVIa), (XVIb), (XVII), (XVIII) and (I*)) and examples thereof as defined herein, unless the context indicates otherwise.

Compounds of the formula (I) can be prepared in accordance with synthetic methods well known to the skilled person.

According to a further aspect of the invention there is provided a process for preparing a compound of formula (I), or a tautomer, stereoisomer, N-oxide, pharmaceutically acceptable salt, or solvate thereof, which comprises:
(a) coupling a compound of formula (A) or a protected derivative thereof:

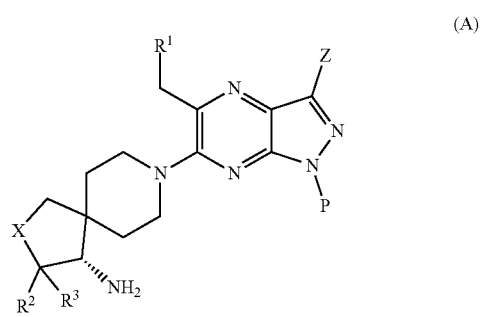

(A)

wherein X, $R^1$, $R^2$ and $R^3$ are as defined hereinbefore for the compounds of formula (I), and P represents a protecting group (such as 2-tetrahydropyran; THP or 2-(trimethylsilyl)ethoxymethyl; SEM) or is hydrogen, and Z is a metal residue (such as zinc halide e.g. zinc chloride) or a leaving group (such as a halogen e.g. iodine or bromine)

with a compound of the formula (B) or a protected version thereof

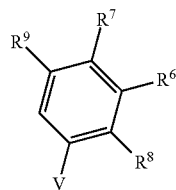

(B)

wherein $R^6$, $R^7$, $R^8$ and $R^9$ are as defined hereinbefore for the compounds of formula (I) and V represents a metal or metaloid residue (such as boronic acid, pinacol boronate, magnesium halide or zinc halide e.g. boronic acid, pinacol boronate) or a leaving group such as halogen, followed by a deprotection reaction suitable to remove the protecting groups; and/or (b) coupling a compound of formula (C) or a protected derivative thereof:

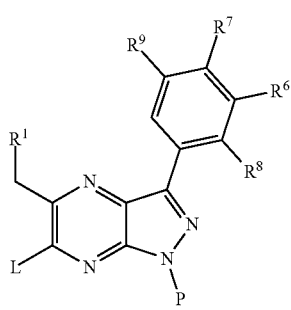

(C)

wherein $R^1$, $R^6$, $R^7$, W and $R^9$ are as defined hereinbefore for the compounds of formula (I), P represents protecting group (such as 2-tetrahydropyran; THP or 2-(trimethylsilyl)ethoxymethyl; SEM) or is hydrogen, L is leaving group (such as chloride), with a compound of formula (D) or a protected derivative thereof, wherein X, $R^2$ and $R^3$ are as defined hereinbefore for the compounds of formula (I).

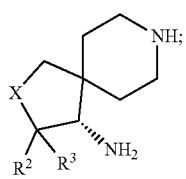

(D)

and/or, (c) reacting a compound of formula (K) or a protected derivative thereof,

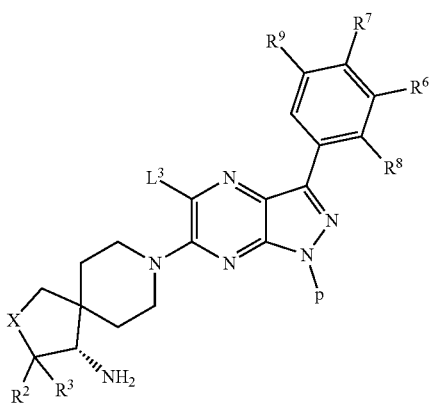

(K)

wherein X, $R^2$, $R^3$, $R^6$, $R^7$, $R^8$ and $R^9$ are as defined herein for the compound of formula (I), P represents an amine protecting group (such as 2-tetrahydropyran; THP or 2-(trimethylsilyl)ethoxymethyl; SEM), N,N-dimethylsulfamoyl or hydrogen, $L^3$ is leaving group (such as halogen e.g. bromine) either:

(i) with a organometallic species of the formula $CH_3M$, where M is a metal (for example $CH_3$—Zn-Hal, where Hal is halogen e.g. chloride, bromide or iodide) in the presence of a metal catalyst (such as (1,3-diisopropylimidazol-2-ylidene)(3-chloropyridyl)palladium(II) dichloride) to give a compound of formula (I) wherein $R^1$ is H; or (ii) with an alkyl boronate (such as potassium (2-trimethylsilyl)-ethoxymethyl trifluoroborate) in the presence of a photoredox catalyst (such as $[Ir\{dFCF_3ppy\}_2(bpy)]PF_6$), a metal catalyst (such as nickel (II) chloride ethylene glycol dimethyl ether complex), a ligand (such as 4,4'-di-tert-butyl-2,2'-dipyridyl), a base (such as dipotassium phosphate), and a source of light (such as a blue LED), to give a compound of formula (I) wherein $R^1$ is OH; and/or (d) cyclisation of a compound of formula (R), or a protected derivatives thereof;

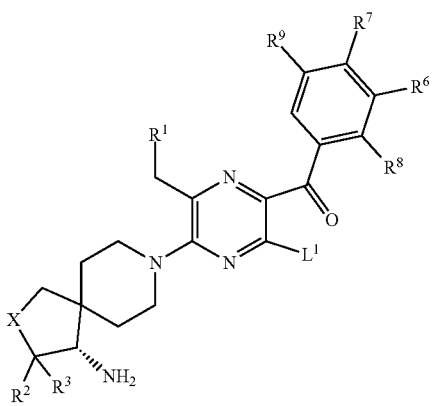

(R)

wherein X, $R^1$, $R^2$, $R^3$, $R^6$, $R^7$, $R^8$ and $R^9$ are as defined hereinbefore for the compounds of formula (I) and $L^1$ represents a suitable leaving group, such as a halogen, using hydrazine or a protected hydrazine derivative; and/or in each case optionally followed by a deprotection step; or
(e) deprotection of a protected derivative of a compound of formula (I); and/or
(f) interconversion of a compound of formula (I) or protected derivative thereof to a further compound of formula (I) or protected derivative thereof; and/or
(g) optionally formation of a pharmaceutically acceptable salt of a compound of formula (I).

In one embodiment the process for preparing a compound of formula (I), or a tautomer, stereoisomer, N-oxide, pharmaceutically acceptable salt, or solvate thereof, comprises
(a) coupling a compound of formula (A) or a protected derivative thereof:

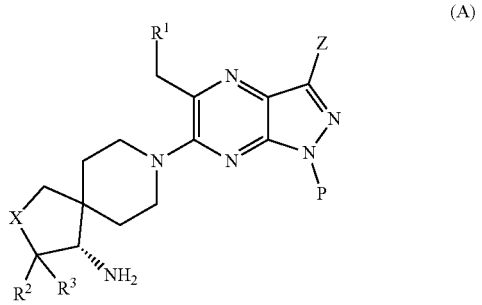

wherein X, $R^1$, $R^2$ and $R^3$ are as defined hereinbefore for the compounds of formula (I), and P represents a protecting group (such as 2-(trimethylsilyl)ethoxymethyl; SEM, or THP) or is hydrogen, and Z is a leaving group (such as a halogen e.g. iodine or bromine)
with a compound of the formula (B) or a protected version thereof

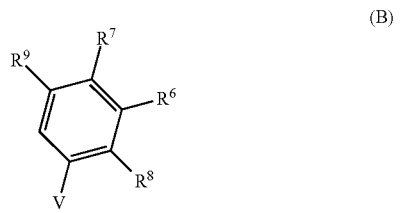

wherein $R^6$, $R^7$, $R^8$ and $R^9$ are as defined hereinbefore for the compounds of formula (I) and V represents a metal or metalloid residue (such as boronic acid, pinacol boronate, magnesium halide or zinc halide e.g. boronic acid, pinacol boronate) or a leaving group such as halogen, and/or
(b) deprotection of a protected derivative of a compound of formula (I); and/or
(c) interconversion of a compound of formula (I) or protected derivative thereof to a further compound of formula (I) or protected derivative thereof; and/or
(d) optionally formation of a pharmaceutically acceptable salt of a compound of formula (I).

Preparative Methods (a), (b), (c) and (d)

Compounds of formula (B) are either commercially available, or are prepared using methods analogous to those described in the examples.

Process (a) typically comprises, reacting a compound of formula (A) with a compound of formula (B) in a suitable solvent, a suitable base and a suitable catalyst at a suitable temperature. Examples of suitable bases are potassium carbonate or potassium phosphate. Example of suitable catalysts are [1,1'-bis(diphenylphosphino)ferrocene]palladium (II) dichloride. Examples of suitable solvents are 1,2-dimethoxyethane or tetrahydrofuran.

Where Z is a metal residue such as zinc halide, the process typically comprises reacting a compound of formula (A) with a compound of formula (B) where V is a leaving group such as a halogen. Typically compounds of formula (A) where Z is a leaving group such as a halogen dissolved in a suitable solvent such as tetrahydrofuran are treated with a reagent such as isopropylmagnesium chloride lithium chloride complex solution, for a suitable time such as 35 min to completely effect metalation. The newly formed organomagnesium species is treated with a suitable metal salt such as zinc chloride to effect transmetalation and optionally stirred for a suitable time such as 10 min then allowed to warm to a suitable temperature such as room temperature for a period of time such as 40 min. The resulting heteroaryl zinc reagent is used directly in the cross coupling reaction with formula (B) using a suitable catalyst such as methanesulfonato(2-dicyclohexylphosphino-2',6'-dimethoxy-1,1'-biphenyl)(2'-methylamino-1,1'-biphenyl-2-yl)palladium(II) (SPhos G4 palladacycle) at a suitable temperature such as room temperature for a suitable time such as 18 h.

Compounds of formula (D) or protected derivatives thereof are obtained from commercially available starting materials, prepared from literature procedures or using methods indicated within the examples outlined in this application or analogous methods thereto.

Compounds of formula (C) or a protected derivative thereof, in particular where $R^1$ is hydrogen, may be obtained by reacting a compound of formula (E):

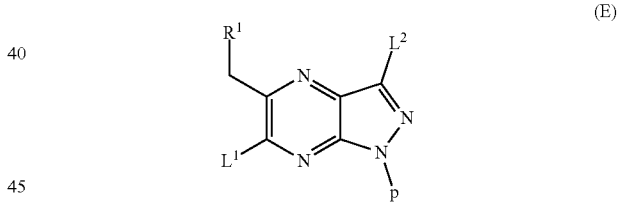

wherein P represents a suitable amine protecting group (such as 2-(trimethylsilyl)ethoxymethyl; SEM) or is hydrogen, and $L^1$ and $L^2$ independently represent leaving groups (such as a halide e.g. chlorine, bromine or iodine) with a compound of formula (B) or protected derivative thereof, using a method analogous to process (a).

Compounds of formula (E) are obtained from commercially available starting materials, prepared from literature procedures or using methods indicated within the examples outlined in this patent or analogous methods, thereto.

Compounds of formula (A) or protected derivatives thereof may be obtained by reacting compound of formula (E), where $R^1$ is H, with a compound of formula (D) or protected derivative thereof, using a suitable base such as diisopropylethylamine, in a suitable solvent such as dimethylsulfoxide or N-methyl-2-pyrrolidinone, at a suitable temperature such as 80° C. to 150° C.

Compounds of formula (A) or protected derivatives thereof may be obtained from compounds of formula (F) or protected derivatives thereof

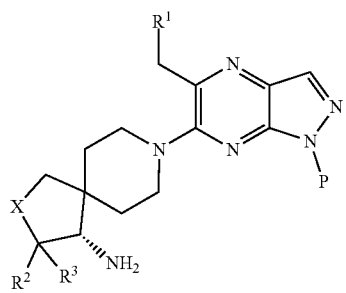
(F)

wherein X, R² and R³ are as defined hereinbefore for the compounds of formula (I) and P represents a suitable amine protecting group (such as 2-tetrahydropyran; THP or 2-(trimethylsilyl)ethoxymethyl; SEM) or is hydrogen, by introducing a suitable leaving group Z such as a halogen, for example using a suitable halogenating reagent (such as N-iodosuccinimide) followed by an optional protection step to introduce the amine protecting group P (such as 2-tetrahydropyran; THP or 2-(trimethylsilyl)ethoxymethyl; SEM).

Compounds of formula (A), or protected derivatives thereof in particular where R¹ is H or —OH, may be be obtained by reacting a compound of formula (X') or protected derivative thereof:

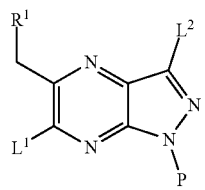
(X')

wherein R¹ is either hydrogen or hydroxyl, P represents a protecting group (such as 2-tetrahydropyran; THP or 2-(trimethylsilyl)ethoxymethyl; SEM) or is hydrogen, and L¹ and L² independently represent leaving groups (such as a halide e.g. chlorine, bromine or iodine), with a compound of formula (D) or protected derivative thereof.

Compounds of formula (X'), in particular where R¹ is OH or protected derivatives thereof, may be obtained by reacting a compound of formula (Y) or protected derivative thereof:

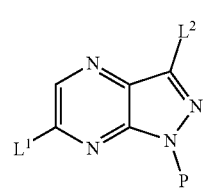
(Y)

wherein P represents a protecting group (such as 2-tetrahydropyran; THP or 2-(trimethylsilyl)ethoxymethyl; SEM) or is hydrogen, and L¹ and L² independently represent leaving groups (such as a halide e.g. chlorine, bromine or iodine), with methanol in the presence of a photoredox catalyst (such as 2,4,5,6-tetra(9H-carbazol-9-yl)isophthalonitrile), a peroxide reagent such as tert-butyl peracetate solution, an acid (such as TFA), and a source of light (such as a blue LED), in a solvent such as DMSO. Alternatively, the reaction can be performed with an excess of an alcohol, such as methanol in the presence of a metal salt such as silver (II) nitrate, an oxidant such as ammonium persulfate, an acid (such as TFA), in a solvent such as DMSO or water and a source of heat (30-150° C.).

Alternatively, compounds of formula (X'), or protected derivatives thereof, may be obtained by reacting a compound of formula (W') or protected derivative thereof:

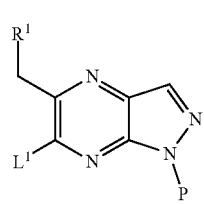
(W')

wherein P represents a protecting group (such as 2-tetrahydropyran; THP or 2-(trimethylsilyl)ethoxymethyl; SEM) or is hydrogen, and L¹ is a leaving group (such as a halogen e.g. iodine or bromine), with a suitable halogenating agent (such as N-bromosuccinimide or N-iodosuccinimide) to introduce a leaving group such as a halogen (e.g. bromine or iodine).

Compounds of formula (W), or protected derivatives thereof in particular where R¹ is hydrogen, may be obtained by reacting a compound of formula (Y') or protected derivative thereof:

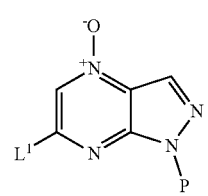
(Y')

wherein P represents a protecting group (such as 2-tetrahydropyran; THP or 2-(trimethylsilyl)ethoxymethyl; SEM) or is hydrogen, and L¹ is a leaving group (such as a halogen e.g. iodine or bromine), with an organometallic residue (such as an organomagnesium species e.g. methyl magnesium chloride).

Compounds of formula (Y'), or protected derivatives thereof, may be obtained by reacting a compound of formula (Z) or protected derivative thereof:

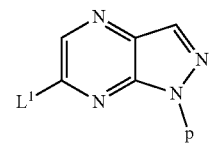
(Z)

wherein P represents a protecting group (such as 2-tetrahydropyran; THP or 2-(trimethylsilyl)ethoxymethyl; SEM) or is hydrogen, and $L^1$ is a leaving group (such as a halogen e.g. iodine or bromine), with an oxidising agent (such as a peracid reagent e.g. trifluoroperacetic acid).

Compounds of formula (F), or protected derivatives thereof, may be obtained by reacting a compound of formula (G) or (G'), or mixtures of (G) and (G'), and protected derivatives thereof

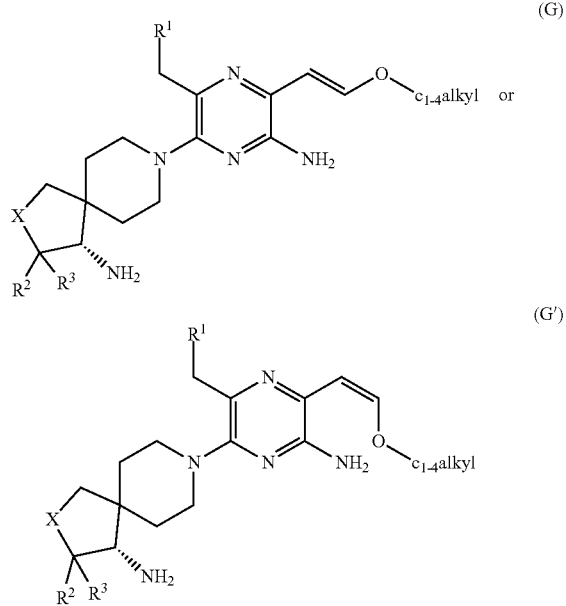

wherein X, $R^1$, $R^2$ and $R^3$ are as defined hereinbefore for the compounds of formula (I), by intramolecular cyclisation of the alkoxy vinyl ether and the amine using a suitable acid (such as TFA). Under such conditions, one or more protecting groups may also be removed, and therefore the cyclisation step may optionally be followed by a re-protection step, for example with di-tert-butyl dicarbonate to give an N-Boc derivative.

Compounds of formula (G) and (G') or protected derivatives thereof may be obtained by reacting a compound of formula (H) or protected derivative thereof,

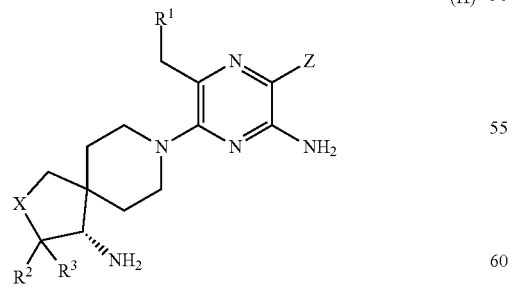

wherein X, $R^1$, $R^2$ and $R^3$ are as defined hereinbefore for the compounds of formula (I), where Z is a leaving group (such as a halogen)
with an alkoxy vinyl derivative such as (E)-1-ethoxyethene-2-boronic acid pinacol ester via metal catalysis (for example using palladium acetate and a suitable ligand such as 2-dicyclohexylphosphino-2',6'-dimethoxybiphenyl i.e. Sphos and a base such as potassium phosphate). The reaction may take place in a suitable solvent or solvent combination such as acetonitrile and water and at a suitable temperature such as 70° C.

Compounds of formula (H) or protected derivatives thereof may be obtained by reacting a compound of formula (J):

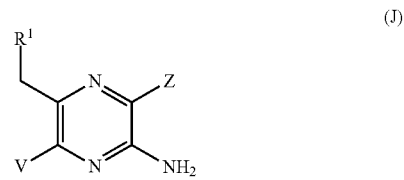

with a compound of formula (D) or protected derivative thereof, wherein, Z is a leaving group (such as a halogen) and V is leaving group (such as a halogen), with a suitable base (such as N,N-diisopropylethylamine), in a suitable solvent (such as N-methyl-2-pyrrolidone) at a suitable temperature (such as 120° C.).

Compounds of formula (K), or protected derivatives thereof, may be obtained by reacting a compound of formula (L) or protected derivative thereof:

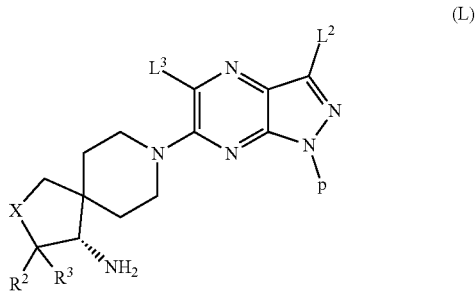

wherein X, $R^2$ and $R^3$ are as defined hereinbefore for the compounds of formula (I), P represents an amine protecting group (such as 2-(trimethylsilyl)ethoxymethyl; SEM), N,N-dimethylsulfamoyl or is hydrogen, $L^2$ is a leaving group (such as halogen e.g. iodide), $L^3$ is a leaving group (such as halogen e.g. bromide), with a compound of formula (B), using procedures such as those outlined for (a).

Compounds of formula (L), or protected derivative thereof, may be obtained by reacting a compound of formula (M):

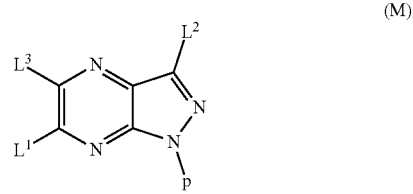

wherein P represents a suitable protecting group such as 2-(trimethylsilyl)ethoxymethyl (SEM) or N,N-dimethylsulfamoyl, L¹ is a leaving group such as chloride, L² is a leaving group such as iodide and L³ is leaving group such as bromide, with a compound of formula (D) using procedures such as those outlined for (b).

Compounds of formula (M) or protected derivatives thereof, may be obtained from commercially available starting materials, prepared from literature procedures or using methods indicated within the examples outlined in this patent or analogous methods.

Alternatively, compounds of formula (L) or protected derivatives thereof may be obtained by reacting a compound of formula (N) or a protected derivative thereof:

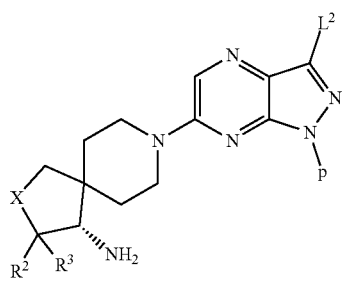
(N)

wherein R² and R³, are as defined hereinbefore for the compounds of formula (I), P represents an amine protecting group (such as 2-(trimethylsilyl)ethoxymethyl; SEM) or is hydrogen, with a suitable halogenating agent (such as N-bromosuccinimide or N-iodosuccinimide) to introduce a leaving group such as a halogen (e.g. bromine or iodine).

Compounds of formula (N) or protected derivatives thereof can be obtained by reacting a compound of formula (O) or protected derivatives thereof:

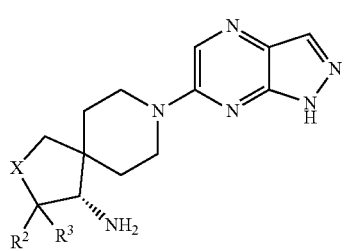
(O)

wherein R² and R³ are as defined hereinbefore for the compounds of formula (I), with a suitable halogenating agent such as N-iodosuccinimide to introduce a leaving group such as a halogen and suitable conditions to introduce the protecting group.

Compounds of formula (O) or protected derivatives thereof, where X is a nitrogen may be obtained by reacting a compound of formula (P):

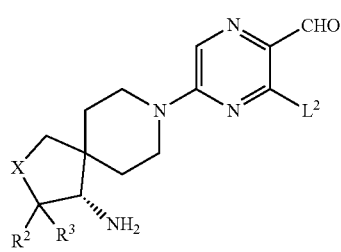
(P)

wherein R² and R³ are as defined hereinbefore for the compounds of formula (I), L² is a leaving group such as chloride, with a suitable hydrazine derivative such as hydrazine hydrate.

Compounds of formula (P) or protected derivatives thereof may be obtained by reacting a compound of formula (Q):

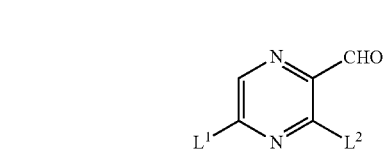
(Q)

with a compound of formula (D) or protected derivative thereof, where L¹ and L² are leaving groups such as chloride.

Compounds of formula (Q) or protected derivatives thereof, are obtained from commercially available starting materials or prepared from literature procedures or using methods indicated within the examples outlined in this patent or analogous methods.

Compounds of formula (R), or protected derivatives thereof, may be obtained by reacting a compound of formula (S) or protected derivative thereof:

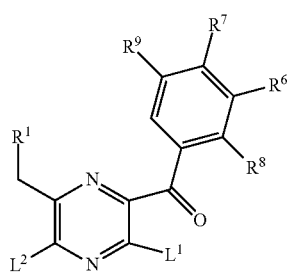
(S)

wherein R¹, R⁶, R⁷, R⁸ and R⁹ are as defined hereinbefore for the compounds of formula (I) and both L¹ and L² represent a suitable leaving group, such as a halogen, with a compound of formula (D).

Compounds of formula (S), or protected derivatives thereof, may be obtained by reacting a compound of formula (T) or protected derivative thereof:

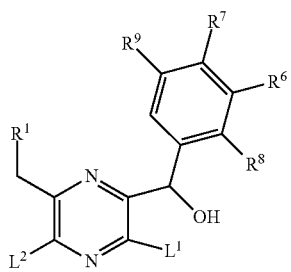

(T)

wherein $R^1$, $R^6$, $R^7$, $R^8$ and $R^9$ are as defined hereinbefore for the compounds of formula (I) and both $L^1$ and $L^2$ represent a suitable leaving group, such as a halogen, with a suitable oxidising reagent such as manganese (IV) oxide.

Compounds of formula (T), or protected derivatives thereof, may be obtained by reacting a compound of formula (U) or protected derivative thereof:

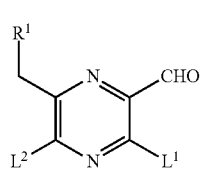

(U)

wherein $R^1$ are as defined hereinbefore for the compounds of formula (I) and both $L^1$ and $L^2$ represent a suitable leaving groups, such as a halogen, with a compound of formula (B), wherein V is a metal or metaloid residue (such as a magnesium halide).

Compounds of formula (U), or protected derivatives thereof, may be obtained by reacting a compound of formula (V') or protected derivative thereof:

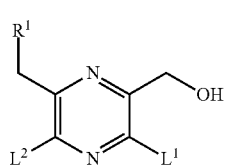

(V')

wherein $R^1$, are as defined hereinbefore for the compounds of formula (I) and both $L^1$ and $L^2$ represent a suitable leaving groups, such as a halogen, with a suitable oxidising reagent such as Dess-Martin periodinane.

Compounds of formula (V), or protected derivatives thereof, may be obtained by reacting a compound of formula (W) or protected derivative thereof:

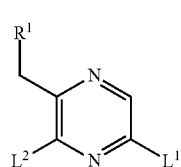

(W)

wherein $R^1$ is as defined hereinbefore for the compounds of formula (I) and both $L^1$ and $L^2$ represent a suitable leaving group, such as a halogen, with an alcohol, such as methanol in the presence of a photoredox catalyst (such as 2,4,5,6-tetra(9H-carbazol-9-yl)isophthalonitrile), an oxidant reagent such as tert-butyl peracetate solution, an acid (such as TFA), and a source of light (such as a blue LED), in a solvent such as DMSO.

Compounds of formula (W) or protected derivatives thereof, are obtained from commercially available starting materials or prepared from literature procedures or using methods indicated within the examples outlined in this patent or analogous methods.

Compounds of formula (T), or protected derivatives thereof, may also be obtained by reacting a compound of formula (Z') or protected derivative thereof:

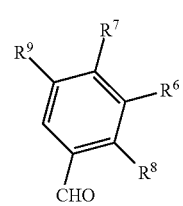

(Z')

wherein $R^6$, $R^7$, Wand $R^9$ are as defined hereinbefore for the compounds of formula (I) with a compound of formula (W). The process typically comprises reacting a compound of formula (W) with a reagent such as 2,2,6,6-tetramethylpiperidinylmagnesium chloride lithium chloride complex solution, for a suitable time such as 2.5 h to completely effect metalation. The newly formed organomagnesium species is treated with a compound of formula (Z') and allowed to warm up e.g. to room temperature and stirred for a suitable time, such as 18 h.

Compounds of formula (Z') or protected derivatives thereof, are prepared using methods indicated within the examples outlined in this patent or analogous methods.

Deprotection of a Protected Derivative of a Compound of Formula (I)

Process (e) typically comprises any suitable deprotection reaction, the conditions of which will depend upon the nature of the protecting group.

When the protecting group P represents SEM, such a deprotection reaction will typically comprise the use of a suitable acid in a suitable solvent, followed by removal of the hydroxymethyl adduct formed during the acid deprotection of the SEM protecting group with ethylenediamine. For example, the acid may suitably comprise of trifluoroacetic acid or hydrogen chloride and the solvent may suitably comprise dichloromethane, DMF or methanol. Optionally a mixture of solvents may be used, for example water and methanol. The second step involves concentration in vacuo, followed by dissolving the crude material in a suitable solvent such as methanol and treatment with a suitable scavenging reagent such as ethylenediamine in a suitable solvent such as methanol.

Where the protecting group is a N,N-dimethylsulfamoyl group ($SO_2NMe_2$), a stronger acid such as trifluoromethanesulfonic acid may be used at a suitable temperature.

When $R^1$=OH and the protecting group P represents SEM, such a deprotection reaction will typically make use of a suitable acid (e.g. methanesulfonic acid or TFA) in a suitable solvent (e.g. DCM, with or without water), followed by removal of the hydroxymethyl adduct formed during the acid deprotection of the SEM protecting group, with ethylenediamine or ammonia in a suitable solvent (e.g. DCM, $CHCl_3$, IPA, MeOH, water, or mixtures thereof). For example, the deprotection reaction comprises the use of methanesulfonic in a DCM/water mixture at RT and the second step involves treating the crude product with ethylenediamine and/or ammonia in a mixture of DCM and water.

When $R^1$=H and the protecting group P represents THP, such a deprotection reaction will typically comprise the use of a suitable acid (e.g. HCl) in a suitable solvent (e.g. dioxane, MeOH) at between RT and 40° C.

In other cases, when $R^1$=H and the compound is protected only with Boc, such a deprotection reaction will typically comprise the use of a suitable acid (e.g. TFA or HCl) in a suitable solvent (DCM, MeOH, dioxane).

The deprotection may be carried out in accordance with the procedures described herein as general procedures for preparation of compounds of formula (I), Methods 1-5.

Formation of a Pharmaceutically Acceptable Salt of a Compound of Formula (I)

The salt formation may be carried out by treatment of a compound of formula (I) in the free base form, dissolved in a suitable solvent, with a stoichiometric amount or an excess of a pharmaceutically acceptable organic or inorganic acid, then isolation of the resulting salt by methods well known in the art, e.g. evaporation of solvent or crystallisation.

General

If appropriate, the reactions previously described in processes (a), (b) and (c) are followed or preceded by one or more reactions known to the skilled of the art and are performed in an appropriate order to achieve the requisite substitutions defined above to afford other compounds of formula (I). Non-limiting examples of such reactions whose conditions can be found in the literature include:

protection of reactive functions,
deprotection of reactive functions,
halogenation,
dehalogenation,
dealkylation,
alkylation and arylation of amine, aniline, alcohol and phenol,
Mitsunobu reaction on hydroxyl groups,
cycloaddition reactions on appropriate groups,
reduction of nitro, esters, cyano, aldehydes,
transition metal-catalyzed coupling reactions,
acylation,
sulfonylation/introduction of sulfonyl groups,
saponification/hydrolysis of esters groups,
amidification or transesterification of ester groups,
esterification or amidification of carboxylic groups,
halogen exchange,
nucleophilic substitution with amine, thiol or alcohol,
reductive amination,
oxime formation on carbonyl and hydroxylamine groups,
S-oxidation,
N-oxidation, and
salification.

A wide range of well known functional group interconversions are know by a person skilled in the art for converting a precursor compound to a compound of formula I and are described in *Advanced Organic Chemistry* by Jerry March, 4$^{th}$ Edition, John Wiley & Sons, 1992. For example, possible metal catalysed functionalisations such as using organo-tin reagents (the Stille reaction), Grignard reagents and reactions with nitrogen nucleophiles are described in 'Palladium Reagents and Catalysts' [Jiro Tsuji, Wiley, ISBN 0-470-85032-9] and Handbook of OrganoPalladium Chemistry for Organic Synthesis [Volume 1, Edited by Ei-ichi Negishi, Wiley, ISBN 0-471-31506-0].

Protecting Groups

In many of the reactions described above, it may be necessary to protect one or more groups to prevent reaction from taking place at an undesirable location on the molecule. Examples of protecting groups, and methods of protecting and deprotecting functional groups, can be found in Protective Groups in Organic Synthesis (T. Green and P. Wuts; 3rd Edition; John Wiley and Sons, 1999).

A hydroxy group may be protected, for example, as an ether (—OR) or an ester (—OC(=O)R), for example, as: a t-butyl ether; a tetrahydropyranyl (THP) ether; a benzyl, benzhydryl (diphenylmethyl), or trityl (triphenylmethyl) ether; a trimethylsilyl or t-butyldimethylsilyl ether; or an acetyl ester (—OC(=O)$CH_3$).

An aldehyde or ketone group may be protected, for example, as an acetal (R—CH(OR)$_2$) or ketal ($R_2$C(OR)$_2$), respectively, in which the carbonyl group (>C=O) is treated with, for example, a primary alcohol. The aldehyde or ketone group is readily regenerated by hydrolysis using a large excess of water in the presence of acid.

An amine group may be protected, for example, as an amide (—NRCO—R) or a carbamate (—NRCO—OR), for example, as: a methyl amide (—NHCO—$CH_3$); a benzyl carbamate (—NHCO—O$CH_2C_6H_5$, —NH-Cbz or NH—Z); as a t-butyl carbamate (—NHCO—OC($CH_3$)$_3$, —NH-Boc); a 2-biphenyl-2-propyl carbamate (—NHCO—OC($CH_3$)$_2C_6H_4C_6H_5$, —NH-Bpoc), as a 9-fluorenylmethyl carbamate (—NH—Fmoc), as a 6-nitroveratryl carbamate (—NH—Nvoc), as a 2-trimethylsilylethyl carbamate (—NH-Teoc), as a 2,2,2-trichloroethyl carbamate (—NH-Troc), as an allyl carbamate (—NH-Alloc), or as a 2(-phenylsulfonyl)ethyl carbamate (—NH-Psec).

For example, in compounds of formula I contains an amino group, the amino group can be protected by means of a protecting group as hereinbefore defined, one preferred group being the ted-butyloxycarbonyl (Boc) group while the additional functionalisation is introduced. Where no subsequent modification of the amino group is required, the protecting group can be carried through the reaction sequence to give an N-protected form of a compound of the formula (I) which can then be de-protected by standard methods (e.g. treatment with acid in the case of the Boc group) to give the compound of formula (I).

Other protecting groups for amines, such as cyclic amines and heterocyclic N—H groups, include toluenesulfonyl (tosyl) and methanesulfonyl (mesyl) groups, benzyl groups such as a para-methoxybenzyl (PMB) group and tetrahydropyranyl (THP) groups.

A carboxylic acid group may be protected as an ester for example, as: an $C_{1-7}$ alkyl ester (e.g., a methyl ester; a t-butyl ester); a $C_{1-7}$ haloalkyl ester (e.g., a $C_{1-7}$ trihaloalkyl ester); a tri$C_{1-7}$ alkylsilyl-$C_{1-7}$ alkyl ester; or a $C_{5-20}$ aryl-$C_{1-7}$ alkyl ester (e.g., a benzyl ester; a nitrobenzyl ester; para-methoxybenzyl ester. A thiol group may be protected, for example, as a thioether (—SR), for example, as: a benzyl thioether; an acetamidomethyl ether (—S—$CH_2$NHC(=O)$CH_3$).

Isolation and Purification of the Compounds of the Invention

The compounds of the invention can be isolated and purified according to standard techniques well known to the person skilled in the art and examples of such methods include chromatographic techniques such as column chromatography (e.g. flash chromatography) and HPLC. One technique of particular usefulness in purifying the compounds is preparative liquid chromatography using mass spectrometry as a means of detecting the purified compounds emerging from the chromatography column.

Preparative LC-MS is a standard and effective method used for the purification of small organic molecules such as the compounds described herein. The methods for the liquid chromatography (LC) and mass spectrometry (MS) can be varied to provide better separation of the crude materials and improved detection of the samples by MS. Optimisation of the preparative gradient LC method will involve varying columns, volatile eluents and modifiers, and gradients. Methods are well known in the art for optimising preparative LC-MS methods and then using them to purify compounds. Such methods are described in Rosentreter U, Huber U.; Optimal fraction collecting in preparative LC/MS; *J Comb Chem.*; 2004; 6(2), 159-64 and Leister W, Strauss K, Wisnoski D, Zhao Z, Lindsley C., Development of a custom high-throughput preparative liquid chromatography/mass spectrometer platform for the preparative purification and analytical analysis of compound libraries; *J Comb Chem.*; 2003; 5(3); 322-9. An example of such a system for purifying compounds via preparative LC-MS is described below in the Examples section of this application (under the heading "Mass Directed Purification LC-MS System").

Methods of recrystallisation of compounds of formula (I) and salt thereof can be carried out by methods well known to the skilled person—see for example (P. Heinrich Stahl (Editor), Camille G. Wermuth (Editor), ISBN: 3-90639-026-8, Handbook of Pharmaceutical Salts: Properties, Selection, and Use, Chapter 8, Publisher Wiley-VCH). Products obtained from an organic reaction are seldom pure when isolated directly from the reaction mixture. If the compound (or a salt thereof) is solid, it may be purified and/or crystallized by recrystallisation from a suitable solvent. A good recrystallisation solvent should dissolve a moderate quantity of the substance to be purified at elevated temperatures but only a small quantity of the substance at lower temperature. It should dissolve impurities readily at low temperatures or not at all. Finally, the solvent should be readily removed from the purified product. This usually means that it has a relatively low boiling point and a person skilled in the art will know recrystallizing solvents for a particular substance, or if that information is not available, test several solvents. To get a good yield of purified material, the minimum amount of hot solvent to dissolve all the impure material is used. In practice, 3-5% more solvent than necessary is used so the solution is not saturated. If the impure compound contains an impurity which is insoluble in the solvent it may then be removed by filtration and then allowing the solution to crystallize. In addition, if the impure compound contains traces of coloured material that are not native to the compound, it may be removed by adding a small amount of decolorizing agent e.g. activating charcoal to the hot solution, filtering it and then allowing it to crystallize. Usually crystallization spontaneously occurs upon cooling the solution. If it is not, crystallization may be induced by cooling the solution below room temperature or by adding a single crystal of pure material (a seed crystal). Recrystallisation can also be carried out and/or the yield optimized by the use of an anti-solvent or co-solvent. In this case, the compound is dissolved in a suitable solvent at elevated temperature, filtered and then an additional solvent in which the required compound has low solubility is added to aid crystallization. The crystals are then typically isolated using vacuum filtration, washed and then dried, for example, in an oven or via desiccation.

Other examples of methods for purification include sublimation, which includes a heating step under vacuum for example using a cold finger, and crystallization from melt (Crystallization Technology Handbook 2nd Edition, edited by A. Mersmann, 2001).

Biological Effects

It is envisaged that the compound of the invention will be useful in medicine or therapy. The compounds of the invention, subgroups and examples thereof, have been shown to inhibit SHP2. Such inhibition leads to inhibition of tumor cell proliferation and activation of T cell immune responses toward cancer cells, which may be useful in preventing or treating disease states or conditions described herein, for example the diseases and conditions discussed below and the diseases and conditions described in the "Background of the Invention" section above in which SHP2 plays a role. Thus, for example, it is envisaged that the compounds of the invention will be useful in alleviating or reducing the incidence of cancer, preventing or treating diseases or conditions mediated by SHP2, for example diseases or conditions such as cancers in which there are activating mutations within upstream components (such as RAS, KRAS and NRAS) of the MAPK pathway or Receptor Tyrosine Kinase (RTK) activated cancers. The compounds of the present invention may be useful for the treatment of the adult population. The compounds of the present invention may be useful for the treatment of the pediatric population.

The compounds of the present invention have been shown to be good inhibitors of SHP2. The compounds of formula (I) are capable of binding to SHP2 and exhibiting potency for SHP2. The efficacies of the compounds of the present invention have been determined against SHP2 using the assay protocol described herein and other methods known in the art. More particularly, the compounds of the formula (I) and sub-groups thereof have potency for SHP2.

Certain compounds of the invention are those having $IC_{50}$ values of less than 0.1 µM in particular less than 0.01 or 0.001 µM.

SHP2 function has been implicated in many diseases due to its role in cell survival and proliferation, primarily through activation of the RAS-ERK signalling pathway, as well as in oncogenesis. As a consequence of their affinity for SHP2 it is anticipated that the compounds may prove useful in treating or preventing a range of diseases or conditions including disorders associated with cell accumulation (e.g. cancer, autoimmune disorders, inflammation and restenosis), disorders where excessive apoptosis results in cell loss (e.g. stroke, heart failure, neurodegeneration such as Alzheimers' disease, Parkinson's disease, Huntington's disease, amyotrophic lateral sclerosis, AIDS, ischemia (stroke, myocardial infarction) and osteoporosis) or treating autoimmune diseases such as multiple sclerosis (MS).

Therefore, it is also envisaged that the compounds of the invention as defined herein may be useful in treating other conditions such as inflammation, hepatitis, ulcerative colitis, gastritis, autoimmunity, inflammation, restenosis, stroke, heart failure, neurodegenerative conditions such as Alzheimers' disease, Parkinson's disease, Huntington's disease, myotonic dystrophy, and amyotrophic lateral sclerosis, AIDS, ischemia such as traumatic brain injury, spinal cord injury, cerebral ischemia, cerebral ischemia/reperfusion (I/R) injury, acute and chronic CNS injury ischemia, stroke or myocardial infarction, degenerative diseases of the musculoskeletal system such as osteoporosis, autoimmune diseases such as multiple sclerosis (MS) and Type I diabetes, and eye diseases such as retinal degeneration which result from loss of control of programmed cell death.

As a consequence of their activity against SHP2 it is anticipated that the compounds may prove useful in treating or preventing proliferative disorders such as cancers.

Examples of cancers (and their benign counterparts) which may be treated (or inhibited) include, but are not limited to tumours of epithelial origin (adenomas and carcinomas of various types including adenocarcinomas, squamous carcinomas, transitional cell carcinomas and other carcinomas) such as carcinomas of the bladder and urinary tract, breast, gastrointestinal tract (including the esophagus, stomach (gastric), small intestine, colon, bowel, colorectal, rectum and anus), liver (hepatocellular carcinoma), gall bladder and biliary system, exocrine pancreas, kidney (for example renal cell carcinoma), lung (for example adenocarcinomas, small cell lung carcinomas, non-small cell lung carcinomas, bronchioalveolar carcinomas and mesotheliomas), head and neck (for example cancers of the tongue, buccal cavity, larynx, pharynx, nasopharynx, tonsil, salivary glands, nasal cavity and paranasal sinuses), ovary, fallopian tubes, peritoneum, vagina, vulva, penis, testes, cervix, myometrium, endometrium, thyroid (for example thyroid follicular carcinoma), brain, adrenal, prostate, skin and adnexae (for example melanoma, basal cell carcinoma, squamous cell carcinoma, keratoacanthoma, dysplastic naevus); haematological malignancies (i.e. leukemias, lymphomas) and premalignant haematological disorders and disorders of borderline malignancy including haematological malignancies and related conditions of lymphoid lineage (for example acute lymphocytic leukemia [ALL], chronic lymphocytic leukemia [CLL], B-cell lymphomas such as diffuse large B-cell lymphoma [DLBCL], follicular lymphoma, Burkitt's lymphoma, mantle cell lymphoma, T-cell lymphomas and leukaemias, natural killer [NK] cell lymphomas, Hodgkin's lymphomas, hairy cell leukaemia, monoclonal gammopathy of uncertain significance, plasmacytoma, multiple myeloma, and post-transplant lymphoproliferative disorders), and haematological malignancies and related conditions of myeloid lineage (for example acute myelogenous leukemia [AML], chronic myelogenous leukemia [CML], chronic myelomonocytic leukemia [CMML], hypereosinophilic syndrome, myeloproliferative disorders such as polycythaemia vera, essential thrombocythaemia and primary myelofibrosis, myeloproliferative syndrome, myelodysplastic syndrome, and promyelocytic leukemia); tumours of mesenchymal origin, for example sarcomas of soft tissue, bone or cartilage such as osteosarcomas, fibrosarcomas, chondrosarcomas, rhabdomyosarcomas, leiomyosarcomas, liposarcomas, angiosarcomas, Kaposi's sarcoma, Ewing's sarcoma, synovial sarcomas, epithelioid sarcomas, gastrointestinal stromal tumours, benign and malignant histiocytomas, and dermatofibrosarcoma protuberans; tumours of the central or peripheral nervous system (for example astrocytomas (e.g. gliomas), neuromas and glioblastomas, meningiomas, ependymomas, pineal tumours and schwannomas); endocrine tumours (for example pituitary tumours, adrenal tumours, islet cell tumours, parathyroid tumours, carcinoid tumours and medullary carcinoma of the thyroid); ocular and adnexal tumours (for example retinoblastoma); germ cell and trophoblastic tumours (for example teratomas, seminomas, dysgerminomas, hydatidiform moles and choriocarcinomas); and paediatric and embryonal tumours (for example medulloblastoma, neuroblastoma, Wilms tumour, and primitive neuroectodermal tumours); or syndromes, congenital or otherwise, which leave the patient susceptible to malignancy (for example Xeroderma Pigmentosum).

Growth of cells is a closely controlled function. Cancer, a condition of abnormal cell growth, results when cells replicate in an uncontrolled manner (increasing in number), uncontrollably grow (getting larger) and/or experience reduced cell death by apoptosis (programmed cell death), necrosis, or annoikis. In one embodiment abnormal cell growth is selected from uncontrolled cell proliferation, excessive cell growth or reduced programmed cell death. In particular, the condition or disease of abnormal cell growth is a cancer.

Thus, in the pharmaceutical compositions, uses or methods of this invention for treating a disease or condition comprising abnormal cell growth (i.e. uncontrolled and/or rapid cell growth), the disease or condition comprising abnormal cell growth in one embodiment is a cancer.

The compounds of the invention may be useful in the treatment of metastasis and metastatic cancers. Metastasis or metastatic disease is the spread of a disease from one organ or part to another non-adjacent organ or part. The cancers which can be treated by the compounds of the invention include primary tumours (i.e. cancer cells at the originating site), local invasion (cancer cells which penetrate and infiltrate surrounding normal tissues in the local area), and metastatic (or secondary) tumours ie. tumours that have formed from malignant cells which have circulated through the bloodstream (haematogenous spread) or via lymphatics or across body cavities (trans-coelomic) to other sites and tissues in the body. In particular, the compounds of the invention may be useful in the treatment of metastasis and metastatic cancers.

In one embodiment the haematological malignancies is a leukaemia. In another embodiment the haematological malignancies is a lymphoma. In one embodiment the cancer is AML. In another embodiment the cancer is CLL.

In one embodiment the compound of the invention is for use in the prophylaxis or treatment of leukemia, such as acute or chronic leukaemia, in particular acute myeloid leukaemia (AML), acute lymphocytic leukaemia (ALL), chronic lymphocytic leukaemia (CLL), or chronic myeloid leukemia (CML). In one embodiment the compound of the invention is for use in the prophylaxis or treatment of lymphoma, such as acute or chronic lymphoma, in particular Burkitt lymphoma, Hodgkin lymphoma, non-Hodgkin lymphoma or diffuse large B-cell lymphoma.

In one embodiment the compound of the invention is for use in the prophylaxis or treatment of acute myeloid leukaemia (AML) or acute lymphocytic leukaemia (ALL).

The cancers may be cancers which are sensitive to treatment with SHP2 inhibitors. The cancers may be cancers which overexpress SHP2. The cancer may be cancers which are SHP2 wild-type. The cancer may be cancers which are mutant SHP2. In one embodiment the cancer has activating mutations in SHP2.

Particular cancers include hepatocellular carcinoma, melanoma, oesophageal, renal, colon, colorectal, lung e.g. NSCLC, mesothelioma or lung adenocarcinoma, breast, bladder, gastrointestinal, ovarian and prostate cancers.

Particular cancers include those with activated SHP2 (activating mutations, amplified and/or SHP2 wild-type overexpression), for example, hepatocellular carcinoma, breast, lung, colorectal and neuroblastoma.

Particular cancers include those with oncogenic alterations in the RAS-RAF-MEK-ERK pathway, including mutant forms of KRAS.

Particular cancers include those where RTK activity drives disease or resistance to cancer therapies.

The compounds of the invention will be particularly useful in the treatment or prevention of cancers of a type associated with or characterised by the presence of elevated Ras, BRAF and/or MEK signalling.

Elevated levels of Ras, BRAF or MEK signalling are found in many cancers and are associated with a poor prognosis. In addition, cancers with activating Ras mutations may also be sensitive to an SHP2 inhibitor. The elevated levels of Ras signalling and mutations in Ras can be identified by the techniques outlined herein.

A further subset of cancers consists of NRas melanoma and NRas AML.

Another subset of cancers consists of KRas lung cancer, KRas pancreatic cancer and KRas colorectal cancer (CRC).

In one embodiment, the cancer is colorectal, breast, lung and brain

In one embodiment, the cancer is a paediatric cancer.

In one embodiment, the cancer is breast cancer, leukaemia, lung cancer, liver cancer, gastric cancer, laryngeal cancer or oral cancer.

Whether a particular cancer is one which is sensitive to SHP2 inhibitors, may be determined by a method as set out in the section headed "Methods of Diagnosis".

A further aspect provides the use of a compound for the manufacture of a medicament for the treatment of a disease or condition as described herein, in particular cancer.

Certain cancers are resistant to treatment with particular drugs. This can be due to the type of the tumour (most common epithelial malignancies are inherently chemoresistant and prostate is relatively resistant to currently available regimens of chemotherapy or radiation therapy) or resistance can arise spontaneously as the disease progresses or as a result of treatment. In this regard, references to prostate includes prostate with resistance towards anti-androgen therapy, in particular abiraterone or enzalutamide, or castrate-resistant prostate. Similarly references to multiple myeloma includes bortezomib-insensitive multiple myeloma or refractory multiple myeloma and references to chronic myelogenous leukemia includes imitanib-insensitive chronic myelogenous leukemia and refractory chronic myelogenous leukemia. In this regard, references to mesothelioma includes mesothelioma with resistance towards topoisomerase poisons, alkylating agents, antitubulines, antifolates, platinum compounds and radiation therapy, in particular cisplatin-resistant mesothelioma. References to melanoma include melanomas that are resistant to treatment with BRAF and/or MEK inhibitors.

The compounds may also be useful in the treatment of tumour growth, pathogenesis, resistance to chemo- and radio-therapy by sensitising cells to chemotherapy and as an anti-metastatic agent.

Therapeutic anticancer interventions of all types necessarily increase the stresses imposed on the target tumour cells. Inhibitors of SHP2 represent a class of chemotherapeutics with the potential for: (i) sensitizing malignant cells to anticancer drugs and/or treatments; (ii) alleviating or reducing the incidence of resistance to anticancer drugs and/or treatments; (iii) reversing resistance to anticancer drugs and/or treatments; (iv) potentiating the activity of anticancer drugs and/or treatments; (v) delaying or preventing the onset of resistance to anticancer drugs and/or treatments.

In one embodiment the invention provides a compound for use in the treatment of a disease or condition which is mediated by SHP2. In a further embodiment the disease or condition which is mediated by SHP2 is a cancer which is characterised by overexpression and/or increased activity of SHP2.

A further aspect provides the use of a compound for the manufacture of a medicament for the treatment of a disease or condition as described herein, in particular cancer.

In one embodiment there is provided a compound for use in the prophylaxis or treatment of a disease or condition mediated by SHP2.

In one embodiment there is provided a pharmaceutical composition comprising an effective amount of at least one compound as defined. In a further aspect of the present invention, there is provided a compound as defined in the present In one embodiment there is provided a method for the prophylaxis or treatment of cancer comprising the steps of administering to a mammal a medicament comprising at least one compound as defined.

Methods of Diagnosis

Prior to administration of a compound of the formula (I), a patient may be screened to determine whether a disease or condition from which the patient is or may be suffering is one which would be susceptible to treatment with a compound which inhibits SHP2. The term 'patient' includes human and veterinary subjects such as primates, in particular human patients.

For example, a biological sample taken from a patient may be analysed to determine whether a condition or disease, such as cancer, that the patient is or may be suffering from is one which is characterised by a genetic abnormality or abnormal protein expression which leads to up-regulation of the levels of SHP2 or to upregulation of a biochemical pathway downstream of SHP2.

Examples of such abnormalities that result in activation or sensitisation of SHP2, loss of, or inhibition of regulatory pathways impacting on SHP2 expression, up-regulation of receptors or their ligands, cytogenetic aberrations or presence of mutant variants of the receptors or ligands. Tumours with up-regulation of SHP2, in particular over-expression or activating mutants of SHP2, or include activating mutations in a Ras isoform such as KRAS may be particularly sensitive to inhibitors of SHP2.

Mutations of Ras have been detected in cell lines and primary tumours including but not limited to melanoma, colorectal cancer, non-small cell lung cancer, and cancers of the pancreas, prostate, thyroid, urinary tract and upper respiratory tract (Cancer Res. 2012; 72: 2457-2467).

The term up-regulation includes elevated expression or over-expression, including gene amplification (i.e. multiple gene copies), cytogenetic aberration and increased expression by a transcriptional or post-translational effect. Thus, the patient may be subjected to a diagnostic test to detect a marker characteristic of up-regulation of SHP2. The term diagnosis includes screening. By marker we include genetic markers including, for example, the measurement of DNA composition to identify amplification SHP2 or presence of mutations of SHP2, or to identify presence of mutations of Ras (e.g. KRAS). The term marker also includes markers which are characteristic of up regulation of SHP2, including protein levels, protein state and mRNA levels of the aforementioned proteins. Gene amplification includes greater than 7 copies, as well as gains of between 2 and 7 copies.

Diagnostic assays for detecting KRAS mutations are described in de Castro et al. Br. J. Cancer. 2012 Jul. 10; 107(2):345-51. doi: 10.1038/bjc.2012.259. Epub 2012 Jun. 19, "A comparison of three methods for detecting KRAS mutations in formalin-fixed colorectal cancer specimens." and references cited therein.

The diagnostic tests and screens are typically conducted on a biological sample (i.e. body tissue or body fluids)

selected from tumour biopsy samples, blood samples (isolation and enrichment of shed tumour cells), cerebrospinal fluid, plasma, serum, saliva, stool biopsies, sputum, chromosome analysis, pleural fluid, peritoneal fluid, buccal smears, skin biopsy or urine.

Methods of identification and analysis of cytogenetic aberration, genetic amplification, mutations and up-regulation of proteins are known to a person skilled in the art. Screening methods could include, but are not limited to, standard methods such as DNA sequence analysis by conventional Sanger or next-generation sequencing methods, reverse-transcriptase polymerase chain reaction (RT-PCR), RNA sequencing (RNAseq), nanostring hybridisation proximity RNA nCounter assays, or in-situ hybridization such as fluorescence in situ hybridization (FISH) or allele-specific polymerase chain reaction (PCR). Newer, next-generation sequencing (NGS) technologies, such as massively parallel sequencing allow for whole exome sequencing or whole genome sequencing.

In screening by RT-PCR, the level of mRNA in the tumour is assessed by creating a cDNA copy of the mRNA followed by amplification of the cDNA by PCR. Methods of PCR amplification, the selection of primers, and conditions for amplification, are known to a person skilled in the art. Nucleic acid manipulations and PCR are carried out by standard methods, as described for example in Ausubel, F. M. et al., eds. (2004) Current Protocols in Molecular Biology, John Wiley & Sons Inc., or Innis, M. A. et al., eds. (1990) PCR Protocols: a guide to methods and applications, Academic Press, San Diego. Reactions and manipulations involving nucleic acid techniques are also described in Sambrook et al., (2001), $3^{rd}$ Ed, Molecular Cloning: A Laboratory Manual, Cold Spring Harbor Laboratory Press. Alternatively a commercially available kit for RT-PCR (for example Roche Molecular Biochemicals) may be used, or methodology as set forth in U.S. Pat. Nos. 4,666,828; 4,683,202; 4,801,531; 5,192,659, 5,272,057, 5,882,864, and 6,218,529 and incorporated herein by reference. An example of an in-situ hybridisation technique for assessing mRNA expression would be fluorescence in-situ hybridisation (FISH) (see Angerer (1987) Meth. Enzymol., 152: 649).

Generally, in situ hybridization comprises the following major steps: (1) fixation of tissue to be analyzed; (2) prehybridization treatment of the sample to increase accessibility of target nucleic acid, and to reduce nonspecific binding; (3) hybridization of the mixture of nucleic acids to the nucleic acid in the biological structure or tissue; (4) post-hybridization washes to remove nucleic acid fragments not bound in the hybridization, and (5) detection of the hybridized nucleic acid fragments. The probes used in such applications are typically labelled, for example, with radioisotopes or fluorescent reporters. Certain probes are sufficiently long, for example, from about 50, 100, or 200 nucleotides to about 1000 or more nucleotides, to enable specific hybridization with the target nucleic acid(s) under stringent conditions. Standard methods for carrying out FISH are described in Ausubel, F. M. et al., eds. (2004) Current Protocols in Molecular Biology, John Wiley & Sons Inc and Fluorescence In Situ Hybridization: Technical Overview by John M. S. Bartlett in Molecular Diagnosis of Cancer, Methods and Protocols, 2nd ed.; ISBN: 1-59259-760-2; March 2004, pps. 077-088; Series: Methods in Molecular Medicine.

Methods for gene expression profiling are described by (DePrimo et al. (2003), BMC Cancer, 3:3). Briefly, the protocol is as follows: double-stranded cDNA is synthesized from total RNA using a (dT)24 oligomer for priming first-strand cDNA synthesis from polyadenylated mRNA, followed by second strand cDNA synthesis with random hexamer primers. The double-stranded cDNA is used as a template for in vitro transcription of cRNA using biotinylated ribonucleotides. cRNA is chemically fragmented according to protocols described by Affymetrix (Santa Clara, CA, USA), and then hybridized overnight to gene-specific oligonucleotide probes on Human Genome Arrays. Alternatively, single nucleotide polymorphism (SNP) arrays, a type of DNA microarray, can be used to detect polymorphisms within a population.

Alternatively, the protein products expressed from the mRNAs may be assayed by immunohistochemistry of tumour samples, solid phase immunoassay with microtitre plates, Western blotting, 2-dimensional SDS-polyacrylamide gel electrophoresis, ELISA, flow cytometry and other methods known in the art for detection of specific proteins e.g. capillary electrophoresis. Detection methods would include the use of site specific antibodies. The skilled person will recognize that all such well-known techniques can be used for detection of upregulation of SHP2, detection of SHP2 or SHP2 variants or mutants, or loss of negative regulators of SHP2 in the present case.

Abnormal levels of proteins such as SHP2 can be measured using standard protein assays, for example, those assays described herein. Elevated levels or overexpression could also be detected in a tissue sample, for example, a tumour tissue by measuring the protein levels with an assay such as that from Chemicon International. The protein of interest would be immunoprecipitated from the sample lysate and its levels measured. Assay methods also include the use of markers.

In other words, SHP2 overexpression or mutant SHP2 can be measured by tumour biopsy.

Methods for assessing gene copy changes include techniques commonly used in cytogenetic laboratories such as MLPA (Multiplex Ligation-dependent Probe Amplification) a multiplex PCR method detecting abnormal copy numbers, or other PCR techniques which can detect gene amplification, gain and deletion.

Ex-functional assays could also be utilised where appropriate, for example measurement of circulating leukemia cells in a cancer patient, to assess the response to challenge with a SHP2 inhibitor.

Therefore all of these techniques could also be used to identify tumours particularly suitable for treatment with the compounds of the invention.

Therefore in a further aspect of the invention includes use of a compound according to the invention for the manufacture of a medicament for the treatment or prophylaxis of a disease state or condition in a patient who has been screened and has been determined as suffering from, or being at risk of suffering from, a disease or condition which would be susceptible to treatment with an SHP2 inhibitor.

Another aspect of the invention includes a compound of the invention for use in the prophylaxis or treatment of cancer in a patient selected from a sub-population possessing amplification of SHP2.

Another aspect of the invention includes a compound of the invention for use in the prophylaxis or treatment of cancer in a patient possessing loss of a SHP2 negative regulator.

Another aspect of the invention includes a compound of the invention for use in the prophylaxis or treatment of cancer in a patient selected from a sub-population possessing RTK-driven activation of the MAPK signalling pathway.

MRI determination of vessel normalization (e.g. using MRI gradient echo, spin echo, and contrast enhancement to measure blood volume, relative vessel size, and vascular permeability) in combination with circulating biomarkers may also be used to identify patients suitable for treatment with a compound of the invention.

Thus a further aspect of the invention is a method for the diagnosis and treatment of a disease state or condition mediated by SHP2, which method comprises (i) screening a patient to determine whether a disease or condition from which the patient is or may be suffering is one which would be susceptible to treatment with SHP2 inhibitor; and (ii) where it is indicated that the disease or condition from which the patient is thus susceptible, thereafter administering to the patient a compound of formula (I) and sub-groups or examples thereof as defined herein.

Advantages of Compounds of the Invention

The compounds of the formula (I) have a number of advantages over prior art compounds. Compounds of the invention may have particular advantage in one or more of the following aspects:
  (i) Superior potency;
  (ii) Superior in vivo efficacy
  (iii) Superior PK;
  (iv) Superior metabolic stability;
  (v) Superior oral bioavailability;
  (vi) Superior physiochemical properties; and/or
  (vii) Superior safety profile or therapeutic index (TI).

Superior Potency and In Vivo Efficacy

The compounds of the formula (I) have increased affinity for SHP2 and in particular increased cell potency against cell lines known to be sensitive to SHP2 antagonists.

Enhanced target engagement is a highly desirable property in a pharmaceutical compound as it allows for a reduced dosage of drug and a good separation ('therapeutic window') between SHP2 activity and toxic effects.

The compounds of the formula (I) have improved cell potency and/or improved selectivity for SHP2 cell lines. As a result of increased potency against SHP2, compounds of the invention may have increased in vivo efficacy in cancer cell lines and in vivo models.

Superior PK and Metabolic Stability

The compounds of the formula (I) may have advantageous ADMET properties for example better metabolic stability (for example as determined with mouse liver microsomes), a better P450 profile, short half-life and/or beneficial clearance (e.g. low or high clearance). It has also been found that many compounds of the formula (I) have an improved PK profile.

These features could confer the advantage of having more drug available in the systemic circulation to reach the appropriate site of action to exert its therapeutic effect. Increased drug concentrations to exert pharmacological action in tumours potentially leads to improved efficacy which thereby allows reduced dosages to be administered. Thus, the compounds of formula (I) should exhibit reduced dosage requirements and should be more readily formulated and administered.

This results in a good separation ('therapeutic window') between SHP2 activity and toxic effects. Many compounds of the formula (I) have a reduction in Cmax required for efficacy (due to better SHP2 potency and/or PK).

Superior Oral Bioavailability

Potentially the compounds of the invention have physiochemical properties suitable for oral exposure (oral exposure or AUC). In particular, compounds of the formula (I) may exhibit improved oral bioavailability or improved reproducibility of oral absorption. Oral bioavailability can be defined as the ratio (F) of the plasma exposure of a compound when dosed by the oral route to the plasma exposure of the compound when dosed by the intravenous (i.v.) route, expressed as a percentage.

Compounds having an oral bioavailability (F value) of greater than 10%, 20% or 30%, more particularly greater than 40%, are particularly advantageous in that they may be administered orally rather than, or as well as, by parenteral administration.

Superior Physiochemical Properties

The compounds of the formula (I) may have advantageous physiochemical properties in particular chemical stability in acidic conditions and reduced lipophilicity.

Lipophilicity can be measured using a partition-coefficient (log P) or a distribution-coefficient (log D). The partition coefficient is a ratio of concentrations of un-ionized compound between two immiscible phases (n-octanol and water) at equilibrium whereas the distribution coefficient is the ratio of the sum of the concentrations of all forms of the compound (ionized plus un-ionized) in each of the two phases. High lipophilicity is associated with poor drug like properties such us low aqueous solubility, poor pharmacokinetics properties (low oral bioavailability), undesired drug metabolism and high promiscuity. Compounds with optimal lipophilicity might have greater chances of success in drug development. However reduced log P (or calculated log P, clog P) can be challenging to achieve whilst retaining an acceptable level of potency for inhibition of protein-protein interactions (PPIs) due to the lipophilic nature of the targets involved.

Superior Safety Profile or Therapeutic Index (TI)

In the late 1990s a number of drugs, approved by the US FDA, had to be withdrawn from sale in the US when it was discovered they were implicated in deaths caused by heart malfunction. It was subsequently found that a side effect of these drugs was the development of arrhythmias caused by the blocking of hERG channels in heart cells. The hERG channel is one of a family of potassium ion channels the first member of which was identified in the late 1980s in a mutant *Drosophila melanogaster* fruitfly (see Jan, L. Y. and Jan, Y. N. (1990). A Superfamily of Ion Channels. Nature, 345 (6277):672). The biophysical properties of the hERG potassium ion channel are described in Sanguinetti, M. C., Jiang, C., Curran, M. E., and Keating, M. T. (1995). A Mechanistic Link Between an Inherited and an Acquired Cardiac Arrhythmia: HERG encodes the Ikr potassium channel. Cell, 81:299-307, and Trudeau, M. C., Warmke, J. W., Ganetzky, B., and Robertson, G. A. (1995). HERG, a Human Inward Rectifier in the Voltage-Gated Potassium Channel Family. Science, 269:92-95. Therefore, elimination of hERG blocking activity remains an important consideration in the development of any new drug.

Compounds that have reduced hERG activity and/or a good separation between activity and hERG activity have a greater 'therapeutic window' or 'therapeutic index'. One method for measurement of hERG activity is the patch clamp electrophysiology method. Alternative methods for measurement of functional hERG activity include hERG binding assays, which can use commercially available membranes isolated from cells stably expressing the hERG channel or commercially available cell lines expressing the hERG channel.

Compounds can also have an improved Cardiac Safety Index (CSI) [CSI=hERG IC50/Cmax(unbound)] (Shultz et al, J. Med. Chem., 2011; Redfern et al, Cardiovasc. Res., 2003). This can be due to an increase in hERG IC50 or a reduction in Cmax required for efficacy (due to better potency and/or PK). Particular compounds may show CV advantage in vivo.

Particular compounds have reduced hERG ion channel blocking activity. Compounds can have mean $IC_{50}$ values against hERG that are greater than 30 times, or greater than 40 times, or greater than 50 times the $IC_{50}$ values of the compounds in cellular proliferation assays.

Pharmaceutical Formulations

While it is possible for the active compound to be administered alone, it is generally presented as a pharmaceutical composition (e.g. formulation).

Thus, the present invention further provides pharmaceutical compositions, as defined above, and methods of making a pharmaceutical composition comprising (e.g admixing) at least one compound of formula (I) (and sub-groups thereof as defined herein), together with one or more pharmaceutically acceptable excipients and optionally other therapeutic or prophylactic agents as described herein.

The pharmaceutically acceptable excipient(s) can be selected from, for example, carriers (e.g. a solid, liquid or semi-solid carrier), adjuvants, diluents, fillers or bulking agents, granulating agents, coating agents, release-controlling agents, binding agents, disintegrants, lubricating agents, preservatives, antioxidants, buffering agents, suspending agents, thickening agents, flavouring agents, sweeteners, taste masking agents, stabilisers or any other excipients conventionally used in pharmaceutical compositions. Examples of excipients for various types of pharmaceutical compositions are set out in more detail below.

The term "pharmaceutically acceptable" as used herein pertains to compounds, materials, compositions, and/or dosage forms which are, within the scope of sound medical judgment, suitable for use in contact with the tissues of a subject (e.g. a human subject) without excessive toxicity, irritation, allergic response, or other problem or complication, commensurate with a reasonable benefit/risk ratio. Each excipient must also be "acceptable" in the sense of being compatible with the other ingredients of the formulation.

Pharmaceutical compositions containing compounds of the formula (I) can be formulated in accordance with known techniques, see for example, Remington's Pharmaceutical Sciences, Mack Publishing. Company, Easton, PA, USA.

The pharmaceutical compositions can be in any form suitable for oral, parenteral, topical, intranasal, intrabronchial, sublingual, ophthalmic, otic, rectal, intra-vaginal, or transdermal administration. Where the compositions are intended for parenteral administration, they can be formulated for intravenous, intramuscular, intraperitoneal, subcutaneous administration or for direct delivery into a target organ or tissue by injection, infusion or other means of delivery. The delivery can be by bolus injection, short-term infusion or longer term infusion and can be via passive delivery or through the utilisation of a suitable infusion pump or syringe driver.

Pharmaceutical formulations adapted for parenteral administration include aqueous and non-aqueous sterile injection solutions which may contain anti-oxidants, buffers, bacteriostats, co-solvents, surface active agents, organic solvent mixtures, cyclodextrin complexation agents, emulsifying agents (for forming and stabilizing emulsion formulations), liposome components for forming liposomes, gellable polymers for forming polymeric gels, lyophilisation protectants and combinations of agents for, inter alia, stabilising the active ingredient in a soluble form and rendering the formulation isotonic with the blood of the intended recipient. Pharmaceutical formulations for parenteral administration may also take the form of aqueous and non-aqueous sterile suspensions which may include suspending agents and thickening agents (R. G. Strickly, Solubilizing Excipients in oral and injectable formulations, Pharmaceutical Research, Vol 21(2) 2004, p 201-230).

The formulations may be presented in unit-dose or multi-dose containers, for example sealed ampoules, vials and prefilled syringes, and may be stored in a freeze-dried (lyophilised) condition requiring only the addition of the sterile liquid carrier, for example water for injections, immediately prior to use. In one embodiment, the formulation is provided as an active pharmaceutical ingredient in a bottle for subsequent reconstitution using an appropriate diluent.

The pharmaceutical formulation can be prepared by lyophilising a compound of formula (I), or sub-groups thereof. Lyophilisation refers to the procedure of freeze-drying a composition. Freeze-drying and lyophilisation are therefore used herein as synonyms.

Extemporaneous injection solutions and suspensions may be prepared from sterile powders, granules and tablets.

Pharmaceutical compositions of the present invention for parenteral injection can also comprise pharmaceutically acceptable sterile aqueous or non-aqueous solutions, dispersions, suspensions or emulsions as well as sterile powders for reconstitution into sterile injectable solutions or dispersions just prior to use. Examples of suitable aqueous and nonaqueous carriers, diluents, solvents or vehicles include water, ethanol, polyols (such as glycerol, propylene glycol, polyethylene glycol, and the like), carboxymethylcellulose and suitable mixtures thereof, vegetable oils (such as sunflower oil, safflower oil, corn oil or olive oil), and injectable organic esters such as ethyl oleate. Proper fluidity can be maintained, for example, by the use of thickening materials such as lecithin, by the maintenance of the required particle size in the case of dispersions, and by the use of surfactants.

The compositions of the present invention may also contain adjuvants such as preservatives, wetting agents, emulsifying agents, and dispersing agents. Prevention of the action of microorganisms may be ensured by the inclusion of various antibacterial and antifungal agents, for example, paraben, chlorobutanol, phenol, sorbic acid, and the like. It may also be desirable to include agents to adjust tonicity such as sugars, sodium chloride, and the like. Prolonged absorption of the injectable pharmaceutical form may be brought about by the inclusion of agents which delay absorption such as aluminum monostearate and gelatin.

In one typical embodiment of the invention, the pharmaceutical composition is in a form suitable for i.v. administration, for example by injection or infusion. For intravenous administration, the solution can be dosed as is, or can be injected into an infusion bag (containing a pharmaceutically acceptable excipient, such as 0.9% saline or 5% dextrose), before administration.

In another typical embodiment, the pharmaceutical composition is in a form suitable for sub-cutaneous (s.c.) administration.

Pharmaceutical dosage forms suitable for oral administration include tablets (coated or uncoated), capsules (hard or soft shell), caplets, pills, lozenges, syrups, solutions, powders, granules, elixirs and suspensions, sublingual tablets, wafers or patches such as buccal patches.

Thus, tablet compositions can contain a unit dosage of active compound together with an inert diluent or carrier such as a sugar or sugar alcohol, eg; lactose, sucrose, sorbitol or mannitol; and/or a non-sugar derived diluent such as sodium carbonate, calcium phosphate, calcium carbonate, or a cellulose or derivative thereof such as microcrystalline cellulose (MCC), methyl cellulose, ethyl cellulose, hydroxypropyl methyl cellulose, and starches such as corn starch. Tablets may also contain such standard ingredients as binding and granulating agents such as polyvinylpyrrolidone, disintegrants (e.g. swellable crosslinked polymers such as crosslinked carboxymethylcellulose), lubricating agents (e.g. stearates), preservatives (e.g. parabens), antioxidants (e.g. BHT), buffering agents (for example phosphate or citrate buffers), and effervescent agents such as citrate/bicarbonate mixtures. Such excipients are well known and do not need to be discussed in detail here.

Tablets may be designed to release the drug either upon contact with stomach fluids (immediate release tablets) or to release in a controlled manner (controlled release tablets) over a prolonged period of time or with a specific region of the GI tract.

Capsule formulations may be of the hard gelatin or soft gelatin variety and can contain the active component in solid, semi-solid, or liquid form. Gelatin capsules can be formed from animal gelatin or synthetic or plant derived equivalents thereof.

The solid dosage forms (eg; tablets, capsules etc.) can be coated or un-coated. Coatings may act either as a protective film (e.g. a polymer, wax or varnish) or as a mechanism for controlling drug release or for aesthetic or identification purposes. The coating (e.g. a Eudragit™ type polymer) can be designed to release the active component at a desired location within the gastro-intestinal tract. Thus, the coating can be selected so as to degrade under certain pH conditions within the gastrointestinal tract, thereby selectively release the compound in the stomach or in the ileum, duodenum, jejunum or colon.

Instead of, or in addition to, a coating, the drug can be presented in a solid matrix comprising a release controlling agent, for example a release delaying agent which may be adapted to release the compound in a controlled manner in the gastrointestinal tract. Alternatively the drug can be presented in a polymer coating e.g. a polymethacrylate polymer coating, which may be adapted to selectively release the compound under conditions of varying acidity or alkalinity in the gastrointestinal tract. Alternatively, the matrix material or release retarding coating can take the form of an erodible polymer (e.g. a maleic anhydride polymer) which is substantially continuously eroded as the dosage form passes through the gastrointestinal tract. In another alternative, the coating can be designed to disintegrate under microbial action in the gut. As a further alternative, the active compound can be formulated in a delivery system that provides osmotic control of the release of the compound. Osmotic release and other delayed release or sustained release formulations (for example formulations based on ion exchange resins) may be prepared in accordance with methods well known to those skilled in the art.

The compound of formula (I) may be formulated with a carrier and administered in the form of nanoparticles, the increased surface area of the nanoparticles assisting their absorption. In addition, nanoparticles offer the possibility of direct penetration into the cell. Nanoparticle drug delivery systems are described in "Nanoparticle Technology for Drug Delivery", edited by Ram B Gupta and Uday B. Kompella, Informa Healthcare, ISBN 9781574448573, published 13$^{th}$ March 2006. Nanoparticles for drug delivery are also described in J. Control. Release, 2003, 91 (1-2), 167-172, and in Sinha et al., Mol. Cancer Ther. August 1, (2006) 5, 1909.

The pharmaceutical compositions typically comprise from approximately 1% (w/w) to approximately 95% active ingredient and from 99% (w/w) to 5% (w/w) of a pharmaceutically acceptable excipient or combination of excipients. Typically, the compositions comprise from approximately 20% (w/w) to approximately 90%,% (w/w) active ingredient and from 80% (w/w) to 10% of a pharmaceutically acceptable excipient or combination of excipients. The pharmaceutical compositions comprise from approximately 1% to approximately 95%, typically from approximately 20% to approximately 90%, active ingredient. Pharmaceutical compositions according to the invention may be, for example, in unit dose form, such as in the form of ampoules, vials, suppositories, pre-filled syringes, dragées, tablets or capsules.

The pharmaceutically acceptable excipient(s) can be selected according to the desired physical form of the formulation and can, for example, be selected from diluents (e.g solid diluents such as fillers or bulking agents; and liquid diluents such as solvents and co-solvents), disintegrants, buffering agents, lubricants, flow aids, release controlling (e.g. release retarding or delaying polymers or waxes) agents, binders, granulating agents, pigments, plasticizers, antioxidants, preservatives, flavouring agents, taste masking agents, tonicity adjusting agents and coating agents.

The skilled person will have the expertise to select the appropriate amounts of ingredients for use in the formulations. For example tablets and capsules typically contain 0-20% disintegrants, 0-5% lubricants, 0-5% flow aids and/or 0-99% (w/w) fillers/ or bulking agents (depending on drug dose). They may also contain 0-10% (w/w) polymer binders, 0-5% (w/w) antioxidants, 0-5% (w/w) pigments. Slow release tablets would in addition contain 0-99% (w/w) polymers (depending on dose). The film coats of the tablet or capsule typically contain 0-10% (w/w) release-controlling (e.g. delaying) polymers, 0-3% (w/w) pigments, and/or 0-2% (w/w) plasticizers.

Parenteral formulations typically contain 0-20% (w/w) buffers, 0-50% (w/w) cosolvents, and/or 0-99% (w/w) Water for Injection (WFI) (depending on dose and if freeze dried). Formulations for intramuscular depots may also contain 0-99% (w/w) oils.

Pharmaceutical compositions for oral administration can be obtained by combining the active ingredient with solid carriers, if desired granulating a resulting mixture, and processing the mixture, if desired or necessary, after the addition of appropriate excipients, into tablets, dragee cores or capsules. It is also possible for them to be incorporated into a polymer or waxy matrix that allow the active ingredients to diffuse or be released in measured amounts.

The compounds of the invention can also be formulated as solid dispersions. Solid dispersions are homogeneous extremely fine disperse phases of two or more solids. Solid solutions (molecularly disperse systems), one type of solid dispersion, are well known for use in pharmaceutical technology (see Chiou and Riegelman, J. Pharm. Sci., 60, 1281-1300 (1971)) and are useful in increasing dissolution rates and increasing the bioavailability of poorly water-soluble drugs.

This invention also provides solid dosage forms comprising the solid solution described herein. Solid dosage forms include tablets, capsules, chewable tablets and dispersible or effervescent tablets. Known excipients can be blended with the solid solution to provide the desired dosage form. For example, a capsule can contain the solid solution blended with (a) a disintegrant and a lubricant, or (b) a disintegrant, a lubricant and a surfactant. In addition a capsule can contain a bulking agent, such as lactose or microcrystalline cellulose. A tablet can contain the solid solution blended with at least one disintegrant, a lubricant, a surfactant, a bulking agent and a glidant. A chewable tablet can contain the solid solution blended with a bulking agent, a lubricant, and if desired an additional sweetening agent (such as an artificial sweetener), and suitable flavours. Solid solutions may also be formed by spraying solutions of drug and a suitable polymer onto the surface of inert carriers such as sugar beads (non-pareils). These beads can subsequently be filled into capsules or compressed into tablets.

The pharmaceutical formulations may be presented to a patient in "patient packs" containing an entire course of treatment in a single package, usually a blister pack. Patient packs have an advantage over traditional prescriptions, where a pharmacist divides a patient's supply of a pharmaceutical from a bulk supply, in that the patient always has access to the package insert contained in the patient pack, normally missing in patient prescriptions. The inclusion of a package insert has been shown to improve patient compliance with the physician's instructions.

Compositions for topical use and nasal delivery include ointments, creams, sprays, patches, gels, liquid drops and inserts (for example intraocular inserts). Such compositions can be formulated in accordance with known methods.

Examples of formulations for rectal or intra-vaginal administration include pessaries and suppositories which may be, for example, formed from a shaped moldable or waxy material containing the active compound. Solutions of the active compound may also be used for rectal administration.

Compositions for administration by inhalation may take the form of inhalable powder compositions or liquid or powder sprays, and can be administrated in standard form using powder inhaler devices or aerosol dispensing devices. Such devices are well known. For administration by inhalation, the powdered formulations typically comprise the active compound together with an inert solid powdered diluent such as lactose.

The compounds of the formula (I) will generally be presented in unit dosage form and, as such, will typically contain sufficient compound to provide a desired level of biological activity. For example, a formulation may contain from 1 nanogram to 2 grams of active ingredient, e.g. from 1 nanogram to 2 milligrams of active ingredient. Within these ranges, particular sub-ranges of compound are 0.1 milligrams to 2 grams of active ingredient (more usually from 10 milligrams to 1 gram, e.g. 50 milligrams to 500 milligrams), or 1 microgram to 20 milligrams (for example 1 microgram to 10 milligrams, e.g. 0.1 milligrams to 2 milligrams of active ingredient).

For oral compositions, a unit dosage form may contain from 1 milligram to 2 grams, more typically 10 milligrams to 1 gram, for example 50 milligrams to 1 gram, e.g. 100 milligrams to 1 gram, of active compound.

The active compound will be administered to a patient in need thereof (for example a human or animal patient) in an amount sufficient to achieve the desired therapeutic effect.

Methods of Treatment

The compounds of the formula (I) and sub-groups as defined herein may be useful in the prophylaxis or treatment of a range of disease states or conditions mediated by SHP2. Examples of such disease states and conditions are set out above.

The compounds are generally administered to a subject in need of such administration, for example a human or animal patient, typically a human.

The compounds will typically be administered in amounts that are therapeutically or prophylactically useful and which generally are non-toxic. However, in certain situations (for example in the case of life threatening diseases), the benefits of administering a compound of the formula (I) may outweigh the disadvantages of any toxic effects or side effects, in which case it may be considered desirable to administer compounds in amounts that are associated with a degree of toxicity.

The compounds may be administered over a prolonged term to maintain beneficial therapeutic effects or may be administered for a short period only. Alternatively they may be administered in a continuous manner or in a manner that provides intermittent dosing (e.g. a pulsatile manner).

A typical daily dose of the compound of formula (I) can be in the range from 100 picograms to 100 milligrams per kilogram of body weight. The compounds of the invention can also be administered by bolus or continuous infusion.

The quantity of compound administered and the type of composition used will be commensurate with the nature of the disease or physiological condition being treated and will be at the discretion of the physician.

It may be beneficial to use a compound of the invention as a single agent or to combine the compound of the invention with another agent which acts via a different mechanism to regulate cell growth thus treating two of the characteristic features of cancer development. Combination experiments can be performed, for example, as described in Chou TC, Talalay P. Quantitative analysis of dose-effect relationships: the combined effects of multiple drugs or enzyme inhibitors. Adv Enzyme Regulat 1984; 22: 27-55.

The compounds as defined herein can be administered as the sole therapeutic agent or they can be administered in combination therapy with one of more other compounds (or therapies) for treatment of a particular disease state, for example a neoplastic disease such as a cancer as hereinbefore defined.

In one embodiment the combination therapy comprises a compound of formula I and one or more other anticancer compounds (or therapies) for treatment of cancer. For the treatment of the above conditions, the compounds of the invention may be advantageously employed in combination with one or more other medicinal agents, more particularly, with other anti-cancer agents or adjuvants (supporting agents in the therapy) in cancer therapy.

Examples of other therapeutic agents or treatments that may be administered together (whether concurrently or at different time intervals) with the compounds of the formula (I) include but are not limited to:

1. Topoisomerase I inhibitors;
2. Antimetabolites and nucleoside derivatives;
3. Tubulin targeting agents including the vinca alkaloids, epothilones, tubulin-binding agents and taxanes;
4. DNA binders such as platinum agents and anthracyclines, and topoisomerase II inhibitors;
5. Alkylating Agents;
6. Monoclonal Antibodies;
7. Anti-Hormones such as GnRAs, estrogen receptor antagonists, selective estrogen receptor modulators (SERMs), aromatase inhibitors, antiandrogens;
8. Signal Transduction Inhibitors;
9. Proteasome Inhibitors;
10. DNA methyl transferase inhibitors;
11. Recombinant interferons, and retinoids;

12. Chromatin targeted therapies;
13. Radiotherapy; and/or
14. Other therapeutic or prophylactic agents.

Examples of other therapeutic agents or treatments that may be administered together (whether concurrently or at different time intervals) with the compounds of the formula (I) include but are not limited to:

I. Platinum compounds;
II. Taxane compounds;
III. Topoisomerase I inhibitors;
IV. Topoisomerase II inhibitors;
V. Vinca alkaloids;
VI. Nucleoside derivatives;
VII. Antimetabolites;
VIII. Alkylating agents;
IX. Other cytotoxics;
X. Anthracyclines, anthracenediones and related drugs;
XI. Epothilones;
XII. DNA methyl transferase inhibitors;
XIII. Histone methyl transferase inhibitors;
XIV. Antifolates;
XV. Cytotoxic antibiotics;
XVI. Tubulin-binding agents;
XVII. Signal Transduction inhibitors;
XVIII. Mitotic kinase inhibitors;
XIX. CDK inhibitors;
XX. PI3K/AKT pathway inhibitors;
XXI. ERK inhibitors;
XXII. Hsp90 inhibitors;
XXIII. Monoclonal Antibodies, antibody derivatives, bispecific antibodies and "antibody-like" therapeutic proteins or other therapeutic proteins and related agents;
XXIV. Estrogen receptor antagonists or selective estrogen receptor modulators (SERMs) or inhibitors of estrogen synthesis;
XXV. Aromatase inhibitors and related drugs;
XXVI. Antiandrogens (i.e. androgen receptor antagonists) and related agents;
XXVII. Hormones and analogues thereof;
XXVIII. Steroids;
XXIX. Steroidal cytochrome P450 17alpha-hydroxylase-17,20-lyase inhibitor (CYP17);
XXX. Gonadotropin releasing hormone agonists or antagonists (GnRAs);
XXXI. Glucocorticoids;
XXXII. Differentiating agents;
XXXIII. Hedgehog pathway inhibitors;
XXXIV. Dehydrogenase inhibitors;
XXXV. Exportin 1 inhibitors;
XXXVI. Polymerase inhibitors;
XXXVII. Farnesyltransferase inhibitors;
XXXVIII. Chromatin targeted therapies;
XXXIX. Drugs targeting the ubiquitin-proteasome pathway including proteasome inhibitors;
XL. Photodynamic drugs;
XLI. Marine organism-derived anticancer agents;
XLII. Radiolabelled drugs for radioimmunotherapy;
XLIII. Telomerase inhibitors;
XLIV. Matrix metalloproteinase inhibitors;
XLV. Recombinant interferons and interleukins;
XLVI. Selective immunoresponse modulators;
XLVII. Therapeutic Vaccines;
XLVIII. Cytokine-activating agents;
XLIX. Cytokine-conjugates;
L. Arsenic trioxide;
LI. Inhibitors of G-protein coupled receptors (GPCR);
LII. Enzymes;
LIII. DNA repair inhibitors;
LIV. Agonists of Death receptor;
LV. Other immunotherapies;
LVI. Regulators of Cell death (apoptosis);
LVII. Gene modifiers or editors;
LVIII. Inhibitors of bromodomains;
LIX. Radiotherapy for radical, palliative or prophylactic purposes (or, for adjuvant or neoadjuvant purposes); and/or
LX. Prophylactic agents (adjuncts); i.e. agents that reduce or alleviate some of the side effects associated with chemotherapy agents.

In one embodiment the combination therapy comprises a compound of formula I and one or more other anticancer compounds (or therapies) for treatment of cancer optionally in combination with radiotherapy and/or prophylactic agents. In one embodiment the combination therapy comprises a compound of formula I in combination with radiotherapy and/or prophylactic agents.

Particular examples of anti-cancer agents or adjuvants (or salts thereof), include but are not limited to any of the agents selected from groups (I)-(LIX) and optionally group (LX), below:

I. Platinum compounds, for example cisplatin (optionally combined with amifostine), carboplatin, oxaliplatin, dicycloplatin, heptaplatin, lobaplatin, nedaplatin, satraplatin or triplatin tetranitrate, in particular cisplatin, carboplatin, or oxaliplatin;

II. Taxane compounds, for example paclitaxel, paclitaxel protein bound particles (Abraxane™) docetaxel, cabazitaxel, larotaxel; ortataxel, tesetaxel, or simotaxel, in particular paclitaxel, paclitaxel protein bound particles (Abraxane™), or docetaxel;

III. Topoisomerase I inhibitors, for example camptothecin compounds, for example camptothecin, irinotecan (CPT11), SN-38, topotecan, bryostatin, callystatin, nogitecan, belotecan, exatecan, rubitecan or lurtotecan, in particular camptothecin, irinotecan or topotecan;

IV. Topoisomerase II inhibitors, for example anti-tumour epipodophyllotoxins or podophyllotoxin derivatives for example etoposide, teniposide, sobuzoxane, edotecarin, amonafide, amrubicin or pixantrone, in particular etoposide or teniposide;

V. Vinca alkaloids, for example vinblastine, vincristine, liposomal vincristine (Onco-TCS), vinorelbine, vindesine, vinflunine, vinvesir, eribulin, or thaliblastine; in particular vinblastine, vincristine or vinorelbine;

VI. Nucleoside derivatives, for example 5-fluorouracil (5-FU, optionally in combination with leucovorin, e.g. LV5FU2), gemcitabine, capecitabine, tegafur (optionally in combination with uracil known as UFT, or in combination with gimeracil and oteracil potassium known as TS-1 or S1), cladribine, cytarabine (Ara-C, cytosine arabinoside), fludarabine, clofarabine, nelarabine; forodesine, doxifluridine, galocitabine, sapacitabine, emitefur, or troxacitabine;

VII. Antimetabolites, for example clofarabine, aminopterin, or methotrexate, azacitidine, cytarabine, floxuridine, pentostatin, thioguanine, thiopurine, 6-mercaptopurine, hydroxyurea (hydroxycarbamide) or trifluridine (optionally in combination with tipiracil);

VIII. Alkylating agents, such as nitrogen mustards or nitrosourea, for example cyclophosphamide, chlorambucil, carmustine (BCNU), ambamustine, bendamustine, thiotepa, melphalan, treosulfan, lomustine (CCNU), busulfan, dacarbazine, estramustine, fotemustine, ifosfamide (optionally in combination with mesna), pipobroman, procarbazine, streptozocin, temozolomide, uracil, mechlorethamine, mechlorethamine oxide hydrochloride, methylcyclohexylchloroethylnitrosourea, nimustine (ACNU), prednimustine, meclorethamine, etoglucid; streptozotocin, irofulven, mitolactol, glufosfamide, evofosfamide, ethylenimines or methylamelamines including altretamine, triethylenemelamine, trimethylolomelamine, triethylenephosphoramide, triethylenethiophosphoramide, or trimemylolomelamine;

IX. Other cytotoxics, such as dolastatin, eleutherobin, pancratistatin, sarcodictyin A, or spongistatin;

X. Anthracyclines, anthracenediones and related drugs, for example daunorubicin, doxorubicin (optionally in combination with dexrazoxane), liposomal formulations of doxorubicin (eg. Caelyx™, Myocet™, Doxil™), idarubicin, mitoxantrone, epirubicin, amsacrine, or valrubicin;

XI. Epothilones, for example ixabepilone, patupilone, BMS-310705, epothilone A, epothilone B, desoxyepothilone B (also known as epothilone D or KOS-862), aza-epothilone B (also known as BMS-247550), aulimalide, isolaulimalide, or luetherobin;

XII. DNA methyl transferase inhibitors, for example temozolomide, azacytidine, decitabine (alone or in combination with a cytidine deaminase inhibitor, such as cedazurdine) or guadecitabine (SGI-110);

XIII. Histone methyl transferase inhibitors for example EZH2 inhibitors such as tazemetostat, PF-06821497, CPI-1205 or CPI-0209;

XIV. Antifolates, for example methotrexate, pemetrexed disodium, raltitrexed, pralatrexate, edatrexate or trimetrexate;

XV. Cytotoxic antibiotics, for example antinomycin D, bleomycin, mitomycin C, dactinomycin, carminomycin, daunomycin, levamisole, plicamycin, mithramycin, aclarubicin, pirarubicin, anthramycin, azaserine, cactinomycin, calicheamicin, carabicin, carzinophilin, chromomycins, detorubicin, esorubicin, esperamicins, geldanamycin, marcellomycin, olivomycins, peplomycin, puromycin, quelamycin, rebeccamycin, rodorubicin, streptonigrin, streptozocin, tubercidin, dynemicin including dynemicin A, centanamycin (CC-1065), including its adozelesin, carzelesin, and bizelesin synthetic analogue, duocarmycin, including the synthetic analogue pibrozelesin (KW-2189), or zinostatin;

XVI. Tubulin-binding agents, for example combrestatin, colchicines, demecolcine, noscapine, or nocodazole;

XVII. Signal Transduction inhibitors such as Kinase inhibitors for example receptor tyrosine kinase inhibitors (e.g. EGFR (epidermal growth factor receptor (Erbb1) inhibitors), VEGFR (vascular endothelial growth factor receptor) inhibitors, PDGFR (platelet-derived growth factor receptor) inhibitors, FGFR (fibroblast growth factor receptor) inhibitors, Axl inhibitors, MTKI (multi target kinase inhibitors), c-Kit inhibitors, other Erbb inhibitors, e.g. Errb2 (HER2), Errb3 (HER3) or Errb4 (HER4), Trk inhibitors, Flt3 inhibitors, JAK inhibitors, RET inhibitors, MET inhibitors, Btk inhibitors, ALK inhibitors, ROS1 inhibitors, FYN inhibitors, Src inhibitors, Bcr-Abl inhibitors, Hexokinase inhibitors, Raf inhibitors, ROCK inhibitors, MEK inhibitors or PI3K Inhibitors for example imatinib, erlotinib, gefitinib, afatinib (dual EGFR/HER2), brigatinib (ALK/EGFR), osimertinib (EGFR), almonertinib (EGFR), olmutinib (EGFR), icotinib (EGFR), alflutinib (EGFR), lazertinib (EGFR), zorifertinib (EGFR), mefatinib (EGFR), sutetinib (EGFR), dasatinib, lapatinib, dovitinib (CHIR 258), axitinib (AG-13736), nilotinib, vandetanib, vatalinib, saracatinib (AZD-0530), bosutinib, bafetinib (NS-187), abivertinib (EGFR, Btk), mobocertinib (EGFR, Erbb2), anlotinib (multi-kinase), avapritinib (KIT, PDGF), lenvatinib (E-7080)(multi-kinase), pyrotinib (multi kinase), lonidamine (hexokinase), BMS-690514, nintedanib (tyrosine kinase), ponatinib (multi-kinase), tivozanib (KRN-951)(multi kinase), R-1530 (multi kinase), vatalanib (PDGF, VEGF), PF-337210 (VEGF), AEE-788 (multi kinase), tesevatinib (XL-647)(multi kinase), K-0706, ripretinib (KIT, PDGF), dacomitinib (EGFR, Erbb2/Erbb4), neratinib (EGFR, Erbb2/Erbb4), varlitinib (EGFR, Erbb2/Erbb4), tucatinib (Erbb2), larotrectinib (Trk), erdafitinib (FGFR), infigratinib (FGFR), pemigatinib (FGFR), rogaratinib (FGFR), derazantinib (FGFR), E-7090 (FGFR), HMPL-453 (FGFR), zoligratinib (FGFR), futibatinib (FGFR), brivanib (FGFR, VEGFR), Ki 23057 (FGFR), surufatinib (FGFR, VEGFR), pazopanib (GW 786034), cediranib (KIT, VEGFR, PDGFR), orantinib (FGF, PDGF, VEGF), H3B-6527, MAX-40279, ICP-105, telatinib (BAY-57-9352)(KIT, PDGFR, VEGFR), pegaptanib (VEGFR), semaxanib (MAPK, VEGFR), quizartinib (AC-220) (Flt3, KIT, PDGFR), crenolanib (CP 868596)(Flt3, PDGFR), lestaurtinib (multi kinase), Cabozantinib (XL-184)(VEGFR2, Axl, MET, RET), selpercatinib (RET), capmatinib (MET), MK-2461 (MET), SU-11274 (MET), PHA-665752 (MET), ibrutinib (Btk), acalabrutinib (Btk), asciminib (Bcr-Abl), flumatinib (Abl), zanubrutinib (Btk), ruxolitinib (JAK), itacitinib (JAK), pacritinib (JAK), momelotinib (JAK), INCB-52793 (JAK), gusacitinib (JAK/SYK), ilginatinib (JAK), cerdulatinib (Syk, JAK), fedratinib (TG-101348) (Flt3, Jak2, RET), tandutinib (Flt3, KIT, PDGF), pexidartinib (KIT, Flt3) midostaurin (Flt3, KIT, PKC), zotiraciclib (FLT3), alectinib (ALK), crizotinib (ALK), ceritinib (ALK), lorlatinib (ALK, Ros1), entrectinib (ALK, Ros1, TRK), masitinib (multi kinase), sorafenib, sunitinib, vemurafenib (PLX4032 or RG7204), dabrafenib, encorafenib, regorafenib (BAY-73-4506) (FGFR3, KIT), selumetinib (AZD6244), trametinib (GSK121120212), binimetinib (BRAF, MEK), cobimetinib (MEK), mirdametinib (PD325901)(MEK), refametinib (MEK), uprosertib (AKT, MEK), pimasertib (MEK), dactolisib (BEZ235), buparlisib (BKM-120; NVP-BKM-120), alpelisib (BYL719)(PI3), copanlisib (BAY-80-6946), paxalisib (PI3K/mTOR/AKT pathway), S-49076 (multi kinase), rigosertib (multi kinase), rebastinib (multi kinase), ZSTK-474, fimepinostat (CUDC-907)(PI3K and HDAC), apitolisib (GDC-0980; RG-7422), pictilisib (GDC-0941, RG-7321, GNE-477), idelalisib (formerly CAL-101, GS 1101, GS-1101, IC87114), serabelisib (MLN1117, INK1117)(PI3K), sapanisertib (MLN0128 (INK128)), duvelisib (IPI-145, INK1197)(PI3K), ipatasertib (GDC-0068), afuresertib, MK-2206, MK-8156, SKLB-1028, LY294002, SF1126 or PI-103, sonolisib (PX-866), GSK1059615 (PI3K), pilaralisib (XL147)(PI3K); SF-1126 (multi kinase) or AT13148 or pan-Raf inhibitors such as PLX8394, RAF-265, or other Signal Transduction inhibitors such as mTOR inhibitors including temsirolimus, everolimus (RAD 001), and RAS inhibitors such as AMG-510, LY-3499446, MRTX-849, or ARS-3248, or isoprenyltransferase inhibitors such as antroquinonol;

XVIII. Mitotic kinase inhibitors such as Aurora kinase inhibitors for example AT9283, barasertib (AZD1152), danusertib (PHA-739358), alisertib (MLN-8237), or CYC-116, or PLK (polo-like kinase inhibitors), such as PLK-1 or PLK-4, including rigosertib, onvansertib, CYC-140, GSK-461364, CFI-400945, or volasertib;

XIX. CDK inhibitors for example AT7519, roscovitine, seliciclib, alvocidib (flavopiridol), abemaciclib, dinaciclib (SCH-727965), 7-hydroxy-staurosporine (UCN-01), JNJ-7706621, PHA533533, ZK-304709, zotiraciclib or AZD-5438 and including CDK4 inhibitors such as palbociclib (PD332991), abemaciclib, dinaciclib, lerociclib, trilaciclib or ribociclib (LEE-011);

XX. PI3K/AKT pathway inhibitors including PKA/B and/or PKB (akt) inhibitors, PI3K inhibitors, mTOR inhibitors, and/or calmodulin inhibitors (forkhead translocation inhibitors) for example PI3K inhibitors such apitolisib, buparlisib, copanlisib, pictilisib, dactolisib, idelalisib, serabelisib, duvelisib, ipatasertib, alpelisib, afuresertib, paxalisib, sonolisib, pilaralisib, fimepinostat (CUDC-907), SKLB-1028, GSK1059615 (PI3K), ZSTK-474, GSK-2636771, samotolisib (LY-3023414), LY294002, SF1126 and PI-103, mTOR inhibitors such as sirolimus (originally known as rapamycin), and rapamycin analogues such as RAD 001 (everolimus), CCI 779 (temsirolemus), AP23573 and ridaforolimus, or sapanisertib (MLN0128 (INK128), a dual inhibitor of the mTOR complex I (mTORCI) and mTORC2, PKA/B (or C) inhibitors for example perifosine, ipatasertib, uprosertib, afuresertib, MK-2206, MK-8156, AT13148, capivasertib (AZD5363), triciribine, Enzastaurin, XL-418, GSK-690693, or RX-0201;

XXI. ERK inhibitors including ulixertinib, ASTX029, LY3214996, LTT462, MK-8353, SCH772984, AZD-0364, ASN-007, or KO-947;

XXII. Hsp90 inhibitors for example onalespib (AT13387), herbimycin, geldanamycin (GA), 17-allylamino-17-desmethoxygeldanamycin (17-AAG) e.g. NSC-330507, Kos-953 and CNF-1010, 17-dimethylaminoethylamino-17-demethoxygeldanamycin hydrochloride (17-DMAG) e.g. NSC-707545 and Kos-1022, NVP-AUY922 (VER-52296), NVP-BEP800, CNF-2024 (BIIB-021 an oral purine), alvespimycin, ganetespib (STA-9090), SNX-5422 (SC-102112) or IPI-504 or pimitespib;

XXIII. Monoclonal Antibodies (unconjugated or conjugated to radioisotopes, toxins or other agents e.g. cytotoxic anticancer agents, such as antibody-drug conjugates), antibody derivatives, bispecific antibodies and "antibody-like" therapeutic proteins (such as DARTs®, Duobodies®, Bites®, XmAbs®, TandAbs®, or Fab derivatives), or other therapeutic proteins and related agents, such as anti-CD, anti-VEGFR, anti-HER2 or anti-EGFR antibodies, for example rituximab (CD20), ofatumumab (CD20), ibritumomab tiuxetan (CD20), GA101 (CD20), tositumomab (CD20), veltuzumab (CD20), epratuzumab (CD22), lintuzumab (CD33), gemtuzumab ozogamicin (CD33), alemtuzumab (CD52), galiximab (CD80), trastuzumab (HER2 antibody), pertuzumab (HER2), trastuzumab-DM1 (HER2), ado-trastuzumab emtansine, fam-trastuzumab deruxtecan, ertumaxomab (HER2 and CD3), cetuximab (EGFR), matuzumab (EGFR), panitumumab (EGFR), necitumumab (EGFR), nimotuzumab (EGFR), zalutumumab (EGFR), bevacizumab (VEGF), ramucirumab (VEGFR), catumaxomab (EpCAM and CD3), abagovomab (CA125), farletuzumab (folate receptor), elotuzumab (CS1), denosumab (RANK ligand), figitumumab (IGF1R), CP751,871 (IGF1R), mapatumumab (TRAIL receptor), metMAB (met), mitumomab (GD3 ganglioside), naptumomab estafenatox (5T4), siltuximab (IL6), zanolimumab (CD4), SGN40 (CD40), ficlatuzumab, (anti-HGF), blinatumomab (CD3 modulator; B-lymphocyte antigen CD19 modulator), tafasitamab-cxix (CD19), brentuximab vedotin (CD30), daratumumab (IgG1kappa antibody), moxetumomab, ranibizumab (anti-VEGF), enfortumab vedotin, sacituzumab govitecan, obinutuzumab (CD20), inotuzumab ozogamicin (CD22), belantamab mafodotin, brentuximab vedotin (CD30), obinutuzumab (CD20), mogamulizumab (CCR4), polatuzumab vedotin (CD79b), isatuximab (CD38), dinutuximab (GD2), olaratumab (IMC 3G3, PDGF mAb), margetuximab, anti-FGFR MAbs (IMC-D11), anti-PDGF receptor-beta mAbs (1B3), aflibercept (AVE-0005)(VEGF trap), or immunomodulating antibodies, including check point inhibitors or agents such as CTLA-4 blocking antibodies and/or antibodies against PD-1 and PD-L1 and/or PD-L2 for example ipilimumab (CTLA4), MK-3475 (pembrolizumab, formerly lambrolizumab, anti-PD-1), nivolumab (anti-PD-1), BMS-936559 (anti-PD-L1), MPDL320A, AMP-514 or MED14736 (anti-PD-L1), or tremelimumab (formerly ticilimumab, CP-675,206, anti-CTLA-4); atezolizumab (anti-PDL1), durvalumab (anti-PDL1), avelumab (anti-PDL1), cemiplimab (anti-PD-1), pidilizumab (anti-PD-1); PDR-001 (anti-PD-1), spartalizumab (anti-PD-1), ipilumumab (anti-CTLA-4), abatacept (antibody fragment and conjugate with CTLA-4), anti-LAG3, such as relatlimab, LAG-525, TSR-033, IBI-110 or FS-118, and anti-OX40 (CD134) agents e.g. MOXR0916, MED16469, PF-04518600, MED10562, BMS 986178, ISB-830, KY-1005, or INCAGN-1949;

XXIV. Estrogen receptor antagonists or selective estrogen receptor modulators (SERMs) or inhibitors of estrogen synthesis, for example tamoxifen, fulvestrant, toremifene, droloxifene, faslodex, raloxifene or keoxifene;

XXV. Aromatase inhibitors and related drugs, such as exemestane, anastrozole, letrozole, testolactone aminoglutethimide, mitotane or vorozole; fadrozole, liarozole, atamestane, formestane, dexaminoglutethimide, or trilostane;

XXVI. Antiandrogens (i.e. androgen receptor antagonists) and related agents for example bicalutamide, nilutamide, flutamide, cyproterone, ketoconazole, apalutamide, darolutamide, or enzalutamide;

XXVII. Hormones and analogues thereof such as medroxyprogesterone, diethylstilbestrol (a.k.a. diethylstilboestrol) or octreotide: finasteride, fludrocortisone, fluoxymesterone, arzoxifene, pasireotide, or vapreotide;

XXVIII. Steroids for example dromostanolone propionate, megestrol acetate, nandrolone (decanoate, phenpropionate), fluoxymestrone, gossypol, calusterone, epitiostanol, or mepitiostane;

XXIX. Steroidal cytochrome P450 17alpha-hydroxylase-17,20-lyase inhibitor (CYP17), e.g. abiraterone; or fadrozole;

XXX. Gonadotropin releasing hormone agonists or antagonists (GnRAs) for example abarelix, goserelin acetate, histrelin acetate, leuprolide acetate, triptorelin, buserelin, deslorelin; leuprorelin, or nafarelin;

XXXI. Glucocorticoids, for example prednisone, prednisolone, or dexamethasone;

XXXII. Differentiating agents, such as retinoids, rexinoids, vitamin D or retinoic acid and retinoic acid metabolism blocking agents (RAMBA) for example accutane, alitretinoin, bexarotene, or tretinoin; fenretinide, isotretinoin, or RII retinamide;

XXXIII. Hedgehog pathway inhibitors, such as glasdegib, vismodegib, or sonidegib;

XXXIV. Dehydrogenase inhibitors such as isocitrate dehydrogenase inhibitors, including enasidenib, ivosidenib, vorasidenib, IDH-305, olutasidenib, DS-1001b, enfludenib, dihydroorotate dehydrogenase inhibitors including laflunimus, brequinar, ASLAN-003, AG-636, BAY-2402234, or PTC-299; or Pyruvate dehydrogenase inhibitors such as devimistat, or KULA-18;

XXXV. Exportin 1 inhibitor such as selinexor, eltanexor, verdinexor, or felezonexor; Polymerase inhibitors, such as DNA or RNA polymerase inhibitors, including lurbinectedin;

XXXVI. Farnesyltransferase inhibitors for example tipifarnib;

XXXVII. Chromatin targeted therapies such as histone deacetylase (HDAC) inhibitors for example sodium butyrate, suberoylanilide hydroxamide acid (SAHA), depsipeptide (FR 901228), dacinostat (NVP-LAQ824), R306465/JNJ-16241199, JNJ-26481585, trichostatin A, vorinostat, chlamydocin, A-173, JNJ-MGCD-0103, PXD-101, apicidin; belinostat, panobinostat, romidepsin, resminostat, abexinostat, entinostat, quisinostat, pracinostat, tefinostat, mocetinostat, givinostat, or fimepinostat;

XXXVIII. Drugs targeting the ubiquitin-proteasome pathway including proteasome inhibitors for example bortezomib, carfilzomib, ixazomib, marizomib (salinosporamide a), oprozomib, ubenimex CEP-18770, MLN-9708, or ONX-0912; NEDD8 inhibitors; HDM2 antagonist, idasanutlin (RG7388), HDM-201, KRT-232 (AMG-232), nutlin 3a, RG7112, CGM-097, ALRN-6924, Debio-0123, LY-3143921, MI-773 (SAR405838), milademetan (DS-3032b), APG-115, or BI-907828, or ASTX295 or UBX0101; inhibitors of deubiquitinases (DUBs); or inhibitors of ubiquitin-specific proteases such as HBX-41108;

XXXIX. Photodynamic drugs for example porfimer sodium or temoporfin;

XL. Marine organism-derived anticancer agents such as trabectidin;

XLI. Radiolabelled drugs for radioimmunotherapy for example with a beta particle-emitting isotope (e.g. Iodine-131, Yittrium-90) or an alpha particle-emitting isotope (e.g., Bismuth-213 or Actinium-225) for example ibritumomab, Iodine tositumomab, alpha radium 223; iobenguane, or lutetium Lu 177-dotatate;

XLII. Telomerase inhibitors for example telomestatin;

XLIII. Matrix metalloproteinase inhibitors for example batimastat, marimastat, prinostat or metastat;

XLIV. Recombinant interferons (such as interferon-γ and interferon α) and interleukins (e.g. interleukin 2), for example aldesleukin, denileukin diftitox, interferon alfa 2a, interferon alfa 2b, or peg interferon alfa 2b;

XLV. Selective immunoresponse modulators for example thalidomide, or thalidomide derivatives such as lenalidomide; or pomalidomide (ENMD 0995, CC-4047);

XLVI. Therapeutic Vaccines such as sipuleucel-T (Proveng) OncoVex, intravesical BCG live, mDC3 vaccine, PEPIDH1M vaccine, T-VEC or IDH1 targeting vaccine;

XLVII. Cytokine-activating agents include picibanil, romurtide, sizofiran, virulizin, or thymosin;

XLVIII. Cytokine-conjugates, such as cytokine-toxin conjugates including tagraxofusp;

XLIX. Arsenic trioxide;

L. Inhibitors of G-protein coupled receptors (GPCR) for example atrasentan;

LI. Enzymes such as L-asparaginase, pegaspargase, rasburicase, or pegademase;

LII. DNA repair inhibitors such as PARP inhibitors for example, olaparib, rucaparib, veliparib, iniparib, INO-1001, AG-014699, ONO-2231; or talazoparib;

LIII. Agonists of Death receptor (e.g. TNF-related apoptosis inducing ligand (TRAIL) receptor), such as mapatumumab (formerly HGS-ETR1), conatumumab (formerly AMG 655), PRO95780, lexatumumab, dulanermin, CS-1008, apomab or recombinant TRAIL ligands such as recombinant Human TRAIL/Apo2 Ligand;

LIV. Other immunotherapies such as oncolytic viruses, such as talimogene laherparepvec (T-VEC); CAR-T cell therapy, such as anti-CD-19 CAR T cell therapy for example, tisagenlecleucel, axicabtagene ciloleucel, lisocabtagene, idecabtagene, brexucabtagene autoleucel (KTE-X19); engineered T cell receptor (TCR-T) therapy; TLR agonists, such as motolimod, imiquimod, rintatolimod or resiquimod or immune checkpoint inhibitors such as PD-1/PD-L1 inhibitors e.g. lazertinib, CA-170, CCX-4503, PCCO208025 (BMS202), GS-4224, INCB-086550, or RRx-001;

LV. Regulators of Cell death (apoptosis) including Bcl-2 (B-cell lymphoma 2) antagonists such as venetoclax (ABT-199 or GDC-0199), ABT-737, ABT-263, TW-37, sabutoclax, obatoclax, and MIM1 and IAP antagonists including LCL-161 (Novartis), Debio-1143 (Debiopharma/Ascenta), AZD5582, Birinapant/TL-32711 (TetraLogic), CUDC-427/GDC-0917/RG-7459 (Genentech), JP1201 (Joyant), T-3256336 (Takeda), GDC-0152 (Genentech), ASTX660 or HGS-1029/AEG-40826 (HGS/Aegera); and myeloid cell leukemia-1 (MCL-1 a member of the BCL2 family) inhibitors including AMG-176, MIK665, and S63845;

LVI. Gene modifiers or editors, such as CRISPR/Cas9, zinc finger nucleases or synthetic nucleases, or TAL-ENs;

LVII. Inhibitors of bromodomains including BET inhibitors such as GSK525762, GSK2820151, OTX-015/MK-8628, BMS-986158, CPI-0610, RO6870810/TEN-010, RVX000222, FT-1101, ABBV-075, BAY1238097, INCB054329, INCB057643, PLX51107 or ZEN003694;

LVIII. Radiotherapy for radical, palliative or prophylactic purposes (or, for adjuvant or neoadjuvant purposes); and/or LIX. Prophylactic agents (adjuncts); i.e. agents that reduce or alleviate some of the side effects associated with chemotherapy agents, for example
   a) anti-emetic agents,
   b) agents that prevent or decrease the duration of chemotherapy-associated neutropenia and prevent complications that arise from reduced levels of platelets, red blood cells or white blood cells, for example interleukin-11 (e.g. oprelvekin), erythropoietin (EPO) (e.g. epoetin alfa, epoetin beta) or analogues thereof (e.g. darbepoetin alfa), colony-stimulating factor analogs such as granulocyte macrophage-colony stimulating factor (GM-CSF) (e.g. sargramostim), or granulocyte-colony stimulating factor (G-CSF) or analogues thereof (e.g. filgrastim, peg-filgrastim, lenograstim, leridistim, mirimostim, molgramostim, nartograstim),
   c) agents that inhibit bone resorption such as denosumab or bisphosphonates e.g. zoledronate, zoledronic acid, pamidronate or ibandronate,
   d) agents that suppress inflammatory responses such as dexamethasone, prednisone, or prednisolone,
   e) agents used to reduce blood levels of growth hormone and IGF-I (and other hormones) in patients with acromegaly or other rare hormone-producing tumours, such as synthetic forms of the hormone somatostatin e.g. octreotide acetate lanreotide,
   f) antidote to drugs that decrease levels of folic acid such as leucovorin, or folinic acid,
   g) agents for pain e.g. opiates such as morphine, diamorphine or fentanyl,
   h) non-steroidal anti-inflammatory drugs (NSAID) such as COX-2 inhibitors for example celecoxib, etoricoxib or lumiracoxib,
   i) agents for mucositis e.g. palifermin,
   j) agents that modulate metabolism of anti-cancer drugs i.e. a PK enhancer for example a P450 (e.g. 3A4 inhibitor) such as cobicistat or a cytidine deaminase inhibitor (e.g zebularine, tetrahydrouridine, or cedazuridine) or thymidine phosphorylase inhibitor (e.g. tipiracil); and/or
   k) agents for the treatment of side-effects including anorexia, cachexia, oedema or thromoembolic episodes, such as megestrol acetate.

In one embodiment the compound of formula I is combined with a RAS-MAPK pathway inhibitor such as a BRAF inhibitor, RAF inhibitor, MEK inhibitor or ERK inhibitor as described herein.

Each of the compounds present in the combinations of the invention may be given in individually varying dose schedules and via different routes. As such, the posology of each of the two or more agents may differ: each may be administered at the same time or at different times. A person skilled in the art would know through his or her common general knowledge the dosing regimes and combination therapies to use. For example, the compound of the invention may be using in combination with one or more other agents which are administered according to their existing combination regimen. Examples of standard combination regimens are provided below.

Where the compound of the formula (I) is administered in combination therapy with one, two, three, four or more other therapeutic agents (typically one or two, more typically one), the compounds can be administered simultaneously or sequentially. In the latter case, the two or more compounds will be administered within a period and in an amount and manner that is sufficient to ensure that an advantageous or synergistic effect is achieved. In one embodiment the compound of formula (I) is administered to a patient undergoing treatment with one or more therapeutic compound. It will be appreciated that the typical method and order of administration and the respective dosage amounts and regimes for each component of the combination will depend on the particular other medicinal agent and compound of the present invention being administered, their route of administration, the particular tumour being treated and the particular host being treated.

The weight ratio of the compound according to the present invention and the one or more other anticancer agent(s) when given as a combination may be determined by the person skilled in the art. Said ratio and the exact dosage and frequency of administration depends on the particular compound according to the invention and the other anticancer agent(s) used, the particular condition being treated, the severity of the condition being treated, the age, weight, gender, diet, time of administration and general physical condition of the particular patient, the mode of administration as well as other medication the individual may be taking, as is well known to those skilled in the art. Furthermore, it is evident that the effective daily amount may be lowered or increased depending on the response of the treated subject and/or depending on the evaluation of the physician prescribing the compounds of the instant invention.

The compounds of the invention may also be administered in conjunction with suitable standard regimens of chemotherapy, which can be determined by those skilled in the art (for example as described in JCO Clin Cancer Inform 4:60-70), including, for example, PC (paclitaxel and carboplatin), FR (fludarabine and rituximab), CHOP (cyclophosphamide, doxorubicin, vincristine and prednisone), CVP (cyclophosphamide, vincristine and prednisone), FCM (fludarabine, cyclophosphamide and mitoxantrone), FCR (fludarabine, cyclophosphamide and rituximab), hyperCVAD (hyperfractionated cyclophosphamide, vincristine, doxorubicin, dexamethasone, methotrexate and cytarabine), ICE (ifphosfphamide, carboplatin and etoposide), MCP (mitoxantrone, chlorambucil, and prednisolone), R—CHOP (rituximab plus CHOP), RCVP (rituximab plus CVP), R-FCM (rituximab plus FCM), R-ICE (rituximab-ICE), ICE-V (ICE plus vincristine), R-MCP (Rituximab-MCP). or FOLFOX or FLOX (folinic acid, fluorouracil and oxaliplatin).

The compounds of the invention may also be administered in conjunction with non-chemotherapeutic treatments such as radiotherapy, photodynamic therapy, gene therapy; surgery and controlled diets. Radiotherapy may be for radical, palliative, adjuvant, neoadjuvant or prophylactic purposes.

The compounds of the present invention also have therapeutic applications in sensitising tumour cells for radiotherapy and chemotherapy. Hence the compounds of the present invention can be used as "radiosensitizer" and/or "chemosensitizer" or can be given in combination with another "radiosensitizer" and/or "chemosensitizer". In one embodiment the compound of the invention is for use as chemosensitiser.

The term "radiosensitizer" is defined as a molecule administered to patients in therapeutically effective amounts to increase the sensitivity of the cells to ionizing radiation and/or to promote the treatment of diseases which are treatable with ionizing radiation.

The term "chemosensitizer" is defined as a molecule administered to patients in therapeutically effective amounts to increase the sensitivity of cells to chemotherapy and/or promote the treatment of diseases which are treatable with chemotherapeutics.

Many cancer treatment protocols currently employ radiosensitizers in conjunction with radiation of x-rays. Examples of x-ray activated radiosensitizers include, but are not limited to, the following: metronidazole, misonidazole, desmethylmisonidazole, pimonidazole, etanidazole, nimorazole, mitomycin C, RSU 1069, SR 4233, EO9, RB 6145, nicotinamide, 5-bromodeoxyuridine (BUdR), 5-iododeoxyuridine (IUdR), bromodeoxycytidine, fluorodeoxyuridine (FudR), hydroxyurea, cisplatin, and therapeutically effective analogs and derivatives of the same.

Photodynamic therapy (PDT) of cancers employs visible light as the radiation activator of the sensitizing agent. Examples of photodynamic radiosensitizers include, but are not limited to, the following: hematoporphyrin derivatives, Photofrin, benzoporphyrin derivatives, tin etioporphyrin, pheoborbide-a, bacteriochlorophyll-a, naphthalocyanines, phthalocyanines, zinc phthalocyanine, and therapeutically effective analogs and derivatives of the same.

Radiosensitizers may be administered in conjunction with a therapeutically effective amount of one or more other compounds, including but not limited to: compounds which promote the incorporation of radiosensitizers to the target cells; compounds which control the flow of therapeutics, nutrients, and/or oxygen to the target cells; chemotherapeutic agents which act on the tumour with or without additional radiation; or other therapeutically effective compounds for treating cancer or other diseases.

Chemosensitizers may be administered in conjunction with a therapeutically effective amount of one or more other compounds, including but not limited to: compounds which promote the incorporation of chemosensitizers to the target cells; compounds which control the flow of therapeutics, nutrients, and/or oxygen to the target cells; chemotherapeutic agents which act on the tumour or other therapeutically effective compounds for treating cancer or other disease. Calcium antagonists, for example verapamil, are found useful in combination with antineoplastic agents to establish chemosensitivity in tumor cells resistant to accepted chemotherapeutic agents and to potentiate the efficacy of such compounds in drug-sensitive malignancies.

For use in combination therapy with another chemotherapeutic agent, the compound of the formula (I) and one, two, three, four or more other therapeutic agents can be, for example, formulated together in a dosage form containing two, three, four or more therapeutic agents i.e. in a unitary pharmaceutical composition containing all components. In an alternative, the individual therapeutic agents may be formulated separately and presented together in the form of a kit, optionally with instructions for their use.

In one embodiment, the present invention further provides a combination drug wherein the compound of formula (I) and at least one or more therapeutic agents are physically associated. In one embodiment the compound of formula (I) and at least one or more therapeutic agents are: (a) in admixture; (b) chemically/physicochemically linked; (c) chemically/physicochemically co-packaged; or (d) unmixed but co-packaged or co-presented.

In another embodiment, the compound of formula (I) and at least one or more therapeutic agents are non-physically associated. In a further embodiment this optionally further includes (a) instructions for the extemporaneous association of the compound of formula (I) and at least one or more therapeutic agents to form a physical association of the two or more compounds; or (b) instructions for combination therapy with the compound of formula (I) and at least one or more therapeutic agents; or (c) instructions for administration to a patient population.

When the individual agents are presented in the form of a kit, the kit may comprise two or more separate pharmaceutical compositions: a compound of Formula (I), and one or more further pharmaceutical compounds. The kit may comprise a container for containing the separate compositions such as a divided bottle or a divided foil packet. Additional examples of containers include syringes, boxes, and bags. In some embodiments, the kit comprises directions for the use of the separate components. The kit form is particularly advantageous when the separate components are preferably administered in different dosage forms (e.g., oral and parenteral), are administered at different dosage intervals, or when titration of the individual components of the combination is desired by the prescribing health care professional.

In a further embodiment, the invention provides a combination of a compound as defined herein and another therapeutic agent, for example another therapeutic agent as defined above.

In another embodiment, the invention provides a pharmaceutical composition comprising a compound as defined herein together with a pharmaceutically acceptable carrier and one or more therapeutic agent(s) as defined above.

In one embodiment the pharmaceutical composition comprises a compound of formula I together with a pharmaceutically acceptable carrier and optionally one or more therapeutic agent(s).

In another embodiment the invention relates to the use of a combination according to the invention in the manufacture of a pharmaceutical composition for inhibiting the growth of tumour cells.

In a further embodiment the invention relates to a product containing a compound of formula I and one or more anticancer agent, as a combined preparation for simultaneous, separate or sequential use in the treatment of patients suffering from cancer.

In a further embodiment the invention relates to a compound of formula (I) for use in treating a disease or condition defined herein, wherein the patient is undergoing treatment with one or more other therapeutic compound.

EXAMPLES

The invention will now be illustrated, but not limited, by reference to the specific embodiments described in the following examples. Compounds are named, for example, using an automated naming package such as AutoNom (MDL), using IUPAC rules or are as named by the chemical supplier. In the examples, the following abbreviations are used.

AcOH acetic acid
Aq. Aqueous
B2pin2 Bis(pinacolato)diboron
Boc tert-butyloxycarbonyl
BuLi butyllithium
Cbz Carboxybenzyl
DCE 1,2-dichloroethane
DCM dichloromethane
DIPEA N,N-Diisopropylethylamine
DMF N,N-dimethylformamide
DMP Dess-Martin periodinane
DMSO dimethyl sulfoxide
$Et_3N$ triethylamine
EtOAc ethyl acetate EtOH ethanol
Et$_2$O diethyl ether
Et$_3$SiH Triethylsilane
HOAt 1-hydroxyazabenzotriazole
HPLC high pressure liquid chromatography
IPA isopropyl alcohol
KO$^t$Bu Potassium tert-butoxide
LED Light emitting diode
MeCN acetonitrile
MeOH methanol
Min minutes
MS mass spectrometry
NaBH(OAc)$_3$ sodium triacetoxyborohydride
NaOEt Sodium ethoxide
NaO$^t$Bu Sodium tert-butoxide
NBS N-Bromosuccinimide
NMP N-methyl-2-pyrrolidinone
NMR nuclear magnetic resonance spectroscopy
Pd/C Palladium on carbon
Pd$_2$(dba)$_3$ tris(dibenzylideneacetone)dipalladium(0)
Pd(OAc)$_2$ palladium(II) acetate
Pd(PPh$_3$)$_4$ tetrakis(triphenylphosphine)palladium(0)
Petrol petroleum ether fraction with boiling point range 40-60° C.
RT Room temperature
Sat Saturated
SEM 2-(trimethylsilyl)ethoxymethyl
SiO$_2$ silica
TBAF tetrabutylammonium fluoride
TFA trifluoroacetic acid
THF tetrahydrofuran
TMBE tert-butyl methyl ether
TLC Thin Layer chromatography
TMSOTf Trimethylsilyl trifluoromethanesulfonate Synthetic Methods All starting materials and solvents were obtained either from commercial sources or prepared according to the literature citation. Unless otherwise stated all reactions were stirred. Organic solutions were routinely dried over anhydrous magnesium sulfate. Hydrogenations were performed on a Parr hydrogenator, a Thales H-cube flow reactor under the conditions stated or under a balloon of hydrogen. Microwave reactions were performed in a CEM Discover and Smithcreator microwave reactor, heating to a constant temperature using variable power microwave irradiation. Normal phase column chromatography was routinely carried out on an automated flash chromatography system such as CombiFlash Companion or CombiFlash RF system using pre-packed silica (230-400 mesh, 40-63 μm) cartridges. SCX was purchased from Supelco and treated with 1M hydrochloric acid prior to use. Unless stated otherwise the reaction mixture to be purified was first diluted with MeOH and made acidic with a few drops of AcOH. This solution was loaded directly onto the SCX and washed with MeOH. The desired material was then eluted by washing with a solvent such as 1% NH$_3$ in MeOH. NH$_2$ ion exchange silica gel purification was done with Strata NH$_2$ (55 μm, 70 Å) columns, loaded directly onto the NH$_2$ column and eluting with a solvent such as methanol. Biotage® KP-NH SNAP silica gel columns were purchased from Biotage®. Reverse phase purification was done using Biotage® SNAP Ultra C18 silica gel columns and were purchased from Biotage®.

NMR Data $^1$H NMR spectra were acquired on a Bruker Avance III spectrometer at 400 MHz, an AL400 (400 MHz; produced by JEOL), a Mercury 400 (400 MHz; produced by Agilent Technologies, Inc.), a 500 MHz Bruker Avance III HD NMR Spectrometer, or a Bruker Avance NEO NMR spectrometer (400 MHz).

Either the central peaks of chloroform-d, dimethylsulfoxide-d$_6$ or an internal standard of tetramethylsilane were used as references. For NMR data, where the number of protons assigned is less than the theoretical number of protons in the molecule, it is assumed that the apparently missing signal(s) is/are obscured by solvent and/or water peaks. In addition, where spectra were obtained in protic NMR solvents, exchange of NH and/or OH protons with solvent occurs and hence such signals are normally not observed.

Analytical and Preparative LC-MS Systems

Analytical LC-MS System and Method Description

In the following examples, compounds were characterised by mass spectroscopy using the systems and operating conditions set out below. Where atoms with different isotopes are present and a single mass quoted, the mass quoted for the compound is the monoisotopic mass (i.e. $^{35}$Cl; $^{79}$Br etc.).

Shimadzu Nexera
  HPLC System: Shimadzu SIL-30AC autosampler/2× Shimadzu LC-30AD pumps
  Mass Spec Detector: Shimadzu LCMS-2020 single quadrupole MS
  Second Detector: Shimadzu SPD-M20A diode array detector MS Operating Conditions
  Qarray DC voltage: 20V on ES Pos (−20V on ES Neg)
  Drying gas flow: 20.0 L/min
  DL Temperature: 300° C.
  Heat Block Temperature: 350° C.
  Nebulising Gas Flow: 1.5 L/min
  Scan Range: 100-750 amu
  Ionisation Mode: ElectroSpray Positive-Negative switching Agilent 1290 Infinity II—6130 LC-MS System
  HPLC System: Agilent 1290 Infinity II
  Mass Spec Detector: Agilent 6130 single quadrupole
  Second Detector: Agilent 1290 Infinity II Diode Array Detector MS Operating Conditions
  Capillary voltage: 3000V
  Fragmentor/Gain: 70
  Gain: 1
  Drying gas flow: 13.0 L/min
  Gas Temperature: 350° C.
  Nebuliser Pressure: 40 psig
  Scan Range: 150-1000 amu
  Sheath Gas Temperature: 360° C.
  Sheath Gas Flow: 10.0 L/min
  Nozzle Voltage: 300 (+ve mode)/1750 (−ve mode)
  Ionisation Mode: Agilent Jet Stream Electrospray Positive-Negative switching LCMS spectra were alternatively measured with an SQD manufactured by Waters Corporation under the following two conditions, and the [M+H]$^+$ values were shown.
  MS detection: ESI positive
  UV detection: 254 nm
  Column flow rate: 0.5 mL/min
  Mobile phase: water/acetonitrile (0.1% formic acid)

Injection volume: 1 µL
Method
Column: Acguity BEH, 2.1×50 mm, 1.7 µm
Gradient:

| Time (min) | water/acetonitrile (0.1% formic acid) |
|---|---|
| 0 | 95/5 |
| 0.1 | 95/5 |
| 2.1 | 5/95 |
| 3.0 | STOP |

Preparative LC-MS System and Method Description

Preparative LC-MS is a standard and effective method used for the purification of small organic molecules such as the compounds described herein. The methods for the liquid chromatography (LC) and mass spectrometry (MS) can be varied to provide better separation of the crude materials and improved detection of the samples by MS. Optimisation of the preparative gradient LC method will involve varying columns, volatile eluents and modifiers, and gradients. Methods are well known in the art for optimising preparative LC-MS methods and then using them to purify compounds. Such methods are described in Rosentreter U, Huber U.; Optimal fraction collecting in preparative LC-MS; J Comb Chem.; 2004; 6(2), 159-64 and Leister W, Strauss K, Wisnoski D, Zhao Z, Lindsley C., Development of a custom high-throughput preparative liquid chromatography/mass spectrometer platform for the preparative purification and analytical analysis of compound libraries; J Comb Chem.; 2003; 5(3); 322-9.

Several systems for purifying compounds via preparative LC-MS are described below although a person skilled in the art will appreciate that alternative systems and methods to those described could be used. From the information provided herein, or employing alternative chromatographic systems, a person skilled in the art could purify the compounds described herein by preparative LC-MS.

Mass Directed Purification LC-MS System

Preparative LC-MS is a standard and effective method used for the purification of small organic molecules such as the compounds described herein. The methods for the liquid chromatography (LC) and mass spectrometry (MS) can be varied to provide better separation of the crude materials and improved detection of the samples by MS. Optimisation of the preparative gradient LC method will involve varying columns, volatile eluents and modifiers, and gradients. Methods are well known in the art for optimising preparative LC-MS methods and then using them to purify compounds. Such methods are described in Rosentreter U, Huber U.; Optimal fraction collecting in preparative LC/MS; J Comb Chem.; 2004; 6(2), 159-64 and Leister W, Strauss K, Wisnoski D, Zhao Z, Lindsley C., Development of a custom high-throughput preparative liquid chromatography/mass spectrometer platform for the preparative purification and analytical analysis of compound libraries; J Comb Chem.; 2003; 5(3); 322-9.

One such system for purifying compounds via preparative LC-MS is described below although a person skilled in the art will appreciate that alternative systems and methods to those described could be used. In particular, normal phase preparative LC based methods might be used in place of the reverse phase methods described here. Most preparative LC-MS systems utilise reverse phase LC and volatile acidic modifiers, since the approach is very effective for the purification of small molecules and because the eluents are compatible with positive ion electrospray mass spectrometry. Employing other chromatographic solutions e.g. normal phase LC, alternatively buffered mobile phase, basic modifiers etc as outlined in the analytical methods described above could alternatively be used to purify the compounds.

Agilent 1260 LC-MS Preparative System

Hardware:
  Autosampler: G2260A Prep ALS
  Pumps: 2× G1361A Prep Pumps for preparative flow gradient, G1311C Quat Pump VL for pumping modifier in prep flow and G1310B Iso Pump for make-up pump flow
  UV detector: G1365C 1260 MWD
  MS detector: G6120B Quadrupole LC-MS
  Fraction Collector: 2× G1364B 1260 FC-PS
  G1968D Active Splitter
Software:
  Agilent OpenLab C01.06
  Agilent MS operating conditions:
  Capillary voltage: 3000 V
  Fragmentor/Gain: 70/1
  Drying gas flow: 12.0 L/min
  Drying Gas Temperature: 275° C.
  Nebuliser Pressure: 40 psig
  Vaporizer Temperature: 200° C.
  Scan Range: 125-800 amu
  Ionisation Mode: ElectroSpray Positive
Columns:
  1. Waters XBridge Prep C18 5 m OBD 100×19 mm
    Typically used for ammonium bicarbonate-based methods
  2. Waters SunFire Prep C18 OBD 5 m 100×19 mm
    Typically used for TFA-based methods
  3. Waters XBridge Prep Phenyl 5 m OBD 100×19 mm
    Typically used for neutral pH ammonium acetate-based methods
  4. Supelco Ascentis RP-Amide 5 m 100×21.2 mm
    Typically used for formic acid-based methods
  5. Phenomenex Synergi Fusion-RP 4 m 100×21.2 mm
    Typically used for formic acid-based methods
Eluents:
  Solvent A: Water
  Solvent B: Acetonitrile
  Solvent C: Choice of available modifiers:
    2.5% Trifluoroacetic acid in water
    2.5% Formic acid in water
    250 mM ammonium bicarbonate in water pH 9.4
    250 mM ammonium acetate
Make Up Solvent:
  90:10 Methanol:Water+0.2% Formic Acid (for all chromatography types)
Methods:
  According to the analytical trace the most appropriate preparative chromatography type was chosen. A typical routine was to run an analytical LC-MS using the type of chromatography (low or high pH) most suited for compound structure. Once the analytical trace showed good chromatography a suitable preparative method of the same type was chosen. Typical running conditions for both low and high pH chromatography methods were:
    Flow rate: 25 mL/min
    Gradient: Generally all gradients had an initial 0.4 min step with 95% A+5% B (with additional modifier C). Then according to analytical trace a 6.6 min gradient was chosen in order to achieve good separation (e.g.

from 5% to 50% B for early retaining compounds; from 35% to 80% B for middle retaining compounds and so on).

Wash: 1.6 minute wash step was performed at the end of the gradient

Make Up flow rate: 0.8 mL/min

Solvent:

All compounds were usually dissolved in 100% MeOH or 100% DMSO

From the information provided someone skilled in the art could purify the compounds described herein by preparative LC-MS.

Waters Fractionlynx system

Hardware:
- 2767 Dual Loop Autosampler/Fraction Collector
- 2525 preparative pump
- CFO (column fluidic organizer) for column selection
- RMA (Waters reagent manager) as make up pump
- Waters ZQ Mass Spectrometer
- Waters 2996 Photo Diode Array detector
- Waters ZQ Mass Spectrometer Software:
- Masslynx 4.1

Waters MS running conditions:
- Capillary voltage: 3.5 kV (3.2 kV on ES Negative)
- Cone voltage: 25 V
- Source Temperature: 120° C.
- Multiplier: 500 V
- Scan Range: 125-800 amu
- Ionisation Mode: ElectroSpray Positive or ElectroSpray Negative Alternatively Reverse phase preparative HPLC column chromatography was performed at the following conditions.
- Column: CAPCELL PAK C18 AQ manufactured by SHISEIDO, 30×50 mm, 5 μm
- UV detection: 254 nm
- Column flow rate: 40 mL/min
- Mobile phase: water/acetonitrile (0.1% formic acid)
- Injection volume: 1.0 mL
- Basic gradient method: water/acetonitrile 0%-50% (8 minutes)

Agilent InfinityLab LC/MSD

LCMS analysis was carried out using either a Waters X-Select CSH C18 (2.5 μm, 4.6×30 mm) or Waters X-Bridge BEH C18 (2.5 μm, 4.6×30 mm) maintained at a temperature of 40° C. and eluted with a linear acetonitrile gradient appropriate for the lipophilicity of the compound over 4 or 15 minutes at a constant flow rate of 2.5 ml/min. The aqueous portion of the mobile phase was either 0.1% Formic Acid (CSH C18 column) or 10 mM Ammonium Bicarbonate (BEH C18 column). LC-UV chromatograms were recorded using an Agilent VWD or DAD detector at 254 nm. Mass spectra were recorded using an Agilent MSD detector with electrospray ionisation switching between positive and negative ion mode. Sample concentration was adjusted to give adequate UV response.

Waters Acquity QDa

UPLC/MS analysis was carried out using either a Waters Acquity CSH C18 or BEH C18 column (2.1×30 mm) maintained at a temperature of 40° C. and eluted with a linear acetonitrile gradient appropriate for the lipophilicity of the compound over 3 or 10 minutes at a constant flow rate of 0.77 ml/min. The aqueous portion of the mobile phase was either 0.1% Formic Acid (CSH C18 column) or 10 mM Ammonium Bicarbonate (BEH C18 column). LC-UV chromatograms were recorded using a Waters Acquity PDA detector between 210 and 400 nm. Mass spectra were recorded using a Waters Acquity QDa detector with electrospray ionisation switching between positive and negative ion mode. Sample concentration was adjusted to give adequate UV response.

Achiral Preparative Chromatography

The compound examples described have undergone HPLC purification, where indicated, using methods developed following recommendations as described in Snyder L. R., Dolan J. W., High-Performance Gradient Elution The Practical Application of the Linear-Solvent-Strength Model, Wiley, Hoboken, 2007.

Chiral Preparative Chromatography

Preparative separations using Chiral Stationary Phases (CSPs) are the natural technique to apply to the resolution of enantiomeric mixtures. Equally, it can be applied to the separation of diastereomers and achiral molecules. Methods are well known in the art for optimising preparative chiral separations on CSPs and then using them to purify compounds. Such methods are described in Beesley T. E., Scott R. P. W.; Chiral Chromatography; Wiley, Chichester, 1998.

Preparation 1: 6-Chloro-3-iodo-5-methyl-1-(oxan-2-yl)-1H-pyrazolo[3,4-b]pyrazine

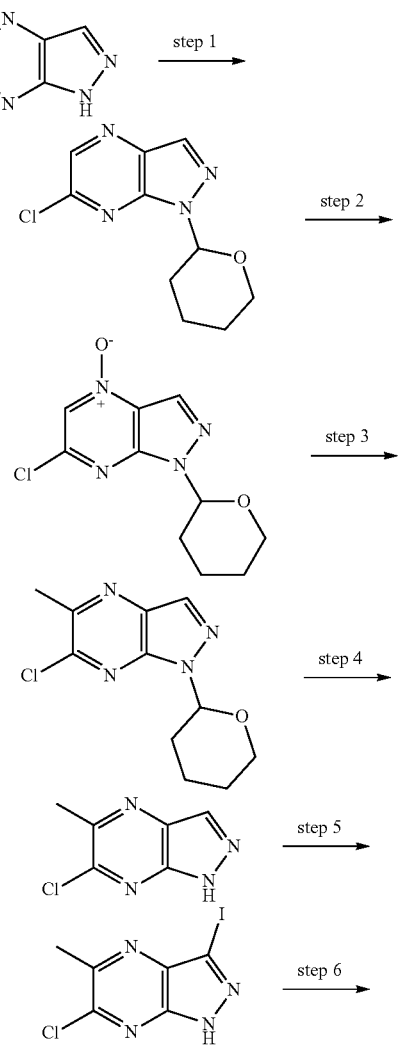

-continued

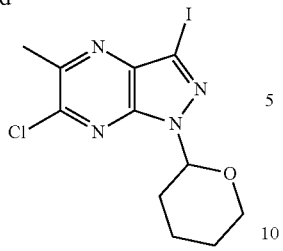

Step 1: 6-Chloro-1-(oxan-2-yl)-1H-pyrazolo[3,4-b]pyrazine

A solution of 6-chloro-1H-pyrazolo[3,4-b]pyrazine (17.85 g, 113.7 mmol) and TsOH·H$_2$O (0.1 eq) in THF (150 mL) was cooled on ice (internal temp ~10° C.). Dihydropyran (20.6 mL, 227.4 mmol) was added slowly over 5 mins. The cooling bath was removed and the reaction mixture was stirred for 90 mins. EtOAc (250 mL) was added and the organic phase was washed with sat. NaHCO$_3$ (150 mL), brine and then dried (MgSO$_4$). This was repeated on a further 17.8 g. The organic layers from both runs were evaporated to give ~55 g of an orange solid. TBME (40 mL) and heptane (400 mL) were added and the mixture was heated to 90° C. and then allowed to cool. A very small amount of brown precipitate appeared, which was removed by filtration. The filtrate was the stirred until the product crystallised. The product was collected by filtration to give batch 1 (20 g) as a white crystalline solid. The filtrate was concentrated to ~30 mL and then diluted with heptane (100 mL) to induce crystallisation. Batch 2 (15.8 g, white crystalline solid) was collected by filtration. MS: [M+H]+=239. $^1$H NMR (500 MHz, DMSO-d6) δ 8.79 (s, 1H), 8.61 (s, 1H), 5.95 (dd, J=10.2, 2.6 Hz, 1H), 3.94 (qd, J=13.2, 4.1, 1.9 Hz, 1H), 3.77-3.69 (m, 1H), 2.49-2.41 (m, 1H), 2.08-2.01 (m, 1H), 1.95 (dq, J=13.0, 3.5 Hz, 1H), 1.86-1.72 (m, 1H), 1.62-1.55 (m, 2H).

Step 2: 6-Chloro-1-(oxan-2-yl)-1H-4λ$^5$-pyrazolo[3,4-b]pyrazin-4-one

6-Chloro-1-(oxan-2-yl)-1H-pyrazolo[3,4-b]pyrazine (18 g, 75.41 mmol) was dissolved in MeCN (150 mL) and cooled on ice. Urea·hydrogen peroxide complex (14.9 g, 158.4 mmol) was added batch wise. Trifluoroacetic anhydride (20.9 mL, 150.8 mmol), as a solution in 30 mL (MeCN) was added dropwise over 15 minutes, keeping internal temperature <10° C. The reaction mixture was stirred at 0-5° C. for 30 mins. and then allowed to warm to RT over 1 hour. A thick precipitate formed and a further 50 mL MeCN was added to mobilize it. The mixture was poured into a stirred mixture of 4M sodium thiosulfate (100 mL), NaHCO$_3$ (50 g solid) and ice-cold water (300 mL). The mixture was stirred for 10 minutes and then DCM (300 mL) was added. The DCM layers was isolated and the aqueous layer was extracted with further DCM (2×100 mL). The DCM layers were combined and washed with water (200 mL), dried (MgSO$_4$) and evaporated to dryness. The process was repeated on a further 18 g of 6-chloro-1-(oxan-2-yl)-1H-pyrazolo[3,4-b]pyrazine. The crude products from both runs were combined and recrystallised from EtOAc (300 mL). Crystalline material was collected by filtration, dissolved in PhMe and evaporated to give 6-chloro-1-(oxan-2-yl)-1H-4λ$^5$-pyrazolo[3,4-b]pyrazin-4-one (11 g, 28%, crop 1) as a white crystalline solid. The filtrate was concentrated and dissolved in hot EtOAc (40 mL). Heptane (400 mL) was added and the mixture heated until all material had dissolved. The solution was allowed to cool and the product crystallised. Product was collected by filtration, dissolved in PhMe and evaporated to give 6-chloro-1-(oxan-2-yl)-1H-4λ$^5$-pyrazolo[3,4-b]pyrazin-4-one (18.46 g, 48%, crop 2). MS: [M+H]+=255. $^1$H NMR (500 MHz, DMSO-d6) δ 8.70 (s, 1H), 8.55 (s, 1H), 5.91 (dd, J=10.1, 2.6 Hz, 1H), 4.01-3.91 (m, 1H), 3.79-3.68 (m, 1H), 2.45-2.34 (m, 1H), 2.08-1.97 (m, 1H), 1.93 (dq, J=13.1, 3.6 Hz, 1H), 1.86-1.73 (m, 1H), 1.61-1.55 (m, 2H).

Step 3: 6-Chloro-5-methyl-1-(oxan-2-yl)-1H-pyrazolo[3,4-b]pyrazine

Methylmagnesium chloride (3.0M in diethyl ether) (163 ml, 489 mmol) was added dropwise in 1 h 15 min to a solution of 6-chloro-1-(oxan-2-yl)-1H-4λ$^5$-pyrazolo[3,4-b]pyrazin-4-one (41.5 g, 163 mmol) in toluene (833 ml) cooled on a dry ice/acetone bath to −60° C. (internal temperature). The mixture was stirred at this temp for 6 h, then quenched with sat. NH$_4$Cl (400 mL) and diluted with water (300 mL) and EtOAc (300 mL). The phases were separated, and the aqueous phase was extracted with EtOAc (2×300 mL). The organics were combined and washed with brine (300 mL), dried (MgSO$_4$) and concentrated to give the crude product as a red solid (38.6 g). The crude residue was dissolved in acetonitrile (50 mL) at reflux. The solution was cooled to RT. The precipitate was isolated by filtration, washed with i-Hexane (50 mL) to give a beige solid (~17 g). The solid (crop1) was heated once more in acetonitrile (25 mL) at reflux. The solution was cooled down to RT, the pink brown solid was filtered, washed with hexane (10 mL) and dried overnight in the vacuum oven at 40° C. to afford the title compound (11.92 g) as a pink brown solid. MS: [M+H]+=253, 255. $^1$H NMR (500 MHz, DMSO-d6) δ 8.47 (s, 1H), 5.91 (dd, J=10.2, 2.6 Hz, 1H), 3.97-3.88 (m, 1H), 3.77-3.66 (m, 1H), 2.70 (s, 3H), 2.49-2.42 (m, 1H), 2.06-2.00 (m, 1H), 1.94 (dq, J=13.1, 3.5 Hz, 1H), 1.83-1.72 (m, 1H), 1.61-1.55 (m, 2H).

Step 4: 6-Chloro-5-methyl-1H-pyrazolo[3,4-b]pyrazine

A solution of hydrogen chloride (4.0M in 1,4-dioxane) (128 ml, 513 mmol) was added dropwise to a suspension of 6-chloro-5-methyl-1-(oxan-2-yl)-1H-pyrazolo[3,4-b]pyrazine (33.21 g, 131 mmol) in methanol (633 ml). The brown mixture was stirred at room temperature overnight. After concentration, the residue was dissolved in MeOH—CHCl$_3$ (1/1 mixture; 400 mL) and then basified with an aqueous solution of NaHCO$_3$ (55 g in 40 0 mL). The separated aqueous layer was extracted with MeOH—CHCl$_3$ (1/1 mixture; 4×400 mL). The organics were combined, washed with brine (300 mL), dried over Na$_2$SO$_4$, filtered and then concentrated in vacuum to give a crude beige solid (28.5 g). The material was suspended in i-hexane (3×200 mL), collected by filtration and dried under vacuum at 40° C. overnight to give 6-chloro-5-methyl-1H-pyrazolo[3,4-b]pyrazine (20.73 g, 121 mmol, 92% yield) as a beige solid. MS: [M+H]+=169. $^1$H NMR (500 MHz, DMSO-d6) δ 14.13 (s, 1H), 8.41 (s, 1H), 2.68 (s, 3H).

Step 5: 6-Chloro-3-iodo-5-methyl-1H-pyrazolo[3,4-b]pyrazine

1-Iodopyrrolidine-2,5-dione (55.3 g, 246 mmol) was added to a solution of 6-chloro-5-methyl-1H-pyrazolo[3,4- b]pyrazine (20.73 g, 123 mmol) in N,N-dimethylformamide (409 mL). The mixture was stirred at 50° C. for 6 h. The reaction mixture was added slowly to a rapidly stirred mixture of saturated aqueous sodium thiosulfate solution (400 mL) and water (400 mL). The precipitate was collected by filtration and washed with water (3×200 mL) and i-Hexane (100 mL). The solid was dissolved in THF (300 mL), dried on Na₂SO₄, filtered and concentrated in vacuo to yield 6-chloro-3-iodo-5-methyl-1H-pyrazolo[3,4-b]pyrazine (19.42 g, 64.6 mmol, 52.6% yield) as a cream solid (dried in the vacuum oven at 40° C.). The aqueous layer was extracted with EtOAc (3×400 mL). The organics were combined, dried on Na₂SO₄ and concentrated in vacuo to give a brown red oil. Water (200 mL) was added. A beige solid was formed which was filtered and washed with water (2×200 mL). The solid was dried in the vacuum oven at 40° C. 6-Chloro-3-iodo-5-methyl-1H-pyrazolo[3,4-b]pyrazine (12.86 g, 41.5 mmol, 33.7% yield) was isolated as a beige solid. MS: [M+H]+=295. ¹H NMR (500 MHz, DMSO-d6) δ 14.49 (s, 1H), 2.70 (s, 3H).

Step 6: 6-Chloro-3-iodo-5-methyl-1-(oxan-2-yl)-1H-pyrazolo[3,4-b]pyrazine 3,4-Dihydro-2H-pyran (50 mL, 547 mmol) and p-toluenesulfonic acid monohydrate (2.085 g, 10.96 mmol) were added to a solution of 6-chloro-3-iodo-5-methyl-1H-pyrazolo[3,4-b]pyrazine (32.28 g, 110 mmol) in THF (647 mL). The mixture was stirred at RT overnight. After concentration of the mixture in vacuo at 30° C. to half of the volume, the mixture was poured into a solution of NaHCO₃ (36.8 g, 438 mmol) in water (300 mL). The aqueous layer was extracted with EtOAc (200 mL). The organics were combined and washed with brine (200 mL), dried on Na₂SO₄, filtered and concentrated in vacuo to give a pink orange solid which was dry loaded on silica gel and purified by chromatography on silica gel (330 g column; gradient elution, 0-100%, DCM/hexane) to afford a white solid (33.98 g). The solid was suspended in i-hexane (100 mL) and stirred for 1 h then filtered, washed with i-hexane (50 ml) and dried in the vacuum oven at 40° C. 6-Chloro-3-iodo-5-methyl-1-(oxan-2-yl)-1H-pyrazolo[3,4-b]pyrazine (31.29 g, 81 mmol, 73.9% yield) was isolated as a white solid. MS: [M+H]+=379. ¹H NMR (500 MHz, DMSO-d6) δ 5.88 (dd, J=10.3, 2.5 Hz, 1H), 3.97-3.88 (m, 1H), 3.77-3.66 (m, 1H), 2.72 (s, 3H), 2.47-2.37 (m, 1H), 2.06-1.98 (m, 1H), 1.94 (dq, J=13.0, 3.4 Hz, 1H), 1.83-1.71 (m, 1H), 1.64-1.52 (m, 2H).

Preparation 2: 6-Chloro-3-iodo-1-((2-(trimethylsilyl)ethoxy)methyl)-1H-pyrazolo[3,4-b]pyrazine

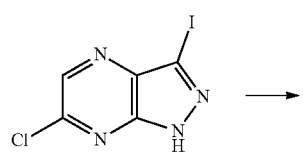

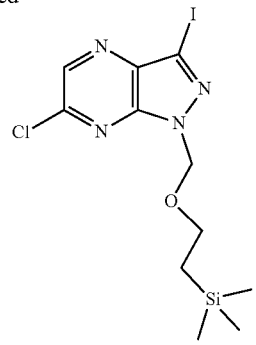

(2-(Chloromethoxy)ethyl)trimethylsilane (56.8 ml, 321 mmol) was added over 30 min to a solution of 6-chloro-3-iodo-1H-pyrazolo[3,4-b]pyrazine (75 g, 267 mmol) and DIPEA (93 mL, 535 mmol) in THF (1118 mL) at 0° C. After 18 h of stirring, the reaction mixture was concentrated in vacuo to a yellow solution, which was treated with saturated ammonium chloride (500 mL) then water (300 mL) and extracted with EtOAc (2×400 mL). The combined organic phases were concentrated then purified by chromatography on silica gel (1 kg cartridge, 0-10% EtOAc/isohexane) to afford 6-chloro-3-iodo-1-((2-(trimethylsilyl)ethoxy)methyl)-1H-pyrazolo[3,4-b]pyrazine as a light yellow solid (dried in the vacuum oven at 40° C.). MS: [M+H]+=411. ¹H NMR (500 MHz, Chloroform-d) δ 8.58 (s, 1H), 5.79 (s, 2H), 3.74-3.63 (m, 2H), 1.00-0.89 (m, 2H), −0.03 (s, 9H).

Preparation 3: (6-Chloro-3-iodo-1-{[2-(trimethylsilyl)ethoxy]methyl}-1H-pyrazolo[3,4-b]pyrazin-5-yl)methanol

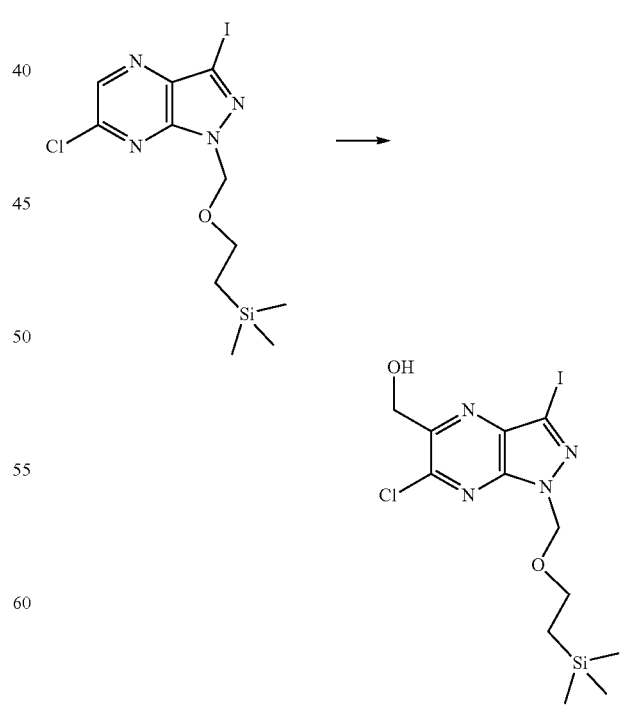

To a solution of 6-chloro-3-iodo-1-((2-(trimethylsilyl)ethoxy)methyl)-1H-pyrazolo[3,4-b]pyrazine (68.5 g, 165 mmol) in methanol (700 mL) was added silver nitrate (14 g, 82 mmol). The mixture was heated to 40° C. then a solution of sodium persulfate (110 g, 462 mmol) in water (210 mL) was added over 30 minutes. The mixture was stirred at 40° C. for 1 h then cooled. The mixture was diluted cautiously with a solution of sodium carbonate (49.0 g, 462 mmol) in water (2 L) and the precipitate was collected by filtration. The filter cake was extracted with dichloromethane:methanol (9:1, 1 L) then concentrated onto loose silica gel (150 g). The silicate was purified by chromatography on silica gel (1 Kg, 0-10% EtOAc/DCM) to afford (6-chloro-3-iodo-1-((2-(trimethylsilyl)ethoxy)methyl)-1H-pyrazolo[3,4-b]pyrazin-5-yl)methanol (27.9 g, 60.8 mmol, 36.8% yield) as a white solid. MS: [M+H]+=441.1H NMR (500 MHz, DMSO-d6) δ 5.73 (s, 2H), 5.59 (t, J=6.0 Hz, 1H), 4.80 (d, J=6.1 Hz, 2H), 3.68-3.53 (m, 2H), 0.91-0.79 (m, 2H), −0.09 (s, 9H).

Preparation 4:
5-Bromo-4-chloro-2-methyl-2H-indazole

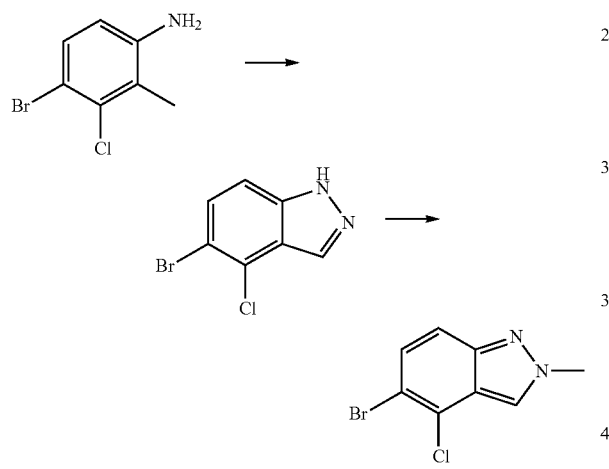

A solution of sodium nitrite (58.6 g, 0.85 mol) in water (98 ml) was added to an ice bath cooled solution of 4-bromo-3-chloro-2-methylaniline (150 g, 0.68 mol) in acetic acid (3 L) with mechanical stirring and the mixture was aged for 1 h at ambient temperature. Most of the solvent was evaporated and the residue suspended in water (500 mL) and filtered, washing with water (250 ml×4), petrol (250 ml×4) and drying in vacuo at 40° C., to give 5-bromo-4-chloro-1H-indazole (130 g), $^1$H NMR (400 MHz, DMSO-d$_6$): 13.61 (1H, s), 8.16 (1H, s), 7.62 (1H, d), 7.53 (1H, dd).

Solid trimethyloxonium tetrafluoroborate (258 g, 1.74 mol) was charged to a solution of ice bath cooled 5-bromo-4-chloro-1H-indazole (367 g, 1.59 mol) in EtOAc (1.9 L) and the resulting mixture was stirred at ambient temperature for 4 h. The reaction mixture was diluted with petrol (1.9 L) and aged for 10 min before filtration, washing with petrol (400 mL×2). The filter cake was combined with sat. sodium bicarbonate (1.5 L), EtOAc (2 L) and the phases were separated. The organic phase was washed with sat. sodium bicarbonate, dried (MgSO$_4$) and concentrated in vacuo, to give the title compound (236 g). $^1$H NMR (400 MHz, DMSO-d$_6$): 8.53 (1H, s), 7.56 (1H, dd), 7.48 (1H, d), 4.20 (3H, s).

Preparation 5:
5-Bromo-4-chloro-2-ethyl-2H-indazole

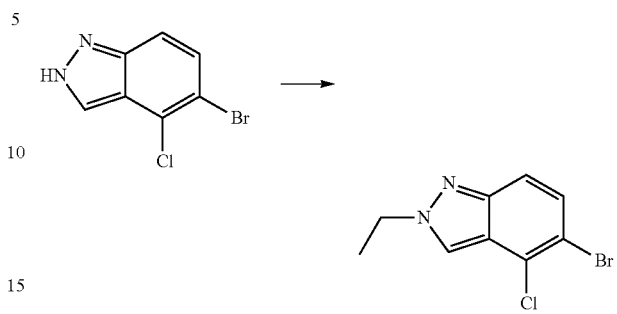

Triethyloxonium hexafluorophosphate (20 g, 80.6 mmol) was added to 5-bromo-4-chloro-1H-indazole (12.4 g, 53.7 mmol) in EtOAc (186 mL) and the resulting mixture was stirred at ambient temperature overnight. The reaction mixture was quenched with sat. sodium bicarbonate (125 ml), and the phases were separated. The aq. was extracted with EtOAc (70 mL) and the combined organics were washed with brine (70 mL), dried (MgSO$_4$) and concentrated in vacuo. The red/brown residue was treated with activated charcoal (12.5 g) in ethanol (125 ml) and EtOAc (125 mL). After stirring at ambient temperature, the mixture was filtered and concentrated in vacuo, to give the title compound (9.88 g). $^1$H NMR (400 MHz, DMSO-d$_6$): 8.58 (1H, s), 7.58 (1H, dd), 7.48 (1H, d), 4.49 (2H, q), 1.52 (3H, t).

Preparation 6:
5-Bromo-3,4-dichloro-2-methyl-2H-indazole

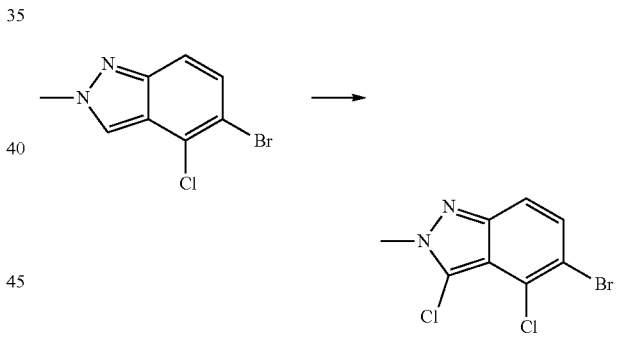

To a solution of 5-bromo-4-chloro-2-methyl-2H-indazole (5 g, 20.3 mmol) in DMF (50 mL) was added NCS (2.99 g, 22.4 mmol) at 0° C. The mixture was stirred at RT overnight. Water (150 mL) was added at RT. The mixture was stirred at RT for 1 h. The precipitate was collected, washed with water, and dried at 60° C. for 3 h under reduced pressure to give the title compound (5.63 g). MS: [M+H]+=279, 281.

Preparation 7:
5-Bromo-4-chloro-2,3-dimethyl-2H-indazole

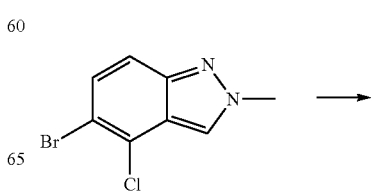

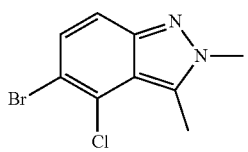

N-Butyllithium (2.5 M in hexanes, 4 mL, 10.0 mmol) was added to a cooled (−10° C.) solution of diisopropylamine (1.5 mL, 10.5 mmol) in THF (10 mL). The mixture was stirred for 10 min before cooling to −78° C. To this solution was added a solution of 5-bromo-4-chloro-2-methyl-2H-indazole (2.0 g, 8.15 mmol) in THF (10 mL). The mixture was warmed to 0° C. for 10 min, then re-cooled to −78° C. Iodomethane (0.66 mL, 10.6 mmol) was added and the mixture was stirred at −78° C. for 1 h. The mixture was quenched with sat. aq. NH$_4$Cl (30 mL) and extracted with EtOAc (3×30 mL). The combined organic phases were dried (Na$_2$SO$_4$), filtered and concentrated. The crude product was purified by column chromatography on silica gel (gradient elution, 15-75% EtOAc/isohexane), to give the title compound (1.7 g). MS: [M+H]$^+$=259, 261, 263.

Preparation 8: 7-Bromo-2,8-dichloroquinoxaline

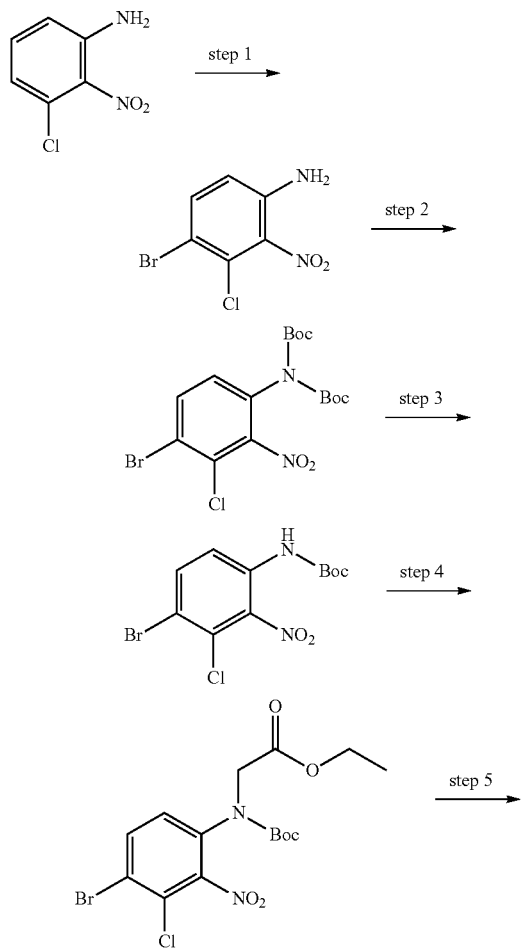

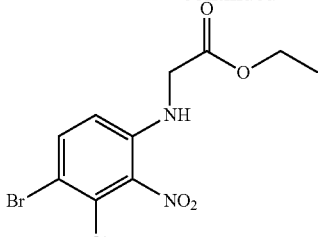

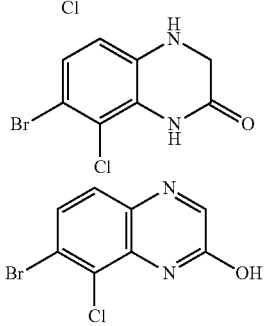

Step 1: 4-Bromo-3-chloro-2-nitroaniline

In a 2 L three necked flask, a solution of 3-chloro-2-nitroaniline (60 g, 348 mmol) in AcOH (600 mL) was treated portionwise with NBS (61.9 g, 348 mmol). The resultant orange solution was heated at 80° C. for 1.5 h. The reaction mixture was cooled to RT and was poured into stirred ice water (800 mL). The resultant orange precipitate was collected by filtration, washed with water (200 mL). The orange residue was collected and dissolved in EtOAc (500 mL). The solution was dried with MgSO$_4$, filtered and the solvent was concentrated in vacuo to give an orange solid (86.5 g). The residue was recrystallised from 10% EtOAc/iso-Hexane (500 mL). The resultant solid was filtered, rinsing with iso-Hexane (100 mL), and dried in vacuo to afford a light orange solid (39.88 g, 158.6 mmol, 46%). The filtrate was concentrated in vacuo to give an orange solid. The residue was recrystallised from 10% Ac/iso-Hexane (250 mL). The resultant solid was filtered, rinsing with iso-Hexane (50 mL), and dried in vacuo to afford a light orange solid (20 g, 79.53 mmol, 23%). $^1$H NMR in DMSO-d6: (7.55 (1H, d), 6.84 (1H, d), 6.40 (2H, s).

Step 2: tert-Butyl N-(4-bromo-3-chloro-2-nitrophenyl)-N-[(tert-butoxy)carbonyl]carbamate In a 2 L three necked flask, a solution of 4-bromo-3-chloro-2-nitroaniline (59.88 g, 226 mmol) in THF (400 mL) at <10° C. (internal temperature, ice bath) was treated portionwise with a solution of di-ted-butyl dicarbonate (99 g, 452 mmol) in THF (200 mL). N,N-dimethylpyridin-4-amine (2.76 g, 22.62 mmol) was added portionwise and the resultant orange solution was stirred at RT for 18 h. The reaction mixture was concentrated in vacuo to give a pale brown solid. The residue was triturated with iso-Hexane (300 mL). The resultant solid was filtered, rinsing with iso-Hexane (50 mL), and dried in vacuo to afford the desired product (97.5 g, 214 mmol, 94% yield) as a sticky colourless solid. $^1$H NMR in CDCl$_3$: 7.81 (1H, d), 7.16 (1H, d), 1.45 (18H, s).

Step 3: tert-Butyl N-(4-bromo-3-chloro-2-nitrophenyl)carbamate

In a 2 L three necked flask, a solution of tert-butyl N-(4-bromo-3-chloro-2-nitrophenyl)-N-[(tert-butoxy)carbonyl]carbamate (97.5 g, 214 mmol) in DCM (600 mL) was treated with a solution of trifluoroacetic acid (32.9 ml, 427 mmol) in DCM (250 mL). The resultant orange solution was stirred at RT for 0.5 h. The reaction mixture was quenched to neutral pH with sat. aq. NaHCO$_3$ (300 mL). The phases were separated and the aqueous layer was extracted with DCM (2×100 mL). The organic extracts were combined and dried over MgSO$_4$, filtered and concentrated in vacuo to afford tert-butyl N-(4-bromo-3-chloro-2-nitrophenyl)carbamate (75 g, 212 mmol, 99% yield) as a light orange solid. $^1$H NMR in CDCl$_3$: 8.06 (1H, d), 7.72 (1H, d), 7.12 (1H, s), 1.53 (9H, s).

Step 4: Ethyl 2-[(4-bromo-3-chloro-2-nitrophenyl)[(tert-butoxy)carbonyl]amino]acetate In a 1 L three necked flask, a suspension of tert-butyl N-(4-bromo-3-chloro-2-nitrophenyl)carbamate (75 g, 211 mmol) and cesium carbonate (138 g, 422 mmol) in DMF (300 mL) at <10° C. (internal temperature, ice bath) was treated portionwise with a solution of ethyl 2-bromoacetate (24.59 ml, 222 mmol) in DMF (125 mL). The resultant orange suspension was stirred at <10° C. for 0.5 h. The reaction mixture was partitioned between EtOAc (300 mL) and water (300 mL). The aqueous layer was extracted with EtOAc (2×200 mL). The organic extracts were combined and washed with saturated brine (2×100 mL) and then dried over MgSO$_4$, filtered and concentrated in vacuo to afford a dark orange oil (~100 mL). The dark orange oil was added to stirred water (200 mL). The resultant orange precipitate was collected by filtration, washed with water (50 mL), and dried in vacuo to afford an orange solid (107 g, 196 mmol, 93% yield). $^1$H NMR in DMSO-d6: 8.14 (1H, d), 7.57 (1H, t), 4.40-3.98 (4H, m), 1.41-1.15 (12H, m).

Step 5: Ethyl 2-[(4-bromo-3-chloro-2-nitrophenyl)amino]acetate

In a 2 L three necked flask, a solution of ethyl 2-[(4-bromo-3-chloro-2-nitrophenyl)[(tert-butoxy)carbonyl]amino]acetate (107 g, 196 mmol) in DCM (600 mL) was treated portionwise with a solution of trifluoroacetic acid (75 ml, 978 mmol) in DCM (200 mL). The resultant orange solution was stirred at RT for 18 h. The reaction mixture was quenched with sat. aq. NaHCO$_3$ (700 mL) followed by slow portion wise addition of solid NaHCO$_3$ (40 g, 476 mmol) to neutral pH. The phases were separated and the aqueous layer was extracted with DCM (2×250 mL). The organic extracts were combined and washed with saturated brine (1×150 mL) and then dried over MgSO$_4$, filtered and concentrated in vacuo to afford ethyl 2-[(4-bromo-3-chloro-2-nitrophenyl)amino]acetate (77.47 g, 184 mmol, 94% yield) as a light orange solid. $^1$H NMR in DMSO-d6: 7.68 (1H, d), 6.78 (1H, d), 6.70 (1H, t), 4.12 (2H, q), 4.04 (2H, d), 1.20 (3H, t).

Step 6: 7-Bromo-8-chloro-1,2,3,4-tetrahydroquinoxalin-2-one

In a 2 L three necked flask, a solution of ethyl 2[((4-bromo-3-chloro-2-nitrophenyl)amino]acetate (35.93 g, 96 mmol) in THF (200 mL) and MeOH (200 mL) at 0° C. (internal temperature, ice bath) was treated portion wise with a solution of sodium dithionite (71.2 g, 409 mmol) in water (200 mL). The resultant orange suspension was stirred at RT for 2 h. The reaction mixture was diluted with water (50 mL) and solid sodium carbonate (65 g, 613 mmol) was added slowly portion wise until pH 9. MeOH and THF were removed in vacuo and the aqueous solution was extracted with Me-THF (2×250 mL). The organic extracts were combined and washed with saturated brine (1×150 mL) and then dried over MgSO$_4$, filtered and concentrated in vacuo to afford 7-bromo-8-chloro-3,4-dihydroquinoxalin-2(1H)-one (26.4 g, 96 mmol, 94% yield) as a thick green solid. $^1$H NMR in DMSO-d6: 9.93 (1H, s), 7.14 (1H, d), 6.63 (1H, d), 6.40 (1H, br s), 3.75 (2H, s).

Step 7: 7-Bromo-8-chloroquinoxalin-2-ol

In a 2 L three necked flask, a solution of 7-bromo-8-chloro-1,2,3,4-tetrahydroquinoxalin-2-one (60 g, 174 mmol) in THF (425 mL) and MeOH (425 mL) at <10° C. (internal temperature, ice bath) was treated portion wise with potassium tert-butoxide (39.1 g, 349 mmol). The resultant orange suspension was stirred at RT for 18 h under a stream of air. Water (200 mL) was added followed by slow addition of AcOH (50 mL). The resultant orange precipitate was collected by filtration; washed with water (100 mL) followed by TBME (50 mL), and dried in vacuo to afford 7-bromo-8-chloroquinoxalin-2-ol (41.81 g, 155 mmol, 89% yield) as a pale orange solid. $^1$H NMR in DMSO-d6: 8.17 (1H, s), 7.69-7.55 (2H, br s).

Step 8: 7-Bromo-2,8-dichloroquinoxaline

In a 1 L three necked flask, a suspension of 7-bromo-8-chloroquinoxalin-2-ol (35 g, 129 mmol) in MeCN (300 mL) at 50° C. under N$_2$ was treated dropwise with a solution of phosphoryl trichloride (36.2 ml, 388 mmol) in MeCN (50 mL). The resultant brown suspension was heated at 80° C. for 3 h and then cooled to RT. The dark brown reaction mixture was concentrated in vacuo and POCl$_3$ was removed by azeotroping with PhMe (250 mL). The brown residue was dissolved in MeCN (500 mL) and the mixture was quenched by slow addition to water (~30° C.). EtOAc (500 mL) was added and the mixture was filtered, obtaining a dark brown solid. The crude solid was dissolved in EtOAc (200 mL) and was combined with the filtrate. The phases were separated. The aqueous layer was extracted with EtOAc (3×200 mL). The organic extracts were combined and washed with saturated brine (1×200 mL) and then dried over MgSO$_4$, filtered and concentrated in vacuo to afford a dark orange solid (34.52 g, 96%, crude). The crude product was purified by chromatography on silica gel (330 g cartridge, 0-30% DCM/iso-Hexane) to afford 7-bromo-2, 8-dichloroquinoxaline (27.69 g, 99 mmol, 76% yield) as a light off-white solid. $^1$H NMR in DMSO-d6: 9.13 (1H, s), 8.23 (1H, d), 8.08 (1H, d).

Preparation 9: 7-Bromo-8-chloro-2-methoxyquinoxaline

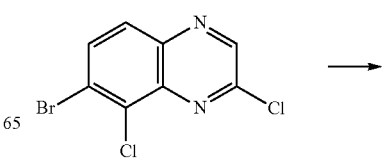

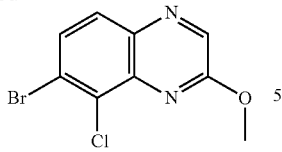

7-Bromo-2,8-dichloroquinoxaline (2 g, 7.12 mmol) and potassium carbonate (3.94 g, 28.5 mmol) were combined in a 100 mL three necked flask in MeOH (40 mL). The resultant colourless suspension was heated at 65° C. (internal temperature) for 18 h. The reaction mixture was cooled to RT. Water (150 mL) was added and the precipitate was filtered to give 7-bromo-8-chloro-2-methoxyquinoxaline (1.79 g, 6.48 mmol, 91% yield) as a light colourless solid. MS: [M+H]$^+$=275. $^1$H NMR in DMSO-d6: 8.69 (1H, s), 8.00-7.89 (2H, m), 4.10 (3H, s).

Preparation 10:
7-Bromo-8-chloro-N,N-dimethylquinoxalin-2-amine

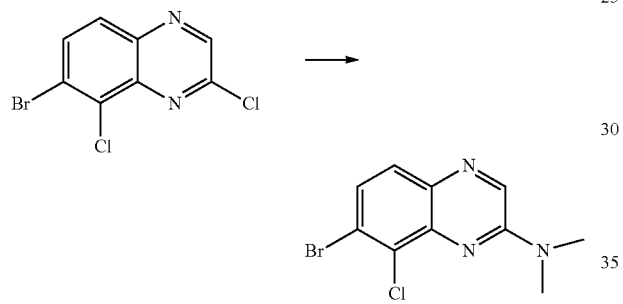

In a 100 mL three necked flask, dimethylamine, 2M in THF solution (22 mL, 44.0 mmol) was treated with 7-bromo-2,8-dichloroquinoxaline (2.01 g, 7.16 mmol) at 0° C. (internal temperature, ice bath). The resultant yellow solution was warmed to RT and stirred for 3 h. The reaction mixture was concentrated in vacuo and was partitioned between EtOAc (50 mL) and saturated aqueous NaHCO$_3$ (50 mL). The layers were separated and the aqueous phase was extracted with EtOAc (2×50 mL). The organic extracts were combined and washed with saturated brine (1×50 mL) and then dried over MgSO$_4$, filtered and concentrated in vacuo to afford 7-bromo-8-chloro-N,N-dimethylquinoxalin-2-amine (1.98 g, 6.77 mmol, 95% yield) as a light yellow solid. MS: [M+H]$^+$=288. $^1$H NMR (500 MHz, DMSO-d6) δ 8.76 (s, 1H), 7.72 (d, J=8.8 Hz, 1H), 7.63 (d, J=8.8 Hz, 1H), 3.29 (s, 6H).

Preparation 11:
2-(Azetidin-1-yl)-7-bromo-8-chloroquinoxaline

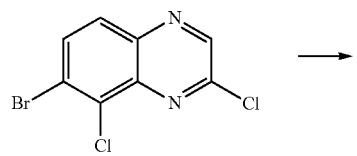

Azetidine (0.49 mL, 7.20 mmol) was added to a solution of 7-bromo-2,8-dichloroquinoxaline (1.00 g, 3.60 mmol) and triethylamine (1.00 mL, 7.20 mmol) in THF (5 mL) and the mixture immediately became yellow. Stirred at RT for 80 h and then partitioned between EtOAc and saturated aqueous NaHCO$_3$. Phases separated, aqueous phase extracted with EtOAc and combined organic phases washed with brine, dried (MgSO$_4$+ hydrophobic frit) and concentrated, to give the title compound (1.05 g). $^1$H NMR (400 MHz, DMSO-d$_6$): 8.36 (1H, s), 7.71 (1H, d), 7.64 (1H, d), 4.28 (4H, t), 2.49-2.41 (2H, m).

Preparation 12:
7-Bromo-8-chloro-2-(morpholin-4-yl)quinoxaline

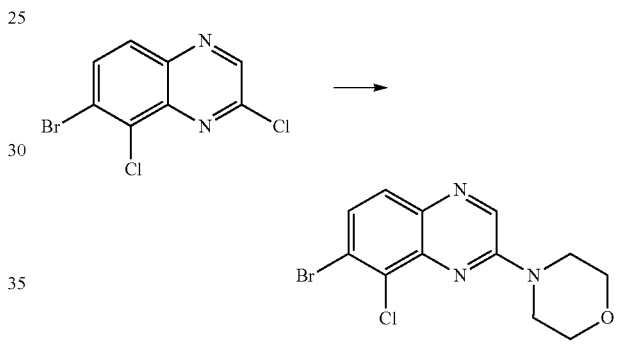

7-Bromo-8-chloro-2-(morpholin-4-yl)quinoxaline was prepared from 7-bromo-2,8-dichloroquinoxaline and morpholine using a similar procedure as in Preparation 11.

Preparation 13: 4-Chloro-2-methyl-5-(4,4,5,5-tetramethyl-1,3,2-dioxaborolan-2-yl)-2H-indazole

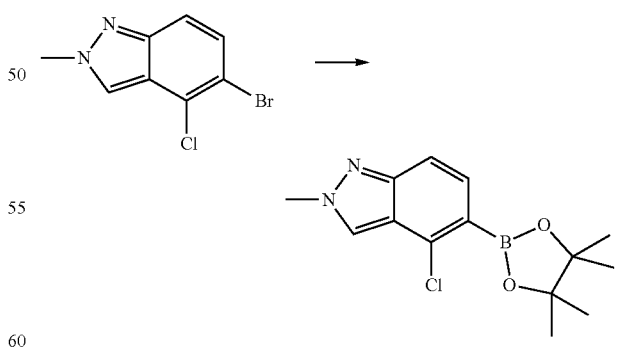

Method A

A mixture of 5-bromo-4-chloro-2-methyl-2H-indazole (12.14 g, 49.45 mmol), bis(pinacolato)diboron (18.83 g, 74.18 mmol), [1,1'-bis(diphenylphosphino)ferrocene]dichloropalladium(II) complex with dichloromethane (4.038 g, 4.945 mmol) and potassium acetate (9.706 g, 98.90 mmol)

in 1,4-dioxane (120 mL) was degassed, purged with nitrogen, and stirred at 120° C. for 5 h. The reaction was cooled to RT, filtered through a pad of Celite, and washed with EtOAc. The filtrate was concentrated in vacuo. The residue was purified by column chromatography on NH silica gel (gradient elution, 0-70% EtOAc/hexane) to give the title compound (14.36 g). MS: [M+H]$^+$=293, 295.

Method B $^i$PrMgCl·LiCl (1.3 M in THF, 63 mL, 82.0 mmol) was added to a solution of 5-bromo-4-chloro-2-methyl-2H-indazole (10.00 g, 40.73 mmol) in THF (100 mL) cooled on ice to <5° C. internal temp under nitrogen. The mixture was kept below 10° C. internal temp throughout the addition and then stirred at <5° C. for 5 h. The mixture was cooled to −10° C. internal temp and isopropoxy pinacolborane (25.00 mL, 122.6 mmol) was added. The mixture was stirred at this temp for 1 h and then quenched with water. Saturated aqueous NH$_4$Cl was added and then the aqueous mixture extracted with EtOAc. The combined organic phases were washed with water, brine and then dried (MgSO$_4$) and concentrated. The residue was dissolved in IPA and then water added to cause precipitation. The solid was collected by filtration. The solid was triturated further with petrol and then collected by filtration to afford a pale yellow solid (10.18 g, 34.79 mmol, 85%).

Preparation 14: 4-Chloro-2-ethyl-5-(4,4,5,5-tetramethyl-1,3,2-dioxaborolan-2-yl)-2H-indazole

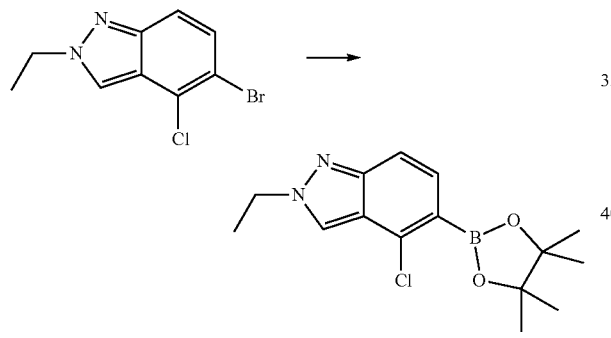

Prepared as preparation 10 above using 5-bromo-4-chloro-2-ethyl-2H-indazole. MS: [M+H]$^+$=307.

Preparation 15: (3,4-Dichloro-2-methyl-2H-indazol-5-yl)boronic acid

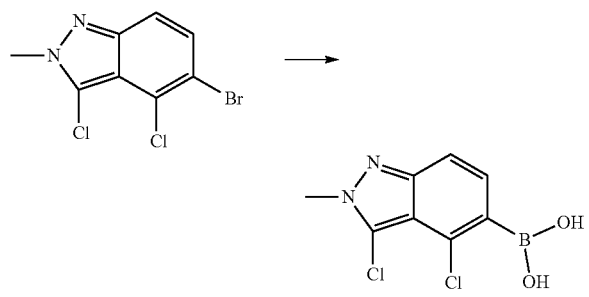

A stirred solution of 5-bromo-3,4-dichloro-2-methyl-2H-indazole (36.4 g, 130 mmol) in THF (364 mL) was cooled to 5° C. (internal temperature) under nitrogen. isopropylmagnesium chloride-lithium chloride complex in THF (1.3 M) (200 mL, 260 mmol) was added dropwise via cannula over 25 minutes. The temperature remained at 5° C. for the duration of the addition. The mixture was allowed to warm to room temperature over the course of 1 h. The mixture was re-cooled to 5° C. then triisopropyl borate (100 ml, 431 mmol) was added by cannula over 10 minutes. The mixture was stirred for 1 h at room temperature then cooled to 5° C. and quenched with AcOH (145 ml, 2533 mmol). The mixture was added dropwise to stirred water (6 L) and the precipitate collected by filtration to yield the crude product. The product was dissolved in a solution of NaOH (10.5 g, 263 mmol) in water (350 mL) then washed with TBME (350 mL). The aqueous layer was treated with 1 M HCl (300 mL, 300 mmol) and the precipitate was collected by filtration to yield (3,4-dichloro-2-methyl-2H-indazol-5-yl)boronic acid (23.9 g, 88 mmol, 67.6% yield) as a beige solid. MS: [M+H]$^+$=245. $^1$H NMR (500 MHz, DMSO-d6) δ 8.33 (s, 2H), 7.51 (d, J=8.7 Hz, 1H), 7.27 (d, J=8.6 Hz, 1H), 4.12 (s, 3H).

Preparation 16: 8-Chloro-N,N-dimethyl-7-(4,4,5,5-tetramethyl-1,3,2-dioxaborolan-2-yl)quinoxalin-2-amine

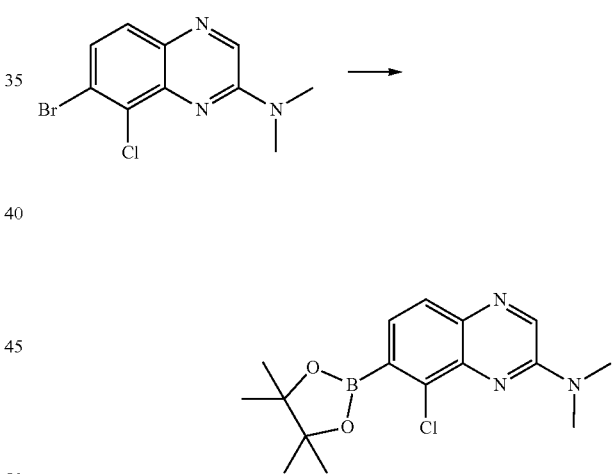

A suspension of bis-pinacolatodiboron (2.58 g, 10.16 mmol), 7-bromo-8-chloro-N,N-dimethylquinoxalin-2-amine (1.98 g, 6.77 mmol) and potassium acetate (1.994 g, 20.31 mmol) in 1,4-Dioxane (20 mL) was degassed using three evacuate/nitrogen backfill cycles. The reaction mixture was then treated with Pd(dppf)Cl$_2$ (0.495 g, 0.677 mmol) and the degassing cycle was repeated. The resultant red suspension was heated at 100° C. (internal temperature) for 1.5 h. The reaction mixture was cooled to room temperature then concentrated in vacuo. The crude product was purified by chromatography on silica gel (24 g cartridge, 0-100% DCM/iso-Hexane) to afford the title compound as a light yellow solid (790 mg). MS: [M+H]$^+$=334. $^1$H NMR (500 MHz, DMSO-d6) δ 8.77 (s, 1H), 7.75 (d, 1H), 7.46 (d, 1H), 3.32 (s, 6H), 1.35 (s, 12H).

The following boronates were made in a similar fashion

| Name | MS and NMR (DMSO-d$_6$,500 MHz) |
|---|---|
| 8-chloro-2-methoxy-7-(4,4,5,5-tetramethyl-1,3,2-dioxaborolan-2-yl)quinoxaline | MS: [M + H]$^+$ = 321<br>8.70 (s, 1H), 7.96 (d, 1H), 7.76 (d, 1H), 4.10 (s, 3H), 1.37 (s, 12H). |
| 4-chloro-2,3-dimethyl-5-(4,4,5,5-tetramethyl-1,3,2-dioxaborolan-2-yl)-2H-indazole | MS: [M + H]$^+$ = 307<br>7.42 (d, 1H), 7.35 (d, 1H), 4.06 (d, 3H), 2.83 (s, 3H), 1.32 (s, 12H). |
| 2-(azetidin-1-yl)-8-chloro-7-(4,4,5,5-tetramethyl-1,3,2-dioxaborolan-2-yl)quinoxaline | MS: [M + H]$^+$ = 346<br>8.37 (s, 1H), 7.76 (d, 1H), 7.48 (d, 1H), 4.27 (t, 4H), 2.44 (p, 2H), 1.35 (s, 12H). |
| 4-(8-chloro-7-(4,4,5,5-tetramethyl-1,3,2-dioxaborolan-2-yl)quinoxalin-2-yl)morpholine | MS: [M + H]$^+$ = 376<br>8.90 (s, 1H), 7.78 (d, 1H), 7.52 (d, 1H), 3.86-3.74 (m, 8H), 1.36 (s, 12H) |

Preparation 17:
3,4-Dichloro-2-methyl-2H-indazole-5-carbaldehyde

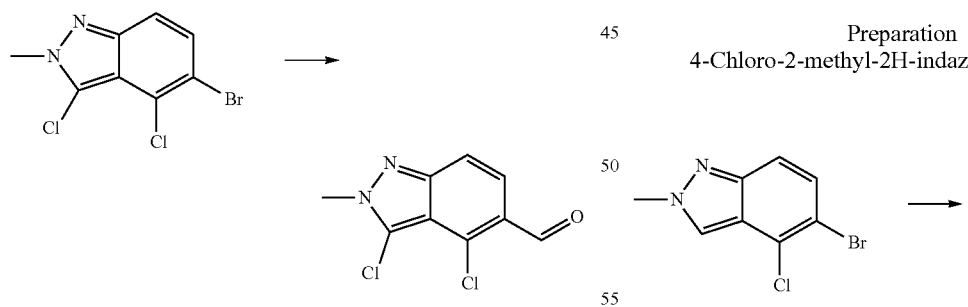

To a solution of 5-bromo-3,4-dichloro-2-methyl-indazole (10.0 g, 35.7 mmol) in THF (100 mL), isopropylmagnesium chloride-lithium chloride complex (1.3 mol/L in THF, 55 mL, 71.4 mmol) was added at 0° C., and then the mixture was stirred at 0° C. for 1 h. Then, DMF (11.0 mL, 143 mmol) was added at the same temp., and the mixture was stirred at 0° C. for 30 min, quenched with sat. NH$_4$Cl aq., and diluted with water. The mixture was extracted with EtOAc, washed with brine, dried over Na$_2$SO$_4$, filtered and then concentrated to give pale yellow solid. The crude product was suspended with EtOAc/heptane (1:1, 10 mL), and stirred at room temperature for 1 h. The precipitate was collected, washed with hexane, and dried at 50° C. for 3 h under reduced pressure to give the title compound (5.50 g). MS: [M+H]$^+$=229, 231

Preparation 18:
4-Chloro-2-methyl-2H-indazole-5-carbaldehyde

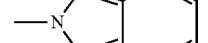

4-Chloro-2-methyl-2H-indazole-5-carbaldehyde was prepared from 5-bromo-4-chloro-2-methyl-2H-indazole using a similar procedure as in preparation 17 above. MS: [M+H]$^+$=195.

Preparation 19: (3,4-Dichloro-2-methyl-2H-indazol-5-yl)(3,5-dichloro-6-methylpyrazin-2-yl)methanol

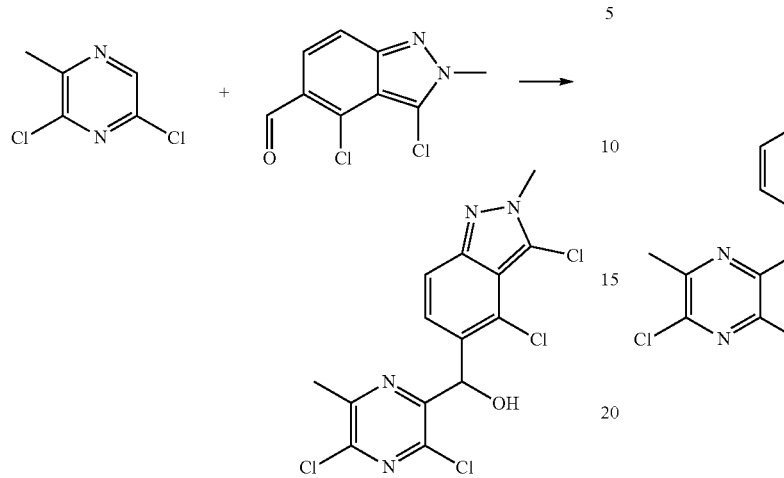

To a solution of 3,5-dichloro-2-methyl-pyrazine (391 mg, 2.40 mmol) in THF (5 mL), 2,2,6,6-tetramethylpiperidinyl-magnesium chloride lithium chloride complex (1 mol/L in THF, 2.88 mL, 2.88 mmol) was added at −60° C. After stirring for 45 min, 3,4-dichloro-2-methyl-indazole-5-carbaldehyde (500 mg, 2.18 mmol) was added to the mixture at the same temp., and then stirred at −60° C. for 10 min., then the mixture was stirred at RT for 30 min. After quenching with sat. NH$_4$Cl aq., the mixture was diluted with water, and extracted with EtOAc, washed with brine, dried over Na$_2$SO$_4$, filtered and then concentrated to give brown residue, which was purified by column chromatography on silica gel (EtOAc/hexane) to give the title compound (510 mg) as a pale yellow amorphous. MS: [M+H]$^+$=391, 393.

Preparation 20: (4-Chloro-2-methyl-2H-indazol-5-yl)(3,5-dichloro-6-methylpyrazin-2-yl)methanol

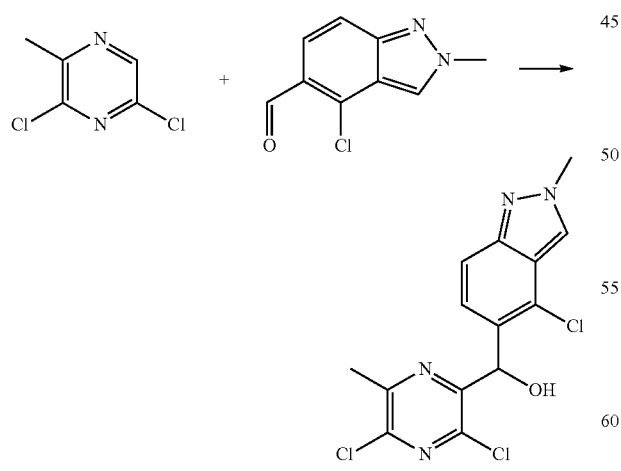

The title compound was prepared from 4-chloro-2-methyl-indazole-5-carbaldehyde and 3,5-dichloro-2-methyl-pyrazine using a similar procedure as in preparation 19 above. MS: [M+H]$^+$=357.

Preparation 21: 3,4-Dichloro-5-(3,5-dichloro-6-methylpyrazine-2-carbonyl)-2-methyl-2H-indazole

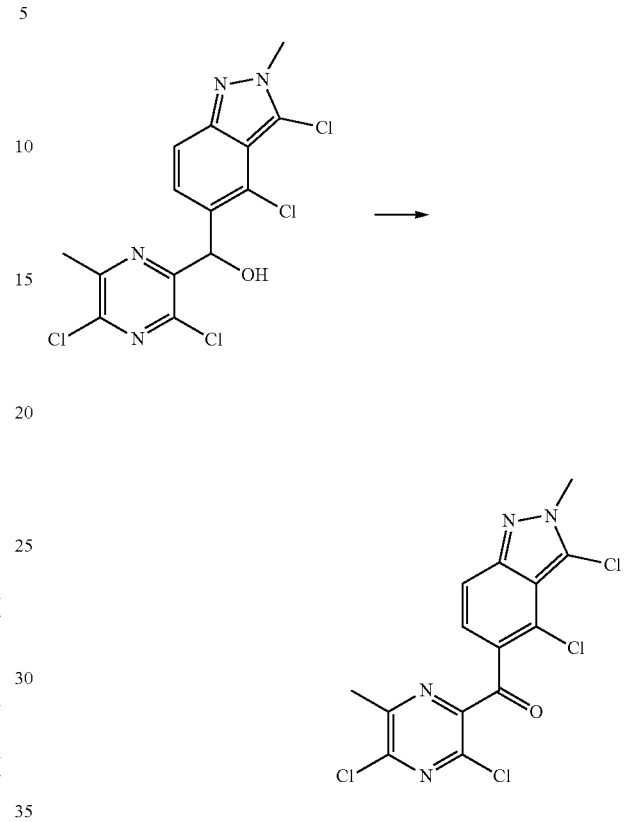

Manganese (IV) oxide (1.93 g, 19.5 mmol) was added to a solution of (3,4-dichloro-2-methyl-indazol-5-yl)-(3,5-dichloro-6-methyl-pyrazin-2-yl)methanol (510 mg, 1.301 mmol) in chloroform (10.2 mL) at RT. The mixture was stirred at RT for 6 h. Additional manganese (IV) oxide (1.93 g, 19.5 mmol) was added to the reaction mixture. The mixture was stirred at RT for 18 h. After filtration, the filtrate was concentrated to give pale yellow solid, which was suspended in hexane, collected by filtration, dried under vacuum at 50° C. to give the title compound (490 mg). MS: [M+H]$^+$=389, 391.

Preparation 22: 4-Chloro-5-(3,5-dichloro-6-methylpyrazine-2-carbonyl)-2-methyl-2H-indazole

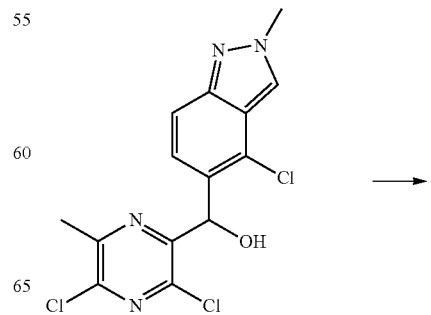

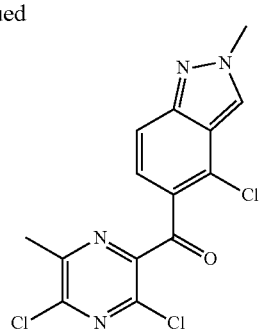

To a stirred solution of (4-chloro-2-methyl-2H-indazol-5-yl)(3,5-dichloro-6-methylpyrazin-2-yl)methanol (0.32 g, 0.895 mmol) in DCM (8.95 mL) at RT was added manganese (IV) oxide (1.56 g, 17.9 mmol). The suspension was stirred overnight before it was filtered, washing with DCM (3×) and concentrated, to give the title compound (0.231 g) which was used without further purification, MS: [M+H]$^+$=355.

Preparation 23:
(S)-2-oxa-8-azaspiro[4.5]decan-4-amine

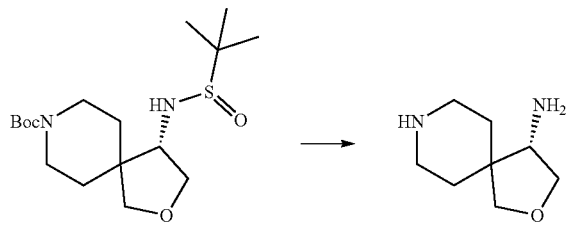 [SMILES: CC(C)(C)OC(=O)N1CCC2(CC1)COC[C@H]2NS(=O)C(C)(C)C ; N[C@@H]1COCC12CCNCC2]

To a solution of tert-butyl (4S)-4-((tert-butylsulfinyl)amino)-2-oxa-8-azaspiro[4.5]decane-8-carboxylate (0.10 g, 0.28 mmol) prepared by the method as described in WO2016203405 in MeOH (1 mL) was added 4 M HCl in 1,4-dioxane (0.70 mL, 2.8 mmol) at RT. The mixture was stirred at 50° C. for 30 min, cooled to RT. The volatiles were removed under reduced pressure, the residue was azeotroped with toluene and the resulting crude (S)-2-oxa-8-azaspiro[4.5]decan-4-amine salt was used without further purification. MS: [M+H]$^+$=157.

Preparation 24: (1R)-8-Azaspiro[4.5]decan-1-amine

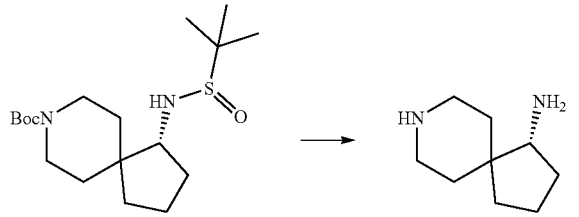 [SMILES: CC(C)(C)OC(=O)N1CCC2(CCC[C@H]2NS(=O)C(C)(C)C)CC1 ; N[C@@H]1CCCC12CCNCC2]

tert-Butyl (1R)-1-((tert-butylsulfinyl)amino)-8-azaspiro[4.5]decane-8-carboxylate prepared by the method as described in WO2016203405 was deprotected using a similar procedure as in Preparation 23. The resulting (1R)-8-azaspiro[4.5]decan-1-amine bis hydrochloride salt was used without further purification.

Preparation 25: (3S,4S)-3-Methyl-2-oxa-8-azaspiro[4.5]decan-4-amine hydrochloride

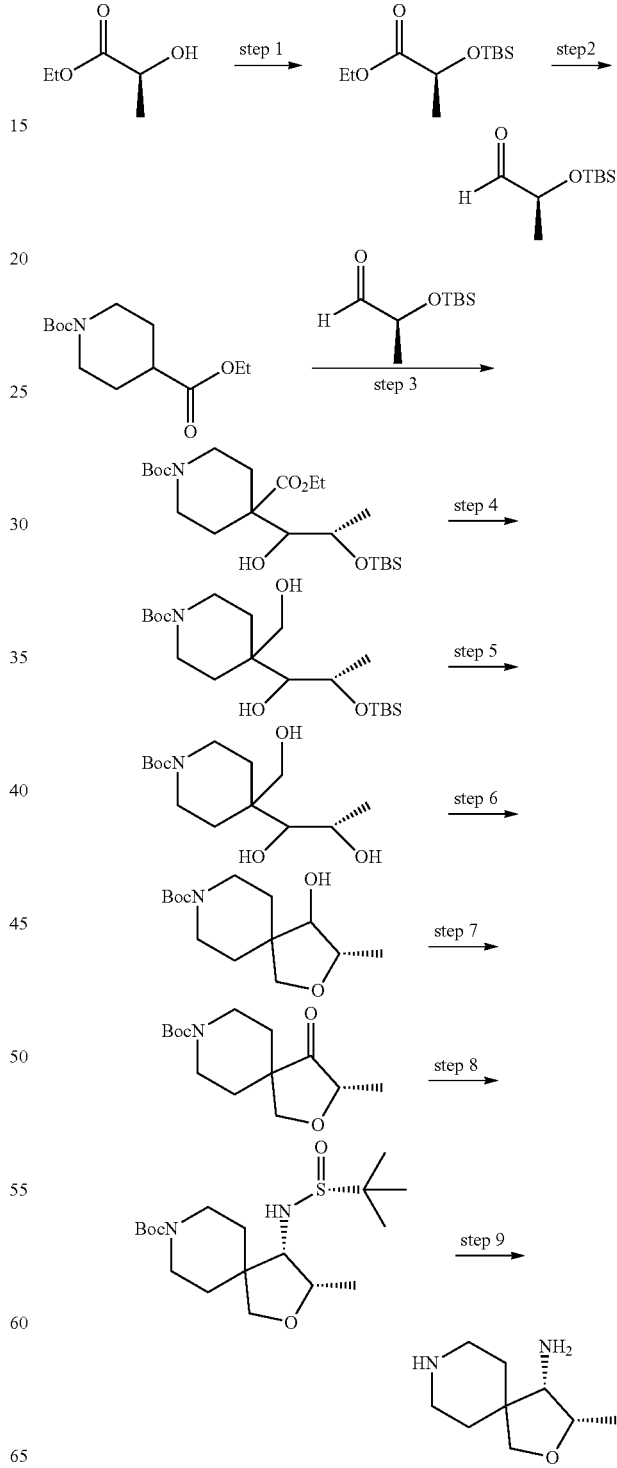

Step 1: Ethyl (2S)-2-[(tert-butyldimethylsilyl)oxy]propanoate

The reaction mixture of ethyl (2S)-2-hydroxypropanoate (95.0 g, 0.8 mol) in DCM (1 L) was cooled to 0° C., then imidazole (81.6 g, 1.2 mol) and TBSCl (133.3 g, 0.88 mol) were added, stirred at ambient temperature for about 1.5 h. The reaction mixture was poured into water (1.0 L), extracted with DCM (2×500 mL), then washed with brine, dried over $Na_2SO_4$, concentrated in vacuo, purified by silica column (pet.ether/EtOAc=50/1 to 20/1) to give the product (180.0 g, 97%) as a colourless oil. $^1H$ NMR (500 MHz, $CDCl_3$) δ: 4.33 (s, 1H), 4.22 (s, 2H), 1.44 (d, J=6.7 Hz, 3H), 1.32 (t, J=7.1 Hz, 3H), 0.97 (s, 9H), 0.15 (s, 6H).

Step 2: (2S)-2-[(tert-Butyldimethylsilyl)oxy]propanal

A solution of ethyl (2S)-2-[(tert-butyldimethylsilyl)oxy]propanoate (131.0 g, 0.56 mol) in toluene (800 mL) was cooled to −60° C., DIBAL-H (1.5 M, 560 mL, 0.85 mol) was dropwise added, then stirred at −60° C. for 2 h. The reaction mixture was poured into water (800 mL), extracted with EtOAc (2×500 mL), washed with brine, dried over $Na_2SO_4$, concentrated in vacuo to give the crude product. It was used in the next step without purification.

Step 3: 1-tert-Butyl 4-ethyl 4-[(2S)-2-[(tert-butyldimethylsilyl)oxy]-1-hydroxypropyl]piperidine-1,4-dicarboxylate A solution of diisopropylamine (65.0 g, 0.64 mol) in THF (400 mL) was cooled to −20° C. n-BuLi (2.5 M, 224 mL, 0.56 mol) was added dropwise, then stirred at −10° C. for 1 h. 1-tert-Butyl 4-ethyl piperidine-1,4-dicarboxylate (110.0 g, 0.43 mol) in THF (200 mL) was added dropwise at −10° C., then stirred at −10° C. to ambient temperature for 1 h under $N_2$. (2S)-2-[(tert-Butyldimethylsilyl)oxy]propanal (120.0 g, 0.64 mol) in THF (200 mL) was added dropwise at −10° C., then stirred at −10° C. to 0° C. for 2 h. The reaction mixture was poured into sat. $NH_4Cl$ (1 L), extracted with EtOAc (2×500 mL), the combined EtOAc phase was washed with brine, dried over $Na_2SO_4$, concentrated in vacuo, purified by silica column (pet.ether/EtOAc=50/1 to 30/1 to 20/1) to give the product (70.0 g, 37%) as a yellow oil. $^1H$ NMR (400 MHz, $CDCl_3$) δ: 4.29-4.09 (m, 2H), 4.06-3.88 (m, 2H), 3.79 (d, 1H), 3.60-3.48 (m, 1H), 2.78 (s, 2H), 2.66-2.25 (m, 1H), 2.24-1.94 (m, 2H), 1.74 (m, 2H), 1.50-1.37 (m, 9H), 1.34-1.18 (m, 5H), 1.12 (d, 3H), 0.91 (s, 10H), 0.04 (s, 6H).

Step 4: tert-Butyl 4-[(2S)-2-[(tert-butyldimethylsilyl)oxy]-1-hydroxypropyl]-4-(hydroxymethyl)piperidine-1-carboxylate To the solution of 1-tert-butyl 4-ethyl 4-[(2S)-2-[(tert-butyldimethylsilyl)oxy]-1-hydroxypropyl]piperidine-1,4-dicarboxylate (70.0 g, 0.157 mol) in THF (700 mL) was added $LiBH_4$ (2 M, 118 mL, 0.236 mol) at 0° C., then stirred at ambient temperature overnight. The mixture was poured into water (500 mL), stirred at ambient temperature for 20 min, extracted with EtOAc (2×300 mL), washed with brine, dried over $Na_2SO_4$, concentrated in vacuo to give the crude product (60.0 g). It was used in the next step without purification.

Step 5: tert-Butyl 4-[(2S)-1,2-dihydroxypropyl]-4-(hydroxymethyl)piperidine-1-carboxylate To a cooled (0° C.) solution of tert-butyl 4-[(2S)-2-[(tert-butyldimethylsilyl)oxy]-1-hydroxypropyl]-4-(hydroxymethyl)piperidine-1-carboxylate (60.0 g, 0.149 mol) in THF (600 mL), TBAF (1 M, 223 mL, 0.223 mol) was added, and stirred at ambient temperature for 2 h. $NaHCO_3$ (aq. 600 mL) was added, stirred at ambient temperature for 10 min, extracted with EtOAc (2×300 mL), washed with brine, dried over $Na_2SO_4$, concentrated in vacuo, purified by silica column (DCM/MeOH=100/1 to 50/1 to 30/1) to give the product (37.0 g, 86%) as a yellow oil. $^1H$ NMR (400 MHz, $CDCl_3$) δ: 4.02-3.87 (m, 1H), 3.74 (m, 4H), 3.36 (d, 4H), 3.10 (s, 2H), 1.66 (s, 3H), 1.40 (s, 10H), 1.31 (s, 3H).

Step 6: tert-Butyl (3S)-4-hydroxy-3-methyl-2-oxa-8-azaspiro[4.5]decane-8-carboxylate To an ice cooled solution of tert-butyl 4-[(2S)-1,2-dihydroxypropyl]-4-(hydroxymethyl)piperidine-1-carboxylate (37.0 g, 0.127 mol) in THF (400 mL) was added NaH (17.8 g, 0.44 mol) in portions, then a solution of TsCl (25.5 g, 0.134 mol) in THF (200 mL) was added and the reaction mixture was stirred at 0° C. for 2 h. The reaction mixture was poured into ice and $NH_4Cl$ (aq. 600 mL), extracted with EtOAc (3×400 mL), washed with brine, dried over $Na_2SO_4$, concentrated in vacuo, purified by silica column (DCM/MeOH=100/1 to 50/1 to 30/1) to give the product (20.0 g, 58%) as a yellow oil. $^1H$ NMR (400 MHz, $CDCl_3$) δ: 3.94-3.57 (m, 4H), 3.45 (d, 1H), 2.96 (s, 2H), 1.70 (s, 3H), 1.42 (s, 10H), 1.29 (m, 4H).

Step 7: tert-Butyl (3S)-3-methyl-4-oxo-2-oxa-8-azaspiro[4.5]decane-8-carboxylate To an ice cooled solution of tert-butyl (3S)-4-hydroxy-3-methyl-2-oxa-8-azaspiro[4.5]decane-8-carboxylate (20.0 g, 0.074 mol) in DCM (200 mL) was added DMP (37.5 g, 0.088 mol) in portions. The reaction mixture was stirred at ambient temperature for 1 h, poured into $NaHCO_3$ (aq.), extracted with DCM, washed with brine, dried over $Na_2SO_4$, concentrated in vacuo to give the product (19.0 g, 95%) as a yellow oil. It was used in the next step directly.

Step 8: tert-Butyl (3S,4S)-3-methyl-4-[(2-methylpropane-2-sulfinyl)amino]-2-oxa-8-azaspiro[4.5]decane-8-carboxylate To the solution of tert-butyl (3S)-3-methyl-4-oxo-2-oxa-8-azaspiro[4.5]decane-8-carboxylate (11.0 g, 0.04 mol) in THF (250 mL) was added (R)-2-methylpropane-2-sulfinamide (9.9 g, 0.08 mol), $Ti(OEt)_4$ (36.5 g, 0.16 mol) and the reaction mixture was stirred at 75° C. for overnight. The reaction mixture was cooled to −10° C., $LiBH_4$ (2 M, 30 mL, 0.06 mol) was dropwise added, then stirred at −10° C. for 1 h. The reaction mixture was poured into ice and $NH_4Cl$ (aq. 300 mL) and EtOAc (300 mL), stirred at ambient temperature for 20 min, then filtered through celite. The reaction mixture was extracted with EtOAc (2×300 mL), washed with brine, dried over $Na_2SO_4$, concentrated in vacuo, purified by silica column (pet. ether/EtOAc=10/1 to 5/1 to 3/1 to 2/1) to give the product (7.0 g, 47%). $^1H$ NMR (400 MHz, DMSO-$d_6$) δ: 5.07 (d, J=11.0 Hz, 1H), 4.06 (s, 1H), 3.74 (m, 3H), 3.37 (d, 3H), 2.84 (s, 2H), 1.69-1.50 (m, 2H), 1.39 (s, 11H), 1.15 (s, 9H), 1.06 (m, 3H).

Step 9: (3S,4S)-3-Methyl-2-oxa-8-azaspiro[4.5]decan-4-amine hydrochloride

To the solution of tert-butyl (3S,4S)-3-methyl-4-[(2-methylpropane-2-sulfinyl)amino]-2-oxa-8-azaspiro[4.5]decane-8-carboxylate (5.8 g, 15.5 mmol) in MeOH (20 mL) was added HCl/dioxane (4M, 39 mL, 155 mmol), then stirred at 50° C. for 2 h. The reaction mixture was cooled to ambient temperature and concentrated in vacuo. The crude product was dissolved in water (50 mL), extracted with EtOAc (3×40 mL). The aqueous phase was freeze dried to give the HCl salt of the product (4.0 g) as a yellow solid. MS: [M+H]$^+$=171. $^1$H NMR (400 MHz, DMSO-d6) δ: 4.44 (m, 1H), 4.05-3.88 (m, 2H), 3.67 (s, 1H), 3.58-3.39 (m, 2H), 3.22-3.01 (m, 2H), 1.98 (m, 4H), 1.34 (s, 3H).

Preparation 26: tert-Butyl 1-oxo-8-azaspiro[4.5]dec-2-ene-8-carboxylate

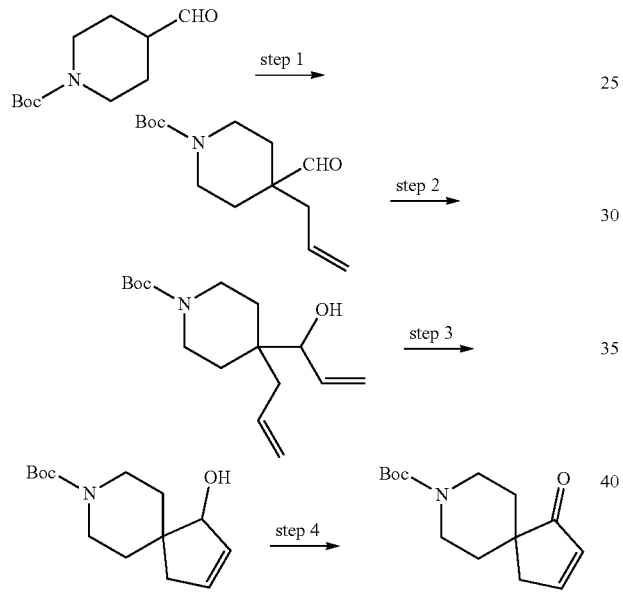

Step 1: tert-Butyl 4-formyl-4-(prop-2-en-1-yl)piperidine-1-carboxylate

The reaction mixture of tert-butyl 4-formylpiperidine-1-carboxylate (1200.0 g, 5.63 mol) in THF (10 L) was cooled to −25° C., then allylbromide (816.5 g, 6.75 mol) was added, followed by t-BuOK (757.8 g, 6.75 mol) in portions. The reaction mixture was stirred at −25° C.~−15° C. for about 45 min, then poured into ice NH$_4$Cl (aq. 8 L), extracted with EtOAc, washed by brine, dried over Na$_2$SO$_4$ and concentrated in vacuo. The crude product was purified by silica column (pet.ether/EtOAc=50/1 to 20/1 to 10/1) to give the title compound (920.0 g, 64.5%) as colorless oil. $^1$H NMR (CDCl$_3$): 9.49 (1H, s), 5.63 (1H, m), 5.09 (2H, m), 3.79 (2H, m), 2.96 (2H, m), 2.23 (2H, d), 1.93 (2H, m), 1.44 (10H, m).

Step 2: tert-Butyl 4-(1-hydroxyprop-2-en-1-yl)-4-(prop-2-en-1-yl)piperidine-1-carboxylate A solution of tert-butyl 4-formyl-4-(prop-2-en-1-yl)piperidine-1-carboxylate (400.0 g, 1.58 mol) in THF (4 L) was cooled to −60° C., vinyl-magnesium bromide (1.90 L, 1.90 mol) was added, then stirred at room temperature for 1 h. The mixture was poured into NH$_4$Cl (aq., 5 L), extracted with EtOAc, washed by brine, dried over Na$_2$SO$_4$, concentrated in vacuo to give the product (426.0 g, 95.8%) as brown oil.
$^1$H NMR (CDCl$_3$): 5.93 (2H, m), 5.24 (2H, m), 5.07 (2H, t), 4.00 91H, d), 3.69 (2H, m), 3.12 (2H, m), 2.30 (1H, m), 2.19 (1H, m), 1.74 (1H, m), 1.60-1.53 (2H, m) 1.49 (11H, m).

Step 3: tert-Butyl 1-hydroxy-8-azaspiro[4.5]dec-2-ene-8-carboxylate

To the solution of ted-butyl 4-(1-hydroxyprop-2-en-1-yl)-4-(prop-2-en-1-yl)piperidine-1-carboxylate (10.0 g, 35.3 mmol) in toluene (150 mL) was added GrubbsII (0.91 g, 1.07 mmol) and the reaction was stirred at 90° C. for 7 h. The mixture was purified by silica column (pet. ether/EtOAc=20/1 to 10/1 to 5/1) to give the desired product (7.1 g, 78.9%) as a brown oil.
$^1$H NMR (CDCl$_3$): 5.92 (1H, m), 5.83 (1H, m), 4.30 (1 h, s), 3.58 (2H, m), 3.16 (2H, m), 2.22 (2H, dd), 1.74 (2H, m), 1.46-1.76 (12H, m).

Step 4: tert-Butyl 1-oxo-8-azaspiro[4.5]dec-2-ene-8-carboxylate

A solution of tert-butyl 1-hydroxy-8-azaspiro[4.5]dec-2-ene-8-carboxylate (100.0 g, 0.39 mol) in DCM (600 mL) was cooled to 0° C., then Dess Martin (184 g, 0.43 mol) was added and the mixture was stirred at RT for 1 h. The reaction mixture was poured into NaHCO$_3$ (1.8 L) and NaHSO$_3$ (1.5 L), extracted with DCM, the combined DCM phases were washed with brine, dried over Na$_2$SO$_4$, concentrated in vacuo to give the crude product. The crude product was poured into pet.ether/EtOAc=4:1 and stirred for overnight, filtered and concentrated in vacuo to give the title compound (57.6 g, 58%) as a pale red solid. $^1$H NMR (CDCl$_3$): 7.6 (1H, m), 6.18 (1H, m), 4.09 (2H, br s), 2.90 (2H, m), 2.61 (2H, s), 1.77 (2H, m), 1.46 (9H, s), 1.27 (2H, d).

Preparation 27: tert-Butyl (1R)-1-{[(tert-butoxy)carbonyl]amino}-3,3-difluoro-8-azaspiro[4.5]decane-8-carboxylate

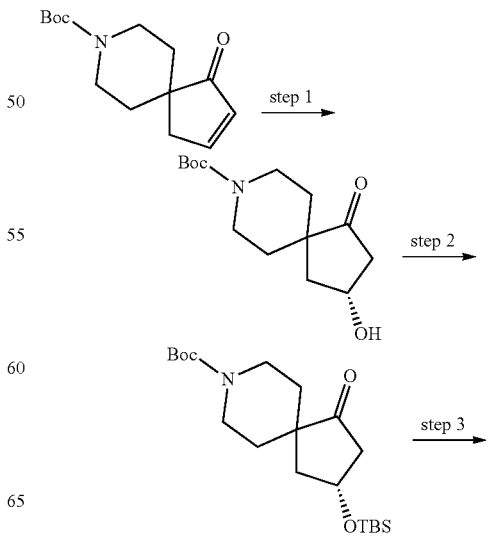

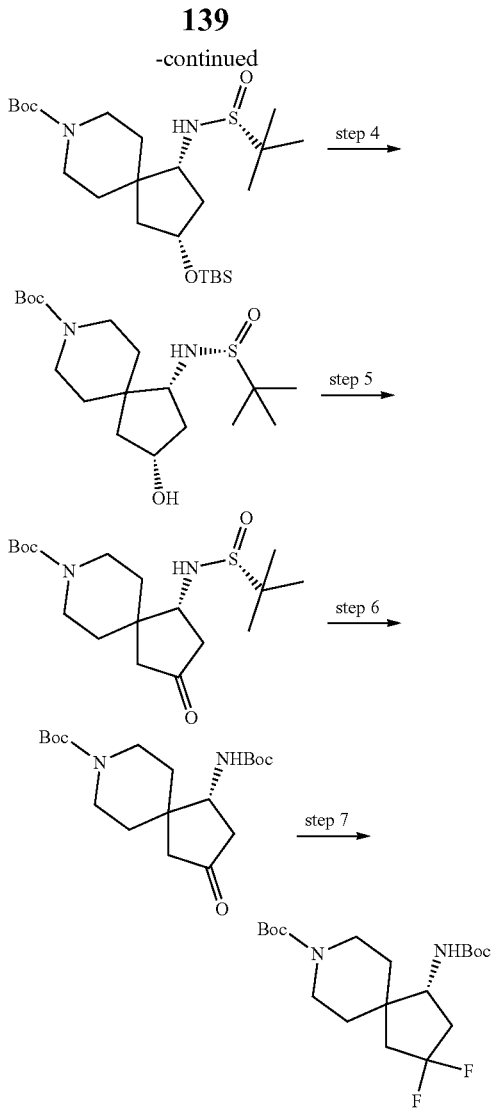

¹H NMR (CDCl₃): 4.62 (1H, m), 3.89 (2H, m), 3.03 (2H, m), 2.63 (1H, dd), 2.43 (1H, dd), 2.10 (1H, m), 1.63 (3H, m), 1.45 (9H, s), 1.30 (3H, m).

Step 2: tert-Butyl (3R)-3-[(tert-butyldimethylsilyl) oxy]-1-oxo-8-azaspiro[4.5]decane-8-carboxylate To a solution of tert-butyl (3R)-3-hydroxy-1-oxo-8-azaspiro[4.5]decane-8-carboxylate (100.0 g, 0.37 mol) in DMF (900 mL) was added imidazole (37.9 g, 0.56 mol), TBSCl (67.2 g, 0.46 mol) and the reaction mixture was stirred at room temperature overnight. The reaction mixture was poured into water (5 L), extracted with EtOAc, washed with brine, dried over Na₂SO₄, concentrated in vacuo, purified by silica column (pet. ether/EtOAc=20/1 to 10/1 to 3/1) to give the product (118.7 g, 79.4%) as a yellow oil.

¹H NMR (CDCl₃): 4.44 (1H, m), 3.83 (2H, d), 2.95 (2H, m), 2.31 (1H, dd), 2.27 (1H, dd), 2.03 (2H, m), 1.93 (1H, m), 1.71 (1H, m), 1.40 (9H, s), 1.21 (2H, m), 0.82 (9H, s), 0.03 (9H, s).

Step 3: tert-Butyl (1R,3R)-3-[(tert-butyldimethylsilyl)oxy]-1-[(2-methylpropane-2-sulfinyl)amino]-8-azaspiro[4.5]decane-8-carboxylate To a solution of ted-butyl (3R)-3-[(tert-butyldimethylsilyl)oxy]-1-oxo-8-azaspiro[4.5]decane-8-carboxylate (120.0 g, 0.31 mol) in THF (2 L) were added sulfinamide (75.8 g, 0.61 mol), Ti (OEt)₄ (285.4 g, 1.25 mol) and the reaction mixture was stirred at 65° C. overnight. The reaction mixture was cooled to −60° C., LiBH₄ (940 mL, 0.94 mol) was added dropwise and stirred at −60° C. for 3 h. The reaction mixture was poured into NH₄Cl (aq.), extracted with EtOAc, washed with brine, dried over Na₂SO₄, concentrated in vacuo, purified by silica column (pet.ether/EtOAc=10/1 to 5/1 to 3/1) to give the product (59.7 g, 39%) as a yellow oil. ¹H NMR (CDCl₃): 4.29 (1H, m), 3.90 (2H, d), 3.76 (1H, m), 3.30 (1H, m), 3.02 (2H, m), 2.33 (1H, m), 1.60-1.80 (7H, m), 1.44 (9H, s), 1.20 (9H, s), 0.86 (9H, s), 0.034 (6H, s).

Step 4: tert-Butyl (1R,3R)-3-hydroxy-1-[(2-methylpropane-2-sulfinyl)amino]-8-azaspiro[4.5]decane-8-carboxylate To a solution of tert-butyl (1R,3R)-3-[(tert-butyldimethylsilyl)oxy]-1-[(2-methylpropane-2-sulfinyl)amino]-8-azaspiro[4.5]decane-8-carboxylate (38.0 g, 77.74 mmol) in THF (230 mL) was added TBAF (155.5 mL, 155.5 mmol) and the reaction mixture was stirred at room temperature for 3 h. The reaction mixture was poured into water, extracted with EtOAc, washed with brine, dried over Na₂SO₄, concentrated in vacuo, purified by silica column (DCM/MeOH=50/1 to 30/1 to 20/1) to give the desired product (26.1 g, 89.7%) as a brown oil. ¹H NMR (DMSO-d₆): 5.06 (1H, m), 4.68 (1H, d), 4.03 (1H, m), 3.78 (2H, m), 3.06 (1H, m), 2.73 (2H, m), 2.15 (1H, m), 1.61 (4H, m), 1.39 (10H, m), 1.26 (2H, m), 1.20 (9H, s).

Step 5: tert-Butyl (1R)-1-[(2-methylpropane-2-sulfinyl)amino]-3-oxo-8-azaspiro[4.5]decane-8-carboxylate To the solution of tert-butyl (1R,3R)-3-hydroxy-1-[(2-methylpropane-2-sulfinyl)amino]-8-azaspiro[4.5]decane-8-carboxylate (23.3 g, 0.062 mol) in DCM (500 mL) was added Dess-Martin (39.6 g, 0.093 mol) at 0° C. and the mixture was stirred at 0° C. for 2 h. The reaction mixture was Step 1: tert-Butyl (3R)-3-hydroxy-1-oxo-8-azaspiro[4.5]decane-8-carboxylate The reaction was performed in three batches.

A mixture of CuCl (0.59 g, 6.0 mmol), (S)-Tol-BINAP (4.05 g, 6.0 mmol), t-BuONa (0.57 g, 6.0 mmol) in THF (450 mL) was stirred at room temperature for 30 min. B2pin2 (55.6 g, 0.22 mol) in THF (250 mL) was added, stirred at room temperature for 15 min. tert-Butyl 1-oxo-8-azaspiro[4.5]dec-2-ene-8-carboxylate (50.0 g, 0.2 mol) in THF (250 mL) and MeOH (12.7 g, 0.4 mol) were added and the reaction mixture was stirred at room temperature overnight. Water (1 L) and NaBO₃ (153.1 g, 0.99 mol) were added and the reaction mixture was stirred at RT for 1 h. The three batches were combined, filtered, extracted with EtOAc, washed with brine, dried over Na₂SO₄, concentrated in vacuo to get the crude product. The crude product was suspended in EtOAc and stirred at 0° C. for 1 h, filtered and dried to give a part of the product (79.3 g). The filtrate was concentrated in vacuo, purified by silica column (pet.ether/EtOAc=20/1 to 10/1 to 3/1) to give the another part of the product (37.5 g) as a white solid.

quenched with sat.aq NaHCO₃, filtered through Celite. The filtrate was extracted with DCM, the combined organic layers were washed with brine, dried over Na₂SO₄ and concentrated in vacuo. The resulting residue was purified by silica column (CH₂Cl₂/MeOH=50/1 to 40/1 to 30/1 v/v) to give the product (21.44 g, 92.4%) as a yellow oil.

Step 6: tert-Butyl (1R)-1-{[(tert-butoxy)carbonyl] amino}-3-oxo-8-azaspiro[4.5]decane-8-carboxylate To the solution of tert-butyl (1R)-1-[(2-methylpropane-2-sulfinyl)amino]-3-oxo-8-azaspiro[4.5]decane-8-carboxylate (10.00 g, 0.027 mol) in dioxane (200 mL) was added HCl (6 M in dioxane, 200 mL) at room temperature, then the mixture was stirred at room temperature for 3 h. The reaction mixture was neutralized with solid NaHCO₃ to PH=9, Boc₂O (23.44 g, 0.11 mol) was added. The mixture was stirred at RT while maintain the PH≥9. The mixture was quenched with sat.aq NaHCO₃, filtered through Celite. The filtrate was extracted with DCM, the combined organic layers were washed with brine, dried over Na₂SO₄, concentrated in vacuo. The residue was purified by silica column (DCM/MeOH=50/1 to 40/1 to 30/1) to give the product (21.44 g, 92.4%) as a yellow oil.

Step 7: tert-Butyl (1R)-1-{[(tert-butoxy)carbonyl] amino}-3,3-difluoro-8-azaspiro[4.5]decane-8-carboxylate To the solution of tert-butyl (1R)-1-{[(tert-butoxy)carbonyl]amino}-3-oxo-8-azaspiro[4.5]decane-8-carboxylate (1.00 g, 2.71 mmol) in DCM (20 mL) was added Deoxo Fluor (2.40 g, 10.85 mmol) at 0° C., then the mixture was allowed to warm to RT and then was stirred at 50° C. overnight. The mixture was quenched with sat.aq NaHCO₃ in ice water bath, extracted with EtOAc, the combined organic layers were washed with brine, dried over Na₂SO₄, concentrated in vacuo. The resulting residue was purified by silica column (pet. ether/EtOAc=20/1 to 15/1 to 10/1 v/v) to give the product (600.0 mg, 56.6%) as a white solid. $^1$H NMR (CDCl₃): 4.55 (1H, d), 4.01-3.93 (3H, m), 2.85 (2H, d), 2.56 (1H, m), 2.26 (1H, m), 2.02 (2H, m), 1.66 (1H, m), 1.44 (21H, s). $^{19}$F NMR (CDCl₃): −86.45 (d).

Preparation 28: (1R)-4,4-Difluoro-8-azaspiro[4.5]decan-1-amine

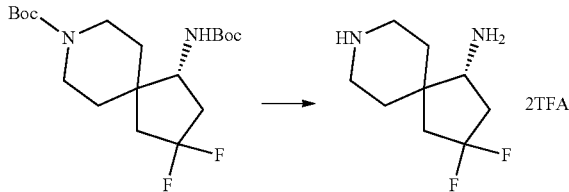 [SMILES: CC(C)(C)OC(=O)N[C@@H]1CC(F)(F)CC12CCN(C(=O)OC(C)(C)C)CC2 ; N[C@@H]1CC(F)(F)CC12CCNCC2]

To a solution of tert-butyl (1R)-1-{[(tert-butoxy)carbonyl]amino}-3,3-difluoro-8-azaspiro[4.5]decane-8-carboxylate (543 mg, 1.39 mmol) in DCM (4 mL) was added TFA (4 mL) and the solution was stirred overnight. The solvent was evaporated to afford the bis-TFA salt of the title compound which was used without further purification. $^1$H NMR (400 MHz, Me-d3-OD): 3.69 (1H, t), 3.54-3.36 (2H, m), 3.22-3.08 (2H, m), 2.93-2.77 (1H, m), 2.69-2.53 (1H, m), 2.52-2.35 (2H, m), 2.15-2.03 (1H, m), 1.97-1.77 (3H, m).

Preparation 29: tert-Butyl N-[(1R,3R)-3-(trifluoromethyl)-8-azaspiro[4.5]decan-1-yl]carbamate

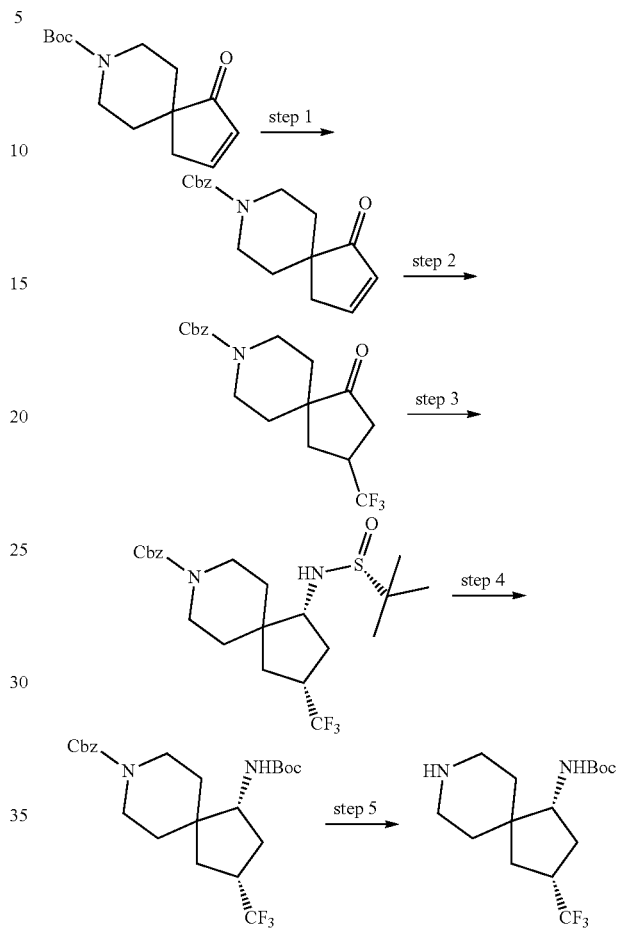

Step 1: Benzyl 1-oxo-8-azaspiro[4.5]dec-2-ene-8-carboxylate

To the mixture of tert-butyl 1-oxo-8-azaspiro[4.5]dec-2-ene-8-carboxylate (30.0 g, 0.20 mol) in DCM (1000 mL) was added TFA (150 mL), then the mixture was stirred at RT overnight. The mixture was concentrated in vacuo to give the impure intermediate which was used in next step directly. To the mixture of the impure intermediate in THF (100 mL) and H₂O (400 mL) was added NaHCO₃ (50.4 g, 0.60 mol) to adjust PH of the solution to 8-9. The mixture was cooled to 0° C. and the solution of Cbz-Cl (51.2 g, 0.30 mol) in THF (100 mL) was added dropwise. The reaction mixture was allowed to warm to r.t after the addition was completed with stirring for overnight. The reaction mixture was extracted with EtOAc and the combined organic layers were washed with brine, dried over Na₂SO₄, concentrated in vacuo. The resulting residue was purified by silica column (pet. ether/EtOAc=10/1 to 2/1) to give the product (49.5 g, 87.5%) as a brown oil.

Step 2: Benzyl 1-oxo-3-(trifluoromethyl)-8-azaspiro[4.5]decane-8-carboxylate

A solution of benzyl 1-oxo-8-azaspiro[4.5]dec-2-ene-8-carboxylate (10.8 g, 37.9 mmol) in THF (150 mL) was cooled to 0° C., then trimethyl(trifluoromethyl)silane (6.5 g, 45.4 mmol), TBAF (0.76 mL, 0.76 mmol) were added. The mixture was stirred at 0° C. for 1.5 h. The mixture was quenched with 2M aqueous HCl (40 mL) at 0° C. The solution was diluted with sat.aq NH₄Cl and extracted with EtOAc, the combined organic layers were washed with brine, dried over Na₂SO₄, concentrated in vacuo. The resulting residue was purified by silica column (pet. ether/EtOAc=10/1 to 3/1) to give the product (4.4 g, 32.6%) as a yellow oil.

Step 3: Benzyl (1R,3R)-1-[(2-methylpropane-2-sulfinyl)amino]-3-(trifluoromethyl)-8-azaspiro[4.5]decane-8-carboxylate A solution of benzyl 1-oxo-3-(trifluoromethyl)-8-azaspiro[4.5]decane-8-carboxylate (19.0 g, 0.05 mol), (R)-tert-butanesulfinamide (13.0 g, 0.11 mol) and Ti(OEt)₄ (48.78 g, 0.21 mol) in THF (400 mL) was stirred at 80° C. for 16 h. The reaction mixture was cooled to −78° C., MeOH (86 mL) and LiBH₄ (2M in THF; 160 mL) were added. The reaction mixture was allowed to warm to RT with stirring. The mixture was quenched with sat.aq NH₄C₁, filtered through Celite. The filtrate was extracted with EtOAc, the combined organic layers were washed with brine, dried over Na₂SO₄, concentrated in vacuo. The resulting residue was purified by silica column (pet. ether/EtOAc=10/1 to 1/1) to give the product (14.68 g, 59.7%) as a white solid.

Step 4: Benzyl (1R,3R)-1-{[(tert-butoxy)carbonyl]amino}-3-(trifluoromethyl)-8-azaspiro[4.5]decane-8-carboxylate To a solution of benzyl (1R,3R)-1-{[(tert-butoxy)carbonyl]amino}-3-(trifluoromethyl)-8-azaspiro[4.5]decane-8-carboxylate (15.2 g, 0.033 mol) in MeOH (130 mL) was added HCl in dioxane (6M, 15 mL). The mixture was stirred at RT for 1 h. Then the reaction mixture was concentrated in vacuo. The resulting residue was dissolved in DCM, DIPEA (21.32 g, 0.165 mol) and Boc₂O (10.8 g, 0.050 mol) were added. The reaction mixture was stirred at ambient temperature for 72 h. The mixture was quenched with sat.aq NH₄C₁, extracted with DCM, the combined organic layers were washed with brine, dried over Na₂SO₄, concentrated in vacuo. The resulting residue was purified by silica column (pet. ether/EtOAc=15/1 to 6/1) to give the product (6.27 g, 41.5%) as a white solid.

Step 5: tert-Butyl N-[(1R,3R)-3-(trifluoromethyl)-8-azaspiro[4.5]decan-1-yl]carbamate To a solution of benzyl (1R,3R)-1-{[(tert-butoxy)carbonyl]amino}-3-(trifluoromethyl)-8-azaspiro[4.5]decane-8-carboxylate (3.0 g, 6.57 mmol) in EtOH (120 mL) was added in 10% Pd/C (1.0 g) and the reaction mixture was stirred at RT for 12 h under H₂ balloon. The mixture was filtered through Celite, the filtrate was concentrated in vacuo to give the product (2.09 g, 98.6%) as a white solid. MS: [M+H]⁺=323. ¹H NMR (CDCl₃): 4.51 (1H, d), 3.82 (1H, m), 3.00 (2H, br s), 2.70 (2H, m), 2.52 (1H, m), 2.03 (2H, br s), 1.75 (2H, m), 1.60 (2H, m), 1.44-1.25 (12H, m). ¹⁹F NMR (CDCl₃): −71.41.

Preparation 30: (1R,3S)-3-Fluoro-8-azaspiro[4.5]decan-1-amine

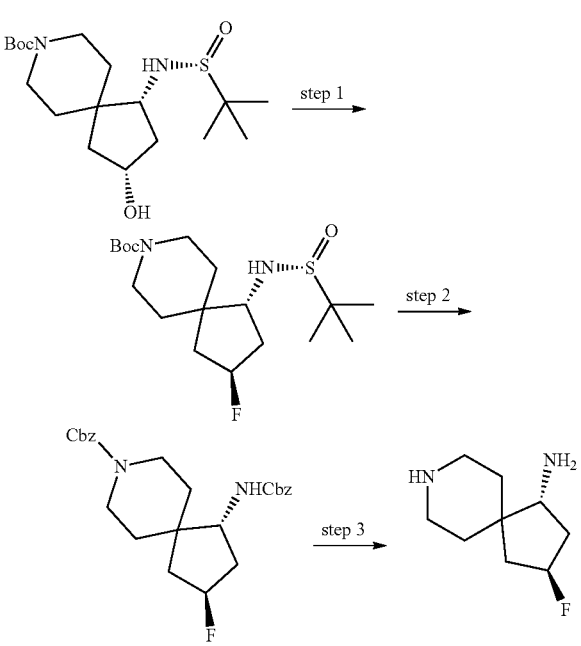

Step 1: tert-Butyl (1R,3S)-3-fluoro-1-[(2-methylpropane-2-sulfinyl)amino]-8-azaspiro[4.5]decane-8-carboxylate To the solution of tert-butyl (1R,3R)-3-hydroxy-1-[(2-methylpropane-2-sulfinyl)amino]-8-azaspiro[4.5]decane-8-carboxylate (10.2 g, 27.2 mmol) in DCM (220 mL) was added DAST (7.02 g, 43.6 mmol) dropwise. The reaction mixture was stirred at 0° C. for 90 minutes. The reaction mixture was poured into NaHCO₃ (aq.) and stirred at 0° C. for 10 minutes. The mixture was extracted with DCM and the organic layers were washed with brine, dried over Na₂SO₄, concentrated in vacuo. The resulting residue was purified by silica column (Pet.ether/EtOAc=10/1 to 2/1) to give the product (7.2 g, 100%) as a yellow solid.

Step 2: Benzyl (1R,3S)-1-{[(benzyloxy)carbonyl]amino}-3-fluoro-8-azaspiro[4.5]decane-8-carboxylate To a solution of tert-butyl (1R,3S)-3-fluoro-1-[(2-methylpropane-2-sulfinyl)amino]-8-azaspiro[4.5]decane-8-carboxylate (6.20 g, 16.5 mmol) in MeOH (60 mL) was added HCl (6M in dioxane, 40 mL) and the reaction mixture was stirred at 45° C. for 45 min. The reaction mixture was concentrated in vacuo and the resulting residue was dissolved in H₂O (50 mL). NaHCO₃ was added into the mixture and adjusted PH=8-9. NaHCO₃ (8.30 g, 98.8 mmol) was added to the reaction mixture and cooled to 0° C., then Cbz-Cl (8.40 g, 49.4 mmol) in THF (50 mL) was added dropwise. The mixture was stirred at ambient temperature overnight. The reaction mixture was extracted with EtOAc, the combined organic layers were washed with brine, dried over Na₂SO₄, concentrated in vacuo. The resulting residue was purified by silica column (pet. ether/EtOAc=10/1 to 6/1 to 3/1) to give the product (6.0 g, 82.8%) as a yellow oil.

Step 3: (1R,3S)-3-Fluoro-8-azaspiro[4.5]decan-1-amine

The mixture of benzyl (1R,3S)-1-{[(benzyloxy)carbonyl]amino}-3-fluoro-8-azaspiro[4.5]decane-8-carboxylate (3.7 g, 8.4 mmol) and 10% Pd/C (1.0 g) in EtOH (100 mL) was stirred at RT for 72 h under H₂ balloon. The mixture was filtered through Celite and the filtrate was concentrated in vacuo to give the product (1.1 g, 75.9%) as a green semi-solid. MS: [M+H]⁺=173. ¹H NMR (CDCl₃): 5.19 (0.5H, m), 5.06 (0.5H, m), 3.14 (1H, m), 2.97 (2H, m), 2.71 (2H, m), 2.29-2.17 (2H, m), 1.98-1.54 (5H, m), 1.39-1.10 (4H, m). ¹⁹F NMR: −164.27

Preparation 31: {6-[(3S,4S)-4-amino-3-methyl-2-oxa-8-azaspiro[4.5]decan-8-yl]-3-iodo-1-{[2-(trimethylsilyl)ethoxy]methyl}-1H-pyrazolo[3,4-b]pyrazin-5-yl}methanol

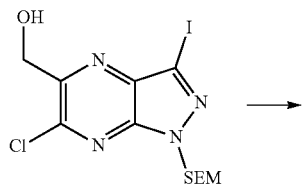

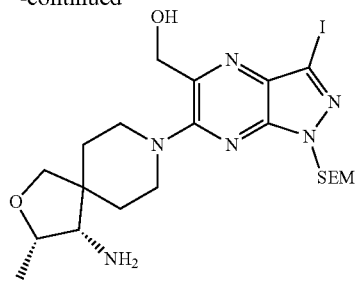

(6-Chloro-3-iodo-1-((2-(trimethylsilyl)ethoxy)methyl)-1H-pyrazolo[3,4-b]pyrazin-5-yl)methanol (15 g, 33.7 mmol), (3S,4S)-3-methyl-2-oxa-8-azaspiro[4.5]decan-4-amine dihydrochloride (9.4 g, 38.7 mmol) and DIPEA (20 mL, 115 mmol) were heated to 80° C. in acetonitrile (150 mL) for 2 h. The mixture was diluted with 20% brine (650 mL) then extracted with ethyl acetate (3×250 mL). The combined organic phases were dried (Na₂SO₄), filtered and concentrated under reduced pressure. The crude product was purified by chromatography on silica gel (330 g cartridge, 0-10% MeOH/DCM) to afford the title compound (18.4 g, 30.4 mmol, 90% yield) as a yellow foam. MS: [M+H]⁺=575.

Method 1: (4S)-8-[3-(4-Chloro-2-methyl-2H-indazol-5-yl)-5-methyl-1H-pyrazolo[3,4-b]pyrazin-6-yl]-2-oxa-8-azaspiro[4.5]decan-4-amine (Example 3)

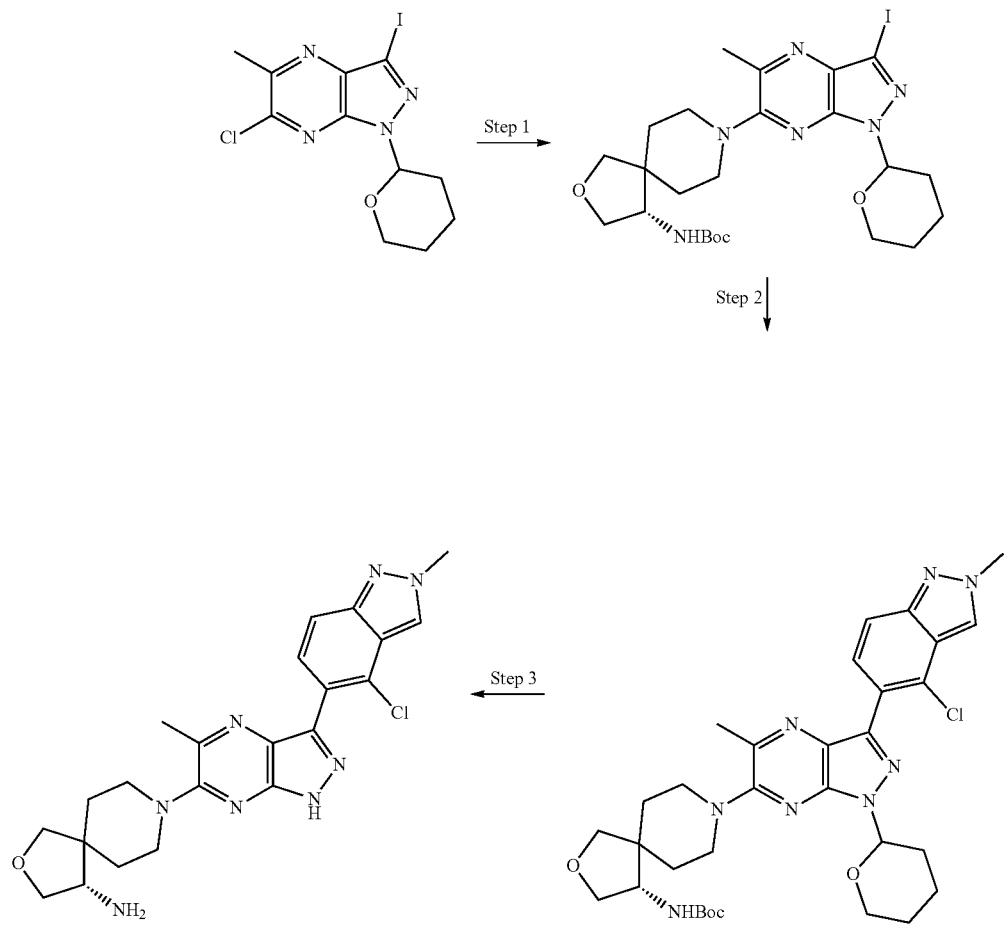

Step 1: A mixture of 6-chloro-3-iodo-5-methyl-1-(oxan-2-yl)-1H-pyrazolo[3,4-b]pyrazine (750 mg, 1.98 mmol), (S)-2-oxa-8-azaspiro[4.5]decan-4-amine dihydrochloride (636 mg, 2.78 mmol), DIPEA (3.45 mL, 19.8 mmol) and NMP (7.5 mL) was stirred at 120° C. for 2 h. The reaction mixture was cooled to RT, and di-tert-butyl dicarbonate (4.55 mL, 19.8 mmol) was added. After 2 h stirring at RT, water was added to the mixture, and extracted with EtOAc. The organic layer was washed with water and brine, dried over anhydrous $Na_2SO_4$, filtered, and concentrated in vacuo. The residue was purified by column chromatography on silica gel (gradient elution, 0-100% EtOAc/hexane) to give tert-butyl N-[(4S)-8-[3-iodo-5-methyl-1-(oxan-2-yl)-1H-pyrazolo[3,4-b]pyrazin-6-yl]-2-oxa-8-azaspiro[4.5]decan-4-yl]carbamate (880 mg). MS: $[M+H]^+=599$.

Step 2: A mixture of tert-butyl N-[(4S)-8-[3-iodo-5-methyl-1-(oxan-2-yl)-1H-pyrazolo[3,4-b]pyrazin-6-yl]-2-oxa-8-azaspiro[4.5]decan-4-yl]carbamate (330 mg, 0.551 mmol), 4-chloro-2-methyl-5-(4,4,5,5-tetramethyl-1,3,2-dioxaborolan-2-yl)-2H-indazole (194 mg, 0.662 mmol), $K_3PO_4$ (176 mg, 0.827 mmol), bis(di-tert-butyl(4-dimethylaminophenyl)phosphine)dichloropalladium(II) (39.0 mg, 0.0551 mmol), 1,4-dioxane (3.3 mL) and water (0.33 mL) was stirred at 80° C. for 2 h, cooled to RT, poured into water, and extracted with EtOAc. The organic layer was washed with brine, dried over anhydrous $Na_2SO_4$, filtered, and concentrated in vacuo. The residue was purified by column chromatography on silica gel (gradient elution, 0-100% EtOAc/hexane) to tert-butyl N-[(4S)-8-[3-(4-chloro-2-methyl-2H-indazol-5-yl)-5-methyl-1-(oxan-2-yl)-1H-pyrazolo[3,4-b]pyrazin-6-yl]-2-oxa-8-azaspiro[4.5]decan-4-yl]carbamate (240 mg). MS: $[M+H]^+=637, 639$.

Step 3: To a mixture of tert-butyl N-[(4S)-8-[3-(4-chloro-2-methyl-2H-indazol-5-yl)-5-methyl-1-(oxan-2-yl)-1H-pyrazolo[3,4-b]pyrazin-6-yl]-2-oxa-8-azaspiro[4.5]decan-4-yl]carbamate (240 mg, 0.377 mmol) in MeOH (4.0 mL) was added 4 M HCl in 1,4-dioxane (2 mL, 8 mmol) at RT. The mixture was stirred at RT for 5 h, and concentrated in vacuo. The residue was purified by column chromatography on NH silica gel (gradient elution, 0-20% MeOH/$CHCl_3$) to give the title compound (90.0 mg). MS: $[M+H]^+=453, 455$. NMR: 1H-NMR (DMSO-D6) δ: 13.62 (1H, br s), 8.56 (1H, s), 7.68 (1H, dd, J=8.8, 0.9 Hz), 7.62 (1H, d, J=8.8 Hz), 4.24 (3H, s), 3.97 (1H, dd, J=8.5, 6.5 Hz), 3.72 (1H, d, J=8.4 Hz), 3.62 (1H, d, J=8.4 Hz), 3.54-3.46 (2H, m), 3.17 (1H, d, J=5.0 Hz), 3.09 (1H, t, J=6.0 Hz), 3.02-2.96 (2H, m), 2.56 (3H, s), 1.88-1.73 (3H, m), 1.56-1.49 (2H, m).

Method 2: (3S,4S)-8-[3-(4-Chloro-2-methyl-2H-indazol-5-yl)-5-methyl-1H-pyrazolo[3,4-b]pyrazin-6-yl]-3-methyl-2-oxa-8-azaspiro[4.5]decan-4-amine (Example 6)

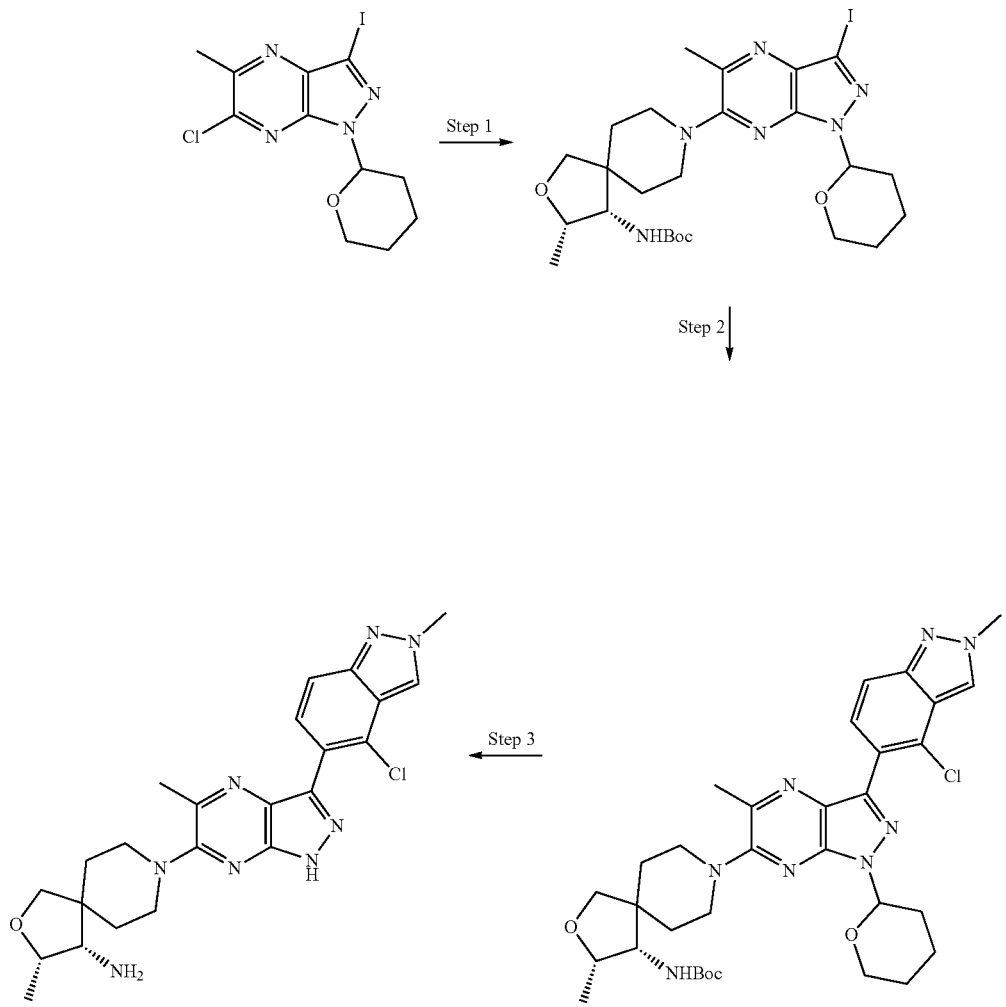

Step 1: A mixture of 6-chloro-3-iodo-5-methyl-1-(oxan-2-yl)-1H-pyrazolo[3,4-b]pyrazine (200 mg, 0.528 mmol), (3S,4S)-3-methyl-2-oxa-8-azaspiro[4.5]decan-4-amine dihydrochloride (154 mg, 0.634 mmol), DIPEA (0.920 mL, 5.28 mmol) and NMP (2.0 mL) was stirred at 120° C. for 1.5 h. The reaction mixture was cooled to RT, and di-tert-butyl dicarbonate (1.15 g, 19.8 mmol) was added. After 4 h stirring at RT, water was added to the mixture, and extracted with EtOAc. The organic layer was washed with water and brine, dried over anhydrous $Na_2SO_4$, filtered, and concentrated in vacuo. The residue was purified by column chromatography on silica gel (gradient elution, 0-70% EtOAc/hexane) to afford tert-butyl N-[(3S,4S)-8-[3-iodo-5-methyl-1-(oxan-2-yl)-1H-pyrazolo[3,4-b]pyrazin-6-yl]-3-methyl-2-oxa-8-azaspiro[4.5]decan-4-yl]carbamate (265 mg). MS: [M+H]$^+$=612.

Step 2: A mixture of tert-butyl N-[(3S,4S)-8-[3-iodo-5-methyl-1-(oxan-2-yl)-1H-pyrazolo[3,4-b]pyrazin-6-yl]-3-methyl-2-oxa-8-azaspiro[4.5]decan-4-yl]carbamate (258 mg, 0.421 mmol), 4-chloro-2-methyl-5-(4,4,5,5-tetramethyl-1,3,2-dioxaborolan-2-yl)-2H-indazole (148 mg, 0.506 mmol), $K_3PO_4$ (179 mg, 0.842 mmol), bis(di-tert-butyl(4-dimethylaminophenyl)phosphine)dichloropalladium(II) (14.9 mg, 0.0211 mmol), 1,4-dioxane (2.6 mL) and water (0.26 mL) was stirred at 80° C. for 2 h, cooled to RT, poured into water, and extracted with EtOAc. The organic layer was washed with brine, dried over anhydrous $Na_2SO_4$, filtered, and concentrated in vacuo. The residue was purified by column chromatography on silica gel (gradient elution, 0-90% EtOAc/hexane) to give tert-butyl N-[(3S,4S)-8-[3-(4-chloro-2-methyl-2H-indazol-5-yl)-5-methyl-1-(oxan-2-yl)-1H-pyrazolo[3,4-b]pyrazin-6-yl]-3-methyl-2-oxa-8-azaspiro[4.5]decan-4-yl]carbamate (203 mg). MS: [M+H]$^+$=651, 653.

Step 3: To a solution of tert-butyl N-[(3S,4S)-8-[3-(4-chloro-2-methyl-2H-indazol-5-yl)-5-methyl-1-(oxan-2-yl)-1H-pyrazolo[3,4-b]pyrazin-6-yl]-3-methyl-2-oxa-8-azaspiro[4.5]decan-4-yl]carbamate (203 mg, 0.312 mmol) in MeOH (4.0 mL) was added 4 M HCl in 1,4-dioxane (4.0 mL, 8 mmol) at RT. The mixture was stirred at RT for 1 h, and concentrated in vacuo. The residue was purified by column chromatography on NH silica gel (gradient elution, 0-10% MeOH/CHCl$_3$) to give (3S,4S)-8-[3-(4-chloro-2-methyl-2H-indazol-5-yl)-5-methyl-1H-pyrazolo[3,4-b]pyrazin-6-yl]-3-methyl-2-oxa-8-azaspiro[4.5]decan-4-amine (126 mg). MS: [M+H]$^+$=467, 469. $^1$H-NMR (DMSO-D6) δ: 13.61 (1H, br s), 8.56 (1H, s), 7.68 (1H, dd, J=8.8, 0.9 Hz), 7.62 (1H, d, J=8.9 Hz), 4.23 (3H, s), 4.13-4.03 (1H, m), 3.69 (1H, d, J=8.8 Hz), 3.52 (1H, d, J=8.3 Hz), 3.42 (2H, q), 3.16-2.97 (2H, m), 2.93 (1H, d, J=5.0 Hz), 2.55 (3H, s), 1.95-1.73 (1H, m), 1.70-1.55 (1H, m), 1.09 (3H, d, J=6.6 Hz).

Method 3: {6-[(3S,4S)-4-Amino-3-methyl-2-oxa-8-azaspiro[4.5]decan-8-yl]-3-(3,4-dichloro-2-methyl-2H-indazol-5-yl)-1H-pyrazolo[3,4-b]pyrazin-5-yl}methanol (Example 8)

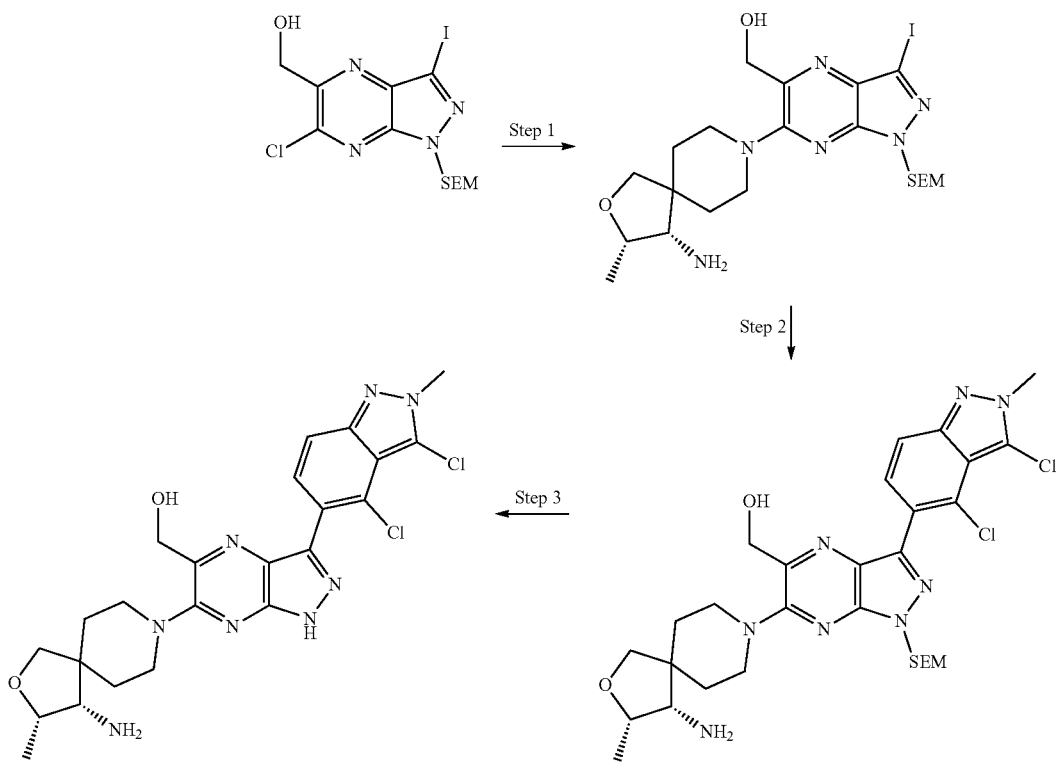

Step 1: A mixture of (6-chloro-3-iodo-1-{[2-(trimethylsilyl)ethoxy]methyl}-1H-pyrazolo[3,4-b]pyrazin-5-yl)methanol (0.8 g, 1.82 mmol), (3S,4S)-3-methyl-2-oxa-8-azaspiro[4.5]decan-4-amine dihydrochloride (0.53 g, 2.18 mmol) and triethylamine (0.885 mL, 6.35 mmol) in NMP (3.63 mL) under $N_2$ was heated at 105° C. for 2 hours. Brine solution (30%) and EtOAc were added, the phases separated and the organic phase was further washed with 30% brine solution (×3), dried ($Na_2SO_4$), filtered and concentrated. The residue was purified by column chromatography on silica gel (gradient elution, 0-12% MeOH/EtOAc) to afford {6-[(3S,4S)-4-amino-3-methyl-2-oxa-8-azaspiro[4.5]decan-8-yl]-3-iodo-1-{[2-(trimethylsilyl)ethoxy]methyl}-1H-pyrazolo[3,4-b]pyrazin-5-yl}methanol (0.925 g). MS: $[M+H]^+$=575.

Step 2: A mixture of {6-[(3S,4S)-4-amino-3-methyl-2-oxa-8-azaspiro[4.5]decan-8-yl]-3-iodo-1-{[2-(trimethylsilyl)ethoxy]methyl}-1H-pyrazolo[3,4-b]pyrazin-5-yl}methanol (0.925 g, 1.61 mmol), (3,4-dichloro-2-methyl-2H-indazol-5-yl)boronic acid (0.788 g, 3.22 mmol), bis(di-tert-butyl(4-dimethylaminophenyl)phosphine)dichloropalladium(II) (0.0912 g, 0.129 mmol) and $K_3PO_4$ (1.03 g, 4.83 mmol) under vacuum was added 1,4-dioxane (8.0 mL) and water (1.6 mL). The vessel was back-filled with $N_2$ and evacuated and back-filled with $N_2$ an additional 2 times. The mixture was heated at 50° C. for 5 hours. The reaction was diluted with EtOAc/30% brine solution the phases separated then the aqueous phase was extracted into EtOAc (×2). The combined organic extracts were dried ($Na_2SO_4$), filtered and concentrated. The residue was purified by column chromatography on KP-NH column (gradient elution, 0-14% MeOH/EtOAc) to give {6-[(3S,4S)-4-amino-3-methyl-2-oxa-8-azaspiro[4.5]decan-8-yl]-3-(3,4-dichloro-2-methyl-2H-indazol-5-yl)-1-{[2-(trimethylsilyl)ethoxy]methyl}-1H-pyrazolo[3,4-b]pyrazin-5-yl}methanol (0.813 g). MS: $[M+H]^+$=647.

Step 3: To a solution of {6-[(3S,4S)-4-amino-3-methyl-2-oxa-8-azaspiro[4.5]decan-8-yl]-3-(3,4-dichloro-2-methyl-2H-indazol-5-yl)-1-{[2-(trimethylsilyl)ethoxy]methyl}-1H-pyrazolo[3,4-b]pyrazin-5-yl}methanol (0.813 g, 1.26 mmol) in DCM (12.2 mL) and water (0.488 mL) at room temperature was added methanesulfonic acid (1.63 mL, 25.1 mmol). The mixture was stirred rapidly for 30 minutes. The reaction mixture was added to a rapidly stirred mixture of $Na_2CO_3$ solution and $CHCl_3$/IPA (3:1). The phases were separated and the aqueous phase was further extracted into $CHCl_3$/IPA (3:1) (×2). The $CHCl_3$/IPA solution was stirred with ~5 mL conc ammonia solution for 2 hours. The phases were separated and organic extract was dried ($Na_2SO_4$), filtered and concentrated to a powder. The residue was purified by column chromatography on C18 (dry load) eluting with 5% (MeCN/0.1% TFA)/($H_2O$/0.1% TFA) to 95% (MeCN/0.1% TFA)/($H_2O$/0.1% TFA). Sat $NaHCO_3$ was added to the desired fractions to neutralize, MeCN was evaporated and the solid was collected by filtration. The product was purified by column chromatography on KP-NH column (gradient elution, 0-8% MeOH/DCM) to provide {6-[(3S,4S)-4-amino-3-methyl-2-oxa-8-azaspiro[4.5]decan-8-yl]-3-(3,4-dichloro-2-methyl-2H-indazol-5-yl)-1H-pyrazolo[3,4-b]pyrazin-5-yl}methanol (0.186 mg). MS: $[M+H]^+$=517.

$^1$H NMR (400 MHz, DMSO-$d_6$): 13.69 (1H, s), 7.71 (1H, d), 7.65 (1H, d), 5.33 (1H, t), 4.60 (2H, d), 4.19 (3H, s), 4.13-4.04 (1H, m), 3.69 (1H, d), 3.64-3.49 (3H, m), 3.28-3.11 (2H, m), 2.93 (1H, d), 1.97-1.73 (2H, m), 1.70-1.55 (2H, m), 1.10 (3H, d).

Method 4: {6-[(3S,4S)-4-Amino-3-methyl-2-oxa-8-azaspiro[4.5]decan-8-yl]-3-[5-chloro-3-(dimethylamino)quinoxalin-6-yl]-1H-pyrazolo[3,4-b]pyrazin-5-yl}methanol (Example 17)

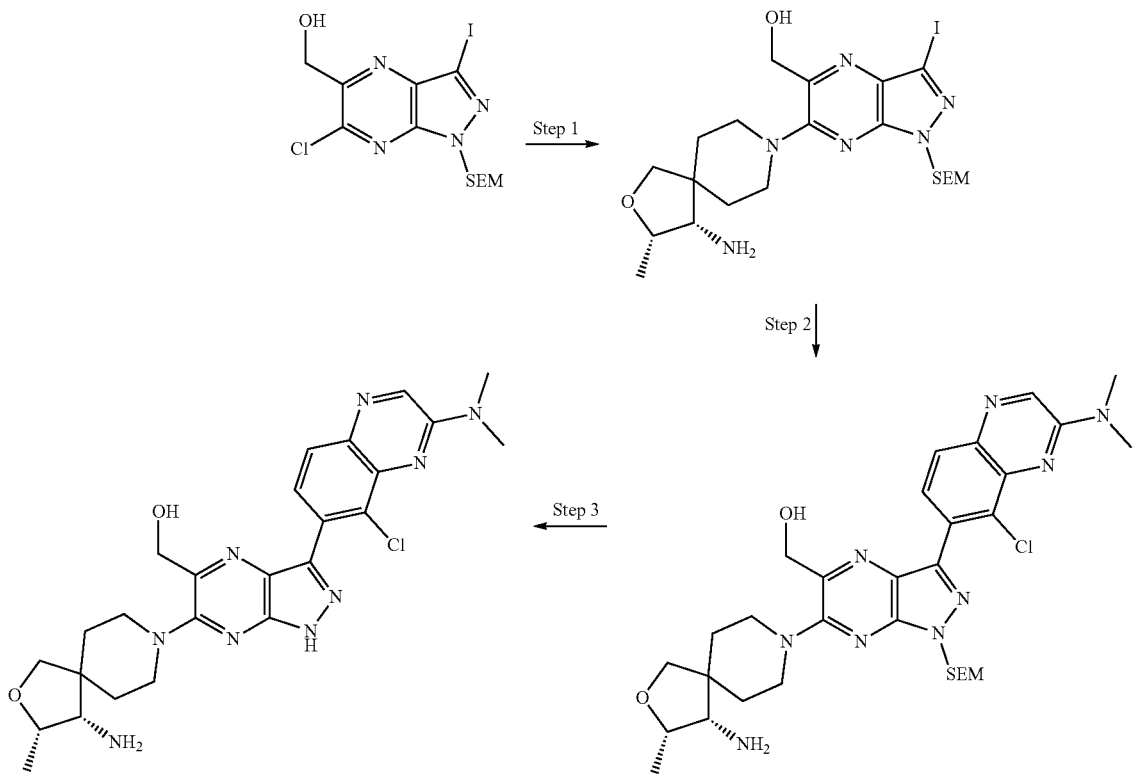

Step 1: N1,N1,N2,N2-tetraethylethane-1,2-diamine (4.78 ml, 22.43 mmol) was added to a solution of (3S,4S)-3-methyl-2-oxa-8-azaspiro[4.5]decan-4-amine, 2HCl (1.5 g, 6.17 mmol) and (6-chloro-3-iodo-1-((2-(trimethylsilyl)ethoxy)methyl)-1H-pyrazolo[3,4-b]pyrazin-5-yl)methanol (2.472 g, 5.61 mmol) in NMP (4.5 mL). The reaction was stirred at 105° C. for 2 hours. The reaction mixture was cooled to room temperature, diluted with 30% brine solution (100 mL) and extracted with ethyl acetate (3×50 mL). The combined organic phases were concentrated then purified by chromatography (120 g column; methanol/dichloromethane: 0-10%) to give {6-[(3S,4S)-4-amino-3-methyl-2-oxa-8-azaspiro[4.5]decan-8-yl]-3-iodo-1-{[2-(trimethylsilyl)ethoxy]methyl}-1H-pyrazolo[3,4-b]pyrazin-5-yl}methanol (2.82 g). MS: [M+H]$^+$=575. $^1$H NMR (500 MHz, DMSO-d6) δ 5.60 (s, 2H), 5.56 (t, 1H), 4.60 (d, 2H), 4.07 (q, 1H), 3.69-3.60 (m, 3H), 3.58 (t, 2H), 3.48 (d, 1H), 3.30-3.27 (m, 1H), 3.26-3.19 (m, 1H), 2.91 (d, 1H), 1.92-1.85 (m, 1H), 1.80-1.73 (m, 1H), 1.67-1.53 (m, 2H), 1.31 (s, 2H), 1.08 (d, 3H), 0.88-0.80 (m, 2H), −0.10 (s, 9H).

Step 2: A mixture of {6-[(3S,4S)-4-amino-3-methyl-2-oxa-8-azaspiro[4.5]decan-8-yl]-3-iodo-1-{[2-(trimethylsilyl)ethoxy]methyl}-1H-pyrazolo[3,4-b]pyrazin-5-yl}methanol (500 mg, 0.870 mmol), 8-chloro-N,N-dimethyl-7-(4,4,5,5-tetramethyl-1,3,2-dioxaborolan-2-yl)quinoxalin-2-amine (459 mg, 1.377 mmol), PdCl$_2$dppf (72.0 mg, 0.098 mmol) and potassium phosphate (626 mg, 2.95 mmol) in 1,4-dioxane (12.2 mL) and water (4.0 mL) was degassed under a flow of N$_2$ and stirred at 30° C. for 3.5 h. The reaction was cooled, diluted with water (100 mL) and extracted with ethyl acetate (3×50 mL). The organic phases were combined, dried over Na$_2$SO$_4$, filtered and concentrated in vacuo. The crude was purified by chromatography on silica gel (12 g cartridge, methanol/dichloromethane 0-20%) to afford {6-[(3S,4S)-4-amino-3-methyl-2-oxa-8-azaspiro[4.5]decan-8-yl]-3-[5-chloro-3-(dimethylamino)quinoxalin-6-yl]-1-{[2-(trimethylsilyl)ethoxy]methyl}-1H-pyrazolo[3,4-b]pyrazin-5-yl}methanol (510 mg). MS: [M+H]$^+$=654 $^1$H NMR (500 MHz, DMSO-d6) δ 8.81 (s, 1H), 7.90 (d, 1H), 7.61 (d, 1H), 5.74 (s, 2H), 5.41 (t, 1H), 4.59 (d, 2H), 4.08 (m, 1H), 3.73-3.61 (m, 5H), 3.51 (d, 1H), 3.31 (s, 6H), 3.28-3.20 (m, 1H), 2.93 (d, 1H), 1.96-1.88 (m, 1H), 1.84-1.74 (m, 1H), 1.69-1.56 (m, 2H), 1.35 (s, 2H), 1.13-1.04 (m, 4H), 0.92-0.84 (m, 2H), −0.09 (s, 9H).

Step 3: {6-[(3S,4S)-4-amino-3-methyl-2-oxa-8-azaspiro[4.5]decan-8-yl]-3-[5-chloro-3-(dimethylamino)quinoxalin-6-yl]-1-{[2-(trimethylsilyl)ethoxy]methyl}-1H-pyrazolo[3,4-b]pyrazin-5-yl}methanol (510 mg, 0.779 mmol) was dissolved in dichloromethane (8 mL) and water (0.35 mL). Methanesulfonic acid (0.5 mL, 7.79 mmol) was added then reaction mixture was stirred at room temperature for 15 minutes. The reaction mixture was added to a rapidly stirred mixture of sat. aq. NaHCO$_3$ (20 mL) and chloroform:isopropanol (3:1, 25 mL). The organic phases were separated and the aqueous was further extracted with chloroform:isopropanol (3:1, 2×25 mL). The combined organic phases were concentrated then suspended in methanol (4 mL) and ethylene diamine (0.5 mL, 7.79 mmol). The suspension was stirred at room temperature for 2 hours. The suspension was concentrated in vacuo, then purified by chromatography column (KPNH 11 g) using methanol/dichloromethane: 0-90% to yield {6-[(3S,4S)-4-amino-3-methyl-2-oxa-8-azaspiro[4.5]decan-8-yl]-3-[5-chloro-3-(dimethylamino)quinoxalin-6-yl]-1H-pyrazolo[3,4-b]pyrazin-5-yl}methanol (89 mg). MS: [M+H]$^+$=524 $^1$H NMR (500 MHz, DMSO-d6) δ 13.74 (s, 1H), 8.79 (s, 1H), 7.88 (d, 1H), 7.67 (d, 1H), 5.33 (t, 1H), 4.59 (d, 2H), 4.07 (m, 1H), 3.69 (d, 1H), 3.62-3.54 (m, 2H), 3.52 (d, 1H), 3.32 (s, 6H), 3.27-3.19 (m, 1H), 3.19-3.11 (m, 1H), 2.93 (d, 1H), 1.95-1.86 (m, 1H), 1.83-1.74 (m, 1H), 1.67-1.55 (m, 2H), 1.37 (s, 2H), 1.09 (d, 3H).

Method 5: {6-[(1R)-1-Amino-3,3-difluoro-8-azaspiro[4.5]decan-8-yl]-3-(4-chloro-2-methyl-2H-indazol-5-yl)-1H-pyrazolo[3,4-b]pyrazin-5-yl}methanol (Example 7)

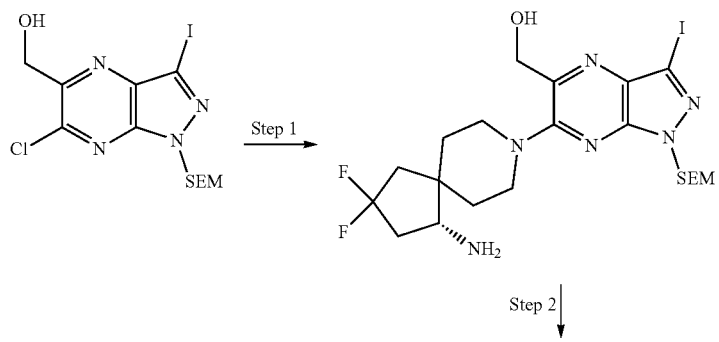

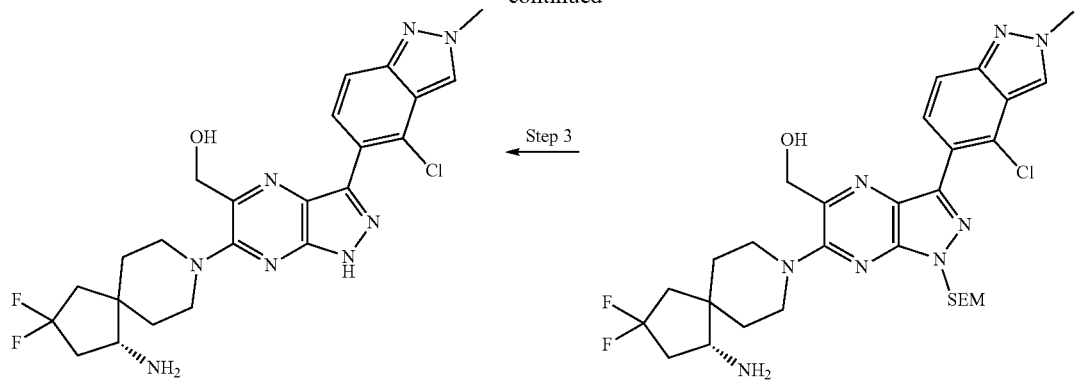

Step 1: {6-[(1R)-1-Amino-3,3-difluoro-8-azaspiro[4.5]decan-8-yl]-3-iodo-1-{[2-(trimethylsilyl)ethoxy]methyl}-1H-pyrazolo[3,4-b]pyrazin-5-yl}methanol was prepared from (6-chloro-3-iodo-1-{[2-(trimethylsilyl)ethoxy]methyl}-1H-pyrazolo[3,4-b]pyrazin-5-yl)methanol and (1R)-3,3-difluoro-8-azaspiro[4.5]decan-1-amine bis-TFA salt using similar procedure as in Method 3, step 1. MS: [M+H]+=595.

Step 2: {6-[(1R)-1-Amino-3,3-difluoro-8-azaspiro[4.5]decan-8-yl]-3-(4-chloro-2-methyl-2H-indazol-5-yl)-1-{[2-(trimethylsilyl)ethoxy]methyl}-1H-pyrazolo[3,4-b]pyrazin-5-yl}methanol was prepared from {6-[(1R)-1-amino-3,3-difluoro-8-azaspiro[4.5]decan-8-yl]-3-iodo-1-{[2-(trimethylsilyl)ethoxy]methyl}-1H-pyrazolo[3,4-b]pyrazin-5-yl}methanol and 4-chloro-2-methyl-5-(4,4,5,5-tetramethyl-1,3,2-dioxaborolan-2-yl)-2H-indazole using similar procedure as in Method 3, step 2. MS: [M+H]+=633.

Step 3: A solution of {6-[(1R)-1-amino-3,3-difluoro-8-azaspiro[4.5]decan-8-yl]-3-(4-chloro-2-methyl-2H-indazol-5-yl)-1-{[2-(trimethylsilyl)ethoxy]methyl}-1H-pyrazolo[3,4-b]pyrazin-5-yl}methanol (63 mg, 0.1 mmol) in DCM (2 mL) and TFA (2 mL) was stirred for 2 h. The reaction mixture was diluted with DCM, sat. aqu. NaHCO$_3$ was added and the product was extracted with CHCl$_3$/IPA (3:1). The solvent was evaporated, the residue was dissolved in MeOH (3 mL) and ethylene-diamine (1 mL) was added, stirred for 1 h and the solvent was evaporated. Water was added and the product was extracted with CHCl$_3$/IPA (3:1). The solvent was evaporated and the crude product was purified on KP-NH column, eluted with DCM/MeOH (0-5%) to afford {6-[(1R)-1-amino-3,3-difluoro-8-azaspiro[4.5]decan-8-yl]-3-(4-chloro-2-methyl-2H-indazol-5-yl)-1H-pyrazolo[3,4-b]pyrazin-5-yl}methanol (4.3 mg). MS: [M+H]+=503.

$^1$H NMR (400 MHz, Me-d3-OD): 8.43 (1H, s), 7.67 (2H, s), 4.78 (2H, s), 4.29 (3H, s), 3.92-3.70 (2H, m), 3.18-3.01 (3H, m), 2.60-2.39 (2H, m), 2.19-2.01 (3H, m), 2.01-1.80 (1H, m), 1.62 (1H, d), 1.52 (1H, d).

(4S)-8-[3-(3,4-Dichloro-2-methyl-2H-indazol-5-yl)-5-methyl-1H-pyrazolo[3,4-b]pyrazin-6-yl]-2-oxa-8-azaspiro[4.5]decan-4-amine (Example 4)

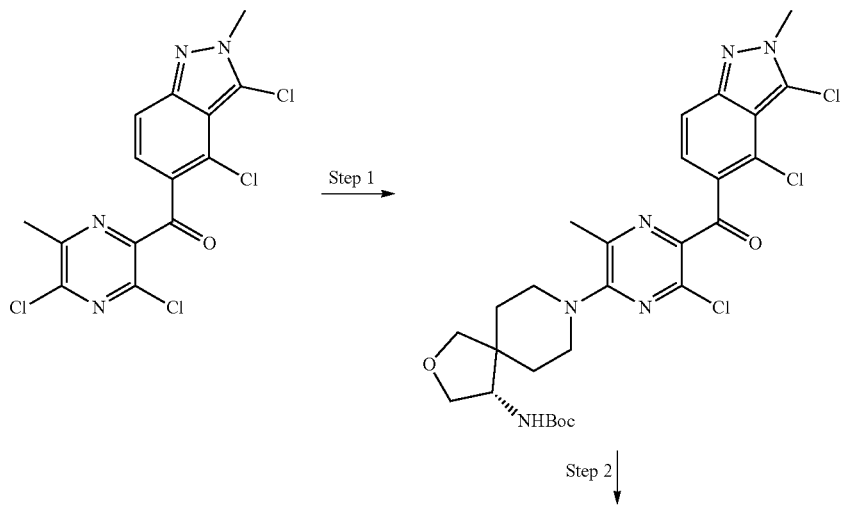

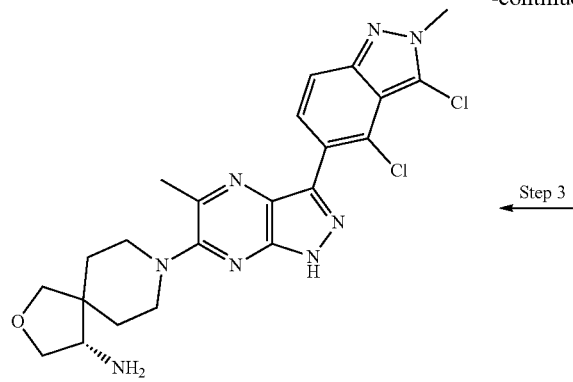
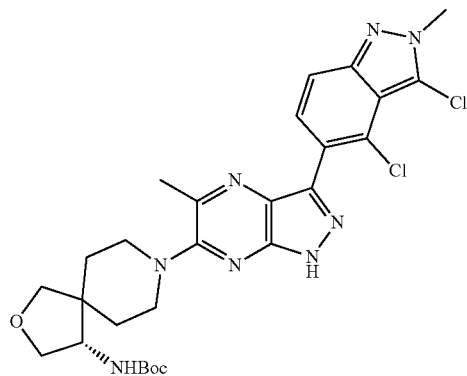

Step 1: To a solution of (S)-2-oxa-8-azaspiro[4.5]decan-4-amine dihydrochloride (127 mg, 0.554 mmol) in NMP (3.0 mL), 3,4-dichloro-5-(3,5-dichloro-6-methylpyrazine-2-carbonyl)-2-methyl-2H-indazole (150 mg, 0.385 mmol) and DIPEA (0.670 mL, 3.85 mmol) were added at RT. The mixture was stirred at RT for 17 h. To the reaction mixture, di-tert-butyl dicarbonate (0.884 ml, 3.85 mmol) was added. The mixture was stirred at RT for 4 h. Additional di-tert-butyl dicarbonate (0.442 mL, 1.92 mmol) was added and was stirred at RT for 2 h, diluted with water, extracted with EtOAc. The organic layer was washed with brine, dried over anhydrous $Na_2SO_4$, filtered, and concentrated in vacuo. The residue was purified by column chromatography on silica gel (EtOAc/hexane) to afford tert-butyl N-[(4S)-8-[6-chloro-5-(3,4-dichloro-2-methyl-2H-indazole-5-carbonyl)-3-methylpyrazin-2-yl]-2-oxa-8-azaspiro[4.5]decan-4-yl]carbamate (146 mg). MS: $[M+H]^+$=609, 611.

Step 2: To a solution of tert-butyl N-[(4S)-8-[6-chloro-5-(3,4-dichloro-2-methyl-2H-indazole-5-carbonyl)-3-methylpyrazin-2-yl]-2-oxa-8-azaspiro[4.5]decan-4-yl]carbamate (146 mg, 0.239 mmol) in EtOH (5.0 mL), hydrazine hydrate (0.116 mL, 2.394 mmol) was added at RT. The mixture was stirred at 80° C. for 3 h. Additional hydrazine hydrate (0.058 mL, 1.20 mmol) was added to the reaction mixture at same temperature. The mixture was stirred at 80° C. for 1 h. The reaction solution was then vacuum-concentrated, and the residue was purified by column chromatography on silica gel (EtOAc/hexane) to give ted-butyl N-[(4S)-8-[3-(3,4-dichloro-2-methyl-2H-indazol-5-yl)-5-methyl-1H-pyrazolo[3,4-b]pyrazin-6-yl]-2-oxa-8-azaspiro[4.5]decan-4-yl]carbamate (8.0 mg). MS: $[M+H]^+$=587, 589.

Step 3: tert-Butyl N-[(4S)-8-[3-(3,4-dichloro-2-methyl-2H-indazol-5-yl)-5-methyl-1H-pyrazolo[3,4-b]pyrazin-6-yl]-2-oxa-8-azaspiro[4.5]decan-4-yl]carbamate (8.0 mg, 0.0136 mmol) was added to TFA (2.0 mL) at RT. The mixture was stirred at RT for 30 min. The reaction solution was then vacuum-concentrated, and the residue was purified by column chromatography on NH-silica gel (MeOH/CHCl₃) to give (4S)-8-[3-(3,4-dichloro-2-methyl-2H-indazol-5-yl)-5-methyl-1H-pyrazolo[3,4-b]pyrazin-6-yl]-2-oxa-8-azaspiro[4.5]decan-4-amine (5.1 mg). MS: $[M+H]^+$=487, 489. $^1$H-NMR (DMSO-$d_6$) NMR (DMSO-S: [M+H]zin-6-yl]-2-oxa-8-azaspiro[4.5]decan-4-amine reaction solution was then vacuum-concentrated, and the residue was purified, 3.62 (1H, d, J=8.5 Hz), 3.54-3.46 (2H, m), 3.12-3.06 (1H, m), 3.03-2.95 (2H, m), 2.56 (3H, s), 1.88-1.73 (3H, m), 1.57-1.49 (2H, m).

(1R,3R)-8-[3-(4-Chloro-2-methyl-2H-indazol-5-yl)-5-methyl-1H-pyrazolo[3,4-b]pyrazin-6-yl]-3-(trifluoromethyl)-8-azaspiro[4.5]decan-1-amine (Example 1)

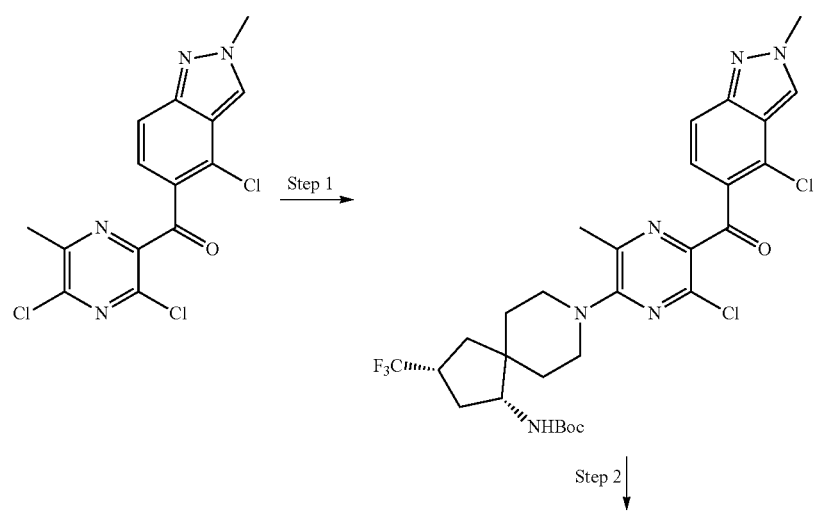

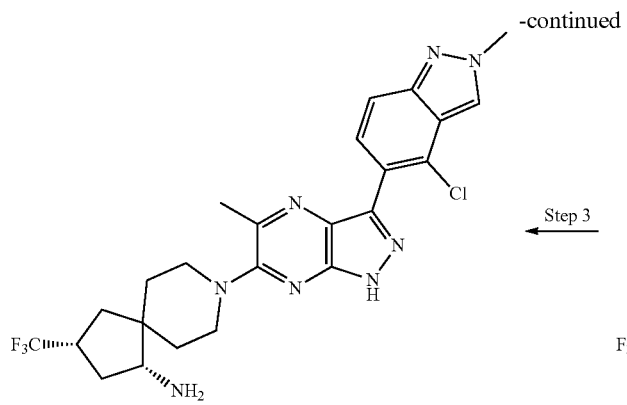

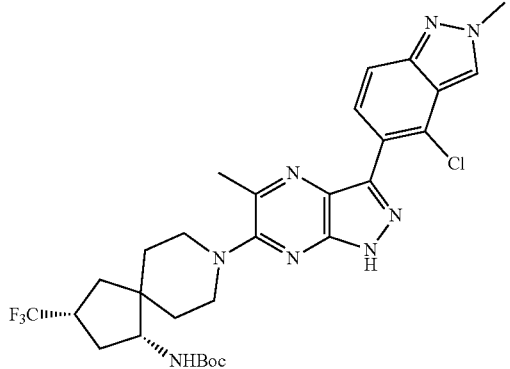

Step 1: To a solution of 4-chloro-5-(3,5-dichloro-6-methylpyrazine-2-carbonyl)-2-methyl-2H-indazole (180 mg, 0.5 mmol) in NMP (4 mL) were added DIPEA (0.1 mL, 1.0 mmol) and tert-butyl N-[(1R,3R)-3-(trifluoromethyl)-8-azaspiro[4.5]decan-1-yl]carbamate (161 mg, 0.5 mmol) at 0° C. The mixture was stirred at room temperature for 16 h. Water was added and the product was extracted with EtOAc. The organic phase was washed with brine (3×), dried, filtered and the solvent was evaporated. The crude product was purified by column chromatography on silica gel (EtOAc/hexane) to give tert-butyl N-[(1R,3R)-8-[6-chloro-5-(4-chloro-2-methyl-2H-indazole-5-carbonyl)-3-methylpyrazin-2-yl]-3-(trifluoromethyl)-8-azaspiro[4.5]decan-1-yl]carbamate (197 mg). MS: [M+H]$^+$=641.

Step 2: To a solution of tert-butyl N-[(1R,3R)-8-[6-chloro-5-(4-chloro-2-methyl-2H-indazole-5-carbonyl)-3-methylpyrazin-2-yl]-3-(trifluoromethyl)-8-azaspiro[4.5]decan-1-yl]carbamate (197 mg, 0.31 mmol) in EtOH was added hydrazine hydrate (50-60%, 60 μL, 0.62 mmol) and the reaction mixture was heated at reflux for 4 h. The solvent was evaporated, sat. NaHCO$_3$ was added and the product extracted with DCM. The organic phase was dried, the solvent evaporated. The crude product was purified by column chromatography on silica gel (EtOAc/hexane) and on KP-NH column to give tert-butyl N-[(1R,3R)-8-[3-(4-chloro-2-methyl-2H-indazol-5-yl)-5-methyl-1H-pyrazolo[3,4-b]pyrazin-6-yl]-3-(trifluoromethyl)-8-azaspiro[4.5]decan-1-yl]carbamate (79 mg). MS: [M+H]$^+$=619.

Step 3: To a solution of tert-butyl N-[(1R,3R)-8-[3-(4-chloro-2-methyl-2H-indazol-5-yl)-5-methyl-1H-pyrazolo[3,4-b]pyrazin-6-yl]-3-(trifluoromethyl)-8-azaspiro[4.5]decan-1-yl]carbamate (74 mg, 0.12 mmol) in MeOH (3 mL) was added HCl-dioxane (4 M, 3 mL) and the mixture was stirred for 4 h. the solvent was evaporated to afford (1R,3R)-8-[3-(4-chloro-2-methyl-2H-indazol-5-yl)-5-methyl-1H-pyrazolo[3,4-b]pyrazin-6-yl]-3-(trifluoromethyl)-8-azaspiro[4.5]decan-1-amine as the HCl salt (62 mg). MS: [M+H]$^+$=519.

$^1$H NMR (400 MHz, DMSO-d6-D$_2$O): 8.53 (1H, s), 7.68 (1H, dd), 7.58 (1H, d), 4.22 (3H, s), 3.35 (1H, t), 3.15-3.05 (1H, m), 3.05-2.92 (2H, m), 2.55 (3H, s), 2.43-2.36 (1H, m), 2.15-2.05 (1H, m), 1.92-1.70 (5H, m), 1.66-1.54 (2H, m).

(1R)-8-[3-(4-Chloro-2-methyl-2H-indazol-5-yl)-5-methyl-1H-pyrazolo[3,4-b]pyrazin-6-yl]-3,3-difluoro-8-azaspiro[4.5]decan-1-amine (Example 2)

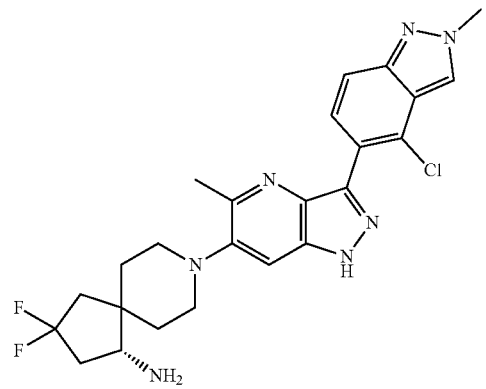 [SMILES: Cc1nc2c(-c3ccc4nn(C)cc4c3Cl)n[nH]c2cc1N1CCC2(CC1)CC(F)(F)C[C@H]2N]

The title compound was prepared from 4-chloro-5-(3,5-dichloro-6-methylpyrazine-2-carbonyl)-2-methyl-2H-indazole and (1R)-3,3-difluoro-8-azaspiro[4.5]decan-1-amine bis-TFA salt using similar procedure to those described for (1R,3R)-8-[3-(4-chloro-2-methyl-2H-indazol-5-yl)-5-methyl-1H-pyrazolo[3,4-b]pyrazin-6-yl]-3-(trifluoromethyl)-8-azaspiro[4.5]decan-1-amine (Example 1); except that Step 2 was performed at reflux and Step 3 was omitted. The product dissolved in MeOH and treated with HCl/Et$_2$O to afford the HCl salt of the title compound as a yellow solid. MS: [M+H]$^+$=487.

$^1$H NMR (400 MHz, DMSO-d$_6$): 8.57 (1H, s), 8.48 (3H, s), 7.69 (1H, dd), 7.63 (1H, d), 4.25 (3H, s), 3.73-3.49 (3H, m), 3.09-2.93 (2H, m), 2.87-2.69 (1H, m), 2.65-2.55 (4H, m), 2.05 (1H, t), 1.89-1.77 (1H, m), 1.72 (1H, d), 1.61 (1H, d).

TABLE 1

The examples in Table 1 were prepared by following methods similar and/or analogous to those described in Methods 1-5, using the appropriate amines and boronates (or boronic acids) (peparations for which are described above). The title compounds were typically purified using coloumn chromatography (Biotage KP-NH, SiO₂ or C18 coloumns). In some cases, the title compound was prpepared as the HCl salt by adding HCl-dioxane to a sloution of the compound and evaporating to dryness.

| Example | Structure | Name | NMR Data | m/z | Method |
|---|---|---|---|---|---|
| 1 | | (1R,3R)-8-[3-(4-chloro-2-methyl-2H-indazol-5-yl)-5-methyl-1H-pyrazolo[3,4-b]pyrazin-6-yl]-3-(trifluoromethyl)-8-azaspiro[4.5]decan-1-amine hydrochloride | ¹H NMR (400 MHz, DMSO-$d_6$): 8.53 (1H, s), 7.68 (1H, dd), 7.58 (1H, d), 4.22 (3H, s), 3.35 (1H, t), 3.15-3.05 (1H, m), 3.05-2.92 (2H, m), 2.55 (3H, s), 2.43-2.36 (1H, m), 2.15-2.05 (1H, m), 1.92-1.70 (5H, m), 1.66-1.54 (2H, m). | 519 | |
| 2 | | (1R)-8-[3-(4-chloro-2-methyl-2H-indazol-5-yl)-5-methyl-1H-pyrazolo[3,4-b]pyrazin-6-yl]-3,3-difluoro-8-azaspiro[4.5]decan-1-amine hydrochloride | ¹H NMR (400 MHz, DMSO-$d_6$): 8.57 (1H, s), 8.48 (3H, s), 7.69 (1H, dd), 7.63 (1H, d), 4.25 (3H, s), 3.73-3.49 (3H, m), 3.09-2.93 (2H, m), 2.87-2.69 (1H, m), 2.65-2.55 (4H, m), 2.05 (1H, t), 1.89-1.77 (1H, m), 1.72 (1H, d), 1.61 (1H, d). | 487 | |
| 3 | | (4S)-8-[3-(4-chloro-2-methyl-2H-indazol-5-yl)-5-methyl-1H-pyrazolo[3,4-b]pyrazin-6-yl]-2-oxa-8-azaspiro[4.5]decan-4-amine | 1H NMR (400 MHz, DMSO-$d_6$): 13.60 (1H, s), 8.56 (1H, s), 7.72-7.60 (2H, m), 4.24 (3H, s), 3.97 (1H, dd), 3.72 (1H, d), 3.63 (1H, d), 3.57-3.43 (2H, m), 3.10 (1H, t), 3.06-2.95 (2H, m), 2.57 (3H, s), 1.96-1.66 (3H, m), 1.65-1.46 (4H, m). | 453 | 1 |
| 4 | | (4S)-8-[3-(3,4-dichloro-2-methyl-2H-indazol-5-yl)-5-methyl-1H-pyrazolo[3,4-b]pyrazin-6-yl]-2-oxa-8-azaspiro[4.5]decan-4-amine | ¹H-NMR (DMSO-$d_6$) δ: 13.66 (1H, s), 7.70 (1H, d, J = 8.9 Hz), 7.60 (1H, d, J = 8.9 Hz), 4.18 (3H, s), 3.97 (1H, dd, J = 8.5, 6.4 Hz), 3.72 (1H, d, J = 8.5 Hz), 3.62 (1H, d, J = 8.5 Hz), 3.54-3.46 (2H, m), 3.12-3.06 (1H, m), 3.03-2.95 (2H, m), 2.56 (3H, s), 1.88-1.73 (3H, m), 1.57-1.49 (2H, m). | 487 | |

TABLE 1-continued

The examples in Table 1 were prepared by following methods similar and/or analogous to those described in Methods 1-5, using the appropriate amines and boronates (or boronic acids) (peparations for which are described above). The title compounds were typically purified using coloumn chromatography (Biotage KP-NH, SiO$_2$ or C18 coloumns). In some cases, the title compound was prpepared as the HCl salt by adding HCl-dioxane to a sloution of the compound and evaporating to dryness.

| Example | Structure | Name | NMR Data | m/z | Method |
|---|---|---|---|---|---|
| 5 | | (4S)-8-[3-(4-chloro-2-ethyl-2H-indazol-5-yl)-5-methyl-1H-pyrazolo[3,4-b]pyrazin-6-yl]-2-oxa-8-azaspiro[4.5]decan-4-amine | $^1$H NMR (400 MHz, DMSO-d$_6$): 13.60 (1H, s), 8.61 (1H, s), 7.70 (1H, dd), 7.64 (1H, d), 4.53 (2H, q), 3.98 (1H, dd), 3.73 (1H, d), 3.63 (1H, d), 3.50 (2H, dd), 3.10 (1H, t), 3.06-2.95 (2H, m), 2.59-2.59 (1H, m), 2.57 (3H, s), 1.91-1.72 (3H, m), 1.61-1.46 (6H, m). | 467 | 1 |
| 6 | | (3S,4S)-8-[3-(4-chloro-2-methyl-2H-indazol-5-yl)-5-methyl-1H-pyrazolo[3,4-b]pyrazin-6-yl]-3-methyl-2-oxa-8-azaspiro[4.5]decan-4-amine | $^1$H NMR (400 MHz, DMSO-d$_6$): 13.60 (1H, d), 8.56 (1H, s), 7.69 (1H, dd), 7.64 (1H, d), 4.24 (3H, s), 4.14-4.07 (1H, m), 3.71 (1H, d), 3.55 (1H, d), 3.50-3.39 (2H, m), 3.11 (1H, d), 3.06-2.97 (2H, m), 1.98-1.87 (2H, m), 1.87-1.74 (2H, m), 1.72-1.58 (3H, m), 1.12 (3H, d). | 467 | 2 |
| 7 | | {6-[(1R)-1-amino-3,3-difluoro-8-azaspiro[4.5]decan-8-yl]-3-(4-chloro-2-methyl-2H-indazol-5-yl)-1H-pyrazolo[3,4-b]pyrazin-5-yl}methanol | $^1$H NMR (400 MHz, Me-d3-OD): 8.43 (1H, s), 7.67 (2H, s), 4.78 (2H, s), 4.29 (3H, s), 3.92-3.70 (2H, m), 3.18-3.01 (3H, m), 2.60-2.39 (2H, m), 2.19-2.01 (3H, m), 2.01-1.80 (1H, m), 1.62 (1H, d), 1.52 (1H, d). | 503 | 5 |
| 8 | | {6-[(3S,4S)-4-amino-3-methyl-2-oxa-8-azaspiro[4.5]decan-8-yl]-3-(3,4-dichloro-2-methyl-2H-indazol-5-yl)-1H-pyrazolo[3,4-b]pyrazin-5-yl}methanol | $^1$H NMR (400 MHz, DMSO-d$_6$): 13.69 (1H, br. s), 7.71 (1H, d), 7.64 (1H, d), 5.33 (1H, t), 4.60 (2H, d), 4.19 (3H, s), 4.15-4.05 (1H, m), 3.69 (1H, d), 3.66-3.50 (3H, m), 3.27-3.11 (2H, m), 2.94 (1H, d), 1.98-1.75 (2H, m), 1.70-1.54 (2H, m), 1.10 (3H, d). | 517.1 | 3 |

TABLE 1-continued

The examples in Table 1 were prepared by following methods similar and/or analogous to those described in Methods 1-5, using the appropriate amines and boronates (or boronic acids) (peparations for which are described above). The title compounds were typically purified using coloumn chromatography (Biotage KP-NH, SiO$_2$ or C18 coloumns). In some cases, the title compound was prpepared as the HCl salt by adding HCl-dioxane to a sloution of the compound and evaporating to dryness.

| Example | Structure | Name | NMR Data | m/z | Method |
|---|---|---|---|---|---|
| 9 | | (3S,4S)-8-[3-(5-chloro-3-methoxyquinoxalin-6-yl)-5-methyl-1H-pyrazolo[3,4-b]pyrazin-6-yl]-3-methyl-2-oxa-8-azaspiro[4.5]decan-4-amine hydrochloride | $^1$H NMR (500 MHz, DMSO-d$_6$) δ 13.8 (br s), 8.74 (s, 1H), 8.19 (s, 3H), 8.11 (d, J = 8.5 Hz, 1H), 7.99 (d, J = 8.5 Hz, 1H), 4.23 (q, J = 6.2 Hz, 1H), 4.13 (s, 3H), 3.91 (d, J = 9.0 Hz, 1H), 3.47-3.42 (m, 2H), 3.05-2.87 (m, 2H), 2.57 (s, 3H), 2.05-1.90 (m, 2H), 1.86-1.76 (m, 1H), 1.74-1.63 (m, 1H), 1.26 (d, J = 6.5 Hz, 3H). 3 protons hidden under HDO peak which itself shifted from 3.31 ppm to c.a. 3.9 ppm due to HCl salt. | 495 | 2 |
| 10 | | (3S,4S)-8-{3-[5-chloro-3-(dimethylamino)quinoxalin-6-yl]-5-methyl-1H-pyrazolo[3,4-b]pyrazin-6-yl}-3-methyl-2-oxa-8-azaspiro[4.5]decan-4-amine | $^1$H NMR (500 MHz, DMSO-d$_6$) δ 13.70 (s, 1H), 8.79 (s, 1H), 7.88 (d, J = 8.4 Hz, 1H), 7.64 (d, J = 8.4 Hz, 1H), 4.08 (p, J = 6.2 Hz, 1H), 3.69 (d, J = 8.4 Hz, 1H), 3.52 (d, J = 8.4 Hz, 1H), 3.48-3.37 (m, 2H), 3.31 (s, 6H), 3.17-3.08 (m, 1H), 3.05-2.99 (m, 1H), 2.94 (d, J = 5.1 Hz, 1H), 2.55 (s, 3H), 1.94-1.87 (m, 1H), 1.83-1.76 (m, 1H), 1.69-1.57 (m, 2H), 1.45 (s, 2H), 1.10 (d, J = 6.4 Hz, 3H) | 508 | 2 |
| 11 | | (4S)-8-{3-[5-chloro-3-(dimethylamino)quinoxalin-6-yl]-5-methyl-1H-pyrazolo[3,4-b]pyrazin-6-yl}-2-oxa-8-azaspiro[4.5]decan-4-amine | $^1$H NMR (500 MHz, DMSO-d$_6$) δ 13.70 (s, 1H), 8.79 (s, 1H), 7.88 (d, J = 8.4 Hz, 1H), 7.64 (d, J = 8.4 Hz, 1H), 3.97 (dd, J = 8.6, 6.5 Hz, 1H), 3.72 (d, J = 8.4 Hz, 1H), 3.62 (d, J = 8.4 Hz, 1H), 3.57-3.45 (m, 2H), 3.31 (s, 6H), 3.09 (t, J = 6.1 Hz, 1H), 3.05-2.96 (m, 2H), 2.56 (s, 3H), 1.90-1.81 (m, 1H), 1.80-1.73 (m, 1H), 1.58-1.48 (m, 3H). the NH2's protons are not clearly visible; | 494 | 2 |
| 12 | | 7-(6-[(1R)-1-amino-8-azaspiro[4.5]decan-8-yl]-5-methyl-1H-pyrazolo[3,4-b]pyrazin-3-yl}-8-chloro-N,N-dimethyl-quinoxalin-2-amine | $^1$H NMR (500 MHz, DMSO-d$_6$) δ 8.79 (s, 1H), 7.88 (d, J = 8.4 Hz, 1H), 7.64 (d, J = 8.4 Hz, 1H), 3.54 (t, J = 14.0 Hz, 2H), 3.31 (s, 6H), 3.03-2.92 (m, 2H), 2.75 (t, J = 7.3 Hz, 1H), 2.55 (s, 3H), 1.92-1.82 (m, 1H), 1.81-1.73 (m, 3H), 1.69-1.59 (m, 1H), 1.58-1.49 (m, 1H), 1.44-1.37 (m, 1H), 1.37-1.20 (m, 3H). The 3 NHs protons are not visible | 492 | 2 |

TABLE 1-continued

The examples in Table 1 were prepared by following methods similar and/or analogous to those described in Methods 1-5, using the appropriate amines and boronates (or boronic acids) (peparations for which are described above). The title compounds were typically purified using coloumn chromatography (Biotage KP-NH, SiO$_2$ or C18 coloumns). In some cases, the title compound was prpepared as the HCl salt by adding HCl-dioxane to a sloution of the compound and evaporating to dryness.

| Example | Structure | Name | NMR Data | m/z | Method |
|---|---|---|---|---|---|
| 13 | | (4S)-8-[3-(5-chloro-3-methoxyquinoxalin-6-yl)-5-methyl-1H-pyrazolo[3,4-b]pyrazin-6-yl]-2-oxa-8-azaspiro[4.5]decan-4-amine | $^1$H NMR (500 MHz, DMSO-d$_6$) δ 8.79 (s, 1H), 7.88 (d, J = 8.4 Hz, 1H), 7.64 (d, J = 8.4 Hz, 1H), 3.54 (t, J = 14.0 Hz, 2H), 3.31 (s, 6H), 3.03-2.92 (m, 2H), 2.75 (t, J = 7.3 Hz, 1H), 2.55 (s, 3H), 1.92-1.82 (m, 1H), 1.81-1.73 (m, 3H), 1.69-1.59 (m, 1H), 1.58-1.49 (m, 1H), 1.44-1.37 (m, 1H), 1.37-1.20 (m, 3H). The 3 NHs protons are not visible | 481 | 2 |
| 14 | | (1R)-8-[3-(5-chloro-3-methoxyquinoxalin-6-yl)-5-methyl-1H-pyrazolo[3,4-b]pyrazin-6-yl]-8-azaspiro[4.5]decan-1-amine | $^1$H NMR (500 MHz, DMSO-d$_6$) δ 8.73 (s, 1H), 8.11 (d, J = 8.5 Hz, 1H), 8.00 (d, J = 8.5 Hz, 1H), 4.14 (s, 3H), 3.63-3.50 (m, 2H), 3.06-2.94 (m, 2H), 2.90-2.82 (m, 1H), 2.57 (s, 3H), 1.99-1.87 (m, 1H), 1.87-1.72 (m, 3H), 1.72-1.62 (m, 1H), 1.62-1.50 (m, 1H), 1.52-1.36 (m, 3H), 1.36-1.26 (m, 1H). Pyrazolo NH and NH2 not observed. | 479 | 2 |
| 15 | | (1R)-8-[3-(3,4-dichloro-2-methyl-2H-indazol-5-yl)-5-methyl-1H-pyrazolo[3,4-b]pyrazin-6-yl]-8-azaspiro[4.5]decan-1-amine | $^1$H NMR (500 MHz, DMSO-d$_6$) δ 7.71 (d, J = 8.9 Hz, 1H), 7.61 (d, J = 8.9 Hz, 1H), 4.19 (s, 3H), 3.54 (t, J = 14.0 Hz, 2H), 2.98 (q, J = 10.4 Hz, 2H), 2.75 (t, J = 7.3 Hz, 1H), 2.56 (s, 3H), 1.92-1.83 (m, 1H), 1.78 (dtd, J = 15.4, 10.5, 10.1, 4.8 Hz, 3H), 1.63 (td, J = 10.3, 9.8, 5.5 Hz, 1H), 1.59-1.49 (m, 1H), 1.44-1.22 (m, 4H). Three NH protons not observed. | 485 | 2 |
| 16 | | {6-[(1R)-1-amino-3,3-difluoro-8-azaspiro[4.5]decan-8-yl]-3-(3,4-dichloro-2-methyl-2H-indazol-5-yl)-1H-pyrazolo[3,4-b]pyrazin-5-yl}methanol | "$^1$H NMR (500 MHz, DMSO-d$_6$) δ 13.56 (br s, 1H), 7.71 (d, J = 8.8 Hz, 1H), 7.64 (d, J = 8.8 Hz, 1H), 5.44-5.28 (m, 1H), 4.68-4.48 (m, 2H), 4.19 (s, 3H), 3.78 (dd, J = 28.0, 13.0 Hz, 2H), 3.13-2.91 (m, 3H), 2.48-2.33 (m, 2H), 2.10-1.57 (m, 6H), 1.50-1.33 (m, 2H). 19F NMR (471 MHz, DMSO-d$_6$) δ -80.08 (d, J = 227.6 Hz), -81.65 (d, J = 227.7 Hz). | 537 | 4 |

TABLE 1-continued

The examples in Table 1 were prepared by following methods similar and/or analogous to those described in Methods 1-5, using the appropriate amines and boronates (or boronic acids) (peparations for which are described above).
The title compounds were typically purified using coloumn chromatography (Biotage KP-NH, SiO₂ or C18 coloumns).
In some cases, the title compound was prpepared as the HCl salt by adding HCl-dioxane to a sloution of the compound and evaporating to dryness.

| Example | Structure | Name | NMR Data | m/z | Method |
|---|---|---|---|---|---|
| 17 | | {6-[(3S,4S)-4-amino-3-methyl-2-oxa-8-azaspiro[4.5]decan-8-yl]-3-[5-chloro-3-(dimethylamino)quinoxalin-6-yl]-1H-pyrazolo[3,4-b]pyrazin-5-yl}methanol | ¹H NMR (500 MHz, DMSO-d₆) δ 13.74 (s, 1H), 8.79 (s, 1H), 7.88 (d, J = 8.4 Hz, 1H), 7.67 (d, J = 8.4 Hz, 1H), 5.33 (t, J = 5.8 Hz, 1H), 4.59 (d, J = 5.6 Hz, 2H), 4.07 (p, 1H), 3.69 (d, J = 8.4 Hz, 1H), 3.62-3.54 (m, 2H), 3.52 (d, J = 8.4 Hz, 1H), 3.32 (s, 6H), 3.27-3.19 (m, 1H), 3.19-3.11 (m, 1H), 2.93 (d, J = 5.1 Hz, 1H), 1.95-1.86 (m, 1H), 1.83-1.74 (m, 1H), 1.67-1.55 (m, 2H), 1.37 (s, 2H), 1.09 (d, J = 6.4 Hz, 3H) | 524 | 4 |
| 18 | | {6-[(3S,4S)-4-amino-3-methyl-2-oxa-8-azaspiro[4.5]decan-8-yl]-3-(2,3-dichlorophenyl)-1H-pyrazolo[3,4-b]pyrazin-5-yl}methanol | ¹H NMR (500 MHz, DMSO-d₆) δ 13.45 (s, 1H), 7.74 (ddd, J = 16.0, 7.9, 1.5 Hz, 2H), 7.50 (t, J = 7.9 Hz, 1H), 5.35 (t, J = 6.4 Hz, 1H), 4.58 (d, J = 4.7 Hz, 2H), 4.07 (p, 1H), 3.68 (d, J = 8.4 Hz, 1H), 3.60-3.53 (m, 2H), 3.51 (d, J = 8.4 Hz, 1H), 3.27-3.20 (m, 1H), 3.19-3.10 (m, 1H), 2.92 (d, J = 5.1 Hz, 1H), 1.94-1.84 (m, 1H), 1.78 (ddd, J = 13.0, 9.2, 3.6 Hz, 1H), 1.67-1.54 (m, 2H), 1.21 (s, 2H), 1.09 (d, J = 6.4 Hz, 3H). | 463 | 4 |
| 19 | | (3S,4S)-8-[3-(3-chloro-2-fluorophenyl)-5-methyl-1H-pyrazolo[3,4-b]pyrazin-6-yl]-3-methyl-2-oxa-8-azaspiro[4.5]decan-4-amine | ¹H NMR (500 MHz, DMSO-d₆) δ 13.78 (s, 1H), 8.15 (ddd, J = 8.0, 6.5, 1.7 Hz, 1H), 7.66 (ddd, J = 8.3, 6.8, 1.7 Hz, 1H), 7.40 (td, J = 7.9, 0.9 Hz, 1H), 4.15-4.02 (m, 1H), 3.69 (d, J = 8.4 Hz, 1H), 3.52 (d, J = 8.4 Hz, 1H), 3.48-3.38 (m, 2H), 3.20-3.07 (m, 1H), 3.07-2.99 (m, 1H), 2.93 (d, J = 5.1 Hz, 1H), 2.60 (s, 3H), 1.96-1.85 (m, 1H), 1.85-1.74 (m, 1H), 1.70-1.56 (m, 2H), 1.26 (br s, 2H), 1.10 (d, J = 6.4 Hz, 3H). | 431 | 2 |
| 20 | | {6-[(1R,3S)-1-amino-3-fluoro-8-azaspiro[4.5]decan-8-yl]-3-(3,4-dichloro-2-methyl-2H-indazol-5-yl)-1H-pyrazolo[3,4-b]pyrazin-5-yl}methanol | ¹H NMR (500 MHz, DMSO-d₆) δ 7.70 (d, J = 8.9 Hz, 1H), 7.63 (d, J = 8.8 Hz, 2H), 5.69-5.22 (m, 1H), 5.14 (dt, J = 54.9 Hz, 1H), 4.58 (s, 2H), 4.18 (s, 3H), 3.74 (t, J = 13.0 Hz, 2H), 3.03 (ddd, J = 15.8, 10.5, 5.0 Hz, 3H), 2.22 (ddd, J = 28.3, 14.9, 6.6 Hz, 1H), 2.06 (ddd, J = 23.2, 14.4, 6.5 Hz, 1H), 1.87 (td, J = 12.5, 4.0 Hz, 1H), 1.83-1.65 (m, 3H), 1.39 (d, J = 13.0 Hz, 1H), 1.25 (d, J = 13.3 Hz, 1H). 19F NMR (471 MHz, DMSO-d₆) δ -162.68. | 519 | 4 |
| 21 | | {6-[(3S,4S)-4-amino-3-methyl-2-oxa-8-azaspiro[4.5]decan-8-yl]-3-(4-chloro-2,3-dimethyl-2H-indazol-5-yl)-1H-pyrazolo[3,4-b]pyrazin-5-yl}methanol | 1H NMR (500 MHz, DMSO-d6) δ 13.62 (s, 1H), 7.58 (d, J = 8.8 Hz, 1H), 7.48 (d, J = 8.8 Hz, 1H), 5.32 (t, J = 5.8 Hz, 1H), 4.59 (d, J = 5.8 Hz, 2H), 4.17-4.04 (m, 4H), 3.69 (d, J = 8.5 Hz, 1H), 3.63-3.49 (m, 2H), 3.27-3.09 (m, 2H), 2.93 (d, J = 5.1 Hz, 1H), 2.87 (s, 3H), 1.96-1.74 (m, 2H), 1.7-1.54 (m, 2H), 1.35 (s, 2H), 1.10 (d, J = 6.4 Hz, 3H). | 497 | 4 |

TABLE 1-continued

The examples in Table 1 were prepared by following methods similar and/or analogous to those described in Methods 1-5, using the appropriate amines and boronates (or boronic acids) (peparations for which are described above). The title compounds were typically purified using coloumn chromatography (Biotage KP-NH, SiO$_2$ or C18 coloumns). In some cases, the title compound was prpepared as the HCl salt by adding HCl-dioxane to a sloution of the compound and evaporating to dryness.

| Example | Structure | Name | NMR Data | m/z | Method |
|---|---|---|---|---|---|
| 22 | | {6-[(3S,4S)-4-amino-3-methyl-2-oxa-8-azaspiro[4.5]decan-8-yl]-3-(5-chloro-3-methoxyquinoxalin-6-yl)-1H-pyrazolo[3,4-b]pyrazin-5-yl}methanol | $^1$H NMR (500 MHz, DMSO-d$_6$) δ 13.85 (s, 1NH), 8.74 (s, 1H), 8.11 (d, J = 8.5 Hz, 1H), 8.02 (d, J = 8.5 Hz, 1H), 5.35 (t, J = 5.7 Hz, 1H), 4.60 (d, J = 5.6 Hz, 2H), 4.14 (s, 3H), 4.11-4.05 (m, 1H), 3.69 (d, J = 8.5 Hz, 1H), 3.64-3.54 (m, 2H), 3.52 (d, J = 8.4 Hz, 1H), 3.28-3.21 (m, 1H), 3.20-3.13 (m, 1H), 2.93 (d, J = 5.1 Hz, 1H), 1.94-1.86 (m, 1H), 1.82-1.75 (m, 1H), 1.68-1.56 (m, 2H), 1.52-1.1 (m, 2H), 1.09 (d, J = 6.4 Hz, 3H) | 511 | 4 |
| 23 | | {6-[(3S,4S)-4-amino-3-methyl-2-oxa-8-azaspiro[4.5]decan-8-yl]-3-(3-chloro-2-fluorophenyl)-1H-pyrazolo[3,4-b]pyrazin-5-yl}methanol | $^1$H NMR (500 MHz, DMSO-d$_6$) δ 13.80 (s, 1H), 8.23 (ddd, J = 8.0, 6.5, 1.7 Hz, 1H), 7.66 (ddd, J = 8.3, 6.8, 1.7 Hz, 1H), 7.39 (t, J = 7.9 Hz, 1H), 5.39 (t, J = 5.7 Hz, 1H), 4.62 (d, J = 5.5 Hz, 2H), 4.07 (p, 1H), 3.68 (d, J = 8.4 Hz, 1H), 3.62-3.53 (m, 2H), 3.51 (d, J = 8.4 Hz, 1H), 3.27-3.19 (m, 1H), 3.18-3.10 (m, 1H), 2.92 (d, J = 5.1 Hz, 1H), 1.94-1.85 (m, 1H), 1.83-1.73 (m, 1H), 1.67-1.54 (m, 2H), 1.23 (s, 2H), 1.09 (d, J = 6.4 Hz, 3H). 19F NMR (471 MHz, DMSO-d$_6$) δ-115.39 (s) | 447 | 4 |
| 24 | | {6-[(3S,4S)-4-amino-3-methyl-2-oxa-8-azaspiro[4.5]decan-8-yl]-3-(2-chlorophenyl)-1H-pyrazolo[3,4-b]pyrazin-5-yl}methanol | $^1$H NMR (500 MHz, DMSO-d$_6$) δ 7.84-7.73 (m, 1H), 7.67-7.58 (m, 1H), 7.53-7.43 (m, 2H), 5.54-5.10 (m, 1H), 4.59 (s, 2H), 4.13-4.00 (m, 1H), 3.69 (d, J = 8.5 Hz, 1H), 3.64-3.48 (m, 3H), 3.23 (t, J = 10.5 Hz, 1H), 3.14 (t, J = 10.4 Hz, 1H), 2.93 (d, J = 5.1 Hz, 1H), 1.96-1.84 (m, 1H), 1.84-1.70 (m, 1H), 1.70-1.50 (m, 2H), 1.16-1.05 (m, 3H). | 429 | 4 |
| 25 | | (3S,4S)-8-{3-[3-(azetidin-1-yl)-5-chloroquinoxalin-6-yl]-5-methyl-1H-pyrazolo[3,4-b]pyrazin-6-yl}-3-methyl-2-oxa-8-azaspiro[4.5]decan-4-amine | 1H NMR (500 MHz, DMSO-d6) δ 13.71 (s, 1H), 8.41 s, 1H), 7.89 (d, J = 8.4 Hz, 1H), 7.66 (d, J = 8.4 Hz,1H), 4.30 (t, J = 7.5 Hz, 4H), 4.09 (p, J = 6.1 Hz, 1H), 3.70 (d, J = 8.4 Hz, 1H), 3.53 (d, J = 8.4 Hz, 1H), 3.50-3.38 (m, 2H), 3.18-2.99 (m, 2H), 2.94 (d, J = 5.1 Hz, 1H), 2.56 (s, 3H), 2.46 (q, J = 7.5 Hz, 2H), 1.99-1.86 (m, 1H), 1.85-1.74 (m, 1H), 1.71-1.55 (m, 2H), 1.34 (s, 2H), 1.10 (d, J = 6.3 Hz, 3H). | 520 | 2 |

TABLE 1-continued

The examples in Table 1 were prepared by following methods similar and/or analogous to those described in Methods 1-5, using the appropriate amines and boronates (or boronic acids) (peparations for which are described above). The title compounds were typically purified using coloumn chromatography (Biotage KP-NH, SiO₂ or C18 coloumns). In some cases, the title compound was prpepared as the HCl salt by adding HCl-dioxane to a sloution of the compound and evaporating to dryness.

| Example | Structure | Name | NMR Data | m/z | Method |
|---------|-----------|------|----------|-----|--------|
| 26 | | (3S,4S)-8-{3-[5-chloro-3-(morpholin-4-yl)quinoxalin-6-yl]-5-methyl-1H-pyrazolo[3,4-b]pyrazin-6-yl}-3-methyl-2-oxa-8-azaspiro[4.5]decan-4-amine | ¹H NMR (500 MHz, DMSO-d₆) δ 13.73 (s, 1H), 8.93 (s, 1H), 7.92 (d, J = 8.5 Hz, 1H), 7.72 (d, J = 8.5 Hz, 1H), 4.13-4.05 (m, 1H), 3.90-3.83 (m, 4H), 3.83-3.75 (m, 4H), 3.70 (d, J = 8.4 Hz, 1H), 3.53 (d, J = 8.4 Hz, 1H), 3.49-3.37 (m, 2H), 3.18-3.08 (m, 1H), 3.08-2.99 (m, 1H), 2.94 (d, J = 5.1 Hz, 1H), 2.56 (s, 3H), 1.96-1.86 (m, 1H), 1.86-1.74 (m, 1H), 1.71-1.57 (m, 2H), 1.41 (s, 2H), 1.10 (d, J = 6.4 Hz, 3H). | 550 | 2 |

Alternative Methods for Preparing Certain Compounds

Example 8: {6-[(3S,4S)-4-Amino-3-methyl-2-oxa-8-azaspiro[4.5]decan-8-yl]-3-(3,4-dichloro-2-methyl-2H-indazol-5-yl)-1H-pyrazolo[3,4-b]pyrazin-5-yl}methanol

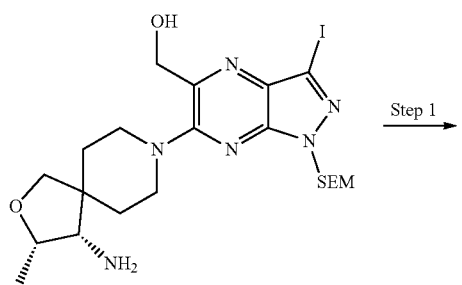

Step 1 →

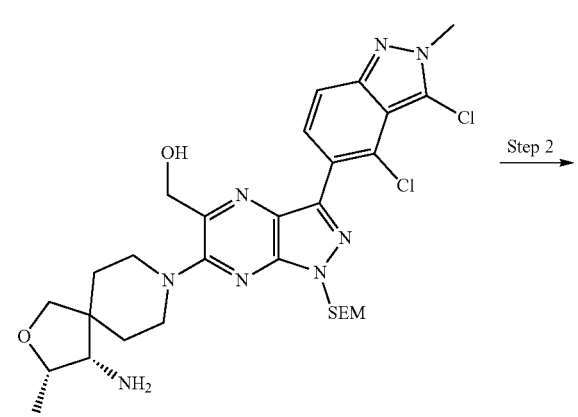

Step 2 →

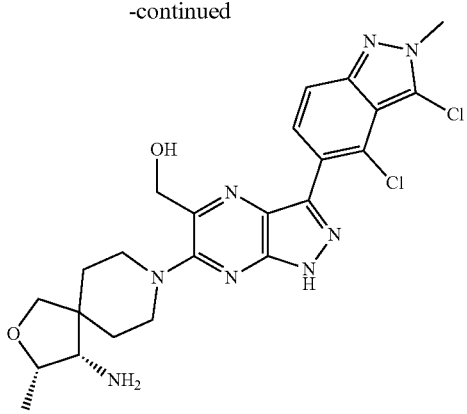

Step 1: A solution of {6-[(3S,4S)-4-amino-3-methyl-2-oxa-8-azaspiro[4.5]decan-8-yl]-3-iodo-1-{[2-(trimethylsilyl)ethoxy]methyl}-1H-pyrazolo[3,4-b]pyrazin-5-yl}methanol (Preparation 31) (1 equivalent), (3,4-dichloro-2-methyl-2H-indazol-5-yl)boronic acid (Preparation 15) (1.9 mol. eq.) and K₃PO₄ (3 mol. eq.) in 1,4-dioxane (10 vol.) and water (3 vol.) was degassed, evacuate/repressurize with nitrogen×3, then heated to 50° C. A degassed suspension of Pd(amphos)Cl₂ (0.1 mol. eq.) in 1,4-dioxane (1.5 vol.) at 50° C. was then added and the mixture was heated at 50° C. for 1 h. The mixture was filtered then diluted with water (27 vol.) and then extracted with ethyl acetate (3×15 vol.). The combined organic phases were concentrated under reduced pressure to give a dark yellow oil. The crude product was purified by chromatography on silica gel (0-10% 1M NH₃ in methanol/ethyl acetate) to afford (6-((3S,4S)-4-amino-3-methyl-2-oxa-8-azaspiro[4.5]decan-8-yl)-3-(3,4-dichloro-2-methyl-2H-indazol-5-yl)-1-((2-(trimethylsilyl)ethoxy)methyl)-1H-pyrazolo[3,4-b]pyrazin-5-yl)methanol (86% yield) as yellow foam. MS: [M+H]⁺=647.

Step 2: A solution of methanesulfonic acid (3.3 vol)* in water (0.9 vol.)* was added dropwise to a rapidly stirred, cooled (10° C.), solution of (6-((3S,4S)-4-amino-3-methyl-2-oxa-8-azaspiro[4.5]decan-8-yl)-3-(3,4-dichloro-2-methyl-2H-indazol-5-yl)-1-((2-(trimethylsilyl)ethoxy)methyl)-1H-pyrazolo[3,4-b]pyrazin-5-yl)methanol (1 equivalent) in dichloromethane (11 vol.). The mixture was warmed to room temperature then stirred rapidly for 45 minutes. The mixture was diluted with water (9 vol.) then the organic phase was removed. The aqueous phase was washed with a further portion of dichloromethane (9 vol) then separated. The aqueous layer was added dropwise to a rapidly stirred solution of 28% aqueous ammonium hydroxide (18 vol.) and dichloromethane (9 vol.). Rapid stirring was maintained for a further 18 h. The resulting heterogenous mixture was filtered to give a cream solid. The solid was washed with water (3.5 vol.) then suspended in methanol (7.4 vol.) and stirred with ethylenediamine (10 mol. eq.) at room temperature for 1 h. The solid was collected by filtration and washed with methanol (2×0.9 vol.) to yield a cream solid. The solid was further triturated with DCM:MeOH (9:1, 9 vol.) and ethanol (9 vol.). The solid was dissolved in a solution of methanesulfonic acid (2.1 mol. eq.) in water (3.7 vol.) then washed with isohexane (2×1.8 vol.). The aqueous layer was then added to a rapidly stirred mixture of 28% aqueous ammonium hydroxide (10.7 mol. eq. $NH_3$) in water (3.7 vol.). The resulting solid was collected by filtration and washed with water (2×0.9 vol) to yield a pale cream solid. The solid was triturated in hot methanol (7.4 vol.) to give the title compound (65% yield) as a pale cream solid.

* volume equivalents relative to starting material

Example 10: (3S,4S)-8-{3-[5-chloro-3-(dimethylamino)quinoxalin-6-yl]-5-methyl-1H-pyrazolo[3,4-b]pyrazin-6-yl}-3-methyl-2-oxa-8-azaspiro[4.5]decan-4-amine 2-diamine (4 mol. eq.) was added. The solution was stirred at 120° C. for 3 hours. Then, the reaction was cooled down to RT overnight. The reaction mixture was added to water (250 vol.). The suspension was extracted with EtOAc (3×250 vol). The combined organic phases were washed with brine (250 vol.), dried ($MgSO_4$), filtered, and then concentrated to give the crude brown oil. The crude was purified by chromatography column (eluting with 0-100% EtOAc/hexanes then 10% MeOH/DCM) to give a brown oil. The oil was further purified by chromatography column (eluting with 0-10% MeOH/DCM) to give (3S,4S)-8-(3-iodo-5-methyl-1-(tetrahydro-2H-pyran-2-yl)-1H-pyrazolo[3,4-b]pyrazin-6-yl)-3-methyl-2-oxa-8-azaspiro[4.5]decan-4-amine (62% yield) as a brown sticky solid. MS: $[M+H]^+$ =513. NMR (500 MHz, DMSO-d6) δ 5.75 (dd, 1H), 4.11-4.03 (m, 1H), 3.96-3.89 (m, 1H), 3.67 (d, J=8.5 Hz, 1H), 3.66-3.60 (m, 1H), 3.50 (dd, J=8.5, 1.6 Hz, 1H), 3.48-3.41 (m, 2H), 3.20-3.13 (m, 1H), 3.13-3.05 (m, 1H), 2.93 (dd, J=5.1, 1.6 Hz, 1H), 2.58 (s, 3H), 2.48-2.41 (m, 1H), 2.05-1.97 (m, 1H), 1.93-1.83 (m, 3H), 1.81-1.51 (m, 7H), 1.09 (d, J=6.4 Hz, 3H).

Step 2: A mixture of (3S,4S)-8-(3-iodo-5-methyl-1-(tetrahydro-2H-pyran-2-yl)-1H-pyrazolo[3,4-b]pyrazin-6-yl)-3-methyl-2-oxa-8-azaspiro[4.5]decan-4-amine (1 equivalent), 8-chloro-N,N-dimethyl-7-(4,4,5,5-tetramethyl-1,3,2-dioxaborolan-2-yl)quinoxalin-2-amine (Preparation 16) (2 mol. eq), Pd(amphos)$Cl_2$ (0.08 mol. eq. 1) and $K_3PO_4$ (3 mol. eq.) under vacuum was added 1,4-dioxane (10 vol.) and

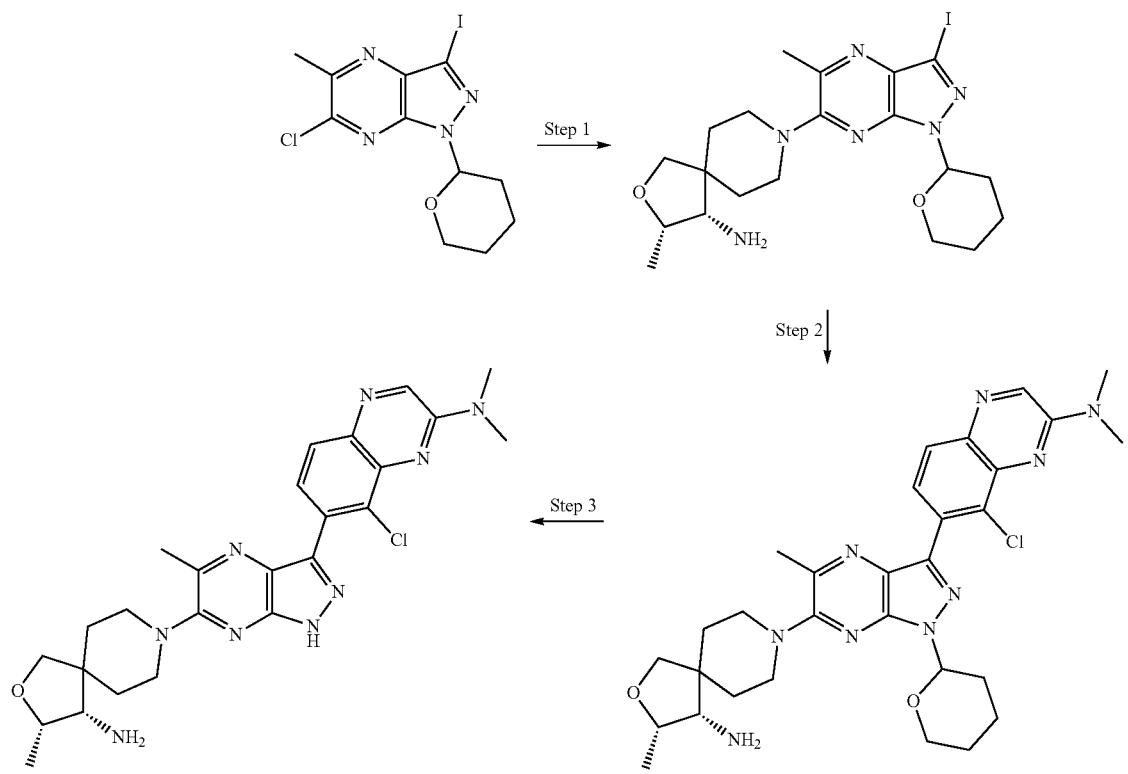

Step 1: (3S,4S)-3-methyl-2-oxa-8-azaspiro[4.5]decan-4-amine dihydrochloride (1 equivalent) and 6-chloro-3-iodo-5-methyl-1-(oxan-2-yl)-1H-pyrazolo[3,4-b]pyrazine (Preparation 1) (1 mol. eq.) were dissolved in 1-methylpyrrolidin-2-one (4 vol.) and $N_1,N_1,N_2,N_2$-tetraethylethane-1, water (2 vol). The vessel was back-filled with $N_2$ and evacuated and back-filled with $N_2$ an additional 3 times. The mixture was heated at 50° C. for 2 hours. The reaction mixture turned to dark brown solution. After 2 h of heating, the resulting grey green suspension was cooled down to RT and was diluted with EtOAc and 30% brine solution. The phases were separated and then the aqueous phase was extracted further with EtOAc. The combined organic extracts were dried through a phase layer separator, filtered and concentrated. Biotage column (KP-NH) eluting with 0%-100% EtOAc/i-Hexane; then to 100% DCM gave (3S, 4S)-8-(3-(5-chloro-3-(dimethylamino)quinoxalin-6-yl)-5-methyl-1-(tetrahydro-2H-pyran-2-yl)-1H-pyrazolo[3,4-b]pyrazin-6-yl)-3-methyl-2-oxa-8-azaspiro[4.5]decan-4-amine (82% yield) as a yellow solid. MS: [M+H]$^+$=592. $^1$H NMR (500 MHz, DMSO-d6) δ 8.80 (s, 1H), 7.88 (d, J=8.4 Hz, 1H), 7.58 (d, J=8.4 Hz, 1H), 5.92 (dd, J=10.1, 2.6 Hz, 1H), 4.09 (q, 1H), 4.01-3.97 (m, 1H), 3.73-3.67 (m, 2H), 3.54-3.51 (m, 1H), 3.51-3.43 (m, 1H), 3.31 (s, 6H), 3.23-3.16 (m, 1H), 3.14-3.07 (m, 1H), 2.95 (d, J=5.1 Hz, 1H), 2.55 (s, 3H), 2.53-2.51 (m, 2H), 2.12-2.05 (m, 1H), 2.01-1.96 (m, 1H), 1.95-1.88 (m, 1H), 1.84-1.74 (m, 2H), 1.71-1.64 (m, 1H), 1.64-1.56 (m, 3H), 1.35 (s, 2H), 1.10 (d, J=6.4 Hz, 3H).

Step 3: To a solution of (3S,4S)-8-(3-(5-chloro-3-(dimethylamino)quinoxalin-6-yl)-5-methyl-1-(tetrahydro-2H-pyran-2-yl)-1H-pyrazolo[3,4-b]pyrazin-6-yl)-3-methyl-2-oxa-8-azaspiro[4 0.5]decan-4-amine (1 equivalent) in MeOH (18 vol.) at room temperature was added HCl (4.0M in 1,4-dioxane) (18 vol.). The mixture was warmed to 40° C. and stirred for 1 hour. The reaction was concentrated under vacuum to give an orange solid which was then partitioned between aqueous NaHCO$_3$ and CHCl$_3$/IPA (3:1). The phases were separated and the aqueous phase was further extracted with 2×CHCl$_3$/IPA (3:1). The combined organic extracts were dried through a phase layer separator and concentrated in vacuo to give a crude yellow solid. The crude was purified by chromatography column using Biotage column (dry load KP-NH) eluting with 0%-10% MeOH in DCM to provide (3S,4S)-8-{3-[5-chloro-3-(dimethylamino)quinoxalin-6-yl]-5-methyl-1H-pyrazolo[3,4-b]pyrazin-6-yl}-3-methyl-2-oxa-8-azaspiro[4.5]decan-4-amine (47% yield) as a yellow solid. MS: [M+H]$^+$=508 (M+H)+.

Example 22: {6-[(3S,4S)-4-amino-3-methyl-2-oxa-8-azaspiro[4.5]decan-8-yl]-3-(5-chloro-3-methoxy-quinoxalin-6-yl)-1H-pyrazolo[3,4-b]pyrazin-5-yl}methanol

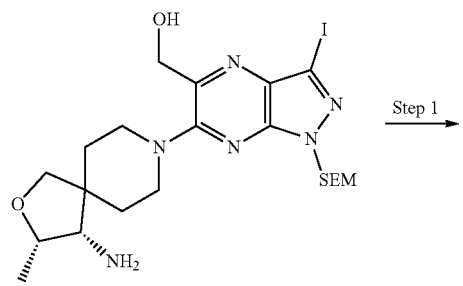

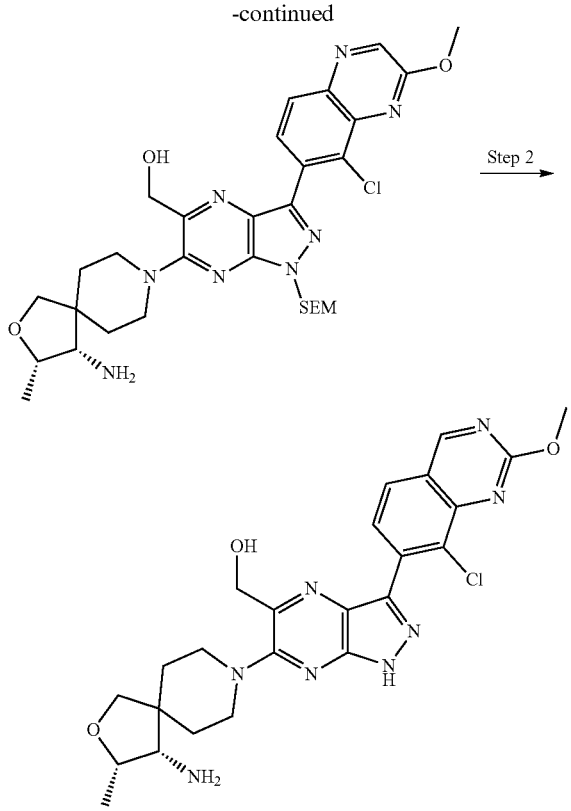

Step 1: A suspension of {6-[(3S,4S)-4-amino-3-methyl-2-oxa-8-azaspiro[4.5]decan-8-yl]-3-iodo-1-{[2-(trimethylsilyl)ethoxy]methyl}-1H-pyrazolo[3,4-b]pyrazin-5-yl}methanol (Preparation 31) (1 equivalent), 8-chloro-2-methoxy-7-(4,4,5,5-tetramethyl-1,3,2-dioxaborolan-2-yl) quinoxaline (1.7 mol. eq.) and K$_3$PO$_4$ (3 mol. eq.) in 1,4-dioxane (11 vol.) and water (0.9 vol.) was degassed using three evacuate/nitrogen backfill cycles. A preheated (50° C.) degassed suspension of Pd(amphos)Cl$_2$ (0.1 mol. eq.) in 1,4-dioxane (0.9 vol.) was added and the degassing cycle was repeated. The resultant yellow suspension was heated at 50° C. for 2 h. The reaction mixture was cooled to RT and then partitioned between DCM (45 vol.) and water (45 vol.). The phases were separated and the aqueous layer was extracted with DCM (2×45 vol.). The organic extracts were combined and washed with saturated brine (45 vol.), dried (phase separator) and concentrated in vacuo to afford a dark orange oil. The crude product was purified by chromatography on silica gel (0-10% (0.7 M ammonia/MeOH)/DCM) to afford (6-((3S,4S)-4-amino-3-methyl-2-oxa-8-azaspiro[4.5]decan-8-yl)-3-(5-chloro-3-methoxyquinoxalin-6-yl)-1-((2-(trimethylsilyl)ethoxy)methyl)-1H-pyrazolo[3,4-b]pyrazin-5-yl)methanol (87% yield) as a sticky yellow foam. MS: [M+H]$^+$=641. $^1$H NMR (500 MHz, DMSO-d6): 8.75 (s, 1H), 8.13 (d, J=8.5 Hz, 1H), 7.97 (d, J=8.5 Hz, 1H), 5.76 (s, 2H), 5.43 (t, J=5.8 Hz, 1H), 4.60 (d, J=5.7 Hz, 2H), 4.14 (s, 3H), 4.12-4.05 (m, 1H), 3.78-3.62 (m, 5H), 3.52 (d, J=8.4 Hz, 1H), 3.38-3.29 (m, 1H), 3.29-3.20 (m, 1H), 2.94 (d, J=5.0 Hz, 1H), 2.00-1.86 (m, 1H), 1.86-1.74 (m, 1H), 1.71-1.55 (m, 2H), 1.32 (s, 2H), 1.10 (d, J=6.4 Hz, 3H), 0.93-0.84 (m, 2H), −0.08 (s, 9H).

Step 2: A (biphasic) solution of (6-((3S,4S)-4-amino-3-methyl-2-oxa-8-azaspiro[4.5]decan-8-yl)-3-(5-chloro-3-methoxyquinoxalin-6-yl)-1-((2-(trimethylsilyl)ethoxy)

methyl)-1H-pyrazolo[3,4-b]pyrazin-5-yl)methanol (1 equivalent) in DCM (8 vol.) and water (0.8 vol.) was treated dropwise with methanesulfonic acid (10 mol. eq.). The resultant orange (biphasic) solution was stirred at RT for 1 h. The reaction mixture was recharged with methanesulfonic acid (10 mol. eq.) and the solution was stirred at RT for a further 1 h. The reaction mixture was diluted with DCM (17 vol) and water (26 vol.) and was vigorously stirred as 28% aqueous ammonium hydroxide (17 vol.) was added dropwise. The reaction mixture was stirred vigorously for 1 h. The resultant precipitate was filtered and washed with water to give a pale yellow solid. The filtrate was collected and was partitioned between $CHCl_3$/IPA (3:1, 43 vol.) and water (43 vol.). The phases were separated and the aqueous layer was extracted with 3:1 $CHCl_3$/IPA solution (3×43 vol.). The organics were combined, dried (phase separator) and the solvent was removed in vacuo to give a further batch of yellow solid. The combined pale yellow solids were suspended in MeOH (8 vol.) and ethane-1,2-diamine (5 mol. eq.) was added. The reaction mixture was stirred at RT for 30 mins. The heterogeneous mixture was filtered to afford a pale yellow solid. The crude product was purified by chromatography on silica gel (0-10% (0.7 M ammonia/MeOH)/DCM) to afford {6-[(3S,4S)-4-amino-3-methyl-2-oxa-8-azaspiro[4.5]decan-8-yl]-3-(5-chloro-3-methoxyquinoxalin-6-yl)-1H-pyrazolo[3,4-b]pyrazin-5-yl}methanol (23% yield) as a pale yellow solid. MS: $[M+H]^+=511$.

Biological Assays

Shp2 Biochemical Assay

SHP2 activity was monitored by measuring the conversion of the surrogate substrate 6,8-difluoromethylumbelliferyl phosphate (DiFMUP) to the fluorescent product, 6,8-difluoromethylumbelliferone (DiFMU).

SHP2 was pre-incubated with test compounds and the activating peptide pIRS1 ($H_2$N-LN(pY)IDLDLV-$(PEG)_8$-LST(pY)ASINFQK-amide) for 30 min, prior to addition of the 6,8-difluoromethylumbelliferyl phosphate (DiFMUP), (Thermo Fisher D6567). Final assay concentrations were 10 pM SHP2, 0.25 µM pIRS1 peptide, 50 µM DiFMUP, 25 mM Bis-Tris propane, pH 7.0, 150 mM NaCl, 0.05% (v/v) Tween-20, 0.5 mM TCEP and 5% (v/v) DMSO. Rates of reaction were then measured over 30 min by monitoring fluorescence on a BMG Pherastar reader at excitation 360 nm/emission 450 nm. $IC_{50}$ values were calculated from the normalized dose-response plots using four parameter logistic curve fit.

Cellular pERK Inhibition Assay

HCC827 cells (ATCC, Manassas, USA) were seeded into 96-well plates at a density of $1×10^5$ cells/well in RPMI medium supplemented with 10% FBS and incubated 24 h. Compounds were diluted first in DMSO and then into serum-free medium, before being added to cells in triplicate to give a final concentration of 0.1% DMSO. Plates were incubated at 37° C. for 0.5 hours in a humidified atmosphere of 5% $CO_2$ in air.

Following compound treatment, medium was removed and cells were lysed by adding 50 µL of lysis buffer (Cell Signalling Technology, Beverly, USA) to each well. Plates were then incubated at room temperature for 25 minutes with shaking. pERK levels were measured in lysates using the PathScan® phospho-p44/42 MAPK (Thr202/Tyr204) sandwich ELISA (Cell Signalling Technology, Beverly, USA) as per kit instructions. Briefly, 50 µL of cell lysate was added to 50 µL of ELISA sample diluent in a 96-well ELISA plate and incubated overnight at 4° C. Following washing, 100 µL of detection antibody was added per well and the plates incubated for 1 hour at 37° C. Plates were washed again and incubated at 37° C. for 30 minutes with 100 µl of HRP-linked secondary antibody per well. After final washing, 100 µL per well of TMB substrate was added and plates incubated at 37° C. to develop colour. Colour development was stopped by the addition of 100 µL per well of stop solution. Plates were read at 450 nm on a SpectraMax Gemini reader (Molecular Devices, Uckfield, UK).

The average signal from blank wells (no cells added) was subtracted from the signals from each sample well. Levels of pERK were then expressed as "percent of control", using DMSO treated samples as control. Dose response curves were generated using GraphPad Prism Version 6 (GraphPad Software, La Jolla, USA) and fitted using the four parameter logistic curve fit.

Results

TABLE 2 biological data obtained from assays as described herein

| Example | SHP2 (IC50, µM) | Cellular pERK assay (IC50, µM) |
| --- | --- | --- |
| 1 | 0.020 | 0.074 |
| 2 | 0.017 | 0.081 |
| 3 | 0.0056 | 0.040 |
| 4 | 0.0053 | — |
| 5 | 0.0076 | 0.046 |
| 6 | 0.018 | 0.012 |
| 7 | 0.011 | 0.0063 |
| 8 | 0.0071 | 0.0036 |
| 9 | 0.018 | 0.045 |
| 10 | 0.019 | 0.017 |
| 11 | 66%@0.030 | 0.032 |
| 12 | 0.015 | 0.033 |
| 13 | 35%@0.010 | 0.095 |
| 14 | 0.013 | 0.15 |
| 15 | 0.0076 | 0.059 |
| 16 | 0.0070 | 0.0062 |
| 17 | 0.014 | 0.0053 |
| 18 | 37%@0.0030 | 0.0049 |
| 19 | 0.0098 | 0.10 |
| 20 | 0.0071 | 0.0041 |
| 21 | 0.015 | 0.0057 |
| 22 | 0.011 | 0.0084 |
| 23 | 0.0054 | 0.0058 |
| 24 | 0.011 | 0.0064 |
| 25 | 0.024 | 0.028 |
| 26 | 0.028 | 0.018 |

Where more than one data point has been obtained, the table above shows an average (e.g. geometric or arithmetic mean) of these data points.

Combination Protocol for Cell Proliferation

The effect of a compound of formula (I) (Compound 1) in combination with (Compound II) can be assessed using the following techniques.

Protocol 1

Cells from human cancer cells lines (e.g. as available from commercial sources such as ATCC or ECCAC) are seeded onto 96-well tissue culture plates, for example at a concentration of $2×10^3$-$4×10^3$ cells/well. Cells are allowed to recover for 16-24 hours prior to addition of compound(s) or vehicle control (e.g. 0.1-0.5% DMSO).

A dose response matrix of compounds in 0.1%-0.5% (v/v) dimethyl sulfoxide (DMSO) can be added according to one of the following schedules;
   a) Concurrent for 72 hours.
   b) Compound I for 24 hours followed by Compound II for 48 hours.
   c) Compound II for 24 hours followed by Compound I for 48 hours.

Following a total of 72-96 hours compound incubation, 20 μl Alamar blue is added. After a further 6 h incubation at 37° C. the plate can be read, for example on a Spectramax Gemini reader (Molecular Devices; excitation 535 nm, emission 590 nm). $GI_{50}$ values are calculated using a sigmoidal dose response equation (Prism GraphPad software, La Jolla, CA, USA). The $GI_{50}$ or $IC_{50}$ for Compound II in the presence of varying doses of Compound I can then be determined.

Alternatively, following a total of 72-96 hours compound incubation, cells were fixed with ice-cold 10% (w/v) trichloroacetic acid for 1 hour on ice and then washed four times with $dH_2O$ using a plate washer (Labsystems Wellwash Ascent) and air-dried. Cells are then stained with 0.4% (w/v) Sulforhodamine B (Sigma) in 1% acetic acid for 20 min at room temperature and then washed four times with 1% (v/v) acetic acid and air-dried before the addition of 10 mM Tris buffer to solubilize the dye. Colourmetric product is quantified by reading at Abs490 nm or Abs570 nm, for example on a Wallac Victor$^2$ plate reader (1420 multilabel counter, Perkin Elmer Life Sciences). The $GI_{50}$ or $IC_{50}$ for Compound II in the presence of varying doses of Compound I was determined.

Synergy is determined when the $GI_{50}$ or $IC_{50}$ shifted down in the presence of sub-effective doses of Compound I. Additivity was determined when the response to Compound II and Compound I together resulted in an effect equivalent to the sum of the two compounds individually. Antagonistic effects were defined as those causing the $GI_{50}$ or $IC_{50}$ to shift upwards, i.e. those where the response to the two compounds was less than the sum of the effect of the two compounds Protocol 2

Cells from human cancer cells lines (e.g. as available from commercial sources such as ATCC or ECCAC) are seeded onto 96-well tissue culture plates, for example at a concentration of $2 \times 10^3$-$4 \times 10^3$ cells/well. Cells are allowed to recover for 16-24 hours prior to addition of compound(s) or vehicle control (e.g. 0.1-0.5% DMSO).

Following a total of 120 hours compound incubation, 100 μl CellTiter-Glo Reagent® (Promega) is added. After a brief 10 minutes incubation at room temperature the plate can be read with a luminometer for example on an Envision reader (Perkin Elmer). IC50 and % inhibition values are calculated using XLfit. The IC50 or % inhibition for Compound II in the presence of varying doses of Compound I can then be determined.

Synergy analysis is performed using a custom R-script to batch process raw data files. Various numerical and graphical outputs were generated to summarize the data. SynergyFinder was used to determine whether the two test compounds demonstrate synergy using four independent mathematical reference models (Loewe additivity, Bliss independence, Highest Single Agent and ZIP).

Protocol 3

Cell lines and culture medium can be used as shown below. Cell lines were obtained from ATCC or Health Science Research Resources Bank.

| Cell line | Culture medium | Cell number (Cells/20 μL/well) |
|---|---|---|
| NCI-H358, MKN45, NCI-H23 | ATCC formulated RPMI-1640 (10% fetal bovine serum) | 500 |
| RT 4 | McCoy's 5A (10% fetal bovine serum) | 500 |
| MV-4-11 | IMDM (10% fetal bovine serum) | 500 |
| RMG-I | Ham's F12 (10% fetal bovine serum) | 500 |

384 well culture plate (781086, Greiner Bio-One International) can be used for cell survival rate measurement assay. Each cell lines are collected by ordinary method, then suspended in indicated medium containing 10% fetal bovine serum. The number of cells seeded per well is set to 500 cells/20 μL. After incubation at 37° C. for 24 hours under 5% $CO_2$, Compound I and Compound II having an antitumor effect or a vehicle (DMSO) was added to each well by using D300e Digital Dispenser (Tecan). The concentration of Compound I was set to 10 concentrations. The concentration of each anti-cancer reagents set to 8 concentrations including 0 nM. After adding the medicine to the cells, the cells were further incubated at 37° C. for 3 days under 5% $CO_2$. Cell survival rates are calculated by adding 20 μL of CellTiter-Glo®2.0 (Promega) solution to each well, incubating the cells at room temperature for 10 minutes, and then measuring the chemiluminasecence intensity of each well using a plate reader (ARVO).

A combination index (CI) value at each combined concentration of the medicines is determined. The combinatory effect of the two medicines was assessed as shown below (Trends Pharmacol. Sci. 4, 450-454, 1983; Pharmacol Rev. 2006, 58(3), 621-81).

| CI Range (upper limit) | Description |
|---|---|
| <0.1 | Very strong synergy |
| 0.1-0.3 | Strong synergy |
| 0.3-0.7 | Synergy |
| 0.7-0.85 | Moderate synergy |
| 0.85-0.9 | Slight synergy |
| 0.9-1 | Almost additive |
| 1-1.2 | Slight antagonism |
| 1.2-1.45 | Moderate antagonism |
| 1.45-3.3 | Antagonism |
| 3.3-10 | Strong antagonism |
| >10 | Very strong antagonism |

It is of course to be understood that the invention is not intended to be restricted to the details of the above embodiments which are described by way of example only.

Pharmaceutical Formulations Examples (i) Tablet Formulation

A tablet composition containing a compound of the formula (I) is prepared by mixing an appropriate amount of the compound (for example 50-250 mg) with an appropriate diluent, disintegrant, compression agent and/or glidant. One possible tablet comprises 50 mg of the compound with 197 mg of lactose (BP) as diluent, and 3 mg magnesium stearate as a lubricant and compressing to form a tablet in known manner. The compressed tablet may be optionally film coated.

(ii) Capsule Formulation

A capsule formulation is prepared by mixing 100-250 mg of a compound of the formula (I) with an equivalent amount of lactose and filling the resulting mixture into standard hard gelatin capsules. An appropriate disintegrant and/or glidant can be included in appropriate amounts as required.

(iii) Injectable Formulation I

A parenteral composition for administration by injection can be prepared by dissolving a compound of the formula (I) (e.g. in a salt form) in water containing 10% propylene glycol to give a concentration of active compound of 1.5% by weight. The solution is then made isotonic, sterilised by filtration or by terminal sterilisation, filled into an ampoule or vial or pre-filled syringe, and sealed.

(iv) Injectable Formulation II

A parenteral composition for injection is prepared by dissolving in water a compound of the formula (I) (e.g. in salt form) (2 mg/ml) and mannitol (50 mg/ml), sterile filtering the solution or by terminal sterilisation, and filling into sealable 1 ml vials or ampoules or pre-filled syringe.

(v) Injectable Formulation III

A formulation for i.v. delivery by injection or infusion can be prepared by dissolving the compound of formula (I) (e.g. in a salt form) in water at 20 mg/ml and then adjusted for isotonicity. The vial is then sealed and sterilised by autoclaving or filled into an ampoule or vial or pre-filled syringe, sterilised by filtration and sealed.

(vi) Injectable Formulation IV

A formulation for i.v. delivery by injection or infusion can be prepared by dissolving the compound of formula (I) (e.g. in a salt form) in water containing a buffer (e.g. 0.2 M acetate pH 4.6) at 20 mg/ml. The vial, ampoule or pre-filled syringe is then sealed and sterilised by autoclaving or sterilized by filtration and sealed.

(vii) Subcutaneous or Intramuscular Injection Formulation

A composition for sub-cutaneous or intramuscular administration is prepared by mixing a compound of the formula (I) with pharmaceutical grade corn oil to give a concentration of 5-50 mg/ml. The composition is sterilised and filled into a suitable container.

(viii) Lyophilised Formulation I

Aliquots of formulated compound of formula (I) are put into 50 ml vials and lyophilized. During lyophilisation, the compositions are frozen using a one-step freezing protocol at (−45° C.). The temperature is raised to −10° C. for annealing, then lowered to freezing at −45° C., followed by primary drying at +25° C. for approximately 3400 minutes, followed by a secondary drying with increased steps if temperature to 50° C. The pressure during primary and secondary drying is set at 80 millitor.

(ix) Lyophilised Formulation II

Aliquots of formulated compound of formula (I) or a salt thereof as defined herein are put into 50 mL vials and lyophilized. During lyophilisation, the compositions are frozen using a one-step freezing protocol at (−45° C.). The temperature is raised to −10° C. for annealing, then lowered to freezing at −45° C., followed by primary drying at +25° C. for approximately 3400 minutes, followed by a secondary drying with increased steps if temperature to 50° C. The pressure during primary and secondary drying is set at 80 millitor.

(x) Lyophilised Formulation for Use in i.v. Administration III

An aqueous buffered solution is prepared by dissolving a compound of formula I in a buffer. The buffered solution is filled, with filtration to remove particulate matter, into a container (such as a Type 1 glass vial) which is then partially sealed (e.g. by means of a Fluorotec stopper). If the compound and formulation are sufficiently stable, the formulation is sterilised by autoclaving at 121° C. for a suitable period of time. If the formulation is not stable to autoclaving, it can be sterilised using a suitable filter and filled under sterile conditions into sterile vials. The solution is freeze dried using a suitable cycle. On completion of the freeze drying cycle the vials are back filled with nitrogen to atmospheric pressure, stoppered and secured (e.g. with an aluminium crimp). For intravenous administration, the freeze dried solid can be reconstituted with a pharmaceutically acceptable diluent, such as 0.9% saline or 5% dextrose. The solution can be dosed as is, or can be diluted further into an infusion bag (containing a pharmaceutically acceptable diluent, such as 0.9% saline or 5% dextrose), before administration.

(xii) Powder in a Bottle

A composition for oral administration is prepared by filling a bottle or vial with a compound of the formula (I). The composition is then reconstituted with a suitable diluent for example water, fruit juice, or commercially available vehicle such as OraSweet or Syrspend. The reconstituted solution may be dispensed into dosing cups or oral syringes for administration.

The invention claimed is:

1. A compound of formula (I):

or a pharmaceutically acceptable salt thereof, wherein:
$R^1$ is hydrogen or hydroxyl;
$R^2$ and $R^3$ are independently selected from hydrogen, halogen, $C_{1-4}$alkyl, haloC$_{1-4}$alkyl, hydroxyC$_{1-4}$alkyl and —CN;
X is O or CR$^4$R$^5$;
$R^4$ and $R^5$ are independently selected from hydrogen, halogen, hydroxyl, C$_{1-4}$alkyl, C$_{1-4}$alkoxy and haloC$_{1-4}$alkyl;
$R^6$ and $R^7$ join to form a Ring A which is optionally substituted by one or more R$^{10}$ groups;
Ring A is either:
  (i) a five-membered nitrogen-containing heterocyclic ring wherein the heterocyclic ring optionally contains one or two additional heteroatoms selected from N, O and S, or
  (ii) a six-membered aromatic nitrogen-containing heterocyclic ring, wherein the heterocyclic ring optionally contains one or two additional heteroatoms selected from N, O and S; or
  (iii) a six-membered non-aromatic nitrogen-containing heterocyclic ring, wherein the heterocyclic ring optionally contains one or two additional heteroatoms selected from N and S;
$R^8$ is selected from haloC$_{1-4}$alkyl, —CH$_3$ and halogen;
$R^9$ is selected from hydrogen, C$_{1-4}$alkyl, haloC$_{1-4}$alkyl and halogen;

$R^{10}$ are independently selected from halogen, cyano, cyano$C_{1-4}$alkyl, hydroxyl, =O (oxo), $C_{1-4}$alkyl, halo$C_{1-4}$alkyl, $C_{1-4}$alkoxy, hydroxyl$C_{1-4}$alkyl, $C_{1-4}$alkoxy$C_{1-4}$alkylene, $C_{1-4}$alkylsulfone, amino, mono$C_{1-4}$alkylamino, di$C_{1-4}$alkylamino, amino$C_{1-4}$alkylene, —$C_{1-4}$alkylene-C(=O)NH$_{(2-q)}$($C_{1-6}$ alkyl)$_q$), —$C_{0-4}$alkylene-NHC(=O)$C_{1-6}$alkyl, sulfonamide $C_{0-4}$alkylene, 3 to 6 membered cycloalkyl, optionally substituted five- or six-membered unsaturated heterocyclic group containing 1, 2, 3 or 4 heteroatoms selected from O, N, and S where the optional substituent is selected from $C_{1-4}$alkyl, $C_{1-4}$alkyl substituted with 3 to 6 membered cycloalkyl, $C_{1-4}$alkyl substituted with optionally substituted five- or six-membered unsaturated heterocyclic group containing 1, 2, 3 or 4 heteroatoms selected from O, N, and S where the optional substituent is selected from $C_{1-4}$alkyl, $C_{1-4}$alkyl substituted with optionally substituted four- to six-membered saturated heterocyclic group containing 1 or 2 heteroatoms selected from O, N, and S where the optional substituent is selected from $C_{1-4}$alkyl, and optionally substituted four- to six-membered saturated heterocyclic group containing 1 or 2 heteroatoms selected from O, N, and S where the optional substituent is selected from $C_{1-4}$alkyl; and q is selected from 0, 1 and 2.

2. A compound of formula (I) according to claim 1, or a pharmaceutically acceptable salt thereof, wherein X is:
O; or
$CR^4R^5$, and $R^4$ and $R^5$ are independently selected from hydrogen, halogen and $C_{1-4}$alkyl optionally substituted by one or more halogen, optionally wherein $R^4$ is hydrogen and $R^5$ is selected from halogen and halomethyl.

3. A compound of formula (I) according to claim 1, or a pharmaceutically acceptable salt thereof, wherein:
$R^1$ is hydroxyl or hydrogen; and/or
$R^2$ is hydrogen and $R^3$ is selected from $C_{1-4}$alkyl, halo$C_{1-4}$alkyl, hydroxy$C_{1-4}$alkyl and —CN; and/or
$R^8$ is selected from —$CH_3$, chlorine and fluorine; and/or
$R^9$ is hydrogen.

4. A compound of formula (I) according to claim 3, or a pharmaceutically acceptable salt thereof, wherein:
$R^2$ is hydrogen and $R^3$ is $CH_3$; and/or
$R^8$ is chlorine.

5. A compound of formula (I) according to claim 1, or a pharmaceutically acceptable salt thereof, wherein Ring A is:
a five-membered nitrogen-containing an aromatic or a non-aromatic heterocyclic ring, or a six-membered aromatic nitrogen-containing heterocyclic ring, wherein the heterocyclic ring optionally contains one or two additional heteroatoms selected from N, O and S; or
a five-membered nitrogen-containing an aromatic or a non-aromatic heterocyclic ring, wherein the heterocyclic ring optionally contains one or two additional heteroatoms selected from N, O and S; or
a five-membered aromatic nitrogen-containing heterocyclic ring, wherein the heterocyclic ring optionally contains one or two additional heteroatoms selected from N and S.

6. A compound of formula (I) according to claim 5, or a pharmaceutically acceptable salt thereof, wherein Ring A is:
a five-membered aromatic nitrogen-containing heterocyclic ring, wherein the heterocyclic ring optionally contains one or two additional heteroatoms selected from N and S.

7. A compound according to claim 1, or a pharmaceutically acceptable salt thereof, wherein Ring A is either:
(i) a six-membered aromatic nitrogen-containing heterocyclic ring, wherein the heterocyclic ring optionally contains one or two additional heteroatoms selected from N, O and S; or
(ii) a six-membered non-aromatic nitrogen-containing heterocyclic ring, wherein the heterocyclic ring optionally contains one or two additional heteroatoms selected from N and S.

8. A compound according to claim 1, or a pharmaceutically acceptable salt thereof, wherein the moiety

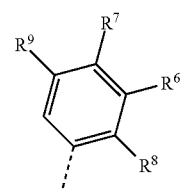

is selected from Table I or Table II below:

TABLE I

| A | 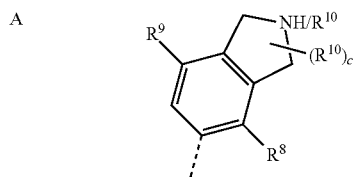 |
| | 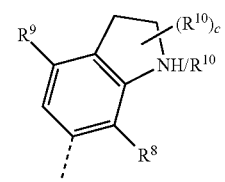 |
| | 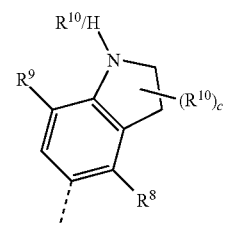 |
| B | 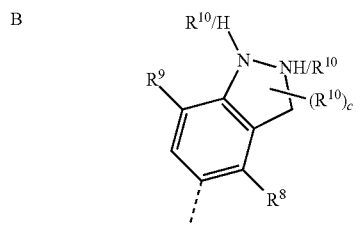 |

TABLE I-continued
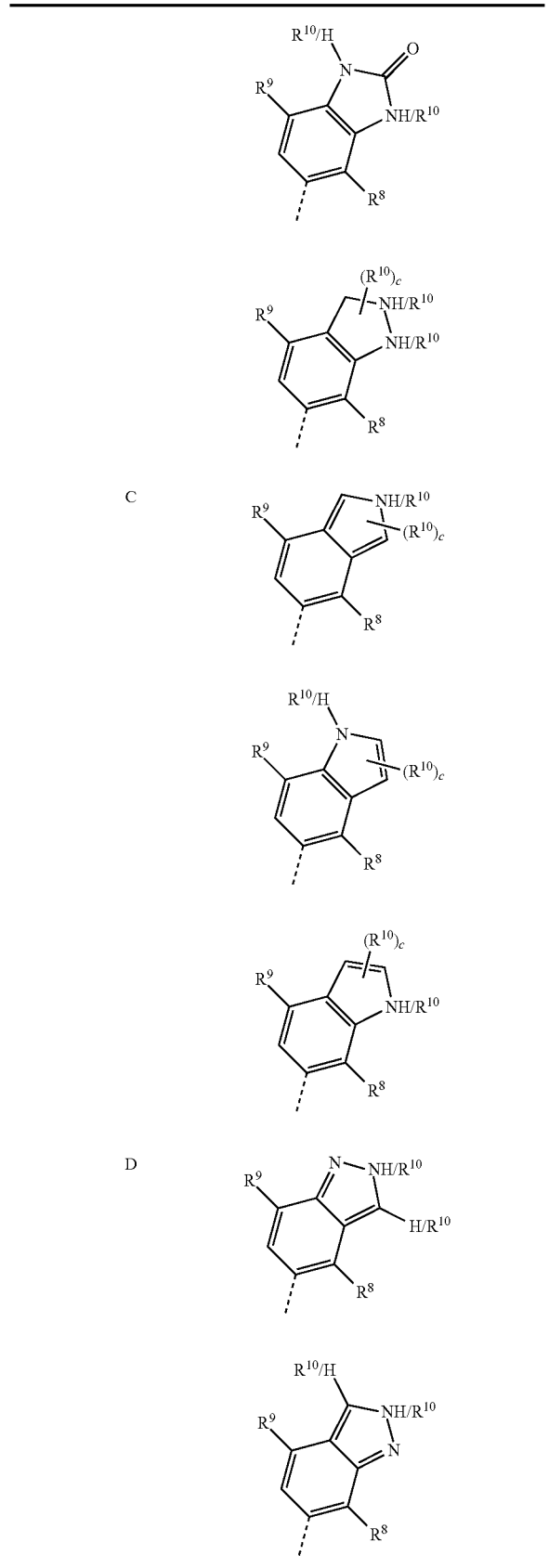
TABLE I-continued
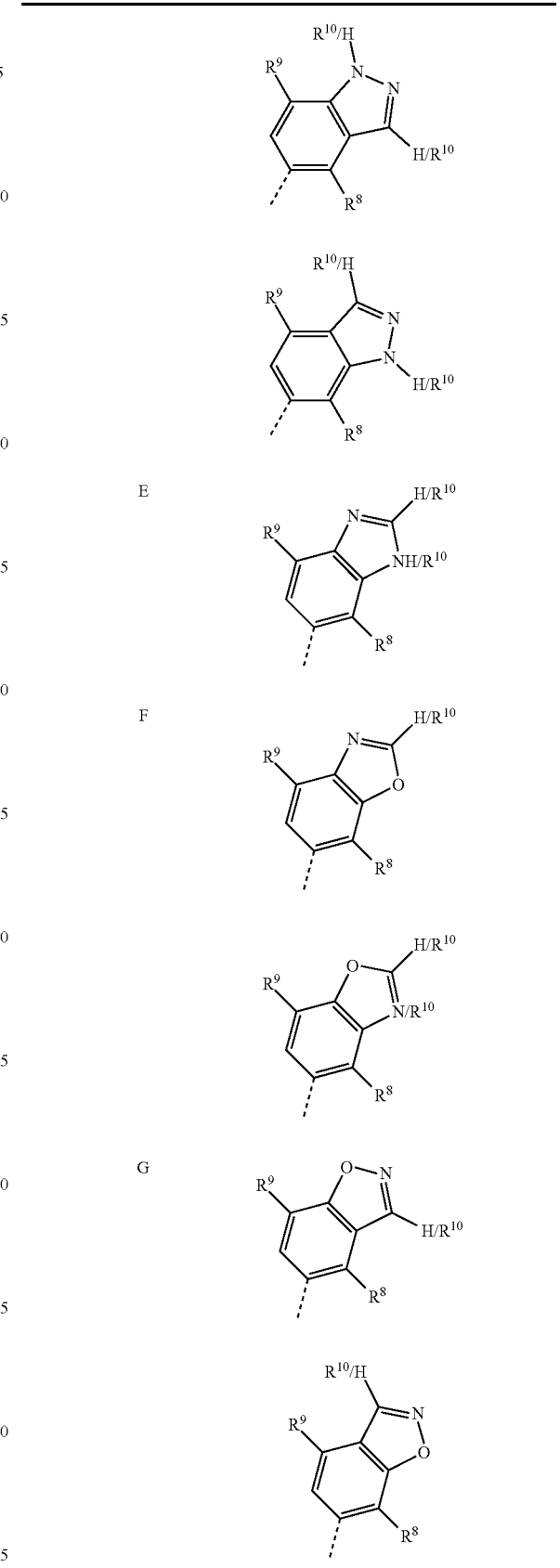

TABLE I-continued
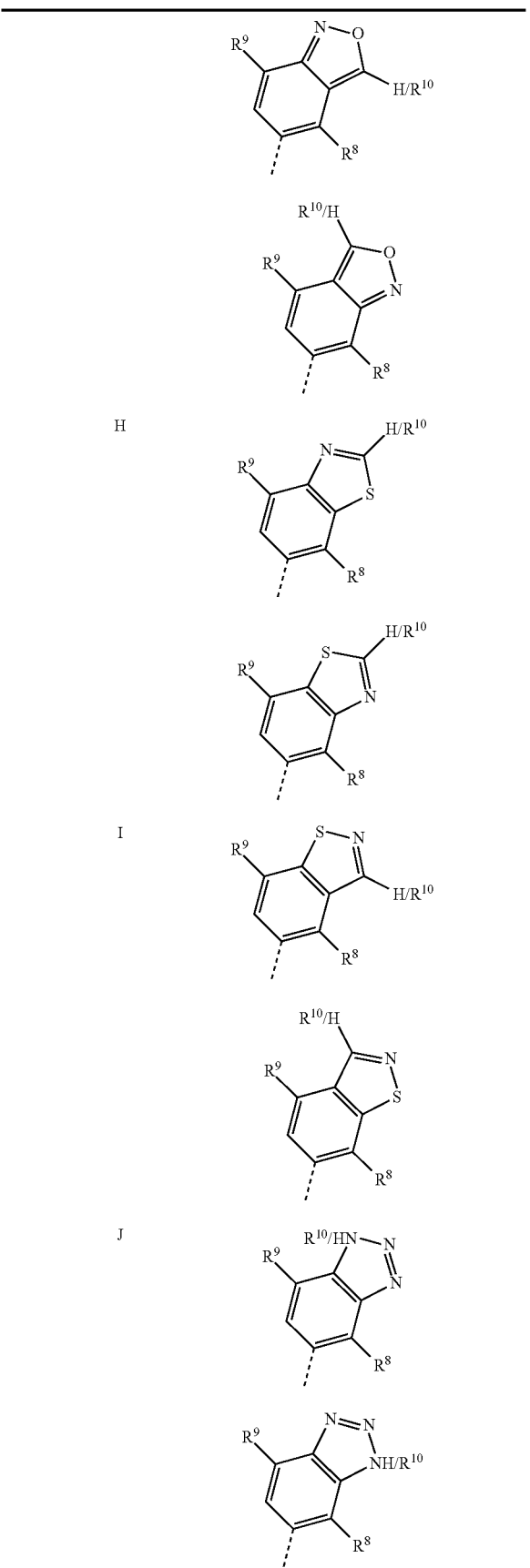
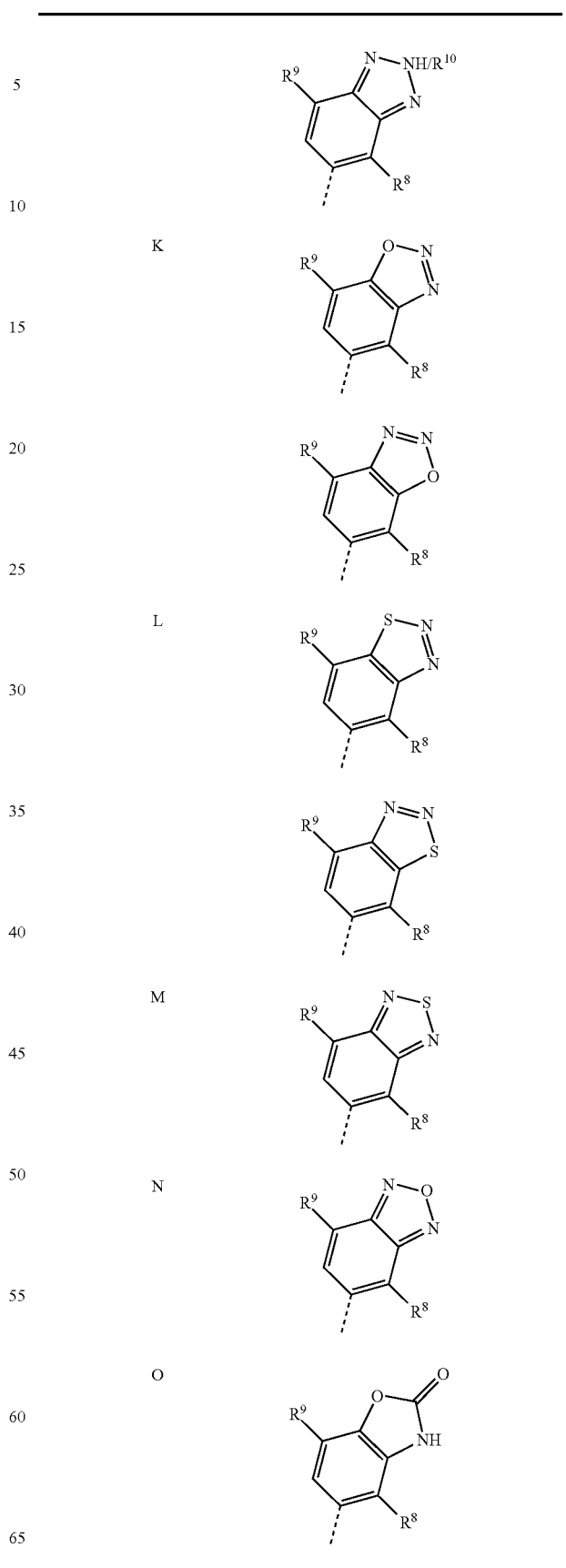

TABLE I-continued
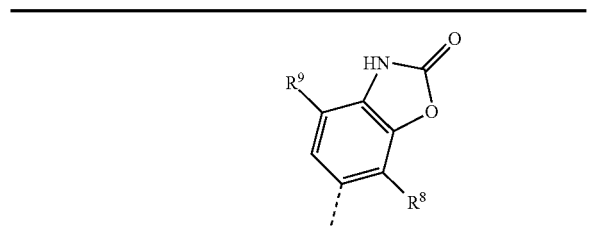
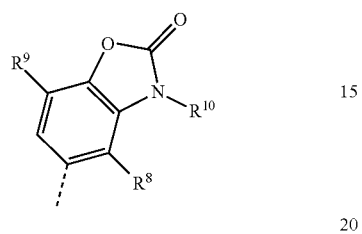
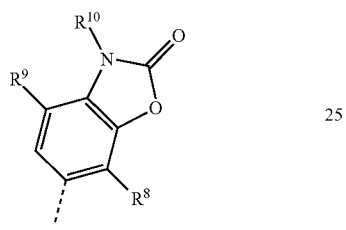
P
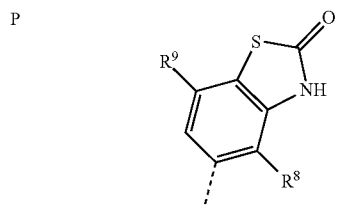
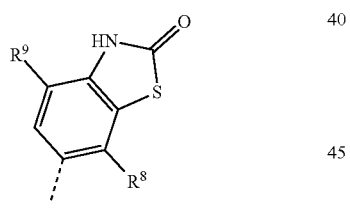
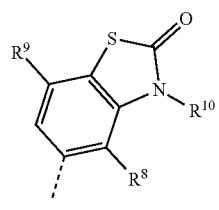
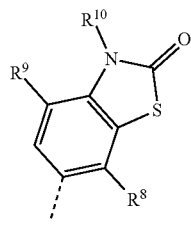
TABLE I-continued
Q 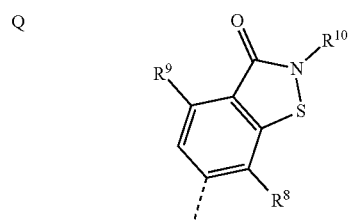
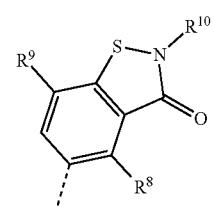
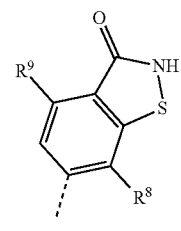
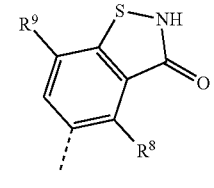
R 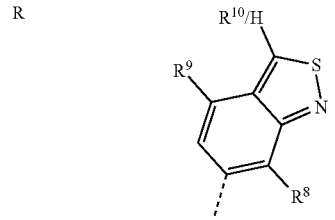
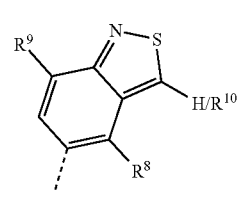
TABLE II
A 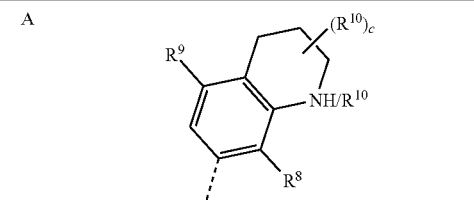

TABLE II-continued
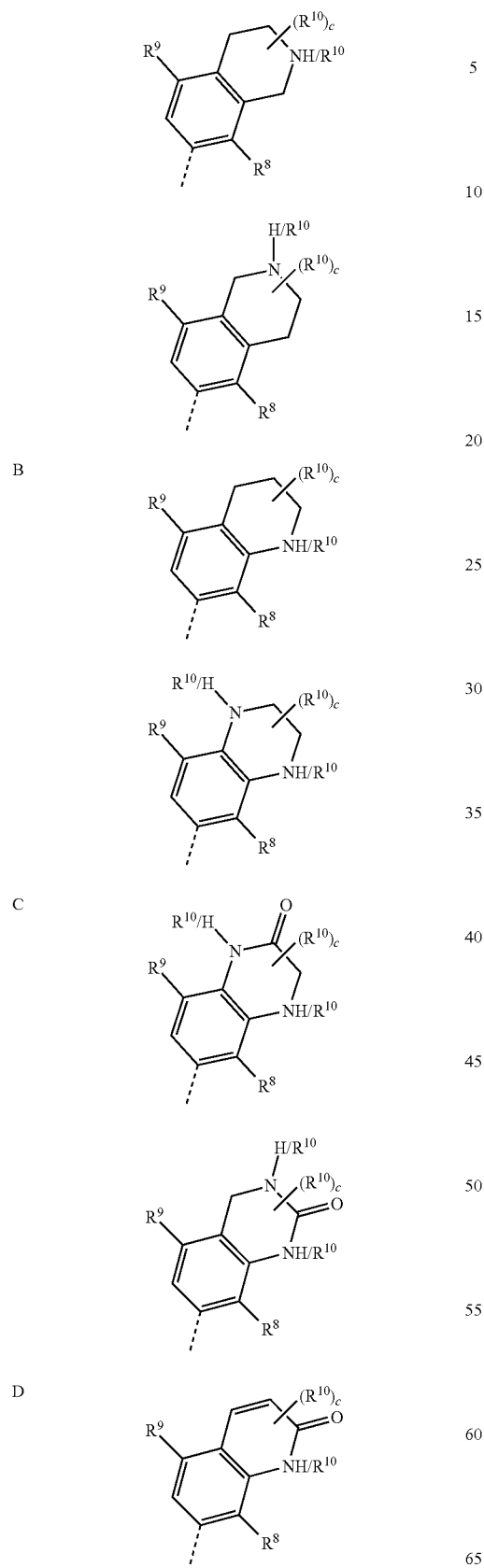
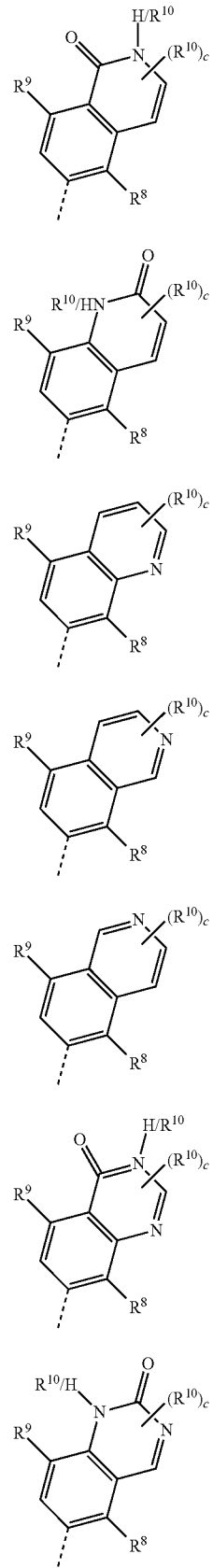

TABLE II-continued

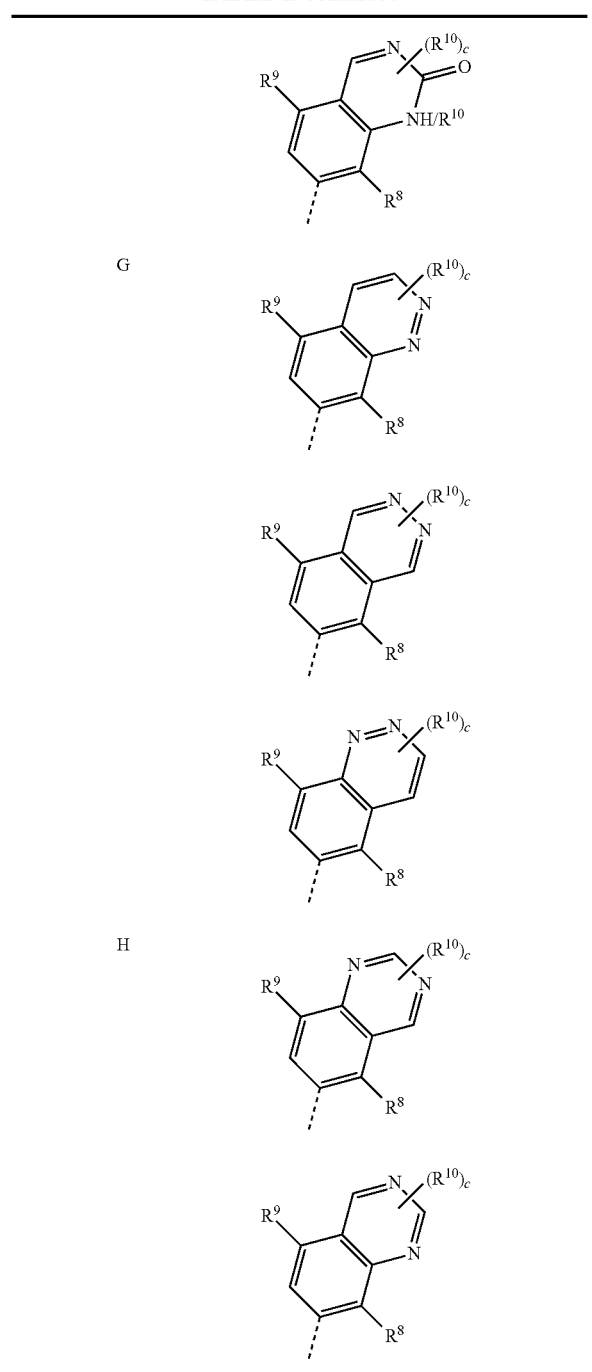

or is selected from:

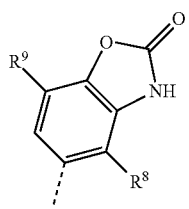  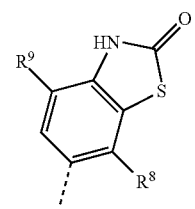

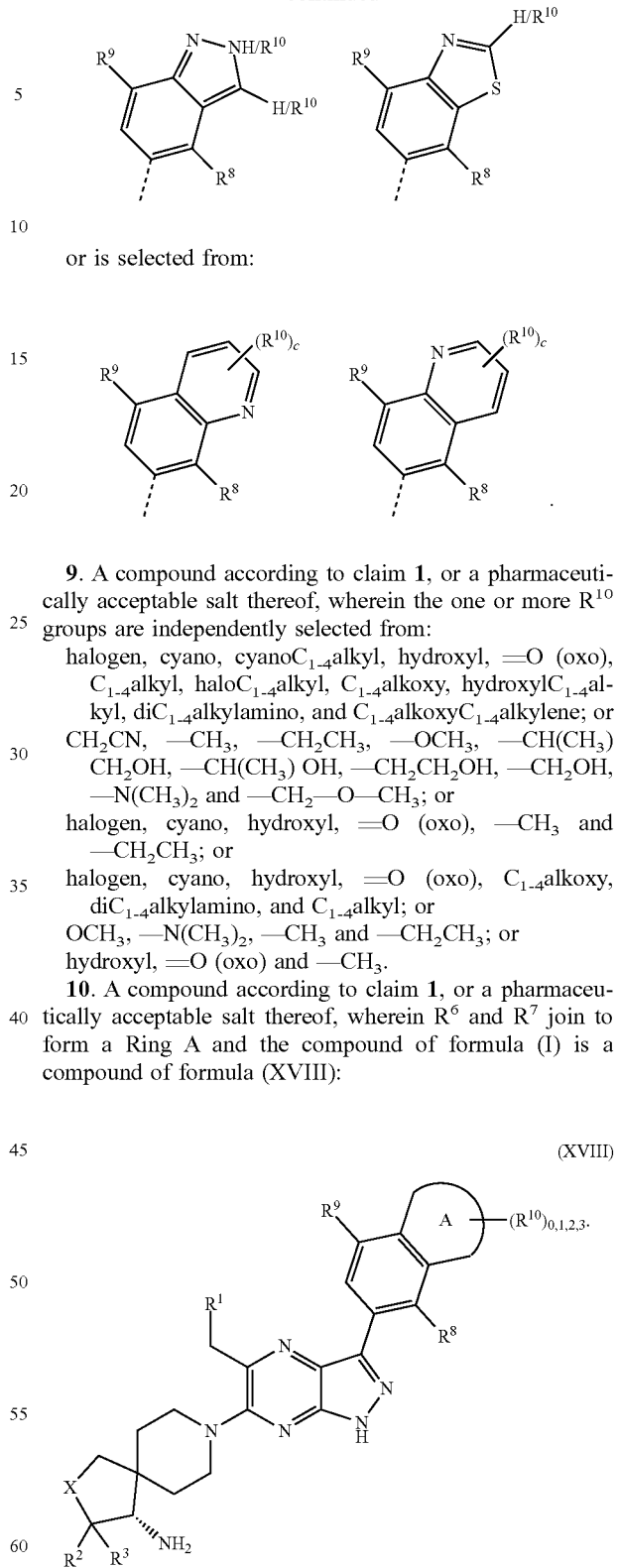

or is selected from:

9. A compound according to claim 1, or a pharmaceutically acceptable salt thereof, wherein the one or more $R^{10}$ groups are independently selected from:
  halogen, cyano, cyano$C_{1-4}$alkyl, hydroxyl, =O (oxo), $C_{1-4}$alkyl, halo$C_{1-4}$alkyl, $C_{1-4}$alkoxy, hydroxyl$C_{1-4}$alkyl, di$C_{1-4}$alkylamino, and $C_{1-4}$alkoxy$C_{1-4}$alkylene; or
  $CH_2CN$, —$CH_3$, —$CH_2CH_3$, —$OCH_3$, —$CH(CH_3)$$CH_2OH$, —$CH(CH_3)$ OH, —$CH_2CH_2OH$, —$CH_2OH$, —$N(CH_3)_2$ and —$CH_2$—O—$CH_3$; or
  halogen, cyano, hydroxyl, =O (oxo), —$CH_3$ and —$CH_2CH_3$; or
  halogen, cyano, hydroxyl, =O (oxo), $C_{1-4}$alkoxy, di$C_{1-4}$alkylamino, and $C_{1-4}$alkyl; or
  $OCH_3$, —$N(CH_3)_2$, —$CH_3$ and —$CH_2CH_3$; or
  hydroxyl, =O (oxo) and —$CH_3$.

10. A compound according to claim 1, or a pharmaceutically acceptable salt thereof, wherein $R^6$ and $R^7$ join to form a Ring A and the compound of formula (I) is a compound of formula (XVIII):

(XVIII)

11. A compound according to claim 1, wherein the compound is selected from:
  (1R,3R)-8-[3-(4-chloro-2-methyl-2H-indazol-5-yl)-5-methyl-1H-pyrazolo[3,4-b]pyrazin-6-yl]-3-(trifluoromethyl)-8-azaspiro[4.5]decan-1-amine;

(1R)-8-[3-(4-chloro-2-methyl-2H-indazol-5-yl)-5-methyl-1H-pyrazolo[3,4-b]pyrazin-6-yl]-3,3-difluoro-8-azaspiro[4.5]decan-1-amine;
(4S)-8-[3-(4-chloro-2-methyl-2H-indazol-5-yl)-5-methyl-1H-pyrazolo[3,4-b]pyrazin-6-yl]-2-oxa-8-azaspiro[4.5]decan-4-amine;
(4S)-8-[3-(3,4-dichloro-2-methyl-2H-indazol-5-yl)-5-methyl-1H-pyrazolo[3,4-b]pyrazin-6-yl]-2-oxa-8-azaspiro[4.5]decan-4-amine;
(4S)-8-[3-(4-chloro-2-ethyl-2H-indazol-5-yl)-5-methyl-1H-pyrazolo[3,4-b]pyrazin-6-yl]-2-oxa-8-azaspiro[4.5]decan-4-amine;
(3S,4S)-8-[3-(4-chloro-2-methyl-2H-indazol-5-yl)-5-methyl-1H-pyrazolo[3,4-b]pyrazin-6-yl]-3-methyl-2-oxa-8-azaspiro[4.5]decan-4-amine;
{6-[(1R)-1-amino-3,3-difluoro-8-azaspiro[4.5]decan-8-yl]-3-(4-chloro-2-methyl-2H-indazol-5-yl)-1H-pyrazolo[3,4-b]pyrazin-5-yl}methanol;
{6-[(3S,4S)-4-amino-3-methyl-2-oxa-8-azaspiro[4.5]decan-8-yl]-3-(3,4-dichloro-2-methyl-2H-indazol-5-yl)-1H-pyrazolo[3,4-b]pyrazin-5-yl}methanol;
(3S,4S)-8-[3-(5-chloro-3-methoxyquinoxalin-6-yl)-5-methyl-1H-pyrazolo[3,4-b]pyrazin-6-yl]-3-methyl-2-oxa-8-azaspiro[4.5]decan-4-amine;
(3S,4S)-8-{3-[5-chloro-3-(dimethylamino) quinoxalin-6-yl]-5-methyl-1H-pyrazolo[3,4-b]pyrazin-6-yl}-3-methyl-2-oxa-8-azaspiro[4.5]decan-4-amine;
(4S)-8-{3-[5-chloro-3-(dimethylamino) quinoxalin-6-yl]-5-methyl-1H-pyrazolo[3,4-b]pyrazin-6-yl}-2-oxa-8-azaspiro[4.5]decan-4-amine;
7-{6-[(1R)-1-amino-8-azaspiro[4.5]decan-8-yl]-5-methyl-1H-pyrazolo[3,4-b]pyrazin-3-yl}-8-chloro-N,N-dimethylquinoxalin-2-amine;
(4S)-8-[3-(5-chloro-3-methoxyquinoxalin-6-yl)-5-methyl-1H-pyrazolo[3,4-b]pyrazin-6-yl]-2-oxa-8-azaspiro[4.5]decan-4-amine;
(1R)-8-[3-(5-chloro-3-methoxyquinoxalin-6-yl)-5-methyl-1H-pyrazolo[3,4-b]pyrazin-6-yl]-8-azaspiro[4.5]decan-1-amine;
(1R)-8-[3-(3,4-dichloro-2-methyl-2H-indazol-5-yl)-5-methyl-1H-pyrazolo[3,4-b]pyrazin-6-yl]-8-azaspiro[4.5]decan-1-amine;
{6-[(1R)-1-amino-3,3-difluoro-8-azaspiro[4.5]decan-8-yl]-3-(3,4-dichloro-2-methyl-2H-indazol-5-yl)-1H-pyrazolo[3,4-b]pyrazin-5-yl}methanol;
{6-[(3S,4S)-4-amino-3-methyl-2-oxa-8-azaspiro[4.5]decan-8-yl]-3-[5-chloro-3-(dimethylamino) quinoxalin-6-yl]-1H-pyrazolo[3,4-b]pyrazin-5-yl}methanol;
{6-[(1R,3S)-1-amino-3-fluoro-8-azaspiro[4.5]decan-8-yl]-3-(3,4-dichloro-2-methyl-2H-indazol-5-yl)-1H-pyrazolo[3,4-b]pyrazin-5-yl}methanol;
{6-[(3S,4S)-4-amino-3-methyl-2-oxa-8-azaspiro[4.5]decan-8-yl]-3-(4-chloro-2,3-dimethyl-2H-indazol-5-yl)-1H-pyrazolo[3,4-b]pyrazin-5-yl}methanol;
{6-[(3S,4S)-4-amino-3-methyl-2-oxa-8-azaspiro[4.5]decan-8-yl]-3-(5-chloro-3-methoxyquinoxalin-6-yl)-1H-pyrazolo[3,4-b]pyrazin-5-yl}methanol;
(3S,4S)-8-{3-[3-(azetidin-1-yl)-5-chloroquinoxalin-6-yl]-5-methyl-1H-pyrazolo[3,4-b]pyrazin-6-yl}-3-methyl-2-oxa-8-azaspiro[4.5]decan-4-amine; and
(3S,4S)-8-{3-[5-chloro-3-(morpholin-4-yl) quinoxalin-6-yl]-5-methyl-1H-pyrazolo[3,4-b]pyrazin-6-yl}-3-methyl-2-oxa-8-azaspiro[4.5]decan-4-amine,
or a pharmaceutically acceptable salt thereof.

12. A combination comprising a compound of formula (I) as defined in claim 1, or a pharmaceutically acceptable salt thereof, with one or more (e.g. 1 or 2) other therapeutic agents.

13. A pharmaceutical composition comprising:
a compound of formula (I) as defined in claim 1, or a pharmaceutically acceptable salt thereof; or
a combination comprising a compound of formula (I) as defined in claim 1, or a pharmaceutically acceptable salt thereof, with one or more other therapeutic agents.

14. A compound of formula (I) according to claim 1, or a pharmaceutically acceptable salt thereof, wherein:
Ring A is optionally substituted by 1, 2, or 3 $R^{10}$ groups; and/or
Ring A is a five-membered nitrogen-containing heterocyclic aromatic or non-aromatic ring wherein the heterocyclic ring optionally contains one or two additional heteroatoms selected from N, O and S; and/or
$R^8$ is —$CF_3$, chlorine or fluorine; and/or
$R^9$ is —$CH_3$, —$CF_3$ or chlorine; and/or
$R^{10}$ is independently selected from —$CH_2$—CN, —$CH_3$, —$CH(CH_3)_2$, —$CH_2CH_3$, —$CHF_2$, —$OCH_3$, —$OCH_2CH_3$, —$OCH(CH_3)_2$, —$CH_2C(CH_3)_2OH$, —$CH(CH_3)CH_2OH$, —$CH(CH_3)OH$, —$CH_2CH_2OH$, —$CH_2OH$, —$CH_2$—O—$CH_3$, —$CH_2$—$CH_2$—O—$CH_3$, —$SO_2CH_3$, —$N(CH_3)_2$, —$CH_2NH_2$, —$SO_2NR^x{}_2$, and —$CH_2SO_2NR^x{}_2$,
wherein $R^x$ is independently selected from H and $C_{1-6}$alkyl.

15. A compound of formula (I) according to claim 1, or a pharmaceutically acceptable salt thereof, wherein:
X is $CR^4R^5$, and $R^4$ and $R^5$ are independently selected from C1alkyl optionally substituted by one or more halogens; or
X is $CR^4R^5$, and $R^4$ is hydrogen and $R^5$ is selected from fluorine, chlorine, bromine, iodine, monohalomethyl, dihalomethyl and trihalomethyl, wherein halo is selected from fluorine, chlorine, bromine or iodine; or
X is $CR^4R^5$, and $R^4$ is hydrogen and $R^5$ is fluorine.

16. A compound of formula (I) according to claim 1, or a pharmaceutically acceptable salt thereof, wherein $R^8$ is chlorine.

17. A compound of formula (I) according to claim 8, or a pharmaceutically acceptable salt thereof, wherein the moiety

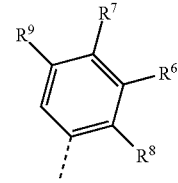

is selected from:

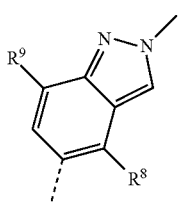 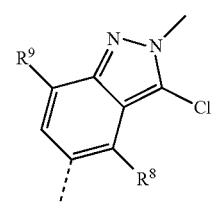

or is selected from:

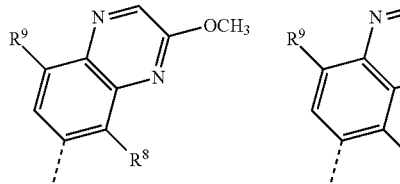

18. The compound {6-[(1R)-1-amino-3,3-difluoro-8-azaspiro[4.5]decan-8-yl]-3-(4-chloro-2-methyl-2H-indazol-5-yl)-1H-pyrazolo[3,4-b]pyrazin-5-yl}methanol:

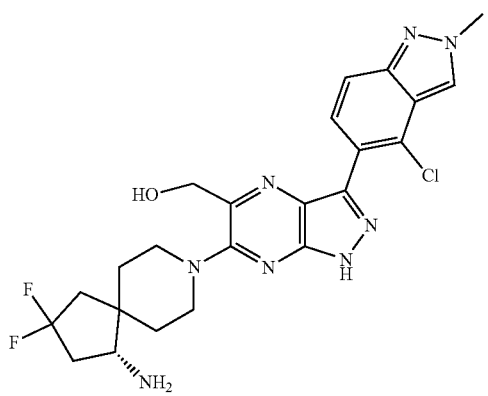

or a pharmaceutically acceptable salt thereof.

19. The compound {6-[(3S,4S)-4-amino-3-methyl-2-oxa-8-azaspiro[4.5]decan-8-yl]-3-(3,4-dichloro-2-methyl-2H-indazol-5-yl)-1H-pyrazolo[3,4-b]pyrazin-5-yl}methanol:

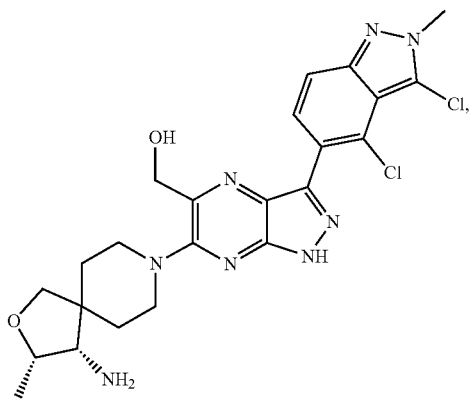 [SMILES: C[C@@H]1OCC2(CCN(c3nc4[nH]nc(-c5ccc6nn(C)c(Cl)c6c5Cl)c4nc3CO)CC2)[C@@H]1N]

or a pharmaceutically acceptable salt thereof.

20. The compound (3S,4S)-8-[3-(5-chloro-3-methoxyquinoxalin-6-yl)-5-methyl-1H-pyrazolo[3,4-b]pyrazin-6-yl]-3-methyl-2-oxa-8-azaspiro[4.5]decan-4-amine:

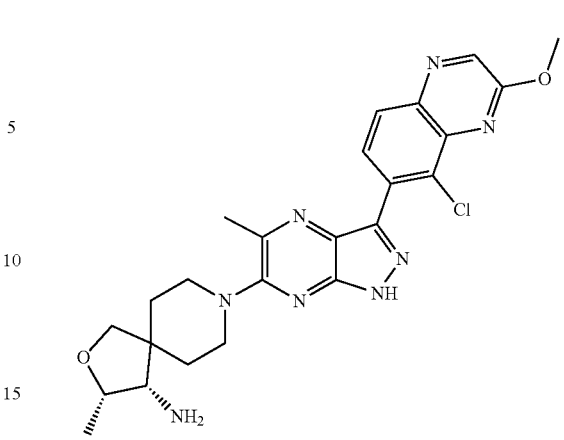

or a pharmaceutically acceptable salt thereof.

21. The compound (3S,4S)-8-{3-[5-chloro-3-(dimethylamino)quinoxalin-6-yl]-5-methyl-1H-pyrazolo[3,4-b]pyrazin-6-yl}-3-methyl-2-oxa-8-azaspiro[4.5]decan-4-amine:

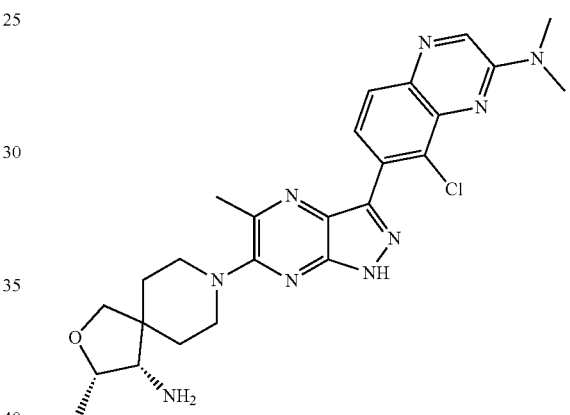

or a pharmaceutically acceptable salt thereof.

22. The compound (1R)-8-[3-(3,4-dichloro-2-methyl-2H-indazol-5-yl)-5-methyl-1H-pyrazolo[3,4-b]pyrazin-6-yl]-8-azaspiro[4.5]decan-1-amine:

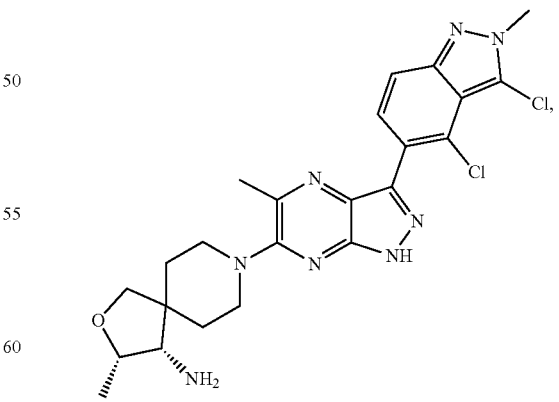

or a pharmaceutically acceptable salt thereof.

23. The compound {6-[(1R)-1-amino-3,3-difluoro-8-azaspiro[4.5]decan-8-yl]-3-(3,4-dichloro-2-methyl-2H-indazol-5-yl)-1H-pyrazolo[3,4-b]pyrazin-5-yl}methanol:

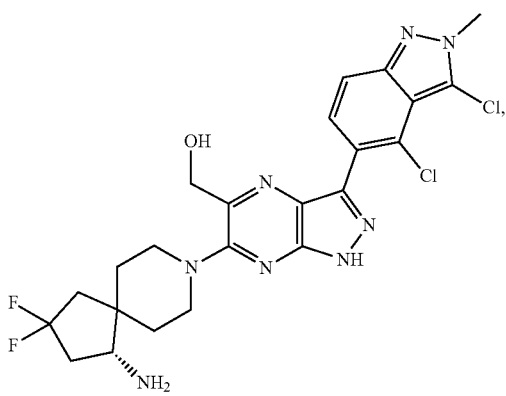 [SMILES: Cn1nc2ccc(-c3n[nH]c4nc(N5CCC6(CC5)CC(F)(F)C[C@H]6N)c(CO)nc34)c(Cl)c2c1Cl]

or a pharmaceutically acceptable salt thereof.

24. The compound {6-[(1R,3S)-1-amino-3-fluoro-8-azaspiro[4.5]decan-8-yl]-3-(3,4-dichloro-2-methyl-2H-indazol-5-yl)-1H-pyrazolo[3,4-b]pyrazin-5-yl}methanol:

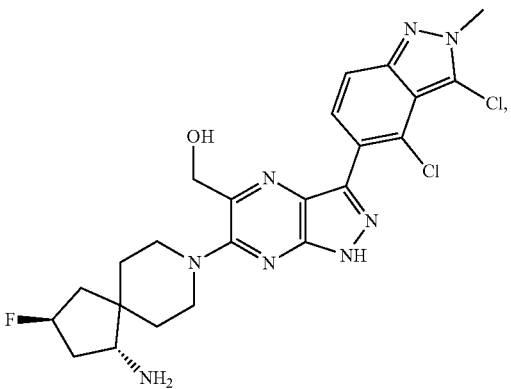 [SMILES: Cn1nc2ccc(-c3n[nH]c4nc(N5CCC6(CC5)C[C@H](F)C[C@H]6N)c(CO)nc34)c(Cl)c2c1Cl]

or a pharmaceutically acceptable salt thereof.

25. A combination comprising a compound of formula (I) according to claim 12 or a pharmaceutically acceptable salt thereof, wherein the therapeutic agents are anti-cancer agents.

26. A combination comprising a compound of formula (I) according to claim 13 or a pharmaceutically acceptable salt thereof, wherein the therapeutic agents are anti-cancer agents.

27. A pharmaceutical composition comprising the compound of claim 18 or a pharmaceutically acceptable salt thereof and a pharmaceutically acceptable excipient.

28. A pharmaceutical composition comprising the compound of claim 19 or a pharmaceutically acceptable salt thereof and a pharmaceutically acceptable excipient.

29. A pharmaceutical composition comprising the compound of claim 20 or a pharmaceutically acceptable salt thereof and a pharmaceutically acceptable excipient.

30. A pharmaceutical composition comprising the compound of claim 21 or a pharmaceutically acceptable salt thereof and a pharmaceutically acceptable excipient.

31. A pharmaceutical composition comprising the compound of claim 22 or a pharmaceutically acceptable salt thereof and a pharmaceutically acceptable excipient.

32. A pharmaceutical composition comprising the compound of claim 23 or a pharmaceutically acceptable salt thereof and a pharmaceutically acceptable excipient.

33. A pharmaceutical composition comprising the compound of claim 24 or a pharmaceutically acceptable salt thereof and a pharmaceutically acceptable excipient.

* * * * *